July 4, 1950 C. E. LOMAX 2,513,426
TELEPHONE SYSTEM, INCLUDING A LINE FINDER ALLOTTER
Filed Oct. 11, 1946 22 Sheets-Sheet 1

Inventor
Clarence E. Lomax
By
Davis, Lindsey, Smith & Shonts
Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 2

Inventor
Clarence E. Lomax
By
Davis, Lindsey, Smith & Shontz
Attorneys

TELEPHONE SYSTEM, INCLUDING A LINE FINDER ALLOTTER

Filed Oct. 11, 1946 22 Sheets-Sheet 3

INVENTOR.
Clarence E. Lomax
BY
Davis, Lindsey, Smith & Shoots
Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 4

INVENTOR.
Clarence E. Lomax

BY
Davis, Lindsey, Smith & Shonts

Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 5

INVENTOR.
Clarence E. Lomax

BY

Davis, Lindsey, Smith & Shoutz

Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 6

*INVENTOR.*
Clarence E. Lomax
*BY*
Davis, Lindsey, Smith & Shonts
Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 7

INVENTOR.
Clarence E. Lomax
BY
Davis, Lindsey, Smith & Shonts
Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 8

INVENTOR.
Clarence E. Lomax
BY
Davis, Lindsey, Smith & Shonts
Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 9

INVENTOR.
Clarence E. Lomax

BY
Davis, Lindsey, Smith & Shonts
ATTORNEYS

July 4, 1950 C. E. LOMAX 2,513,426

TELEPHONE SYSTEM, INCLUDING A LINE FINDER ALLOTTER

Filed Oct. 11, 1946 22 Sheets-Sheet 10

INVENTOR.
Clarence E. Lomax
BY
Davis, Lindsey, Smith & Shonts
Attorneys

TELEPHONE SYSTEM, INCLUDING A LINE FINDER ALLOTTER

Filed Oct. 11, 1946 22 Sheets-Sheet 11

INVENTOR.
Clarence E. Lomax
BY
Davis, Lindsey, Smith & Shonts
Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 12

INVENTOR.
Clarence E. Lomax
BY
Davis, Lindsey, Smith & Shonts
Attorneys

INVENTOR.
Clarence E. Lomax

BY

Davis, Lindsey, Smith & Shonts

Attorneys

INVENTOR.
Clarence E. Lomax
BY
Davis, Lindsey, Smith & Shonts
Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 15

INVENTOR.
Clarence E. Lomax
BY
Davis, Lindsey, Smith & Shonts
Attorneys

*INVENTOR.*
Clarence E. Lomax
*BY*
Davis, Lindsey, Smith & Shonts
Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 17

INVENTOR.
Clarence E. Lomax
BY
Davis, Lindsey, Smith & Shonts
Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 18

INVENTOR.
Clarence E. Lomax
BY
Davis, Lindsey, Smith & Shonts
Attorneys

TELEPHONE SYSTEM, INCLUDING A LINE FINDER ALLOTTER

Filed Oct. 11, 1946

INVENTOR.
Clarence E. Lomax
BY
Davis, Lindsey, Smith & Shonts
Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 20

INVENTOR.
Clarence E. Lomax
BY
Davis, Lindsey, Smith & Shonts
Attorneys

INVENTOR.
Clarence E. Lomax
BY
Davis, Lindsey, Smith & Shonts
Attorneys

July 4, 1950 C. E. LOMAX 2,513,426

TELEPHONE SYSTEM, INCLUDING A LINE FINDER ALLOTTER

Filed Oct. 11, 1946 22 Sheets-Sheet 22

*INVENTOR.*

Clarence E. Lomax

*BY*

Davis, Lindsey, Smith & Shoots

Attorneys

Patented July 4, 1950 2,513,426

UNITED STATES PATENT OFFICE 2,513,426

TELEPHONE SYSTEM, INCLUDING A LINE FINDER ALLOTTER

Clarence E. Lomax, Chicago, Ill., assignor to Automatic Electric Laboratories, Inc., Chicago, Ill., a corporation of Delaware Application October 11, 1946, Serial No. 702,846

18 Claims. (Cl. 179—18)

The present invention relates to telephone systems and more particularly to improvements in automatic switching equipment of the character used in a switching network including a plurality of relatively small exchanges which are trunk connected to a larger central office.

It is an object of the present invention to provide in a system of the character described, an improved distributor arrangement for preselecting an idle automatic switching link for the use of a calling line and for preselecting an additional idle switching link for the use of the calling line in response to the failure of the first preselected link to connect therewith.

It is a further object of the invention to provide in a system of the character described, an improved distributor arrangement for preselecting a second idle switching link for the use of a calling line in response to the failure of the first preselected link to find said line and which is arranged to transfer the preselecting function to a second distributor, which is common to another group of links, in response to the failure of the second preselected switching link to find said calling line.

According to another object of the invention, improved apparatus is provided in a first link distributor of the all relay type for transferring its preselecting function to a second link distributor a predetermined elapsed time interval after two unsuccessful attempts to find a calling line have been made by one or more of the links preselected by the first link distributor.

In accordance with still another object of the invention, each finder included in the system has access to two groups of lines and is provided with two test circuits each of which includes a test wiper in the finder and a test relay in the distributor for determining the particular one of two sets of wipers and the particular one of two switch-through relays to be utilized by the finder in seizing a calling line.

Figure 1A:
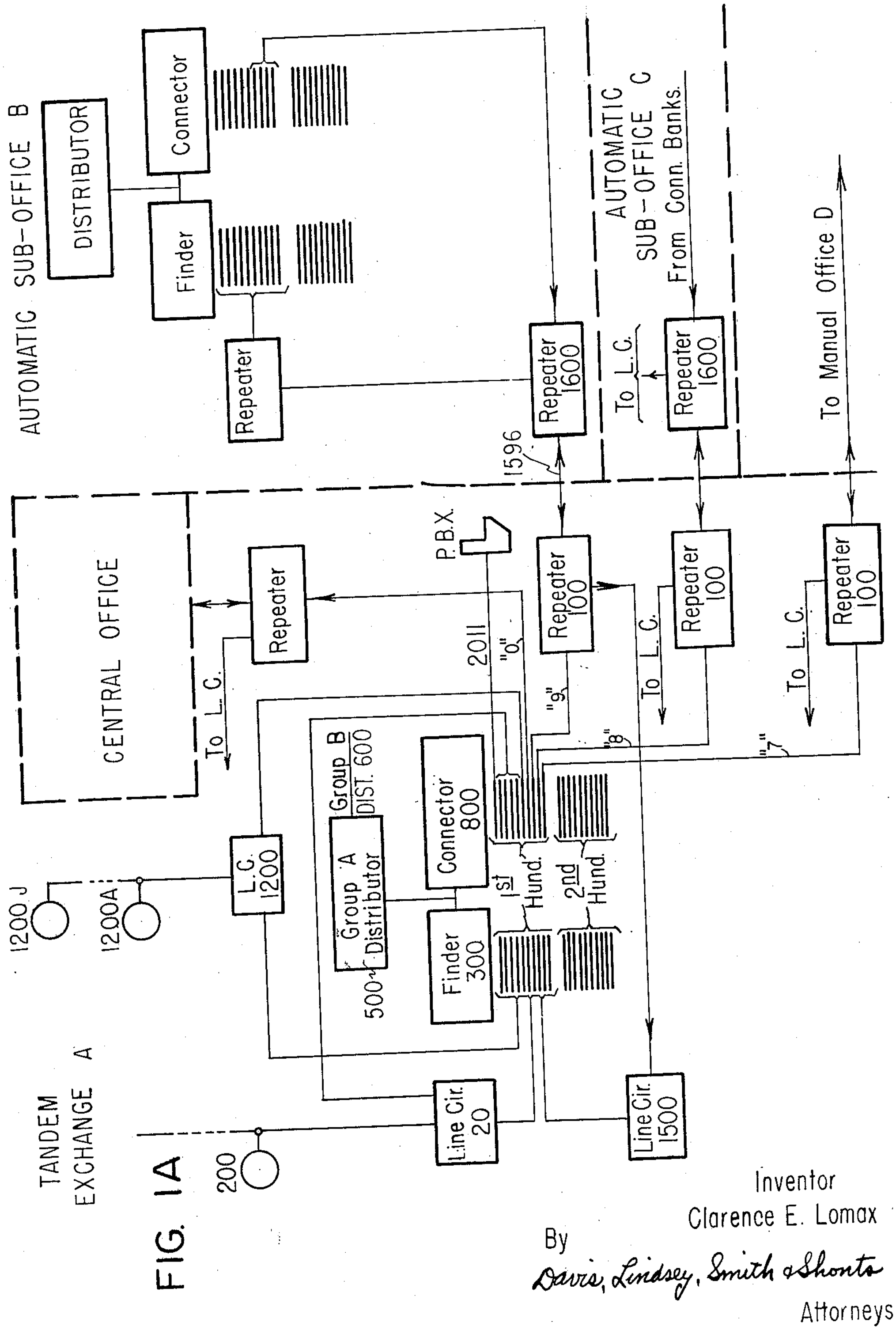
Figure 1B:
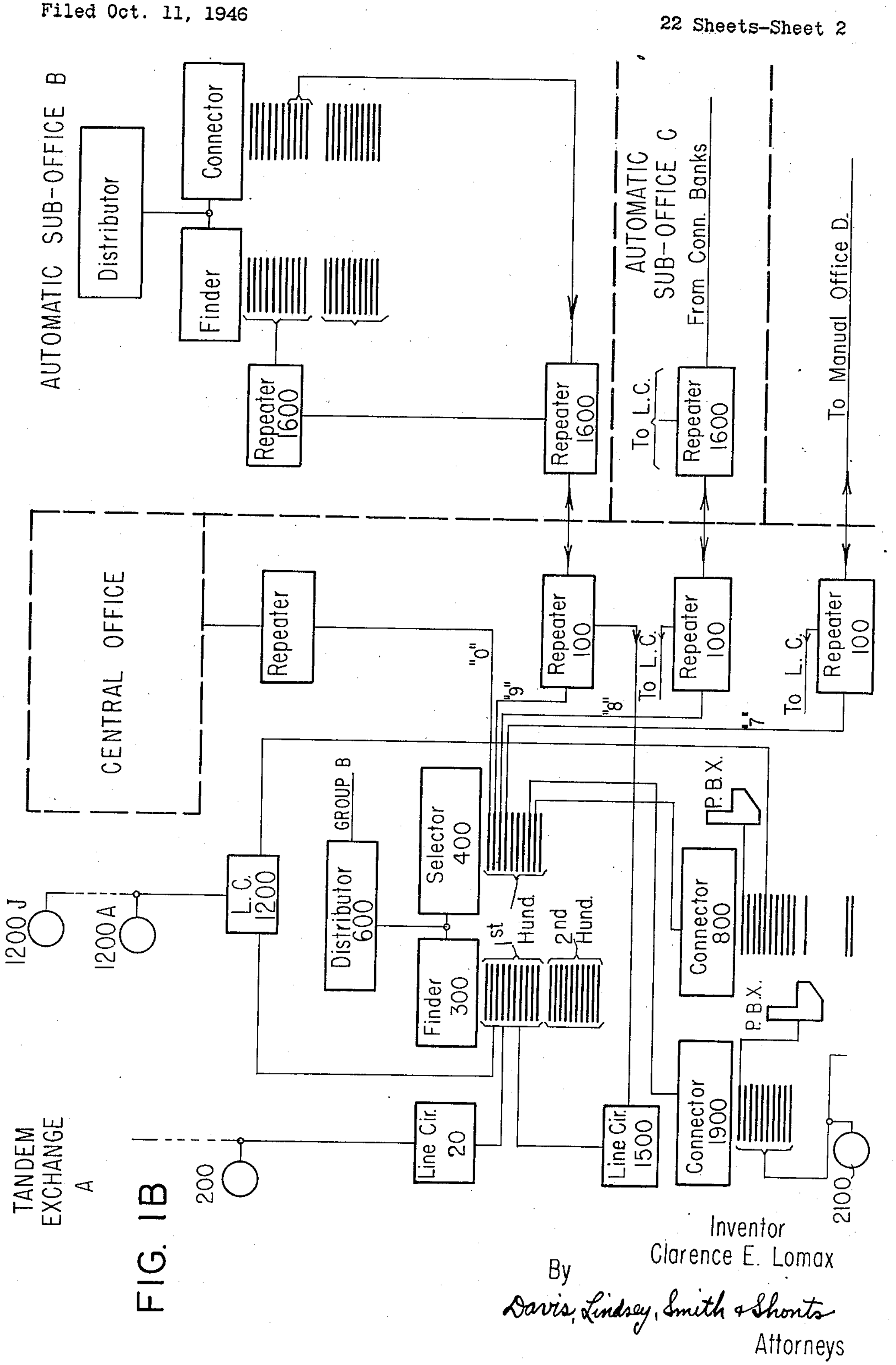
Figure 4:
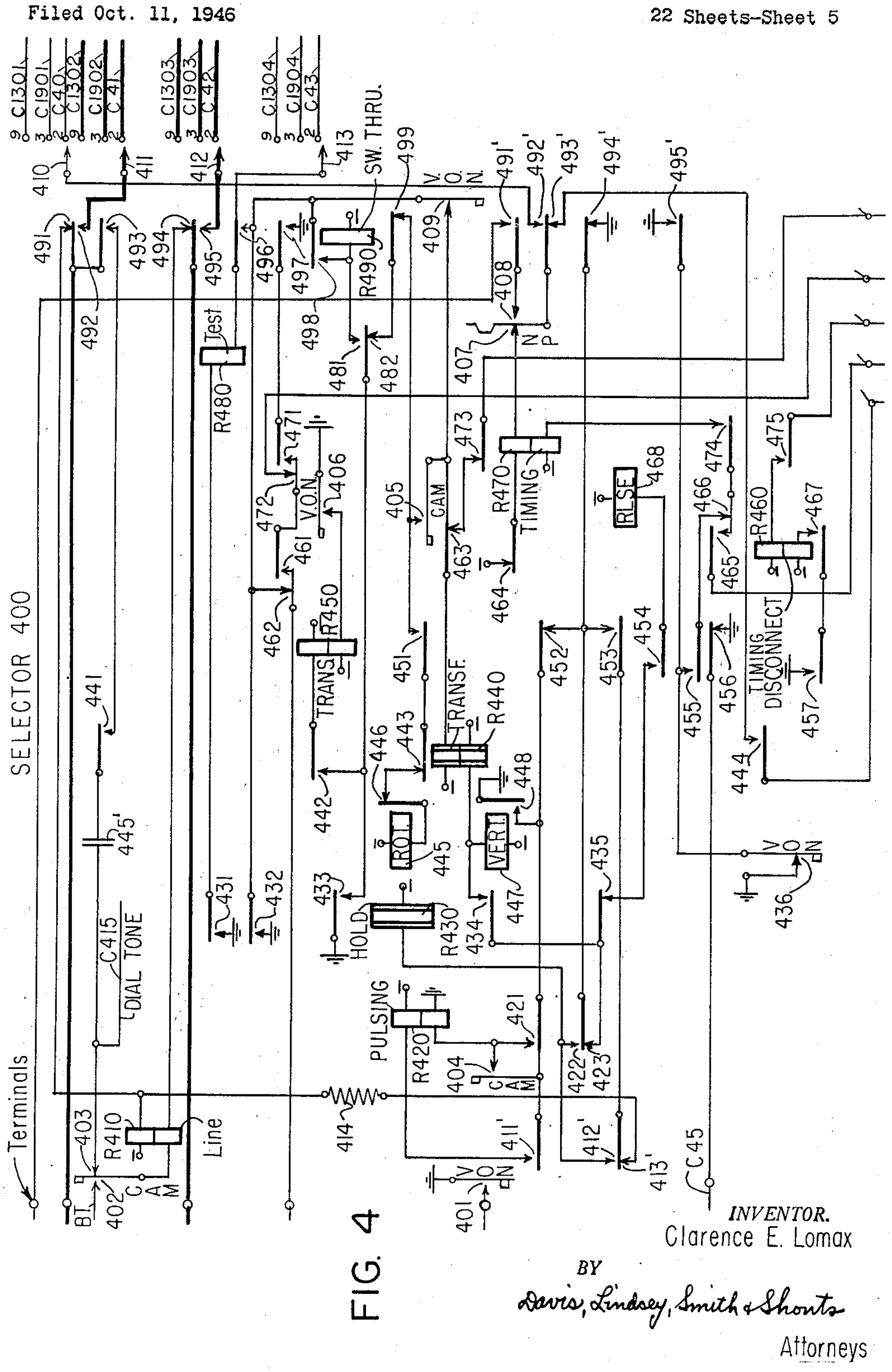
Figures 5, 22, 23:
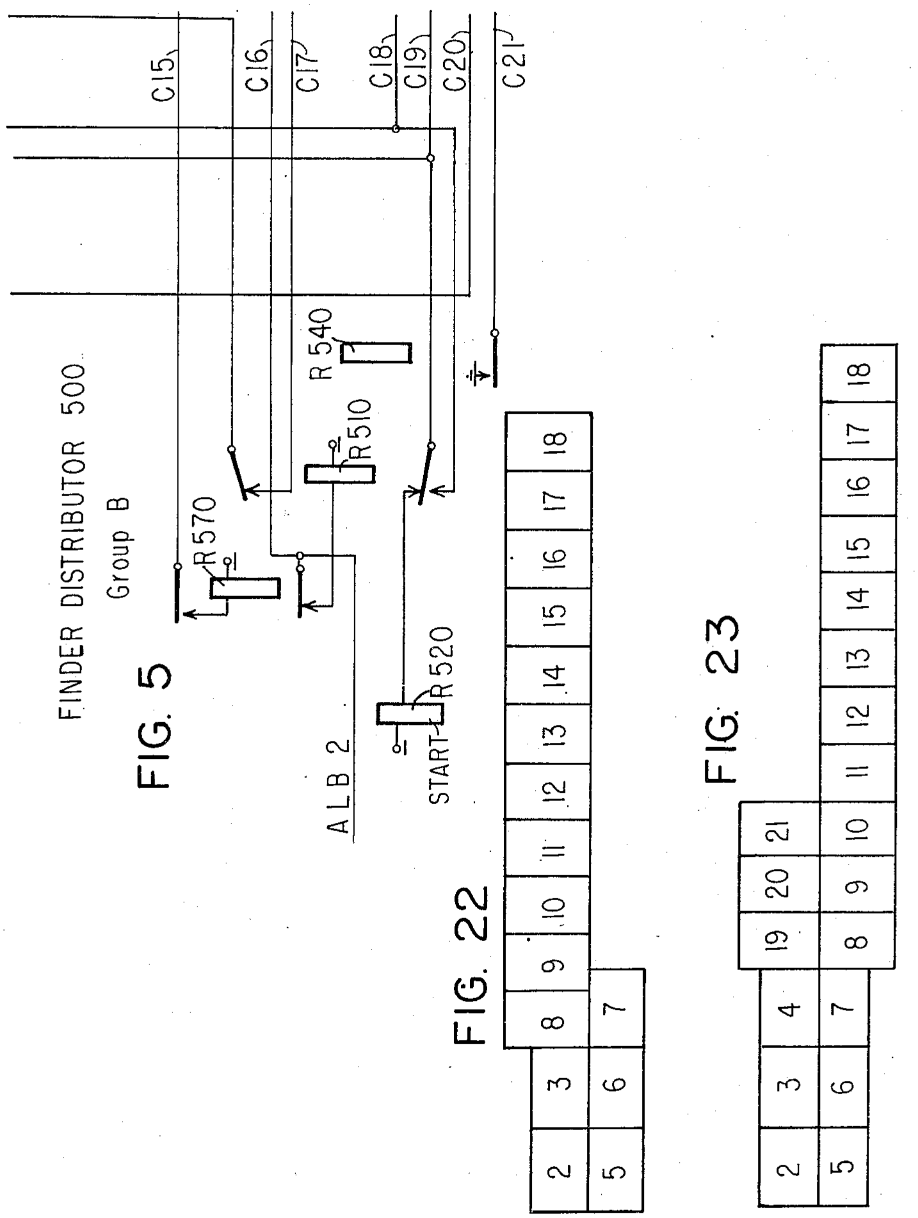
Figure 6:
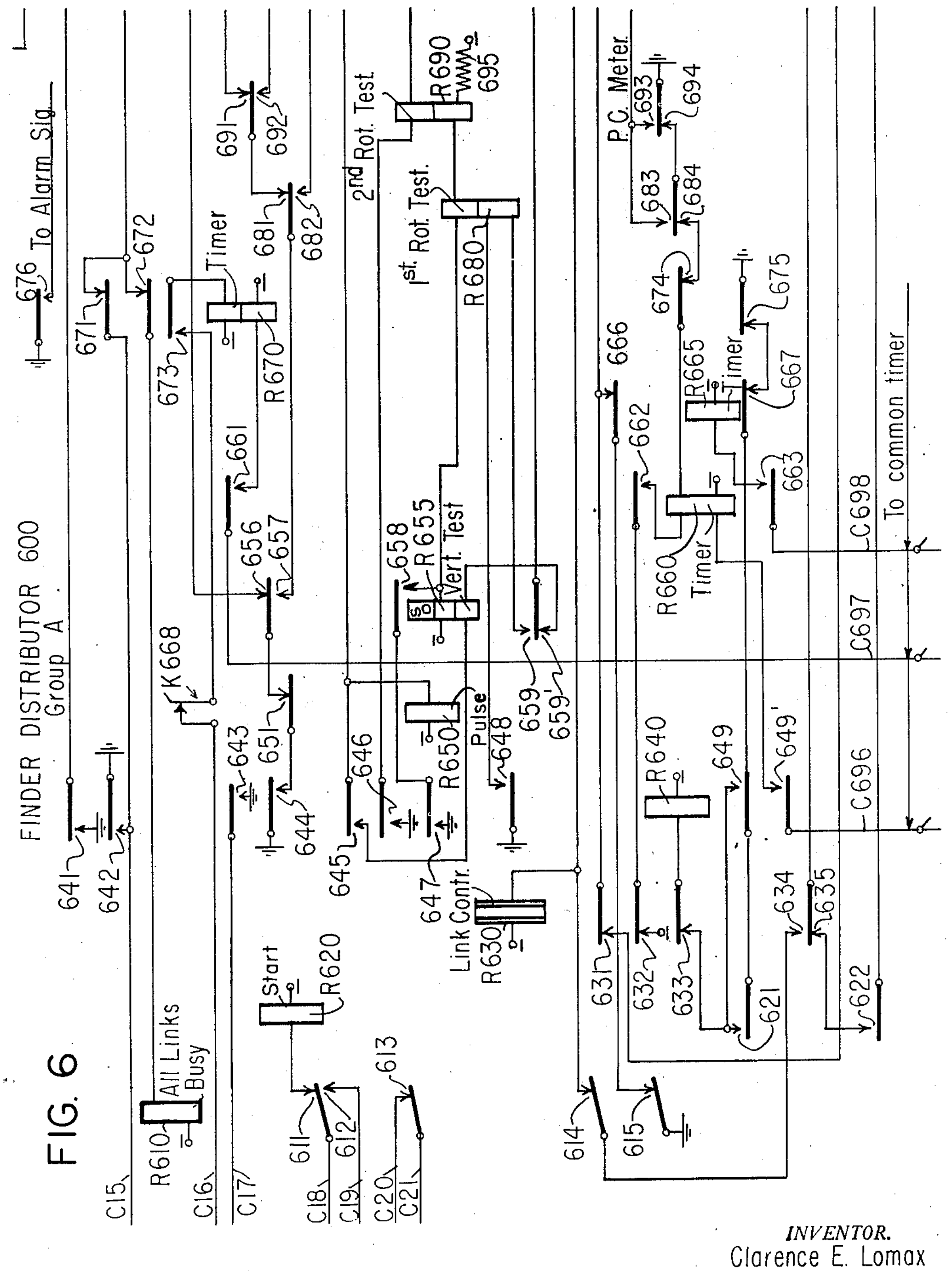
Figure 7:
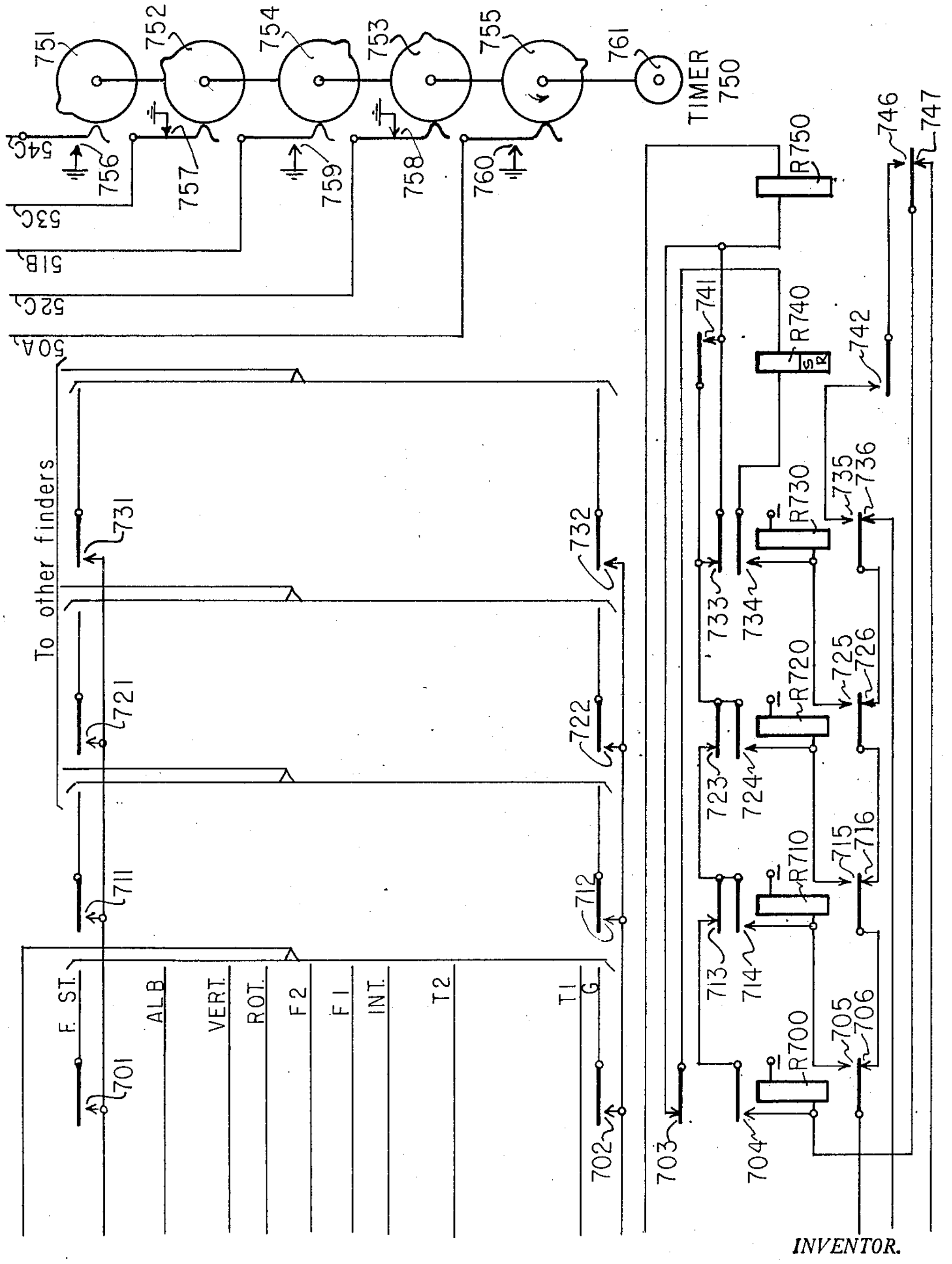

The invention, both as to its organization and method of operation, together with further objects and advantages thereof, will best be understood by reference to the specification taken in connection with the accompanying drawings in which Figs. 2, 3 and 5 to 18, inclusive, when combined in the manner shown in Fig. 22, show one embodiment of a small automatic telephone system of the type schematically illustrated in Fig. 1A, having incorporated therein certain of the features of the invention briefly referred to above; and Figs. 2 to 21, inclusive, when combined in the manner shown in Fig. 23, show one embodiment of a larger capacity automatic telephone system of the type schematically illustrated in Fig. 1B, also characterized by certain of the features of the invention briefly referred to above.

As indicated by the above reference to the drawings, two different exchanges are disclosed. Both of these exchanges are trunk connected to a distant central office. In the first or smaller exchange two hundred line finder-connector links are used so that the capacity of the exchange is limited to two hundred lines. In the second or larger exchange a selector switching stage has been interposed between the finders and connectors, thus providing finder-selector links in place of the previously mentioned finder-connector links and permits the capacity of the exchange to be increased to one thousand lines. Although the two systems have been separately illustrated in Figs. 22 and 23, it will be understood from the subsequent description of the apparatus involved that a smaller or two hundred line capacity exchange may have its capacity increased to one thousand lines by the insertion of a selector while still retaining all of the apparatus and the essential services provided in the smaller of the two exchanges. Furthermore, when additional connectors are required to serve the exchange which has been converted to a selector system, hundred line connectors of the type illustrated in Figs. 19 to 21, inclusive, are utilized instead of the two hundred line connectors of the type illustrated in Figs. 8 to 12, inclusive.

To consider first the small exchange arrangement schematically illustrated in Fig. 1A and, more particularly, illustrated in Figs. 2, 3 and 5 to 18, inclusive, of the drawings, the telephone lines, automatic switching apparatus and repeaters there illustrated may comprise, for example, a small tandem automatic exchange designed to serve a plurality of small suboffices of either automatic or manual type, and which is geographically located near a large town which is served by a central office. Interoffice trunks are used to provide communication facilities between the tandem office, the suboffices and the central office. For example, the automatic switching equipment of the tandem exchange A is illustrated as having access to the automatic suboffice C over a group of trunks which includes the trunk 1596. This trunk terminates in the tandem exchange A in a repeater 100 which is rendered accessible to the links on calls incoming from the automatic suboffice C through the provision of an associated line circuit. The automatic switching equipment of the illustrated tandem exchange A also has access to the automatic suboffice B and to the manual office D over groups of trunks terminating in repeaters similar to the repeater 100 and which are rendered accessible to the links of the tandem exchange A on calls incoming from the automatic suboffice B or the manual office D.

Figure 12:
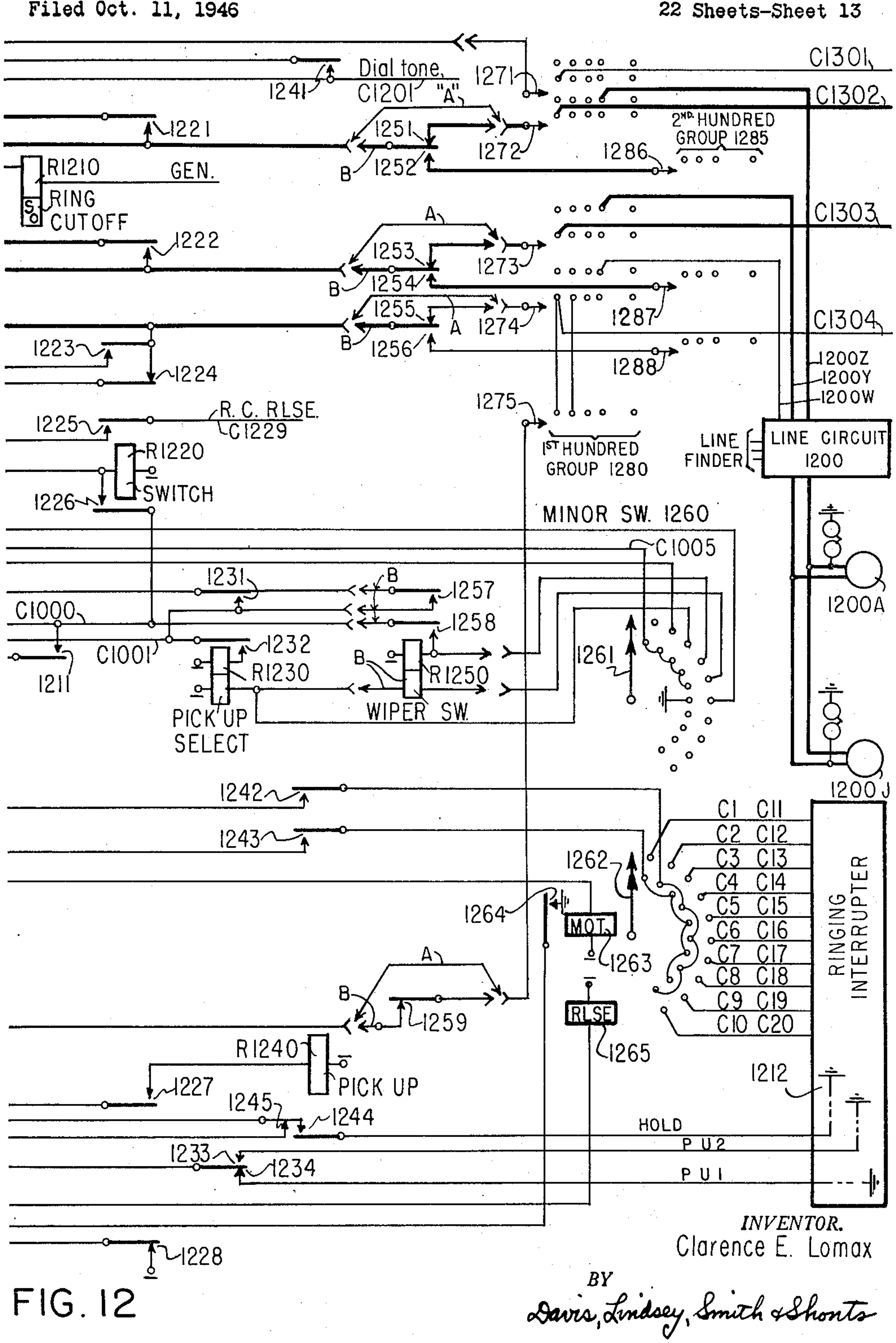

The subscriber lines terminating at the tandem exchange A may comprise single or private lines, full metallic multiparty lines arranged for divided ringing, and ground return lines. The illustrated line terminating in the line circuit 20 is shown as being of the party type and is arranged to serve a plurality of substations, such as the substation 200. Another subscriber line of the multiparty type, arranged for divided ringing, is illustrated in Fig. 12 of the drawings as being arranged to serve ten substations 1200A to 1200J, inclusive. This line terminates in the tandem exchange in a line circuit 1200. The lines extending to the line terminals of the links in the tandem exchange may also include one or more groups of branch exchange trunks. One such trunk 1596 is illustrated as terminating in the tandem exchange in a line circuit 1500. The line circuits 1200 and 1500 and the line circuits of the other subscriber lines extending to the tandem exchange are each identical to the line circuit 20 terminating the line of the substation 200.

Figure 13:
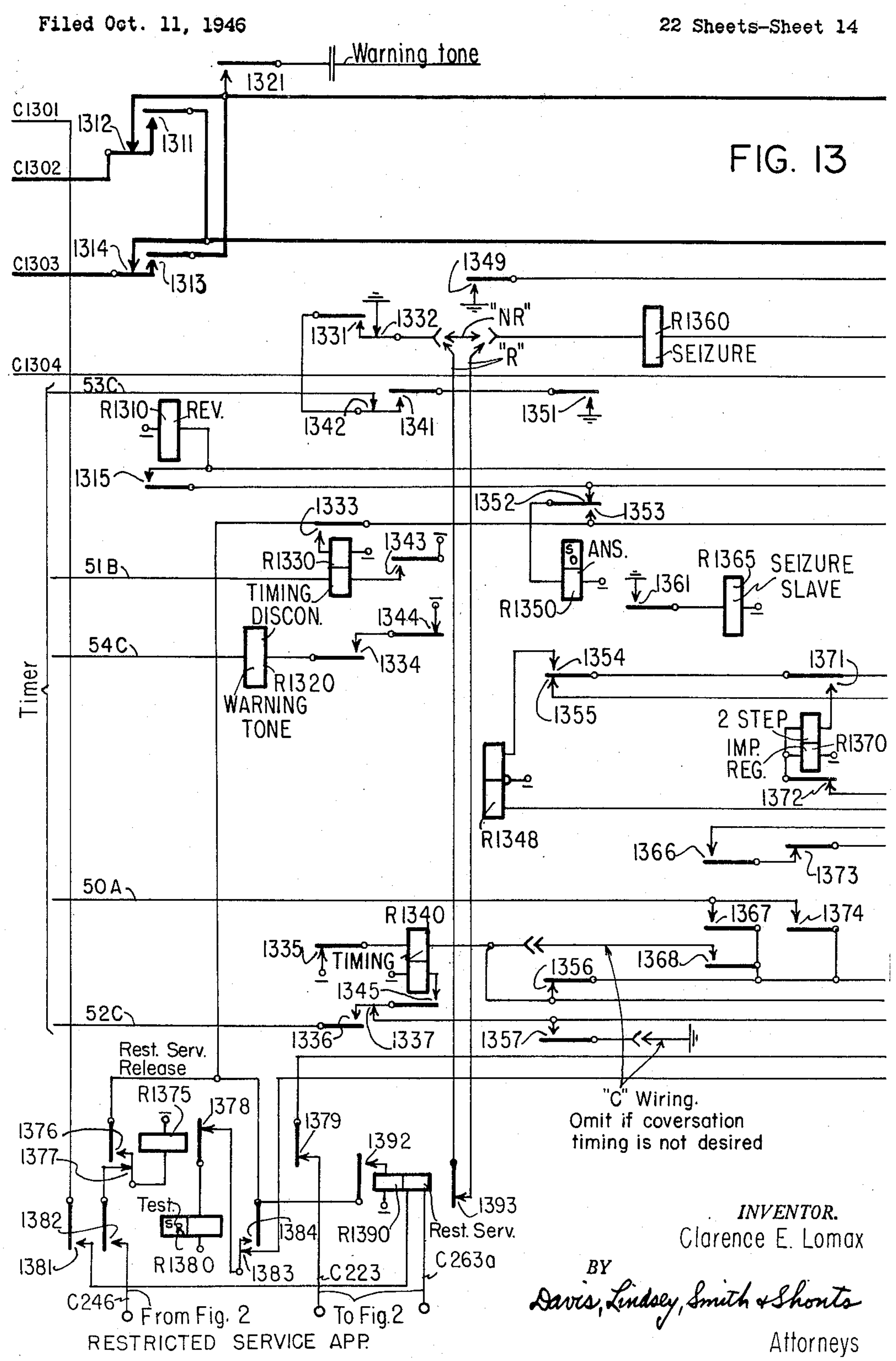
Figure 14:
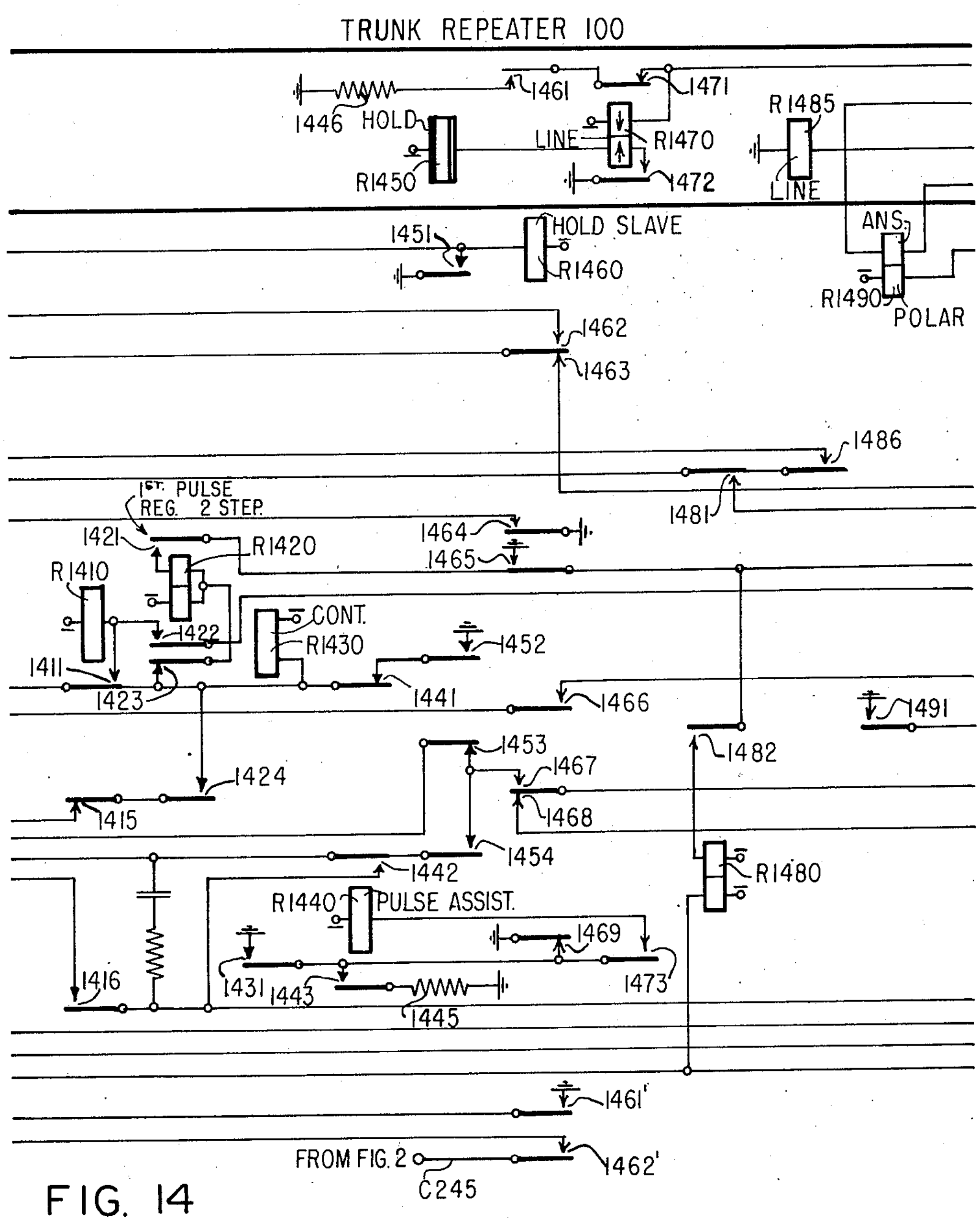
Figure 15:
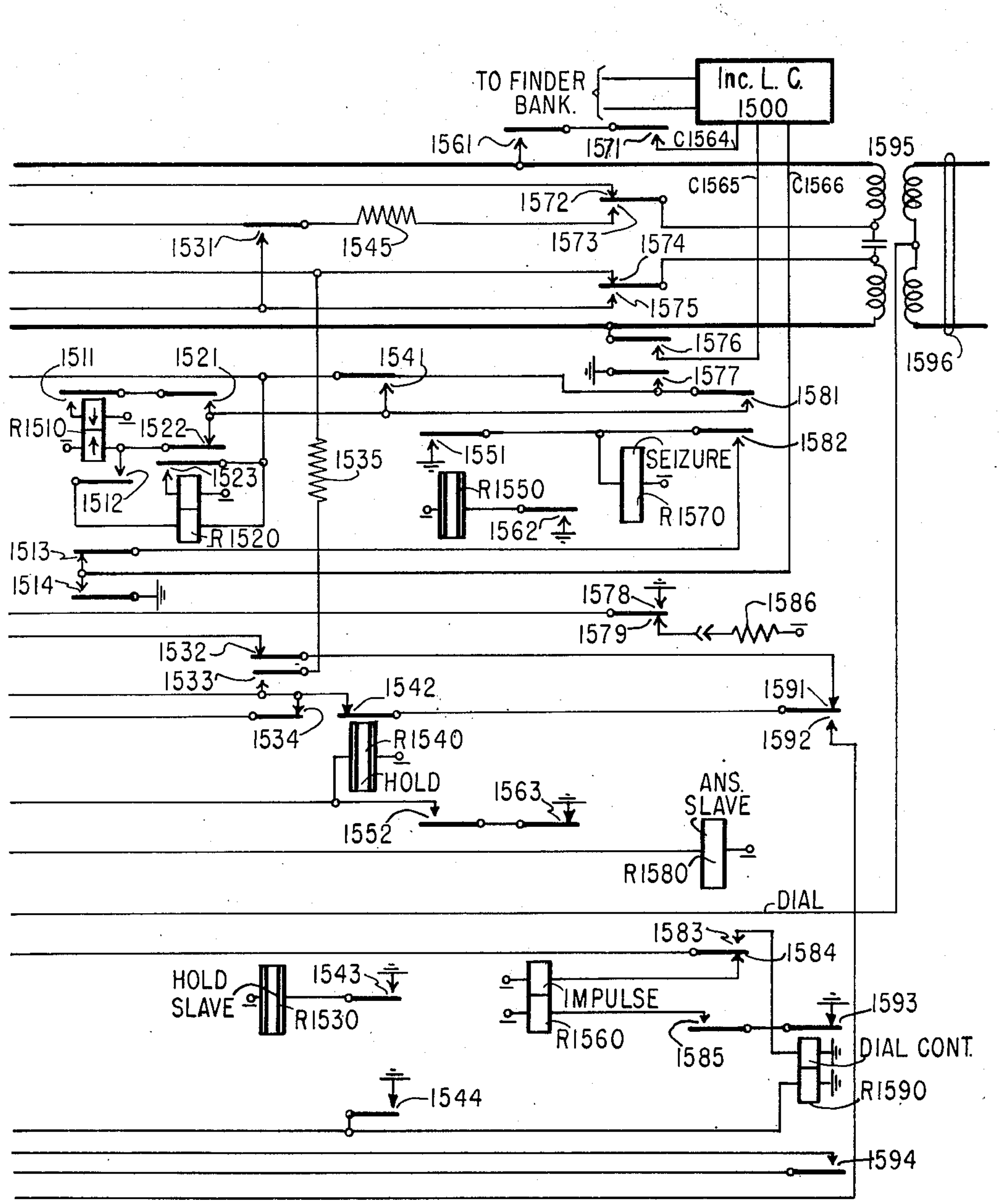
Figure 16:
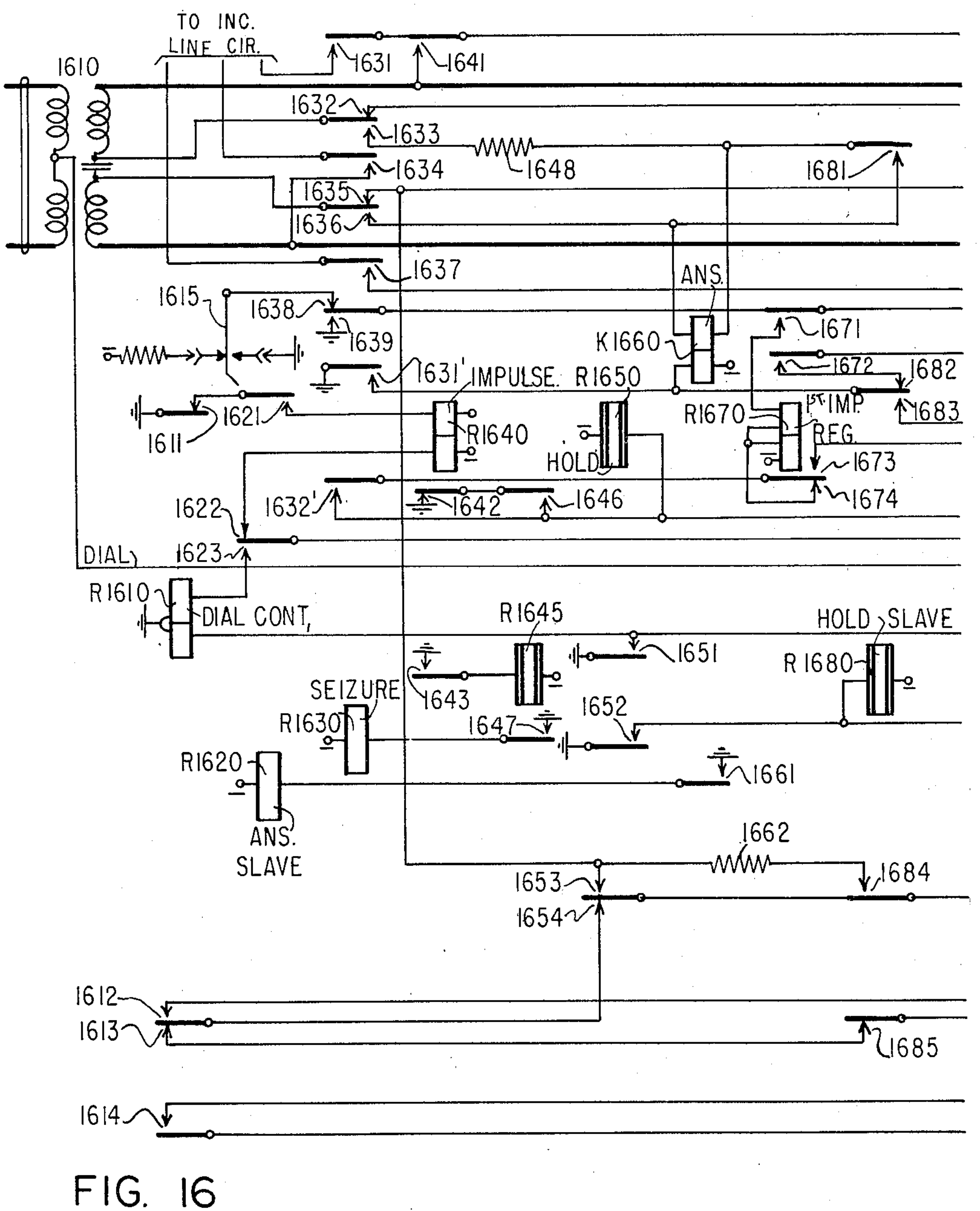
Figure 17:
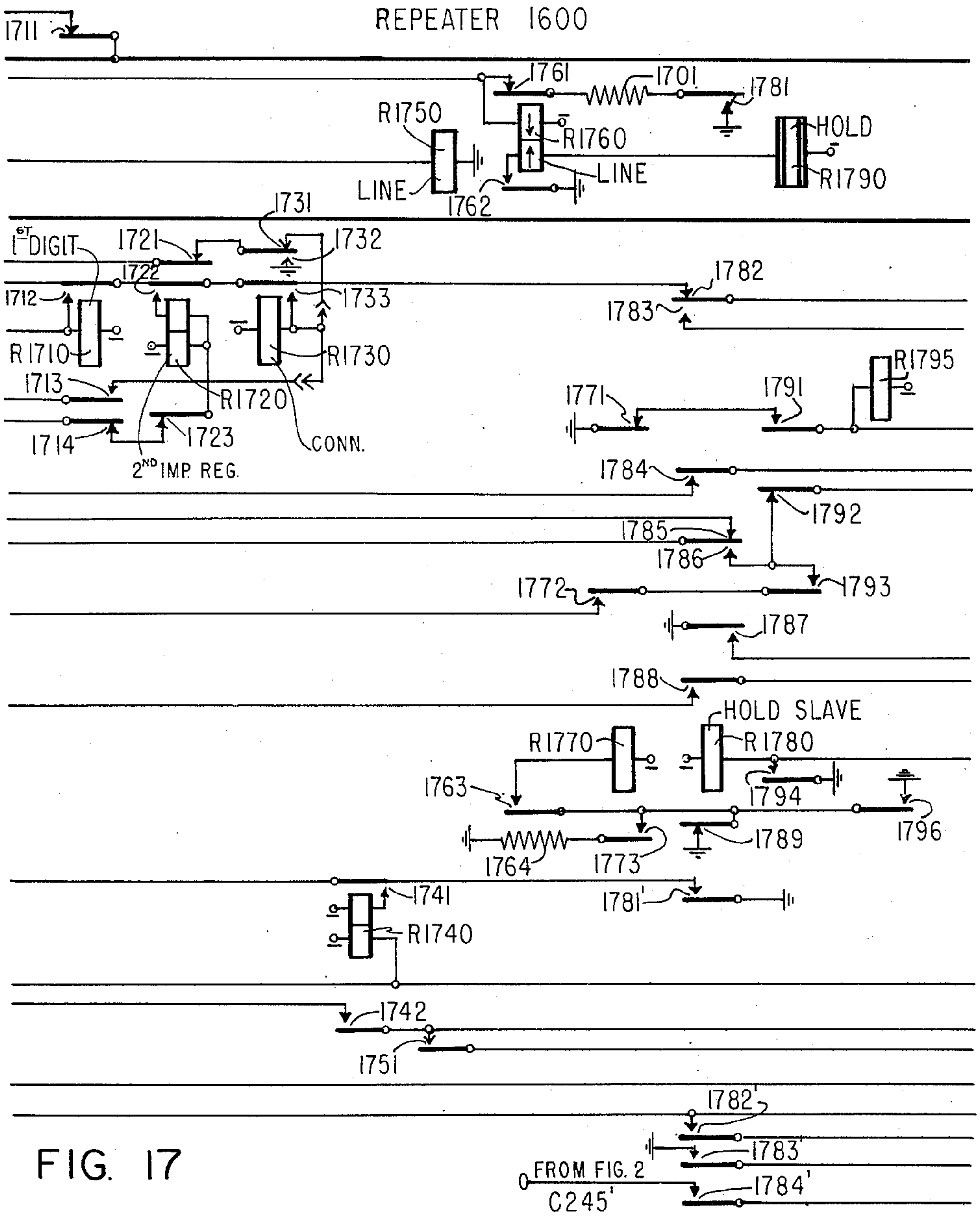
Figure 18:
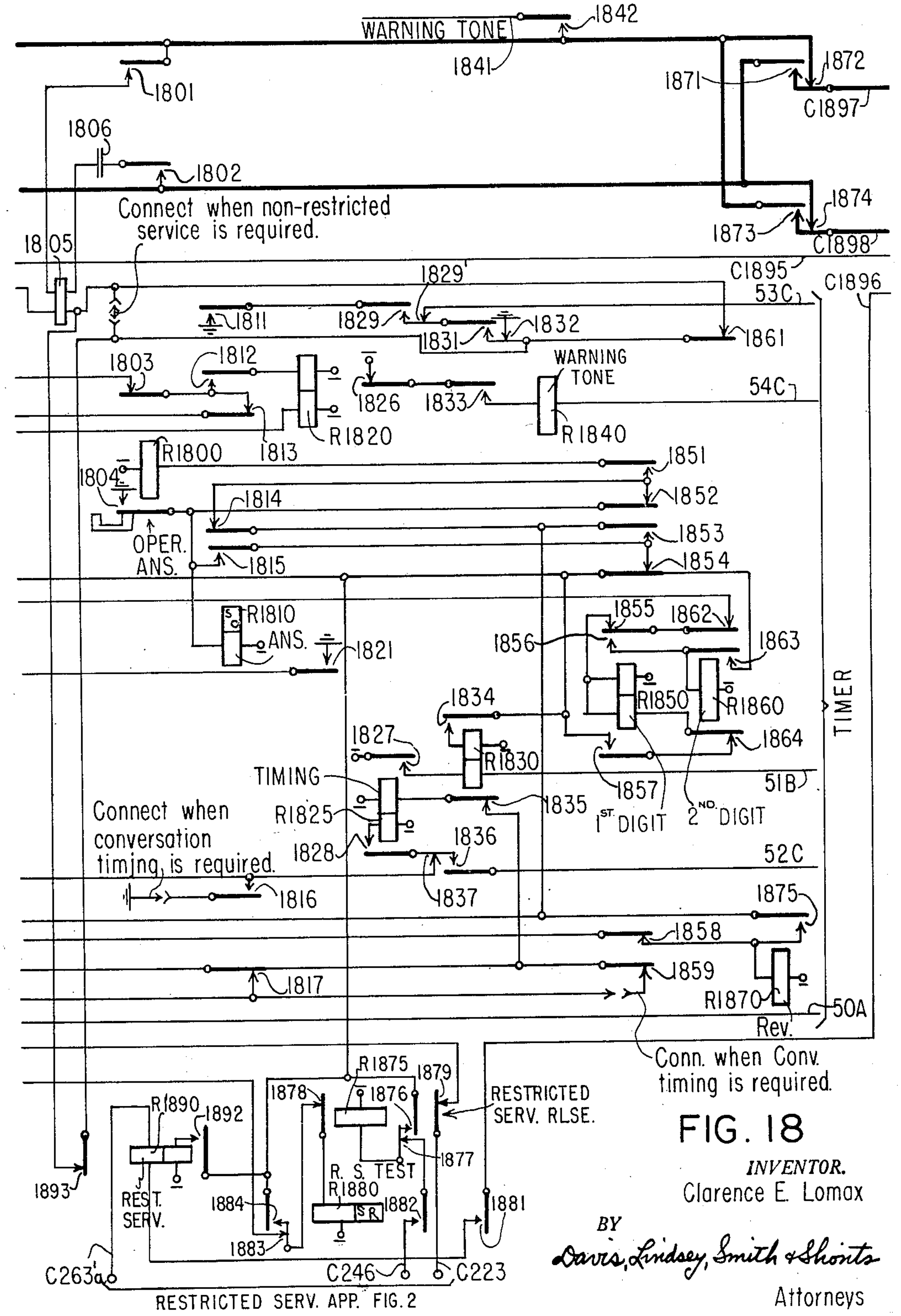

The repeaters, individually associated with the trunks which interconnect the tandem exchange with the automatic suboffices B and C and the manual office D, are identical in wiring arrangement to the repeater 100 illustrated in Figs. 13 to 15, inclusive. The operation of the repeater 100 will be fully apparent from the following detailed explanation thereof.

The automatic switching equipment provided in the tandem exchange for setting up connections between various subscriber lines and trunks terminating thereat comprises a plurality of finder-connector links. The finder portion of each finder-connector link is provided with two sets of wipers arranged to serve two hundred line terminals. The finder bank 330 associated with the first set of wipers, comprising the —1, +1, C1 and RST1 wipers, terminates the subscribers in the first hundred line group and the four groups of trunks lines. The finder bank 340 associated with the second set of wipers, comprising the —2, +2, C2 and RST2 wipers, terminates the subscriber lines in the second hundred group. Since the finder portion of the finder-connector link is of the well known Strowger type employing a Strowger switching mechanism, the contact field of the bank 330 is divided into ten levels of bank contacts and has each level provided with ten rows of contacts, whereby each of the abovementioned wipers, of the wiper set comprising the wipers —1, +1, C1 and RST1, has access to one hundred individual bank contacts. The contact bank 340 is identical with the contact bank 330 and is accesible to the wipers —2, +2, C2 and RST2. The finder portion 300 and the connector portion 800 of a finder-connector link is illustrated in Figs. 3, 8, 9, 10, 11 and 12 of the drawings.

Each of the finder-connector links provided in the tandem exchange A may be identical with the link which comprises a finder portion 300 and a connector portion 800, each link having access to the lines and trunks terminating at the tandem exchange. Preferably the links are arranged in first and second groups, each group being provided with a distributor individual thereto for assigning idle ones of the links in the group to the use of calling lines or trunks. The number of links included in each group is determined by the amount of traffic which the tandem exchange is required to handle, and for the purposes of illustration only it is assumed that each group includes four links. The first group of finder-connector links is provided with a link distributor 600 illustrated in Figs. 6 and 7 and the second group of finder-connector links is provided with a link distributor 500 which is partially illustrated in Fig. 5. The lines terminating at the tandem exchange A are also arranged in first and second groups, which groups are normally accessible to the links respectively associated with corresponding ones of the distributors, whereby calling lines in the first group of lines are normally assigned for use idle ones of the links in the first group of links, and calling lines in the second group of lines are normally assigned for use idle ones of the links in the second group of links, thereby rendering it possible simultaneously to extend two calls respectively initiated on two lines individually included in the two groups of lines. Furthermore, each of the two distributors is provided with a plurality of relays which are sequentially controlled by a common timer (not shown), whereby a second link is assigned to find a calling line in an associated group in the event that the first assigned link fails to find and connect with the calling line, and whereby the second distributor is controlled to assign a link in its associated group to find the calling line in the first group of lines in the event that the second assigned finder in the first group also fails to find and connect with the calling line. With this arrangement at least two links will be assigned in each group of links in an attempt to find and connect with a calling line. Furthermore, the distributors are so connected and arranged that when all of the links in an associated group are busy when a call is initiated on a line in that group the distributor common to the alternate group of links will be controlled to assign an associated link to find and connect with that calling line. In order to simplify the drawings and the description thereof the second finder distributor 500 associated with the second group of links has only been partially illustrated inasmuch as it is otherwise the same as the distributor 600.

Figure 3:
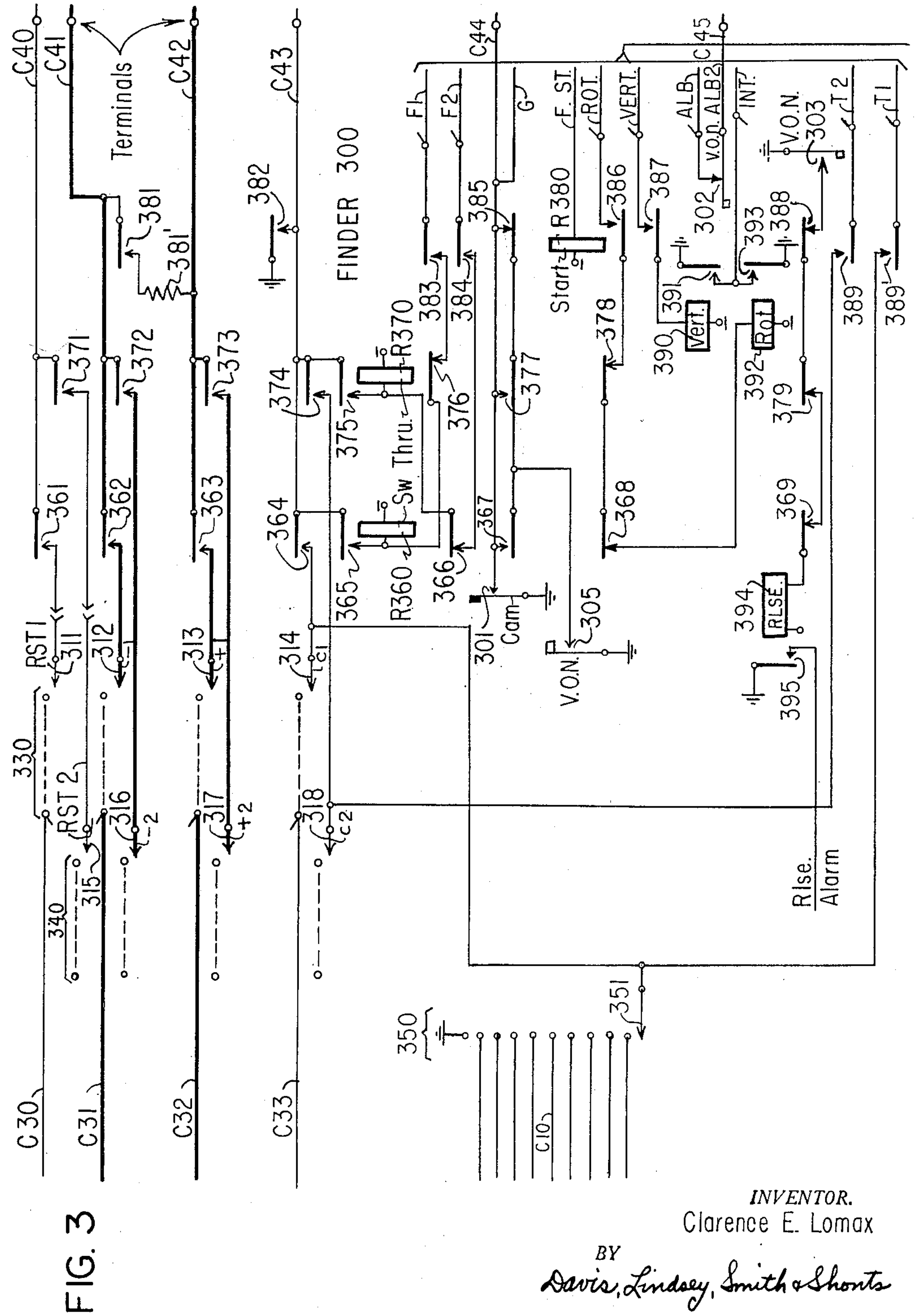
Figure 8:
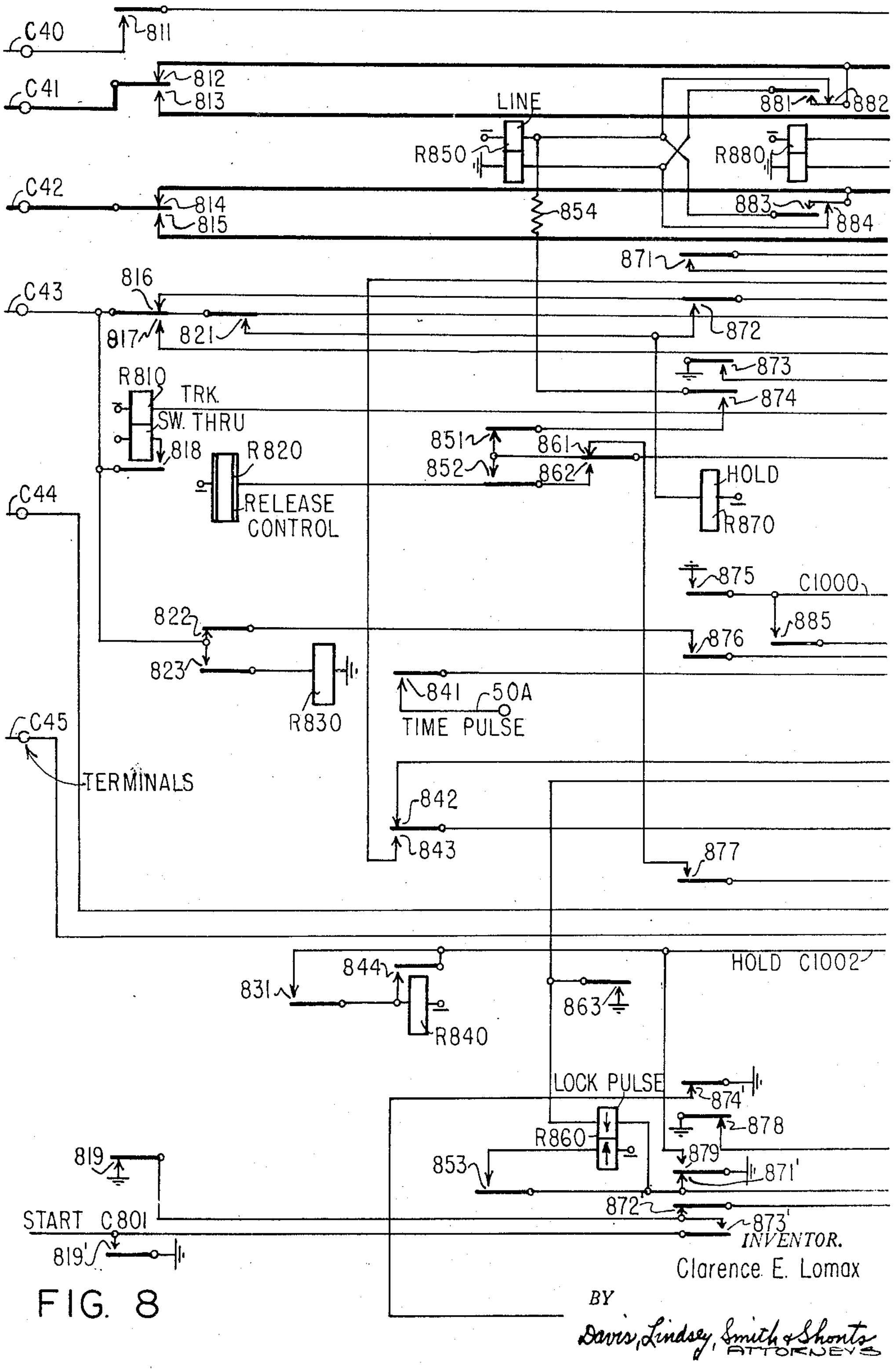
Figure 9:
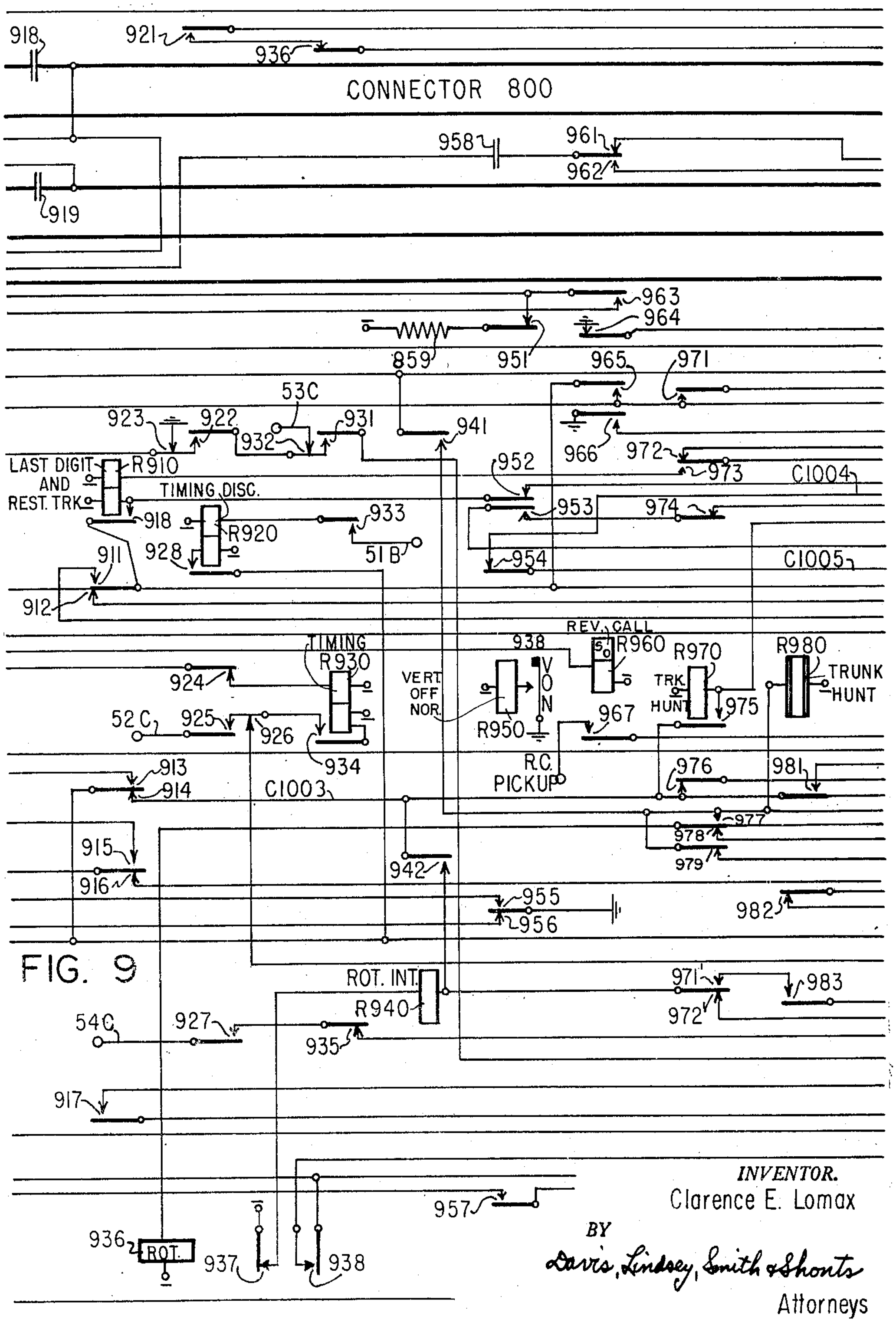
Figure 10:
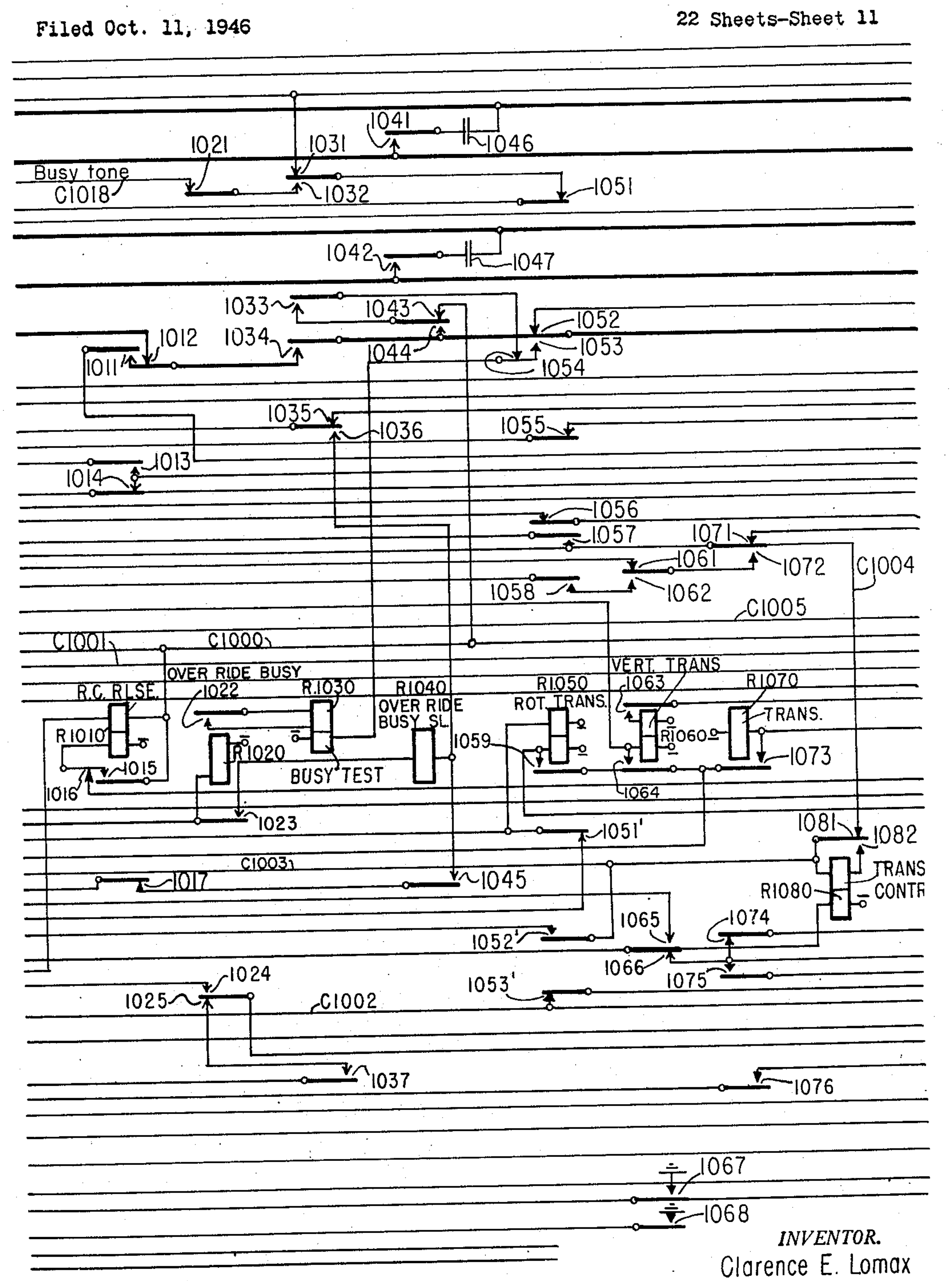
Figure 11:
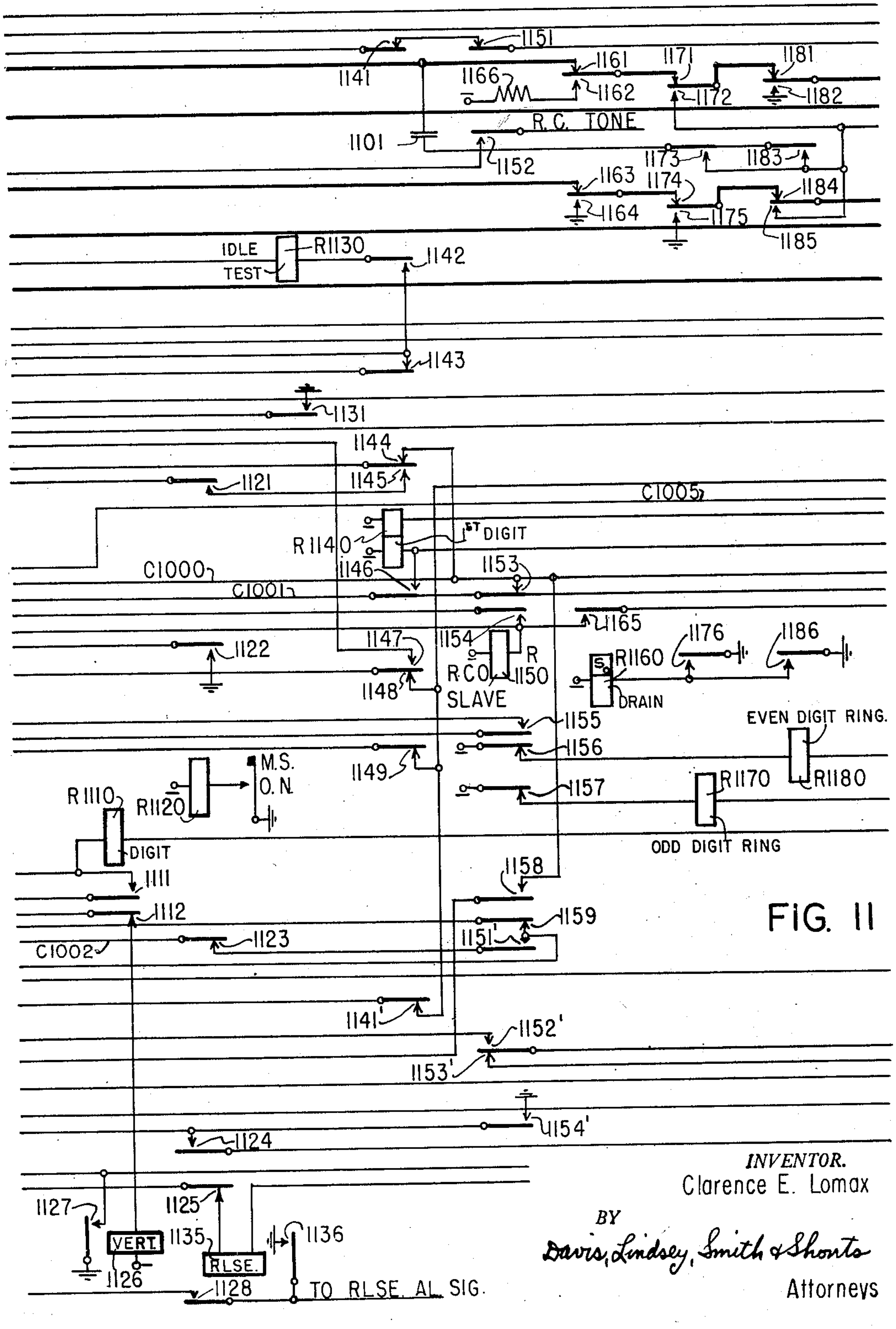

The connector 800 is illustrated in Figs. 8, 9, 10, 11 and 12 of the drawings, and when it is used as the connector portion of a finder-connector link Fig. 8 thereof should be placed to the right of Fig. 3 with the conductors C40 to C45, inclusive, in alignment. The connector 800 is of the Strowger type and is provided with two wiper sets. Each wiper of the two wiper sets has access to a contact field arranged in ten vertical levels and wherein each level includes ten radially disposed contacts. The first wiper set comprises five wipers 1271 to 1275, inclusive, and the second wiper set comprises the wipers 1286 to 1288, inclusive. Depending upon the deenergized or energized condition of a wiper switching relay R1250, the respective first or second wiper set will be utilized in extending a connection through the connector 800. The two wiper sets are carried by a wiper shaft (not shown) which is movable in a vertical direction under control of a vertical magnet 1126, is movable in a rotary direction under control of a rotary magnet 938, and is automatically restored to its normal starting position under control of a release magnet 1135.

The connector 800 is also provided with certain alternative wiring in order to accommodate the use of the connector 800 in an initial installation having a capacity of one hundred lines or less while still retaining the novel features thereof, and whereby the capacity of the connector 800 may be increased to two hundred lines at a future date or the initial installation may be made to serve an exchange having a capacity of two hundred lines or less.

More particularly, the "A" wiring is utilized when the initial installation is to serve one hundred line terminals or less and, consequently, there is no necessity for initially installing the wiper switching relay R1250, the second wiper set comprising the wipers 1286 to 1288, inclusive, or the associated contact banks of the second hundred group 1285. On the other hand, the "B" wiring is utilized in order to increase the capacity of a system having connectors initially wired according to the "A" wiring arrangement from one hundred to two hundred line terminals and also when the capacity of the initial installation is greater than one hundred lines but less than two hundred lines. In the event that it is only necessary to provide the "A" wiring for an initial installation, the connector 800 will be installed so that the "B" wiring may be added at any time with minimum alteration of the initially installed connector 800. In order to facilitate the changeover from "A" to "B" wiring the first wiper set will be mounted on the wiper shaft from the top down in the following order: EC wiper 1275, C1 wiper 1274, −1 wiper 1272, +1 wiper 1273, and RST wiper 1271, with the associated bank contacts in corresponding relationship. When the bank contacts comprising the second hundred group 1285, together with the wiper switching relay R1250, are subsequently added to the connector 800 and the associated "A" wiring is altered in accordance with the "B" wiring, the additional wipers are added to the wiper shaft, without disturbing the initially installed wipers, below the RST wiper 1271 in the following order: C2 wiper 1288, −2 wiper 1286 and +2 wiper 1287, with the associated bank contacts in corresponding relationship. Thus it will be seen that the additional wipers and contact banks may be added to the connector 800 without disturbing or altering the initially installed wipers and associated bank contacts.

The connector 800 also comprises a minor switch 1260 which includes the wipers 1261 and 1262 and the associated bank contacts, the rotary magnet 1263 for driving the wipers one step in a clockwise direction upon each energization thereof, and the release magnet 1265 for returning the wipers 1261 and 1262 to their normal starting positions.

The first four lowermost levels of the bank contacts in the first hundred group 1280 of the connector 800 are utilized to terminate four different groups of interoffice trunks extending to the tandem exchange A, while the tenth level thereof is utilized to terminate the P. B. X or private branch exchange trunks. The fifth to the ninth levels of the bank contacts in the first hundred group 1280 and the ten levels of the bank contacts in the second hundred group 1285 are utilized to terminate the various subscriber lines.

The repeaters individually associated with the trunks which interconnect the tandem exchange A with the automatic substations B and C, and the manual office D, are identical in wiring arrangement. As shown in Figs. 13 to 15, inclusive, the repeater 1300 which terminates one of the trunks in the trunk group 1296 is illustrative of all of the above-mentioned repeaters and is arranged to time outgoing calls for permanents, to time the conversation of outgoing calls from the local tandem exchange subscribers to the automatic suboffices B and C and to the manual office D, and to time the conversation of outgoing and toll calls set up by the toll operator at the central office only in the event that the toll operator initiates such timing. The repeater 1300 is also arranged to prevent certain restricted subscriber lines in the tandem exchange A from extending calls to certain restricted suboffices.

The service restricting facilities provided in the tandem exchange A include a network 10 which is common to all of the finder-connector links and the subscriber lines upon which service restrictions are to be imposed. The function of this network is to produce at spaced intervals matched signal or control pulses which respectively represent or designate different trunk restrictions. In brief, this network comprises a start relay R220, three pulsing relays R260, R265 and R270, three sequence relays R225, R230 and R235, a reflex relay R240, and a fuse relay R250. It is noted that only three pulsing relays and three sequence relays have been illustrated but it should be understood that five such relays are required to provide five separate restrictions. Since the additional pulse and sequence relays are wired in exactly the same maner as the pulse relay R265 and the sequence relay R230, the details thereof have been omitted from the drawings. Cross connections between the contacts of the pulsing relays and the finder bank terminals of the subscriber lines or trunks upon which restrictions are imposed are made at a terminal frame 290. The different conductors extending from the contacts of the pulsing relays each terminate in individual terminals on the terminal frame 290 and the conductors which are connected to the finder bank contacts of the various individual lines or trunks may be connected to the individual terminals of the frame 290 or to combinations of the individual terminals whereby one or more restrictions may be applied to any one subscriber line or trunk without interfering or falsely effecting the operation of the restricted service apparatus over another line terminal on which a different restriction has been imposed. By means of the restricted service network 10, subscribers in the tandem exchange A paying a high rate for their telephone service are permitted to extend connections over all outgoing trunk lines to the automatic suboffices B and C, to the manual office D and to the toll operator at the central office. The subscribers paying the next lower rate for their telephone service may, for example, be permitted to extend connections over the trunk lines extending to the automatic suboffices B and C and to the toll operator, but are prevented from extending connections over the trunk lines extending to the manual office D. Other subscribers paying the same rate as the last-mentioned subscribers, but who are geographically located near the borderline of the exchange areas served by any one of the suboffices B and C or the manual office D, may be permitted to extend connections over the associated trunk lines extending to such adjacent offices and to the toll operator, but on the other hand are prevented from extending connections over the trunk lines interconnecting the other suboffices with the tandem exchange. The subscribers paying the lowest rate may, for example, be permitted to extend local connections in the tandem exchange A and to connections to the toll operator, but are prevented from extending connections over any of the other interconnecting trunk lines. It may also be desirous under certain conditions to permit automatic subscribers in the automatic suboffice B or C to extend connections to the local subscribers in the tandem exchange A, and tandem connections through the tandem exchange A to the manual office D and to the toll operator, while preventing tandem connections through the tandem exchange A between subscribers located respectively in the suboffice B or C.

DIRECTORY NUMBERING ARRANGEMENT

In order to facilitate an understanding of the following detailed description of the operation of the system, it is in order to first consider the directory numbering scheme which is utilized in designating the various lines terminated in the bank contacts of the various connectors. In this regard it will be arbitrarily assumed that each interoffice trunk group and the P. B. X trunk group includes ten trunks. It should be understood, however, that if the interoffice and P. B. X traffice is rather light, the number of trunks included in each of the trunk groups may be reduced accordingly. Based on the foregoing assumption, the following directory numbers may be assigned to the lines of different types, it being noted that the indefinite character "X" may be any number from 1 to 9 and 0:

Single digit 7—
Interoffice trunks terminated in the first level of the first hundred group 1280 bank contacts of the connectors.

Single digit 8—
Interoffice trunks terminated in the second level of the first hundred group 1280 bank contacts of the connectors.

Single digit 9—
Interoffice trunks terminated in the third level of the first hundred group 1280 bank contacts of the connectors.

Single digit 0—
Interoffice trunks terminated in the fourth level of the first hundred group 1280 bank contacts of the connectors.

2011—
Private branch exchange trunks terminated in the tenth level of the first hundred group 1280 bank contacts of the connectors and arranged for selection through an automatic trunk hunting operation. For night service the individual P. B. X trunks (except the first trunk in the group) may be selected by dialing the individual trunk numbers.

251X to 259X and 250X, 351X to 359X and 350X—
Ten subscriber lines of the twenty party type terminated in the fifth level of the first hundred group 1280 bank contacts of the connectors.

261X to 269X and 260X, 361X to 369X and 360X—
Ten subscriber lines of the twenty party type terminated in the sixth level of the first hundred group 1280 bank contacts of the connectors.

271X to 279X and 270X, 371X to 379X and 370X—
Ten subscriber lines of the twenty party type terminated in the seventh level of the first hundred group 1280 bank contacts of the connectors.

281X to 289X and 280X, 381X to 389X and 380X—
Ten subscriber lines of the twenty party type terminated in the eighth level of the first hundred group 1280 bank contacts of the connectors.

291X to 299X and 290X, 391X to 399X and 390X—
Ten subscriber lines of the twenty party type terminated in the ninth level of the first hundred group 1280 bank contacts of the connectors.

411X to 419X and 410X, 511X to 519X and 510X—
Ten subscriber lines of the twenty party type terminated in the first level of the second hundred group 1285 bank contacts of the connectors.

421X to 429X and 420X, 521X to 529X and 520X—
Ten subscriber lines of the twenty party type terminated in the second level of the second hundred group 1285 bank contacts of the connectors.

431X to 439X and 430X, 531X to 539X and 530X—
Ten subscriber lines of the twenty party type terminated in the third level of the second hundred group 1285 bank contacts of the connectors.

441X to 449X and 440X, 541X to 549X and 540X—
Ten subscriber lines of the twenty party type terminated in the fourth level of the second hundred group 1285 bank contacts of the connectors.

451X to 459X and 450X, 551X to 559X and 550X—
Ten subscriber lines of the twenty party type terminated in the fifth level of the second hundred group 1285 bank contacts of the connectors.

461X to 469X and 460X, 561X to 569X and 560X—
Ten subscriber lines of the twenty party type terminated in the sixth level of the second hundred group 1285 bank contacts of the connectors.

471X to 479X and 470X, 571X to 579X and 570X—
Ten subscriber lines of the twenty party type terminated in the seventh level of the second hundred group 1285 bank contacts of the connectors.

481X to 489X and 480X, 581X to 589X and 580X—
Ten subscriber lines of the twenty party type terminated in the eighth level of the second hundred group 1285 bank contacts of the connectors.

491X to 499X and 490X, 591X to 599X and 590X—
Ten subscriber lines of the twenty party type terminated in the ninth level of the second hundred group 1285 bank contacts of the connectors.

401X to 409X and 400X, 501X to 509X and 500X—
Ten subscriber lines of the twenty party type terminated in the tenth level of the second hundred group 1285 bank contacts of the connectors.

From the above outline of the directory numbering scheme it will be noted that directory numbers differing only in the first digit thereof may be utilized to designate the same subscriber line. For example, the first digit "2" or "3" determines that the particular called subscriber party line terminates in the first hundred group 1280 bank contacts of the connectors and also determines whether one of the first ten ringing codes or one of the last ten ringing codes is to be ultimately selected to signal a particular called subscriber on the selected party line. Furthermore, the first digit "4" or "5" determines that the particular called subscriber party line terminates in the second hundred group 1285 bank contacts of the connectors and also determines whether one of the first ten ringing codes or one of the last ten ringing codes is to be ultimately selected to signal a particular called subscriber on the selected party line.

The second and third digits of any directory number dialed into one of the connectors effect respectively the vertical and the rotary movement of the Strowger switch wipers of the connector. The fourth digit is used to effect code selection and to indicate the side of the line over which ringing current is to be transmitted during the ringing operation. More specifically, odd numbered fourth digits, when dialed into a connector following a first digit "2" or "4," serve to effect the selection of the corresponding codes in the first group of codes and to select the negative side of the selected line for ringing current transmission. Even numbered fourth digits, when dialed into a connector following a first digit "2" or "4," serve to effect the selection of the corresponding codes in the first group of codes and to select the positive side of the selected line for ringing current transmission. Odd numbered fourth digits, when dialed into a connector following a first digit "3" or "5," serve to effect the selection of the corresponding codes in the second group of codes and to select the positive side of the selected line for ringing current transmission. Even numbered fourth digits, when dialed into a connector following a first digit "3" or "5," serve to effect the selection of the corresponding codes in the second group of codes and to select the negative side of the selected line for ringing current transmission.

LOCAL CALLS

In considering the operation of the system to set up a connection through the illustrated finder-connector link between two subscriber lines terminating in the bank contacts thereof, it may be assumed that all of the equipment in the distributor 600 is normal and that a call originating at the substation 200 and intended for the substation 1200A on a multiparty line is initiated. When the handset provided at the calling substation 200 is removed from its supporting hook or cradle, a loop circuit is completed from ground, by way of the contacts 277, the positive line conductor C32, the substation 200, the negative line conductor C31, the contacts 276, and the winding of the line relay R280, to battery. The line relay R280 operates over this circuit and, at its contacts 282, it applies ground potential to the conductor C34, thereby to mark the calling line as busy in the bank contacts of the various connectors having access thereto. At its contacts 283, the relay R280 opens a point in one of the operating circuits for the cutoff relay R275; at its contacts 281 it impresses negative battery potential by way of the winding of the cutoff relay R275 and the conductor C33, whereby the rotary position of the calling line is marked in the bank contacts of the various finders; and, at its contacts 284 it impresses ground potential upon the first contact of the vertical test contact set 350 of the finder, thereby to mark the vertical position of the calling line in the bank contacts of the various finders. As a further result of the operation of the line relay R280, at its contacts 284 it also applies ground potential by way of the resistor 290B, the conductors C11 and C18, and the contacts 611, in order to energize the start relay R620 of the distributor 600.

It is noted that the above-described circuit for energizing the start relay R620 included the contacts 611 of the operated all links busy relay R610. The relay R610 is normally maintained in its operated position provided at least one of the finder-connector links is idle in the group of links associated with the distributor 600. The energizing circuit for the relay R610 may be traced from battery by way of the winding of the relay R610, the contacts 672, the ALB conductor extending to the first finder 300 in the first group of finder-connector links and multiply connected to corresponding points of all other finders in the first group, and extending therefrom by way of the vertical off-normal contacts 302 of the finder 300, the ALB2 conductor C45 extending to the corresponding conductor of the associated connector 800 (Fig. 8) and the contacts 956, to ground. Similar circuits are completed through all other idle finder-connector links in the first group. Accordingly, as each finder-connector link becomes busy, ground potential is removed from the multiply connected ALB conductor, and, finally, when all of the links are busy the relay R610 restores to normal, thereby to transfer, at its contacts 612, the start circuit for the relay R620 of the first distributor 600 to the start relay R520 of the second distributor 500. Consequently, all calls initiated by subscribers in the first group will now cause the distributor 500 of the second group to assign an idle finder therein for use of a calling subscriber in the first group.

Referring again to the relay R620, it is noted that upon operating it completes a circuit, at its contacts 622, for energizing the first link relay R700 individual to the illustrated finder-connector link. This circuit may be traced from ground by way of the contacts 615, 666, 631, 736, 726, 716, 706, 635, 622 and 747, and the winding of the relay R700, to battery. Upon operating, the relay R700 first locks to ground over a circuit which includes its preliminary make contacts 704, the contacts 713, 723 and 733, the winding of the control relay R745, and the contacts 666 and 615. The control relay R745, however, is short-circuited until the relay R700 operates sufficiently to interrupt its initial energizing circuit, at its contacts 706. When this occurs the control relay R745 operates over the above-traced circuit in series with the winding of the link relay R700. As a further result of the operation of the link relay R700, at its contacts 705 it prepares a point in the operating circuit for the link relay R710 individual to the second finder-connector link in the first group. At its contacts 701 and 702, the relay R700 respectively connects the finder start conductor F. ST. and the guard conductor G, which are individual to the illustrated finder-connector link, to the corresponding control conductors in the distributor 600, so that the operation of the finder portion 300 of the assigned finder-connector to search for a calling line may be initiated. It may be well to mention at this time that the test conductors T1 and T2, the interrupter conductor INT., the all links busy conductor ALB, the vertical conductor VERT., the rotary conductor ROT., the switch-through conductors F1 and F2, are multiply connected to all of the finders included in the first group of finder-connector links.

When the control relay R745 operated in series with the link relay R700 it interrupted, at its contacts 747, a further point in the initial operating circuit for the relay R700 and, at its contacts 746, it prepared a point in a reflex circuit whereby the first link relay R700 may be reoperated after the fourth link relay R730 has been operated to select the last finder-connector link in the first group.

Referring again to the start relay R620, as a further result of its operation, at its contacts 621, it completes a circuit for energizing the control relay R640 which may be traced from ground, by way of the contacts 675, 667, 621 and 633, and the winding of the control relay R640, to battery. Upon operating, the relay R640, at its contacts 649, completes a locking circuit for itself which is independent of the circuit including the contacts 621 of the start relay R620. At its contacts 642, the relay R640 completes a multiple circuit for maintaining the all links busy relay R610 in its operated position. This circuit may be traced from ground by way of the contacts 642, 671 and 672, and the winding of the all links busy relay R610, to battery. At its contacts 643, the relay R640 applies ground potential by way of the conductor C17, the normally closed upper contacts of the all links busy relay R510 in the distributor 500, and the conductor C10 in order to mark the fifth contact in the vertical banks 350 of all of the finders 300 in the first group. Application of ground potential to this bank terminal prevents the finder 300 and any other assigned finder in the first group from advancing its wipers beyond the fifth level of its associated contact bank. At its contacts 644, the relay R640 applies ground potential, by way of the contacts 651 and 656, to the vertical conductor VERT.; at its contacts 645 it prepares a point in the circuit for the lower winding of the vertical test relay R655, which circuit includes the interrupter conductor INT. and the test conductor T1; at its contacts 646 it prepares a point in the circuit for the upper winding of the second rotary test relay R690; at its contacts 647 it prepares a point in the locking circuit for the vertical transfer relay R655; at its contacts 648 it prepares a point in the circuit for the lower winding of the first rotary test relay R680; and at its contacts 641 it applies ground potential by way of the contacts 701 to the finder start conductor F. ST., whereupon the start relay R380 in the finder 300 is operated.

*Selecting the calling line*

When the finder start relay R380 is operated the operation of the finder 300 to search for the calling line is initiated. More specifically, upon operating, the relay R380, at its contacts 387, completes an operating circuit for the vertical magnet 390 by way of the grounded vertical conductor VERT. The vertical magnet, upon operating, raises the wipers 351 and 311 to 318, inclusive, of the finder 300 one step in a vertical direction. Also upon operating, the vertical magnet 390, at its contacts 391, places ground potential upon the interrupter conductor INT., thereby completing a circuit for energizing the pulse relay R650 in the distributor 600. Upon operating, the relay R650, at its contacts 651, interrupts a point in the previously traced circuit for energizing the vertical magnet 390 which now restores and, at its contacts 391, interrupts the circuit for the pulse relay R650. When the circuit for the pulse relay R650 is interrupted upon the restoration of the vertical magnet 390, the relay R650 restores and, at its contacts 651, recompletes the energizing circuit for the vertical magnet 390. Upon reoperating, the vertical magnet 390 elevates the wipers 351 and 311 to 318, inclusive, an additional step in the vertical direction to a position opposite the second level of the associated bank contacts. The interaction between the vertical magnet 390 of the finder 300 and the pulse relay R650 of the distributor 600 continues until the wipers of the finder 300 are elevated to a position opposite the level marked by the calling line in the vertical bank 350. In the present example the second contact in the vertical bank 350 is marked with ground potential applied thereto from the contacts 284. Consequently, when the vertical wiper 351 engages the second contact in the vertical bank 350, ground potential is extended by way of the contacts 389′, the test conductor T1, the contacts 659′, the lower winding of the vertical test relay R655, the contacts 645, and the winding of the pulse relay R650, to battery. The current traversing this circuit is sufficient to maintain the pulse relay R650 in its operated position whereby further operation of the vertical magnet 390 is prevented, and to cause the operation of the vertical test relay R655.

From the above explanation it will be noted that during the vertical movement of the vertical wiper 351 a circuit, including ground at the contacts 284, and the resistors 290B and 290A, is completed when the wiper 351 engages the first contact in the vertical bank 350 which includes the lower winding of the vertical test relay R655 and the pulse relay R650. The resistance of the resistors 290A and 290B included in this circuit is sufficient to prevent the vertical test relay R655 from operating in series with the pulse relay R650. However, when direct ground is applied to the vertical wiper 351 the pulse relay R650 and the vertical test relay R655 operate in the manner described above.

When the vertical test relay R655 operated in series with the pulse relay R650, at its preliminary make contacts 658, it completed an obvious circuit for energizing its upper winding whereby the relay R655 remains in its operated position after its initial energizing circuit is interrupted at its contacts 659′. After this locking circuit is completed the relay R655, at its contacts 659′, disconnects the test conductor T1 from the circuit including the lower winding of the relay R655 and the winding of the pulse relay R650 and, at its contacts 659 it prepares a test circuit which includes the test conductor T1 and the first rotary test relay R680. As a further result of the operation of the relay R655, at its contacts 656 it interrupts a further point in the circuit for the vertical magnet 390 and, at its contacts 657, it prepares a point in the circuit for controlling the rotary magnet 392. At its contacts 658, the relay R655 also completes a circuit for energizing the upper winding of the first rotary test relay R680 in series with the lower winding of the second rotary test relay R690 over a circuit which may be traced from ground, by way of the contacts 647 and 658, the upper winding of the relay R680, the lower winding of the relay R690, and the resistor 695, to battery. The current traversing this circuit is insufficient to cause the operation of the relays R680 and R690 but renders these relays exceedingly fast to operate when the alternate windings are energized.

When the vertical test relay R655 interrrupted, at its contacts 659', the circuit for the pulse relay R650, the latter relay restored to normal and, at its contacts 651, completed a circuit for energizing the rotary magnet 392. This circuit extends from ground, by way of the contacts 644, 651, 657, 681 and 691, the rotary conductor ROT., the contacts 386, 378 and 368, and the winding of the rotary magnet 392, to battery. Upon operating, the rotary magnet 392 rotates the wipers 311 to 318, inclusive, into engagement with the contacts forming the first contact set in the first hundred group 330 and the second hundred group 340 of bank contacts, and rotates the vertical wiper 351 out of engagement with the second contact in the vertical bank 350. As a further result of the operation of the rotary magnet 392, at its contacts 393, it completes the previously traced circuit including the interrupter conductor INT. for energizing the pulse relay R650. The interaction between the rotary magnet 392 and the pulse relay R650 is exactly the same as the interaction between the vertical magnet 390 and the pulse relay R650. Accordingly, the rotary magnet 392 continues to advance the wipers 311 to 318, inclusive, step by step in a rotary direction until the wipers engage the contacts in the bank terminating the conductors of the calling line, or until the wipers have tested all of the contacts in the selected level and have rotated to the eleventh rotary off-normal position.

In the present case the rotary movement of the wipers is terminated when the wiper 314 engages the bank contact terminating the conductor C33 of the calling line. At this time a circuit is completed for energizing the lower winding of the first rotary test relay R680, which may be traced from ground, by way of the contacts 648, the lower winding of the relay R680, the contacts 659, the test conductor T1, the contacts 389', the wiper 314 and the engaged contact in its associated bank terminating the conductor C33, the contacts 281, and the winding of the cutoff relay R275, to battery. Since the relay R680 is preenergized over a circuit including its upper winding, the relay operates exceedingly fast when the above-traced circuit is completed for its lower winding and, upon operating, at its contacts 681, it interrupts a point in the above-traced circuit for the rotary magnet 392. Thus the rotary movement of the wipers is arrested. At its contacts 682, the relay R680 completes a circuit for energizing the switch-through relay R360, which may be traced from ground, by way of the contacts 644, 651, 657 and 682, the conductor F1, the contacts 383 and 376, and the winding of the switch-through relay R360, to battery.

Referring again to the start relay R380 of the finder 300, it is noted that upon operating, at its contacts 381, it closes a circuit for bridging the resistor 381' across the talking conductors C41 and C42 extending to the corresponding conductors of the connector 800 (Figs. 8 to 12, inclusive) whereby the line relay R850 is energized in the manner to be explained more fully below. Also, at its contacts 382, the relay R380 applies ground potential to the conductor C43 and, consequently, when the switch-through relay R360 is operated in the manner described above, at its contacts 365, it locks itself to the grounded conductor C43. At its contacts 362 and 363, the relay R360 extends the line conductors C31 and C32 of the calling line, by way of the conductors C41 and C42, to the line relay R850 of the connector 800; at its contacts 361, it connects the RST1 conductor C30 to the RST conductor C40; and, at its contacts 364, it connects the control conductor C33 to the grounded conductor C43. At its contacts 366, the relay R360 interrupts a point in the circuit for the switch-through relay R370 and, at its contacts 367, it connects the guard conductor G to ground through the vertical off-normal contacts 305. In this connection it is noted that the vertical off-normal contacts 302 were opened as soon as the vertical magnet elevated the wipers of the finder from their normal position, and the vertical off-normal contacts 303 and 305 were also closed. Finally, the switch-through relay R360, at its contacts 368, interrupts a further point in the circuit for the rotary magnet 392 and, at its contacts 369, it interrupts a further point in the incomplete circuit for the release magnet 394.

As indicated above, when the wiper 314 engaged the bank contact terminating the conductor C33, a circuit was completed for energizing the cutoff relay R275 in series with the lower winding of the first rotary test relay R680. The cutoff relay R275 operates over this circuit and, at its preliminary make contacts 278, completes a locking circuit for itself which is independent of the contacts 281. Furthermore, when the switch-through relay R360 operates and closes its contacts 364, ground at the contacts 382 is applied to the conductor C33 in order to maintain the locking circuit for the cutoff relay R275 and to short-circuit the lower winding of the first rotary test relay R680. The latter circuit may be traced from ground, by way of the contacts 382, 364 and 389', the test conductor T1, the contacts 659, the lower winding of the relay R680, and the contacts 648, to ground. This circuit renders the relay R680 somewhat slow to release but the relay subsequently restores to normal.

As a result of the operation of the cutoff relay R275, at its contacts 276 and 277, it interrrupts the previously traced circuit for the line relay R280, whereupon the latter relay restores to normal. Upon restoring, the relay R280, at its contacts 281, interrupts a point in the initial energizing circuit for the cutoff relay R275; at its contacts 282, it disconnects ground potential from the conductor C34 and immediately thereafter, at its contacts 283, it reapplies the holding ground potential on the conductor C33 to the conductor C34; and, finally, at its contacts 284, it interrupts the circuit for the start relay R620 in the distributor 600.

In order to describe the operation of the finder 300 to find a line terminated in the second hundred group 340 of bank contacts, it will be assumed that when the wipers 311 to 318, inclusive, engaged the first contact in their associated contact banks the wiper 318 encountered battery potential instead of the wiper 314. When this condition exists a circuit is completed from ground at the contacts 646 in the distributor 600, applied by way of the upper winding of the second rotary test relay R690, the test conductor T2, the contacts 389, and the wiper 318 to cause the operation of the cutoff relay of a calling line terminated in the engaged contact banks in the second hundred group 340 of bank contacts. The associated cutoff relay and the rotary test relay R690 operate in series in a manner similar to the operation of the cutoff relay R275 in series with the first rotary test relay R680. Upon operating, the relay R690, at its contacts 691, interrupts a point in a circuit for the rotary magnet 392, thereby to arrest rotary movement of the wipers of the finder and, at its contacts 692, it completes a circuit for energizing the switch-through relay R370 which may be traced from ground, by way of the contacts 644, 651, 657, 681 and 692, the conductor F2, the contacts 384 and 366, and the winding of the switch-through relay R370, to battery. The relay R370 operates over this circuit and, at its contacts 375, locks to the grounded conductor C43; and, at its contacts 371 to 374, inclusive, it interconnects the selected calling line by way of the wipers 315 to 318, inclusive, to the conductors C40 to C43, inclusive, extending to the connector 800. The remaining circuit controlling operations by the contacts 376 to 379, inclusive, are precisely the same as the corresponding contacts 366 to 369 of the switch-through relay R360. From the foregoing description of operation of the finder 300, it will be understood that in the event the calling line is terminated in the first hundred group 330 of bank contacts, the switch-through relay R360 will be operated to interconnect the calling line with the connector 800, and that in the event the calling line is terminated in the second hundred group 340 of bank contacts, the switch-through relay R370 will be operated to interconnect the calling line with the connector 800.

*Selecting an idle link*

As indicated above, the distributor start conductor C11 is disconnected from ground potential incident to the restoration of the line relay R280. If no other calling lines are awaiting assignment of a link at the time this operation occurs, the start relay R620 of the distributor 600 is deenergized and restores. On the other hand, if a second call is awaiting assignment of a link in the first group of links, the start relay R620 is held energized over the start conductor C11 extending to the line circuit associated with the other calling lines and does not restore. Regardless of the position of the start relay R620, however, a second link relay is selected in the distributor 600 immediately upon the operation of the switch-through relay R360 or the switch-through relay R370. More specifically, with the finder vertical off-normal contacts 305 in their closed position, ground potential is connected to the guard conductor G either by way of the contacts 367 of the switch-through relay R360 or by way of the contacts 377 of the switch-through relay R370, in the event either of these relays is operated. When ground potential is applied to the guard conductor G a circuit is completed by way of the contacts 702 for energizing the link control relay R630. The relay R630 operates and, at its contacts 631 and 635, interrupts further points in the previously traced circuit for energizing the first link relay R700; at its contacts 633, it interrupts the circuit for the control relay R640, thereby to cause the latter relay to restore; and, finally, at its contacts 634, it completes a circuit for energizing the second link relay R710. The circuit for energizing the second link relay R710 includes the grounded guard conductor G, the contacts 702, 614, 634 and 705, and the winding of the second link relay R710, to battery.

The relay R710, upon operating, locks to ground over a circuit which includes its preliminary make contacts 714, the contacts 723 and 733, the winding of the control relay R745, and the contacts 666 and 615. After completing this locking circuit the relay R710, at its contacts 713, interrupts the locking circuit for the first link relay R700, whereupon the latter relay restores. Also, at its contacts 715, the relay R710 prepares a point in the circuit for the third link relay R720 and, at its contacts 711 and 712, it connects the finder start conductor F. ST. and the guard conductor G of the second finder link to the distributor 600. The first link relay R700 restores to normal when the above-mentioned locking circuit is interrupted and, at its contacts 701 and 702, it interrupts the circuit of the start relay R380 in the finder 300 and disconnects the grounded guard conductor G, extending from the finder 300, from the circuit including the link control relay R630. The relay R700, at its contacts 704, interrupts a further point in its locking circuit; at its contacts 705, it interrupts a point in the initial energizing circuit for the second link relay R710; and, at its contacts 706, it prepares a point in the circuit for controlling the third link relay R720.

In the event the second finder link is busy at the time the second link relay R710 operates, ground potential is applied to the guard conductor G thereby to maintain the link control relay R630 in its energized position and to complete the previously traced circuit for energizing the third link relay R720. In the event ground potential is not encountered on the second guard conductor G when the second link relay R710 operates, the link control relay R630 restores to normal. Accordingly, when the next call is initiated by a calling subscriber the start relay R620 will be operated in the manner previously described and will cause the finder portion of the second link assigned by the second link relay R710 to operate, in the same manner as the finder 300, to find and connect with the calling line. If, however, the second link is busy when the second link relay R710 operates, ground potential on the second link guard conductor G will be extended by way of the contacts 712 to maintain the link control relay R630 in its operated position and will also be extended by way of the contacts 614, 634, 706 and 715, and the winding of the third link relay R720, to cause the operation of the latter relay. The third link relay, upon operating, locks in series with the control relay R745, in the manner explained above, and it causes the restoration of the second link relay R710 by interrupting the locking circuit therefor, at its contacts 723. Also, at its contacts 725, the relay R720 prepares the energizing circuit for the fourth link relay R730. If the third finder link in the group is also busy, ground potential on the third link guard conductor G will be extended by way of the contacts 722 over the previously traced circuit to maintain the link control relay R630 in its energized position and to cause the operation of the fourth link relay R730. Upon operating, the fourth link relay R730, at its contacts 734, completes a locking circuit for itself in series with the control relays R740 and R745, which may be traced from battery by way of the winding of the fourth link relay R730, the preliminary make contacts 734, the winding of the slow-to-operate control relay R740, the contacts 703 of the deenergized first link relay R700, the winding of the control relay R745, and the contacts 666 and 615, to ground. In addition, the relay R730, at its contacts 733, interrupts the locking circuit for the third link relay R720, which restores to normal before the contacts 741 are closed by the slow-to-operate relay R740. At its contacts 735, the relay R730 also prepares a circuit, which will be traced hereinafter, for reoperating the first link relay R700 in the event that the fourth finder link in the group is busy at the time the fourth link relay R730 operates. If the associated fourth link is busy and its guard conductor G has ground potential applied thereto when the relay R730 operates, a circuit is completed by way of the contacts 732 for maintaining the link control relay R730 in its operated position and for completing a circuit by way of the contacts 614, 634, 706, 716, 726, 735, 742 and 746, and the winding of the first link relay R700, to battery. Upon operating, the first link relay R700, in addition to performing the control operations described hereinbefore, at its contacts 703, interrupts the previously traced series circuit including the windings of the fourth link relay R730, the slow-to-operate control relay R740, and the control relay R745. The relays R730 and R740 restore to normal when the above-mentioned circuit is interrupted but the control relay R745 remains energized first over a circuit which includes the winding of the relay R700, the contacts 704, 713, 723 and 741, the winding of the relay R745, and the contacts 666 and 615, to ground. The release time of the relay R740 is somewhat slower than the release time of the relay R730 and, consequently, it maintains its contacts 741 in a closed position until the relay R730 restores and completes an additional point, at its contacts 733, in the locking circuit for the first link relay R700 and the control relay R745.

From the above explanation it will be understood that the link relays R700, R710, R720 and R730 individual to the various finder-connector links are operated in sequence under control of the link control relay R630 over circuits which respectively include the guard conductors individual to the various links as successive calls are handled by the distributor 600. It will also be understood that when a link has been assigned to a calling line, and the start relay R620 is de-energized due to the fact that no other link in the group is calling, the link assigning relays will be operated in the above-described sequence until an idle link is assigned.

*All links busy*

As indicated above, the all links busy relay R610 is normally maintained in its operated position as long as an idle link is available in the first group of finder-connector links, a condition which is indicated to the all links busy relay R610 by ground potential applied to the multiply connected all links busy conductor ALB. Referring to the finder 300, attention is directed to the fact that when the vertical magnet 390 elevates the wiper shaft of the Strowger mechanism the vertical off-normal contacts 302 are opened, thus removing the source of ground potential provided by the finder 300 for the all links busy conductor ALB. As each finder link is taken into use and the wiper shaft thereof is elevated from its normal position, ground potential from the associated link is removed from the all links busy conductor ALB. When all of these circuits are opened to indicate that all of the links in the group are occupied with calls, the all links busy relay R610 is de-energized and restores. In restoring, this relay interrupts, at its contacts 614 and 615, the previously traced circuits for the various link relays R700, R710, R720 and R730, thereby to prevent useless operation of these relays in search of an idle link. At its contacts 611, the relay R610 interrupts the circuit for the start relay R620 individual to the distributor 600 and, at its contacts 612, it prepares a start circuit for the start relay R520 individual to the distributor 500. Finally, the relay R610, at its contacts 613, interrupts a point in the circuit including the conductors C21 and C20, thereby to prevent the second distributor 500 from placing a marking potential on the fifth contact on the vertical bank associated with the finder links in the second group.

If a call is initiated by the subscriber at substation 200, for example, at a time when all of the links in the first group are busy, the line relay R280 will operate in the manner previously described and a circuit will be completed from ground by way of the contacts 284, the resistor 290B, the start conductor C11, the conductor C18, the contacts 612, the conductor C19, the normally closed contacts of the all links busy relay R510 of the second distributor 500 and the winding of the start relay R520, to battery. The start relay R520 of the distributor 500 causes the selection of an idle finder-connector link in the second group, in the same manner as described hereinbefore in connection with the operation of the distributor 600. Since the fifth contact in the vertical bank of the selected finder is not marked with ground potential, the wiper shaft of the selected finder will be elevated to the eighth level, at which point the vertical wiper will encounter ground potential applied to the associated vertical contact by the operation of the line relay R280. The wipers of the selected finder will then be rotated over the associated contact bank until the wipers thereof engage the contact in the associated bank contacts terminating the calling line. Further operations of the selected finder in the second group are the same as described hereinbefore in connection with the description of the operation of the finder 300. Thus it will be understood that in the event all of the finder links in a group are busy, the finder links in the alternate group may be utilized in completing connections for calling subscribers who are normally served by the links in the busy group.

When a link in a busy group again becomes idle the finder, for example the finder 300, restores its wipers to their normal position whereupon the vertical off-normal contacts 302 are again closed and ground potential is applied to the all links busy conductor ALB to cause the reoperation of the all links busy relay R610. Upon reoperating, the all links busy relay R610 again completes, at its contacts 611, the start circuit for the relay R620. Any additional call will now cause the link distributor 600 to assign the idle link in the associated group.

*Finder failure*

In the foregoing description of operation of the finder 300, it was assumed that the operation thereof was satisfactory and that the finder found and connected with the calling line in the proper manner. Under certain circumstances a finder, although in proper working order, may fail to find a calling line for which it is searching. This type of finder failure may be due to an abnormal condition in the equipment, for example, a calling condition is not marked on a vertical contact of the vertical bank 350, but is most frequently occasioned by the abandonment of the call on the line for which the finder is searching shortly after the searching operation of the finder has been initiated. More particularly, assuming that the subscriber at substation 200 has initiated a call in the manner previously described, the finder is controlled by the vertical magnet 390 to elevate its vertical wiper 351 in search of the associated vertical contact in the bank 350 marked with direct ground potential as a result of the operation of the line relay R280. In the event the vertical wiper 351 fails to encounter ground potential on the second contact in the vertical bank 350, because the calling subscriber has abandoned the call, it will continue to be elevated to the fifth level, at which point the conductor C10 has ground potential applied thereto from the contacts 643 of the operated control relay R640 in the distributor 600. Ground potential is normally placed on this contact of the vertical bank when the distributor 600 is in operation to assign an idle finder-connector link in the associated group, and all subscriber lines served by the links in this group have their lines normally terminated in the first five levels of the associated first and second hundred groups 330 and 340 of bank contacts. If the wiper 351 of the finder 300 encounters ground on the fifth contact of the vertical bank 350, the vertical test relay R655 operates in the manner previously described and thus causes the rotary magnet 392 to rotate the wipers 311 to 318, inclusive, of the finder step by step over the contacts of the fifth level. Since the calling line is not terminated in the fifth level of the bank contacts the wiper 314 or 318 will not encounter battery potential and the first or second rotary test relay R680 or R690 will not be operated. Consequently, the wipers of the finder 300 will be automatically rotated into the eleventh rotary position, at which point the cam contacts 301 are closed. When the cam contacts 301 are closed ground potential is applied by way of the guard conductor G, the closed contacts 702, 712, 722 or 732, depending upon whether the first, second, third or fourth finder-connector link has been selected by the distributor 600, and the winding of the link control relay R630, to battery. This circuit is also extended from the grounded guard conductor G by way of the contacts 614 and 634, whereby the link relay of the selected finder-connector link is restored and the link relay of the next succeeding idle link is operated to select the corresponding finder-connector link for use. Inasmuch as the relay R630 is momentarily operated, the circuit for the relay R640 is interrupted and the latter relay, at its contacts 647, interrupts the circuit for the vertical test relay R655. The latter relay, at its contacts 641, removes ground potential from the start conductor F. ST. of the assigned finder, thereby causing the restoration of the associated start relay R380. The relay R380 in the assigned finder restores and thereby causes the restoration of the finder to normal in a manner to be described hereinafter. If the next assigned finder is idle, the guard conductor G individual thereto is ungrounded and consequently the relay R630 restores to reoperate the control relay R640 in the event that the start relay R620 is retained in its operated condition under control of a calling line. Further operation of the distributor 600 to control the operation of the newly assigned link is the same as has been described in connection with the description of the operation of finder 300.

In the foregoing description of operation, it was assumed that the distributor 600 and the finder 300 of the assigned link operated satisfactorily but that it failed to find the calling line. Satisfactory operation of the finder 300 being indicated by the application of ground potential to the associated guard conductor G to cause the distributor 600 to assign another idle link. If an assigned finder fails to return ground potential by way of the guard conductor to momentarily operate the link control relay R630, the assigning operation of the distributor would be blocked out. In order to obviate this condition, the timing relays R660, R665 and R670 have been provided to forcibly assign another link in the event the first assigned link fails to return ground potential on the associated guard conductor within a predetermined elapsed time interval.

When the control relay R640 operates, under control of the start relay R620, it completes a locking circuit for itself which includes the contacts 633, 649, 667 and 675. Also, at its contacts 649′, the relay R640 prepares a circuit for the lower winding of the timer relay R660. Thus the conductor C696 extending to the common timer (not shown) is included in the circuit for the lower winding of the relay R660. The common timer applies ground potential to the conductor C696 approximately at seven second intervals. Depending upon the time of operation of the relay R640, the ground pulse impressed on conductor C696 may cause the operation of the timer relay R660 immediately thereafter, or the operation may be delayed for approximately seven seconds. When the timer relay R660 operates, at its contacts 662, it completes a locking circuit for its upper winding which may be traced from ground by way of the contacts 694, 684 and 674, the upper winding of the relay R660, and the contacts 662 and 632, to battery. The momentary ground pulse applied to the conductor C696 by the common timer subsequently deenergizes the lower winding of the relay R660 but the relay remains in its operated position over the above-mentioned locking circuit. If the finder of the assigned link should find and connect with the particular calling line, either the first rotary test relay R680 or the second rotary test relay R690 will operate to interrupt, at either the contacts 684 or 694, the above-mentioned locking circuit for the relay R660 which will thereupon restore before an additional pulse is applied to the conductor C698 by the common timer. If the relay R680 or R690 fails to operate, thus indicating that the finder has failed to find the calling line and that ground potential has not been returned over the associated guard conductor G, the relay R660 remains in its locked position and, at the contacts 663 and 661, it prepares circuits for respectively operating the timer relays R665 and R670 under control of the common timer. Shortly after a ground pulse is applied to the conductor C696 the common timer applies a momentary ground pulse to the conductor C698, thereby to complete a circuit for energizing the timer relay R665. Upon operating, the relay R665, at its contacts 667, interrupts a point in the locking circuit for the control relay R640 which restores to normal. At its contacts 666, the relay R665 also interrupts a point in the locking circuit which includes the winding of the control relay R745 and the operated link relay R700, R710, R720 or R730. Assuming that the finder of the second link in the group was unable to find a calling line and failed to return ground potential on the associated guard conductor G, as a result thereof, the timer operates in the manner described above to cause the second link relay R710 and the control relay R745 to restore to normal when the series locking circuit for these relays is interrupted at the contacts 666 by the timer relay R665. When the relay R710 restores it prepares, at its contacts 716, a point in the circuit for the first link relay R700 and when the relay R745 restores it prepares a further point in the circuit for reoperating the first link relay R700. In other words, when the finder portion of any second, third or fourth link in the group fails to find a calling line and fails to return ground on the associated guard conductor G, the timer will control the distributor 600 to assign the first link in the group to initiate a second attempt to connect with the calling line.

When the control relay R640 restores to normal under control of the timer relay R665, it interrupts a point in the circuit for controlling the vertical and rotary magnets of a selected finder. Also, the relay R640, at its contacts 647, interrupts the locking circuit for the upper winding of the vertical test relay R655 which now restores to normal, in the event it has been operated, to again prepare, at its contacts 656, a point in the circuit for controlling the vertical magnet of the newly assigned finder link.

After the momentary ground pulse is applied to the conductor C698 by the common timer, the timer relay R665 restores to normal and, at its contacts 666, prepares a point in the circuit for operating the first link relay R700; and at its contacts 667 it prepares a point in the circuit for reoperating the control relay R640. Since the calling subscriber's line has not been found by the link selected by the distributor 600, the start relay R620 is still retained in its operated position. Consequently, as soon as the contacts 666 are again closed by the timer relay R665, the previously traced circuit, including the contacts 622, is again completed for operating the first link relay R700. This link relay completes a locking circuit for itself by way of its contacts 706 and the previously traced circuit, including the winding of the control relay R745, in order to select the first finder-connector link in the associated group. Furthermore, when the timer relay R665 restores, a circuit is recompleted including the contacts 667 and 621, whereby the control relay R640 is again operated. Upon reoperating, the relay R640 causes the finder 300 of the first link to operate in the manner previously described in an attempt to find and connect with the calling line. If the finder 300 should find and connect with the calling line, the first rotary test relay R680 or the second rotary test relay R690 will be operated in the manner previously described, and, at the contacts 684 or 694, the locking circuit for the first timer relay will be interrupted in order to disconnect, at the contacts 661, the circuit for controlling the timer relay R670. However, it will be assumed that the finder 300 also fails to find the calling line and also fails to return ground potential on the associated guard conductor G. Shortly thereafter the common timer applies a momentary ground pulse to the conductor C697, whereupon a circuit is completed by way of the contacts 661 for energizing the lower winding of the timer relay R670. The relay R670, upon operating, closes its preliminary make contacts 673 to complete a locking circuit for its upper winding which includes the key K668 and the conductor C16 extending to the distributor 500, which conductor is grounded over the all links busy lead ALB2 provided an idle link is available in the second group of links. Assuming that an idle link is available in the second group of finder-connector links, the timer relay R670 will remain locked in its operated position. As a further result of the operation of the relay R670, at its contacts 672 it interrupts the circuit for maintaining operated the all links busy relay R610 associated with the first group of finder-connector links, thereby to transfer the start circuit for the subscriber lines normally associated with the first group of links from the distributor 600 to the distributor 500, in the manner described hereinbefore. At its contacts 675, the relay R670 again interrupts the circuit for the control relay R640, thereby to cause the latter relay to restore. At its contacts 674, the relay R670 interrupts a point in the locking circuit for the timer relay R660, whereupon the latter relay restores to normal. Finally, at its contacts 676, the relay R670 completes a circuit including an alarm signal, whereby the exchange attendant is notified that a fault exists and that the distributor 600 is locked out of service.

The attendant at the exchange, having been informed by the alarm signal that a fault exists in the group of finder-connector links served by the distributor 600, will immediately take the necessary steps to correct this condition, and when he is satisfied that the fault has been cleared the key K668 is actuated in order to interrupt a point in the locking circuit for the upper winding of the timer relay R670. Since this relay is the only relay in the distributor 600 which remained in its operated position during the time that the distributor has been locked out of service, the restoration of the relay completes the necessary circuits whereby the all links busy relay R610 may reoperate in order to again complete the circuit for the start relay R620. Thus the distributor 600 is again conditioned for selecting idle links for the use of calling subscribers in the associated group.

It may be well to mention at this time that in the event the tandem exchange A is of the unattended type, the alarm signal circuit described above may be omitted, in which case the unattended exchange equipment is periodically checked by way of a trunk line extending from the central office. In the latter case the operator checking the unattended exchange equipment will take the necessary steps to have the fault cleared and the distributor 600 again placed in service.

Incident to the operation of the distributor 600 to select another link or to transfer the control to the finder distributor 500, the finder that has attempted to find the calling line must be restored to normal. More particularly, when the control relay R640 is restored, in response to the operation of either the timer relay R665 or the timer relay R660, ground potential is disconnected at its contacts 641 from the finder start conductor F. ST. of the selected finder. Assuming that the finder 300 was the finder in use at the time the control relay R640 restored to normal, the removal of ground potential from the finder start conductor F. ST. causes the restoration of the start relay R380. Incident to the restoration of the start relay R380 to normal, at its contacts 381 it disconnects the resistor 381′ from across the talking conductors C41 and C42 extending to the associated connector 800. Thus the operated line relay R850 in the connector 800 is restored to normal. At its contacts 383, 384, 386, 387, 389 and 389′, the relay R380 disconnects the common multiply connected distributor conductors from the finder 300. The start relay R380 also completes, at its contacts 388, a circuit for energizing the release magnet 394 which may be traced from ground, by way of the vertical off-normal contacts 303, the contacts 388, 379 and 369, and the winding of the release magnet 394, to battery. When this magnet is energized the wiper carriage structure of the Strowger switching mechanism in the finder 300 is restored to its normal vertical and rotary positions in the usual manner. The vertical off-normal contacts 303 are opened when the wiper carriage restores to its normal position, thereby to interrupt the energizing circuit for the release magnet 394. The vertical off-normal contacts 302 are again closed, whereby ground potential on the conductor C45 is applied to the all links busy conductor ALB in order to indicate that the associated finder is idle and available for further use. Also, the vertical off-normal contacts 305 are opened in order to remove ground potential from the guard conductor G inasmuch as the start relay R380 has restored to normal to again close its contacts 385. Finally, the cam contacts 301 are opened to interrupt a further point in the circuit for applying ground potential to the guard conductor G. Thus the illustrated finder 300 is fully released. In the event that the wiper carriage of the Strowger mechanism for the finder 300 fails to restore to normal when the release magnet 394 is energized, the circuit completed at the contacts 395 for applying ground potential to the release alarm conductor will cause an alarm signal to be given, after a predetermined delay, to the exchange attendant in order to indicate that the finder 300 has failed to restore to normal.

*Seizing the connector*

When the loop circuit, including the line of the subscriber at substation 200, is extended through the finder 300 in the manner explained above, a circuit is completed for energizing the line relay R850 in the connector, which may be traced from ground, by way of the lower winding of the line relay R850, the contacts 884 and 814, the conductor C42 extending to Fig. 3, the contacts 363, the positive wiper 313 and the engaged contact in the first hundred group 330 of bank contacts terminating the conductor C32, the loop circuit including the substation 200, the conductor C31, the contact in the first hundred group 330 of bank contacts engaged by the negative wiper 312, the contacts 332, the conductor C41 extending to Fig. 8, the contacts 812 and 882 and the upper winding of the line relay R850, to battery. When the line relay R850 operates, at its contacts 852 it completes a circuit for energizing the release control relay R820, which may be traced from ground by way of the contacts 923 and 852, and the winding of the relay R820, to battery. The line relay R850, at its contacts 851, opens a point in the incomplete circuit for preenergizing the upper winding of the line relay R850, and at its contacts 853 it completes a circuit for energizing the lower winding of the lock-pulse relay R860, which may be traced from ground by way of the contacts 871′ and 853, and the lower winding of the relay R860, to battery.

When the above-mentioned circuit is completed for energizing the release control relay R820 the relay operates and, at its contacts 821, completes a circuit for energizing the hold relay R870, which may be traced from ground by way of the contacts 382 and the conductor C43, the contacts 821 and the winding of the relay R870, to battery. It should be noted at this time that when the finder 300 was initially operated in response to the energization of the start relay R380, the circuit for operating the line relay R850 in the connector was immediately completed at the contacts 381 and simultaneously therewith ground potential was applied to the conductor C43 at the contacts 382. Accordingly, the line relay R850 in the connector 800 and the relays R870, R860 and R820 are operated during the interval of time that the start relay R380 in the finder 300 is in its energized position. At its contacts 823, the release control relay R820 also connects one terminal of the winding of the control relay R830 to the grounded conductor C43 but since the other terminal of the winding of this relay is also grounded at this time it does not operate. However, as soon as the switch-through relay R360 in the finder 300 operates to cut the calling line through to the connector 800, the guard conductor G extending to the distributor is grounded in the manner described hereinbefore and thereby causes the restoration of the start relay R380. When this occurs the temporary loop circuit, including the contacts 381 for operating the line relay R850 of the connector 800, is disconnected and the above-mentioned circuit including the calling subscriber line is completed for retaining the line relay R850 in its operated position. As a further result of the restoration of the start relay R380, at its contacts 382 it removes the ground potential applied to the conductor C43 which has retained a short circuit around the winding of the control relay R380. The relay R380 now operates in multiple with the hold relay R870 and the cutoff relay R275 individual to the calling subscriber line. This circuit may be traced from ground, by way of the winding of the control relay R830, and the contacts 823, one branch extending by way of the contacts 821 and the winding of the hold relay R870, and the other branch extending by way of the conductor C43 extending to Fig. 3, the contacts 364, the C1 wiper 314 and the engaged contact in its associated bank terminating the conductor C33, the contacts 278, and the winding of the cutoff relay R275. In view of the foregoing it will be understood that, as soon as the finder 300 switches through to the calling subscriber line, a holding ground potential is applied by way of the winding of the control relay R830 in order to retain the finder 300, the cutoff relay R275 and the hold relay R870 in their operated positions. When the relay R830 operates, at its contacts 831, it completes a circuit for operating the auxiliary control relay R840 from ground at contacts 879. The relay R840, upon operating, at its contacts 844, locks to ground at contacts 879 and at its contacts 841 and 843 it respectively prepares the timing circuit for the timing relay R930 and the reverting call circuit to be described hereinafter.

The lock-pulse relay R860 operates when the above-traced circuit for its lower winding is completed and, at its contacts 862, it completes a multiple circuit for retaining the release control relay R820 in its operated position; at its contacts 861 it opens a point in the incomplete pulsing circuit for the various magnets of the connector 800; and finally, at its contacts 863 it completes a circuit including its upper winding, the contacts 853 and its lower winding, whereby the relay is retained in its operated position, but due to the differential action of the two windings of the relay it is partially deenergized so that it will quickly restore when the circuit is opened under control of the line relay R850, as will be explained hereinafter. In this connection attention is directed to the fact that the relay R870, upon operating, at its contacts 871' interrupted the initial energizing circuit for the lower winding of the lock-pulse relay R860, thereby to permit the above-mentioned series circuit including the upper and lower windings of the relay R860 to be completed in the manner explained above.

As a further result of the operation of the hold relay R870, at its contacts 872 it completes a locking circuit for itself from ground potential applied to the control conductor C43 by way of the winding of the control relay R830. This circuit is provided in order to retain the relay R870 in its energized position when a reverting call is made by a subscriber on a calling party line. At its contacts 873, the relay R870 prepares a locking circuit for various relays included in the connector 800; at its contacts 874 it prepares a point in the preenergizing circuit for the upper winding of the line relay R850, including the resistor 854; at its contacts 875 it applies ground potential to the common locking conductor C1000; and, at its contacts 876, it prepares the point in the circuit for the reverting call relay R950, which relay is operated in the event that the calling subscriber has made a reverting call to another subscriber on the same party line. The relay R870 also interrupts, at its contacts 878, a point in a circuit traced hereinafter for controlling the release magnet 1265 of the minor switch 1260; at its contacts 877 it prepares a point in the incomplete pulsing circuit for the magnet 1263 of the minor switch 1260 and the vertical and rotary magnets 1126 and 936 of the connector 800; and at its contacts 879 it applies ground potential to the hold conductor C1002 and the all links busy conductor C45, whereby ground potential is applied to the all links busy conductor ALB extending to the finder distributor 500 in the event that the finder 300 should be restored to normal to close its vertical off-normal contacts 302 prior to the time that the connector 800 has restored to normal. At its contacts 872', the relay R870 interrupts a point in the circuit traced hereinafter for controlling the release magnet 1135, whereby the wipers of the connector 800 are restored to their normal positions when the connector 800 is released; and, at its contacts 873', it completes a circuit for applying ground potential to the start conductor C801, whereby operation of the common ringing apparatus associated with the connector 800 is initiated. In this connection it is noted that in the event the common ringing apparatus is operating continuously the above-mentioned start circuit may be omitted. At its contacts 874', the relay R870 interrupts a point in the circuit traced hereinafter for controlling the release alarm signal; and, finally, at its contacts 871 it completes a circuit, traced hereinafter, for transmitting the dial tone signal to the calling subscriber. This circuit may be traced from the dial tone conductor C1204 by way of the contacts 1151, 1141, 1031, 1051 and 961, the condenser 958, the contacts 871, the negative talking conductor of the connector 800, the contacts 812, the conductor C41 extending to the finder 300, the contacts 362, the wiper 312, and the engaged contact in the first hundred group 330 of the bank contacts terminating the conductor C31 extending to the substation 200. When the calling subscriber hears the dial tone signal transmitted over the above-traced circuit it is an indication that the dialing of the called subscriber number may be initiated.

From the foregoing explanation of the operation of the connector 800 in response to seizure thereof under control of the start relay R380 of the finder 300, it will be seen that the line relay R850, the release control relay R820, the lock-pulse relay R860 and the hold relay R870 are operated to condition the connector 800 to respond to the impulses of the first digit dialed by the calling subscriber.

*Dialing the first digit*

Assuming that the directory number designating the desired substation 1200A is "2543," the first digit dialed at the calling substation 200 will necessarily comprise two impulses. When the impulse springs of the dial at the calling subscriber substation interrupts the loop circuit, including the windings of the line relay R850, the line relay restores to normal and, at its contacts 852, interrupts a point in the previously traced multiple circuit for the release control relay R820; and, at its contacts 851, it completes a preenergizing circuit for its upper winding, whereby the line relay R850 will be more rapidly operated when the loop circuit including the calling subscriber line is reclosed at the end of the first impulse. This circuit may be traced from ground by way of the contacts 923, 851 and 874, the resistor 854, and the upper winding of the relay R850, to battery. Finally, at its contacts 853, the relay R850 interrupts a point in the previously traced holding circuit including the upper and lower windings of the lock-pulse relay R860. The lock-pulse relay R860 quickly restores to normal inasmuch as the locking circuit, including the differential windings, is such that the relay in its locked position is just on the verge of restoring.

When the lock-pulse relay R860 restores to normal, at its contacts 862, it interrupts a further point in the previously traced multiple circuit for the release control relay R820. The latter relay, however, is of the slow-to-release type and therefore remains in its operated position during pulsing. At its contacts 863, the relay R860 opens a point in the previously traced locking circuit for itself and, finally, at its contacts 861, it completes a circuit for energizing the magnet 1263 of the minor switch 1260 in series with the digit relay R1110 and in multiple with the transfer control relay R1080. This circuit may be traced from ground by way of the contacts 923, 861, 877 and 916, one branch of the circuit extending by way of the lower winding of the transfer control relay R1080, to battery, and the other branch of the circuit extending by way of the contacts 1066 and 1074, the winding of the digit relay R1110, and the winding of the minor switch magnet 1263, to battery. Thus it will be seen that, upon the first restoration of the line relay R850, the lock-pulse relay R860 is restored to normal and it, in turn, causes the operation of the transfer control relay R1080, the digit relay R1110, and the magnet 1263.

The relay R1080 upon operating, at its contacts 1081, disconnects ground potential applied to the conductors C1002 and C1003 from the conductor C1004, thereby to temporarily disconnect ground potential from the multiply connected first to fifth contacts in the banks of the minor switch 1260 associated with the wiper 1261. At its contacts 1082, the relay R1080 short-circuits its upper winding in order to render the relay slow to release and is thus retained in its operated position during pulsing.

The digit relay R1110, upon energizing over the previously mentioned circuit, at its contacts 1111, completes a locking circuit for itself which is independent of its initial energizing circuit including the contacts 1074 and, at its contacts 1112, interrupts a point in the incomplete circuit, traced hereinafter, for controlling the vertical magnet 1126.

In response to its energization the magnet 1263 of the minor switch 1260 advances its wipers 1261 and 1262 in a clockwise direction into engagement with the first contacts in the associated banks and, at its contacts 1264, it prepares a circuit for reenergizing the lower winding of the lock-pulse relay R860 as soon as the line relay R850 is reoperated at the end of the first pulse. In view of the fact that the restoration of the lock-pulse relay R860 completed, at its contacts 861, the circuit for operating the magnet 1263, the latter circuit cannot be interrupted upon the reenergization of the line relay R850 until the magnet 1263 has fully operated to advance its wipers and recomplete, at its contacts 1264, the circuit for operating the lock-pulse relay R860. As soon as the wipers 1261 and 1262 of the minor switch 1260 are advanced from their normal resting positions, the minor switch off-normal contacts 1113 are closed, thereby to complete a circuit for energizing the winding of the minor switch off-normal relay R1120. Upon operating, the relay R1120, at its contacts 1121, prepares a circuit for subsequently controlling the last digit relay R910 and the transfer relay R1070; at its contacts 1122 it prepares a locking circuit for the upper winding of the transfer relay R1060; at its contacts 1123 it disconnects the grounded hold conductor C1002 from the incomplete locking circuit for the relay R930; at its contacts 1125 it interrupts a further point in the circuit for the release magnet 1135; and, finally, at its contacts 1124 it prepares a point in the incomplete circuit for the release magnet 1265 of the minor switch 1260.

At the end of the first pulse the impulse springs of the dial at the calling subscriber substation are reclosed in order to again complete the loop circuit for energizing the line relay R850. Since the upper winding of the line relay R850 has been preenergized over the above-mentioned circuit, including the resistor 854, it immediately energizes and again controls the previously traced circuits by way of its associated contacts 851 to 853, inclusive. At the contacts 853 the previously mentioned circuit, including the contacts 1264 of the magnet 1263, is completed for the lower winding of the lock-pulse relay R860. Upon reoperating, the lock-pulse relay R860, at its contacts 863, completes the previously mentioned holding circuit, including its upper and lower windings; at its contacts 862 it again completes a point in the multiple circuit for maintaining the release control relay R820 in its energized position; and, finally, at its contacts 861 it interrupts the above-mentioned pulsing circuit for controlling the lower winding of the transfer control relay R1080, the digit relay R1110, and the minor switch magnet 1263. When the pulsing circuit including the relays R1080 and R1110 and the magnet 1263 is interrupted, the relay R1080, due to the short-circuit around its upper winding, does not restore to normal immediately but the relay R1110 and the magnet 1263 both restore to normal. When the magnet 1263 restores, at its contacts 1264, it opens the circuit for energizing the lower winding of the lock-pulse relay R860 but the latter winding is maintained energized over the above-mentioned locking circuit including its upper winding. Subsequent impulses transmitted from the calling subscriber dial control the line relay R850, the lock-pulse relay R860, the transfer control relay R1080, the digit relay R1110, and the minor switch magnet 1263 in the same manner as has been described above. Since the first digit dialed by the calling subscriber is the digit "2," the wipers 1261 and 1262 of the minor switch 1260 are positioned into engagement with the second contacts in the associated contact banks and the line relay R850 and the lock-pulse relay R860 are in their operated positions at the end of the second impulse of the digit "2." Referring now to the transfer control relay R1080, at the end of the second impulse, i. e., during the interdigital pause, the relay subsequently restores to normal and, at its contacts 1081, reapplies ground potential to the multiply connected contacts one to five of the bank contacts associated with the wiper 1261 of the minor switch 1260. A circuit is now completed for energizing the first digit relay R1140, which may be traced from ground by way of the contacts 879, the hold conductor C1002, the contacts 914, the conductor C1003, the contacts 1081, the conductor C1004, the contacts 954, the conductor C1005, the multiply connected contacts one to five and the wiper 1261 in engagement with the second contacts in the associated contact bank of the minor switch 1260, and the upper winding of the relay R1140, to battery. The relay R1140 operates over the above-traced circuit and, at its contacts 1146, completes a holding circuit including its lower winding, the conductor C1001, the contacts 912, the conductor C1000, the contacts 875, and ground. As a further result of the operation of the relay R1140, at its contacts 1141 it interrupts the circuit for transmitting dial tone to the calling subscriber; at its contacts 1142 it prepares a point in the circuit for testing for idle subscriber lines, including the winding of the relay R1130; at its contacts 1143 it interrupts a point in the circuit, traced hereinafter, for the switch-through relay R810; at its contacts 1144 it interrupts a point in the incomplete circuit for controlling the last digit and restricted trunk relay R910; at its contacts 1145 and 1147 it completes a circuit for operating the relay R1070; at its contacts 1149 it interrupts a point in the incomplete circuit for the rotary transfer relay R1050; and, finally, at its contacts 1141' it interrupts a point in the circuit for controlling the rotary interrupter relay R940. The foregoing operations are initiated in the event that the first digit "2" is dialed by the calling subscriber.

The above-mentioned circuit for controlling the transfer relay R1070 may be traced from the grounded conductor C1003 by way of the contacts 1081, 1071, 1121, 1145, 1056, 972 and 1147, and the winding of the relay R1070, to battery. The relay R1070 operates over this circuit and closes its preliminary make contacts 1073 before its energizing circuit is opened at its contacts 1071, whereupon a locking circuit is completed which includes the contacts 1073 and 976, and the grounded conductor C1003. When the transfer relay R1070 is completely energized over the circuit including its locking contacts 1073, it interrupts, at its contacts 1071, its initial energizing circuit; it prepares, at its contacts 1072, a point in the incomplete circuit for the lower winding of the vertical transfer relay R1060; at its contacts 1074 it interrupts a point in the previously traced impulsing circuit for energizing the digit relay R1110 in series with the magnet 1263; at its contacts 1075 it prepares a point in the circuit, traced hereinafter, for controlling the vetrical magnet 1126; and at its contacts 1076 it prepares a point in the circuit, traced hereinafter, for controlling the rotary interrupter relay R940.

The connector 800 has now been conditioned to receive the second digit "5" of the directory number of the called substation 1200A.

*Dialing the second digit*

When the second digit "5" is dialed by the subscriber at substation 200, the line relay R850 cooperates with the lock-pulse relay R860 and the contacts 1127 of the vertical magnet 1126 to transmit four current pulses to the lower winding of the transfer control relay R1080 and the winding of the vertical magnet 1126. Thus when the line relay R850 restores at the beginning of the first pulse, the lock-pulse relay R860 restores and, at its contacts 861, completes a circuit which may be traced from ground by way of the contacts 923, 861, 877 and 916, over one branch including the lower winding of the transfer control relay R1080 and over another branch including the contacts 1066, 1075 and 1112, and the winding of the vertical magnet 1126. The transfer control relay operates in the manner described hereinbefore to interrupt, at its contacts 1081, the application of ground potential from the conductor C1003 to the conductor C1004 and, at its contacts 1082, it completes the shunting circuit for its upper winding, whereby the relay is rendered slow to release and remains in its operated position during pulsing. The vertical magnet 1126 operates over the above-traced circuit and, at its contacts 1127, prepares the circuit for operating the lower winding of the lock-pulse relay R860 as soon as the line relay R850 is reenergized, whereupon the lock-pulse relay R860, at its contacts 861, interrupts the pulsing circuit for the vertical magnet 1126 which now restores. Incident to its operation the vertical magnet 1126 causes the wipers 1271 to 1275, inclusive, and 1286 to 1288, inclusive, to be advanced one step in the vertical direction opposite the first level of the associated bank contacts. As soon as the wipers of the connector 800 are moved in a vertical direction away from their normal resting positions the vertical off-normal contacts 958 are closed, thereby to complete an obvious circuit for energizing the vertical off-normal relay R950. Upon operating, the relay R950, at its contacts 951, disconnects battery potential, which is normally connected to the conductor C43 by way of the contacts 816 and the resistor 859 for the purpose of indicating that the connector 800 is idle when it is used in a selector system having selectors of the type disclosed in Fig. 4. In a connector system, however, the battery potential applied to the conductor C43 performs no function in conjunction with the finder 300. At its contacts 952, the relay R950 interrupts a point in the incomplete circuit for the lower winding of the relay R910; at its contacts 953 it prepares a point in the circuit for the lower winding of the vertical transfer relay R1060, which circuit is now interrupted at the contacts 1081 by the relay R1080; and at its contacts 954 it interrupts a point in the previously traced circuit for energizing the first digit relay R1140. The relay R950, at its contacts 956, disconnects ground potential from the ALB2 conductor C45 and connects ground potential, by way of the contacts 955, to the guard conductor C44 extending to the finder 300, thereby to busy the finder-connector link to the finder distributor 600 until the finder 300 and the connector 800 have both restored to normal. Finally, at its contacts 957, the relay R950 prepares a point in the incomplete circuit for controlling the release magnet 1135.

Each time the vertical magnet 1126 is energized in response to the restoration of the lock-pulse relay R860, it causes the above-mentioned wipers of the connector 800 to be advanced an additional step in the vertical direction until, at the conclusion of the fifth impulse transmitted by the calling subscriber at the substation 200, the line relay R850 and the lock-pulse relay R860 remain in their operated positions. Since five impulses have been transmitted corresponding to the digit "5," the vertical magnet has now positioned the wipers of the connector 800 opposite the fifth levels of the associated contact banks. Shortly after the last impulse constituting the digit "5" has been transmitted to the transfer control relay R1080, it restores to normal and, at its contacts 1081, completes a circuit for energizing the lower winding of the vertical transfer relay R1060, which may be traced from the grounded conductor C1003, the contacts 1081, the conductor C1004, the contacts 1072, 1061, 974 and 953, and the lower winding of the relay R1060, to battery. The relay R1060 operates over this circuit and, at its preliminary make contacts 1064, completes a locking circuit for the lower winding including the contacts 976 and the grounded conductor C1003, which is independent of its original energizing circuit. At its contacts 1063, the relay R1060 completes an additional locking circuit including its upper winding, from ground potential at the contacts 1022; at its contacts 1061 it interrupts a point in its original energizing circuit; at its contacts 1062 it prepares a point in the circuit for subsequently controlling the relay R970; at its contacts 1065 it prepares a point in the circuit for controlling the rotary magnet 936; at its contacts 1066 it interrupts the previously mentioned circuit for controlling the vertical magnet 1126 in multiple with the lower winding of the transfer control relay R1080; at its contacts 1067 it completes a circuit including the contacts 1124 for energizing the minor switch release magnet 1265; and, finally, at its contacts 1068 it prepares a point in the circuit for controlling the lock-pulse relay R860 during the rotary movement of the wipers of the connector 800.

When the above-mentioned circuit is completed for the release magnet 1265 of the minor switch 1260, the magnet attracts its associated holding pawl (not shown), thereby to permit the wipers 1261 and 1262 to be restored in a counterclockwise direction to their illustrated normal positions. Incident to the release of the wipers 1261 and 1262 of the minor switch 1260 to their normal positions the minor switch off-normal contacts 1113 are opened, thereby to interrupt the circuit for the minor switch off-normal relay R1120. The latter relay now restores to normal and, at its contacts 1124, interrupts the previously traced circuit for the released magnet 1265, thereby permitting the magnet to restore to normal. Furthermore, the relay R1120, at its contacts 1122, interrupts a point in the energizing circuit for the upper winding of the relay R1060, but the latter relay remains in its operated position over the locking circuit inlcuding its lower winding; at its contacts 1123 it prepares a point in the incomplete locking circuit for the lower winding of the relay R930; and, finally, at its contacts 1125 it prepares a further point in the incomplete circuit for the release magnet 1135. Following the operations just described the connector 800 is conditioned to respond to the impulses of the third digit "4" of the directory number of the called subscriber at substation 1200A.

*Dialing of the third digit*

During the dialing of the third digit "4" the line relay R850 and the lock-pulse relay R860 cooperate in the manner previously described to transmit four current pulses over the impulsing circuit to the transfer control relay R1080, and the rotary magnet 936, in the following manner. Upon the first restoration of the line relay R850 and the lock-pulse relay R860 a pulse is transmitted from ground by way of the contacts 923, 861, 877 and 916, one branch extending to the lower winding of the transfer control relay R1080, which now operates and remains in its operated position during pulsing due to the shunt circuit completed around its upper winding; and the other branch extending by way of the contacts 1065 to the winding of the rotary magnet 936, and in parallel therewith a circuit is completed by way of the contacts 978 and 1051′ for the upper winding of the rotary transfer relay R1050. When the relay R1080 operates, at its contacts 1081, it interrupts the circuit for applying ground potential from the grounded conductor C1003 to the conductor C1004, thereby to prevent the operation of the relay R970 until the relay R1080 restores at the end of the third dialed digit.

The rotary transfer relay R1050, upon operating in parallel with the rotary magnet 936, at its preliminary make contacts 1059 completes a locking circuit which includes its lower winding, the contacts 976, and the grounded conductor C1003, whereby the relay is retained in its operated position after its initial energizing circuit is interrupted at its contacts 1051′. Also, upon operating, the relay R1050, at its contacts 1051, interrupts a further point in the incomplete dial tone circuit; at its contacts 1052 and 1053 it transfers the circuit, which includes either the C1 wiper 1274 or the C2 wiper 1288, from the circuit including the idle test relay R1130 to a circuit including the busy test relay R1030; at its contacts 1055 it interrupts a point in the incomplete circuit for controlling the trunk switch-through relay R810; at its contacts 1056 it interrupts a point in the incomplete circuit for the upper winding of the last digit and restricted trunk relay R910; and, simultaneously therewith, at its contacts 1057 it prepares the point in the incomplete circuit for the lower winding of the relay R910. The relay R1050 also prepares, at its contacts 1058, a circuit for operating the trunk hunting relay R970 at the end of the third digit; at its contacts 1052′ it completes a circuit including the grounded conductor C1003 and the contacts 979 for energizing the winding of the slow-to-release trunk hunting relay R980; and, finally, at its contacts 1053′ it interrupts a point in the incomplete locking circuit for the timing relay R930. The latter circuit is provided in order to restore the timing relay R930 and thus reset the timing period so that the time required by the subscriber to dial the first and second digits is not charged against the subscribed when conversation timing is used.

The slow-to-release trunk hunting relay R980, upon operating, at its contacts 981 completes a locking circuit including the grounded conductor C1003 and the upper winding of the rotary transfer relay R1050 in order to maintain the latter relay in its operated position; at its contacts 982 it interrupts a point in the circuit of the reverting call release relay R1010; and at its contacts 983 it prepares a point in the incomplete circuit for the rotary interrupter relay R940. The latter relay is provided for the purpose of causing automatic rotary stepping of the wipers of the connector 800 in search of an idle trunk, in the event a trunk group is dialed by the calling subscriber.

When the rotary magnet 936 operates it rotates the wipers of the connector into engagement with the first set of bank contacts in the selected level. In the present example the rotary magnet 936 rotates the wipers of the connector 800 into engagement with the first set of bank contacts in the fifth level. Also upon operating, the rotary magnet 936, at its contacts 938, prepares a circuit which may be traced from ground by way of the contacts 1068, 938 and 853 for energizing the lower winding of the lock-pulse relay R860. This circuit is completed as soon as the rotary magnet 936 operates, provided the line relay R850 has operated in the meantime. When the lock-pulse relay R860 operates it interrupts, at its contacts 861, the above-traced circuit for energizing the transfer control relay R1080, the rotary transfer relay R1050, and the rotary magnet 936. The magnet restores to normal but the relays R1080 and R1050 remain in their operated positions during the dialing of the third digit.

Each time the rotary magnet 936 is energized over the above-traced pulsing circuit it functions to step the wipers of the connector one step in the rotary direction, so that at the conclusion of the third digit "4" the wipers are left in engagement with the contacts terminating the conductors of the party line extending to the called subscriber at substation 1200A. Furthermore, each time the rotary magnet 936 operates it completes, at its contacts 938, the above-mentioned circuit for energizing the lock-pulse relay R860 and, at its contacts 937, it interrupts a point in the incomplete circuit for the rotary interrupter relay R940.

Incident to the rotary movement of the wipers 1271 to 1275, inclusive, and the wipers 1286 to 1288, inclusive, over the contacts of the selected fifth level, the busy test relay R1030 is operated each time the C1 wiper 1274 or the C2 wiper 1288, in the event the wiper switching relay R1250 is operated, encounters a contact terminating the private conductor of a busy line. The resulting operation and release of this relay, which occurs during the indicated movement of the enumerated wipers, is without effect.

*Busy test*

In the event the called line is busy at the time it is selected in the manner just explained, the private conductor 1200W thereof is marked with ground potential and the busy test relay R1030 is energized over a circuit traced hereinafter. This circuit may be traced as extending from ground by way of the private conductor 1200W, the C1 wiper 1274, the contacts 1255 in the event that "B" wiring is provided in the connector 800, the contacts 1053, and the lower winding of the busy test relay R1030, to battery. Upon operating, the relay R1030, at its contacts 1031, interrupts a further point in the previously traced dial tone circuit; at its contacts 1032 it prepares a point in the circuit, traced hereinafter, for transmitting busy tone to the calling subscriber;

at its contacts 1033 it prepares a point in the locking circuit for itself; and at its contacts 1034 it prepares a circuit for forwarding ground potential on the C1 wiper 1274. The latter circuit is only completed in the event that the call being extended by the calling subscriber is a reverting call to another subscriber on the calling subscriber line. The relay R1030, upon operating, also interrupts, at its contacts 1035, a point in the circuit for the idle test relay R1130 in order to prevent the latter relay from operating in the event that the called subscriber line should subsequently become idle while the wipers of the connector 800 are in engagement therewith; at its contacts 1036 it prepares a point in the incomplete circuit for energizing the relay R1040 in series with the relay R1020; and, finally, at its contacts 1037 it prepares a point in the circuit for connecting the rotary interrupter relay R940 to the EC wiper 1275 in order to provide automatic rotary stepping of the wipers in the event a P. B. X group of trunks has been dialed by the calling subscriber.

Shortly following the operation of the busy test relay R1030, and a short interval of time after the receipt of the last impulse of the third digit "4" dialed by the calling subscriber, the transfer control relay R1080 restores to normal. Upon restoring, at its contacts 1081, the relay R1080 completes a circuit for operating the trunk hunting relay R970, which may be traced from the grounded conductor C1003 by way of the contacts 1081, 1072, 1062 and 1058, and the winding of the relay R970, to battery. The relay R970 operates over the above-traced circuit and, at its contacts 975, completes a locking circuit for itself which includes the grounded conductor C1003. Furthermore the relay R970, upon operating, at its contacts 971 prepares a point in the incomplete circuit for the trunk switch-through relay R810; at its contacts 972 it interrupts a point in the previously traced initial energizing circuit for the transfer relay R1070; at its contacts 973 it prepares a point in the incomplete circuit for the upper winding of the last digit and restricted trunk relay R910; and at its contacts 974 it interrupts a point in the previously traced initial energizing circuit for the lower winding of the vertical transfer relay R1060. Furthermore, the relay R970, upon operating, at its contacts 976 interrupts a point in the locking circuits for the relays R1050, R1060 and R1070. The relays R1060 and R1070 now restore to normal but the rotary transfer relay R1050 remains in its operated position over the locking circuit including its upper winding, the contacts 981, and the grounded conductor C1003. At its contacts 977 the relay R970 prepares a point in the circuit for controlling the rotary magnet 936 in conjunction with the rotary interrupter relay R940 in order to prepare the wipers of the connector 800 for automatic rotary movement in the event the P. B. X trunk group is called; at its contacts 978 it opens a point in the previously traced initial energizing circuit for the upper winding of the relay R1050; at its contacts 979 it interrupts a point in the circuit for the trunk hunting relay R980, but this relay does not immediately restore to normal due to its slow-to-release characteristics; and, finally, at its contacts 971′ it completes a circuit including the EC wiper 1275, the contacts 1259 if "B" wiring of the connector is used, the contacts 1225, 1037, 983 and 971′, the winding of the rotary interrupter relay R940, and the contacts 937, to battery. Since the call being described is not extended to a P. B. X trunk group, the contacts engaged by the wiper 1275 are not grounded, as is the usual case in P. B. X trunk hunting connectors, and, consequently, the rotary interrupter relay R940 is not energized on the call being described.

When the transfer relay R1070 and the vertical transfer relay R1060 restore in response to the operation of the trunk hunting relay R970, they recomplete, at their respective contacts 1074 and 1066, the previously traced pulsing circuit including the lower winding of the transfer control relay R1080, the winding of the digit relay R1110 and the magnet 1263 of the minor switch 1260. The various other contacts on the two mentioned relays control various incomplete circuits which are ineffective at the present time.

The trunk hunting relay R980, due to its slow-to-release characteristics, is somewhat delayed in restoring to normal after its circuit is interrupted at the contacts 979 by the operation of the trunk hunting relay R970. The relay R980 subsequently restores to normal and, at its contacts 981, interrupts the previously traced circuit for the upper winding of the relay R1050, thereby to permit the latter relay to restore; at its contacts 982 it prepares a point in the incomplete circuit for the upper winding of the reverting call release relay R1010; and, finally, at its contacts 983 it interrupts a point in one of the circuits for controlling the rotary interrupter relay R940.

The rotary transfer relay R1050, upon restoring to normal, at its contacts 1053 disconnects the circuit, including the lower winding of the busy test relay R1030, from the C1 wiper 1274 and, simultaneously therewith, at its contacts 1054 it connects the lower winding of the relay R1030 by way of the contacts 1033 and 1043 to the grounded conductor C1000, thereby to retain the relay R1030 in its operated position after the relay R1050 restores to normal. At its contacts 1052, the relay R1050 connects the C1 wiper 1274 to a circuit including the idle test relay R1130, but, inasmuch as the busy test relay R1030 is in its energized position and its contacts 1035 are opened, the idle test relay R1130 cannot be operated at the present time. At its contacts 1051, the relay R1050 completes a circuit for transmitting a busy tone signal to the calling subscriber, which may be traced from the busy tone conductor C1018 by way of the contacts 1021, 1032, 1051 and 961, the condenser 958, and via the previously traced circuit described in connection with the transmission of the dial tone signal to the calling subscriber line. The resulting busy signal serves to inform the calling subscriber at substation 200 that the desired connection cannot be obtained at the present time. As a further result of the restoration of the relay R1050, at its contacts 1055 it prepares a point in the incomplete circuit for the upper winding of the trunk switch-through relay R810; at its contacts 1056 it prepares a point in the incomplete circuit for the upper winding of the last digit and restricted trunk relay R910; at its contacts 1051′ it again prepares a point in the incomplete circuit for energizing its upper winding; at its contacts 1052′ it interrupts a further point in the previously traced circuit for energizing the trunk hunting relay R980; and, at its contacts 1053′ it prepares a point in the locking circuit for the timing relay R930. The circuits which are interrupted by the contacts 1057, 1058 and 1059, upon the restoration of the relay R1050, have no effect at the present time. The above-described operations of the connector 800 for transmitting the busy tone signal to the calling subscriber when a busy called line is encountered take place immediately after the third digit "4" has been dialed by the calling subscriber. Consequently, upon hearing the busy tone signal the calling subscriber at substation 200 should replace his receiver upon the associated switchhook in order to release the entire connection. If the subscriber ignores the busy signal and dials the fourth digit of the called subscriber number, the connector 800 will respond to select the ringing signal of the desired called subscriber at substation 1200A and the busy tone signal will be transmitted after the fourth digit is dialed. The operation of the connector 800 in response to the dialing of the fourth digit of the called subscriber number will be described subsequently.

*Idle test*

In the event that the called party line extending to the subscriber at substation 1200A is idle at the time it is selected in the manner explained above, the private conductor 1200W thereof is marked with negative battery potential so that the lower winding of the busy test relay R1030 is short-circuited and does not operate. Therefore, at the end of the third digit dialed by the calling subscriber the transfer control relay R1080 restores to normal and causes the operation of the trunk hunting relay R970. The latter relay, in turn, causes the restoration of the transfer relay R1070 and the vertical transfer relay R1060. Shortly thereafter the slow-to-release trunk hunting relay R980 restores to normal and thereby causes the rotary transfer relay R1050 also to restore to normal. The circuits controlled by the various relays just mentioned have been described hereinbefore and will not be repeated. It is to be noted, however, that when the relay R1050 restores to normal the battery potential which is connected to the private conductor 1200W, by way of the winding of the cutoff relay (not shown) in the line circuit 1200, and extended by way of the C1 wiper 1274 and the contacts 1255, is disconnected from the winding of the busy test relay R1030 at the contacts 1053, and at the contacts 1052 the battery potential is connected, by way of the idle test relay R1130, the contacts 1142, 1035 and 873, to ground. When the above-traced circuit is completed the idle test relay R1130 operates and completes, at its contacts 1131, a circuit including the contacts 1014 for operating the switching relay R1220.

In operating, the switching relay R1220 first completes a locking circuit for itself which includes its contacts 1226 and the grounded conductor C1000. At its contacts 1221 and 1222, the relay R1220 prepares a talking connection between the subscriber at substation 200 and the called party line extending to the subscriber at substation 1200A, and prepares a circuit for transmitting ringing current over the called line. Also, the relay R1220, at its contacts 1223, completes a circuit including ground at the contacts 964 and 1255, and the C1 wiper 1274, for marking the selected called line busy to all other connectors having access thereto. At the time the above-traced circuit is completed the ground potential at the contacts 964 is further extended by way of the contacts 1223 and 1252, thereby to short-circuit the idle test relay R1130 which slowly restores to normal. At its contacts 1227 the relay R1220 prepares a point in the incomplete operating circuit for the pickup relay R1240 and, at its contacts 1228, it interrupts a point in the incomplete circuit for the release magnet 1135. Finally, at its contacts 1225, the relay R1220 prepares a point in the incomplete circuit for applying ground potential to the reverting call release conductor C1229 extending to the timer (not shown). The latter circuit functions only when the calling subscriber is making a reverting call to another subscriber located on the same calling line. Following the operation of the switching relay R1220 to perform the functions just described, the connector 800 is conditioned to respond to the fourth digit of the directory number designating the called subscriber at substation 1200A.

*Dialing the fourth digit*

During the dialing of the fourth digit "3" designating the particular ringing code assigned to the called substation 1200A, the line relay R850 and the lock-pulse relay R860 function in the manner previously described to transit three current pulses to the transfer control relay R1080, to the digit relay R1110 and to the minor switch magnet 1263. The circuit over which these relays are controlled is exactly the same as that previously described in connection with the transmission of the first digit dialed by the calling subscriber to the connector 800. Consequently, the minor switch magnet 1263, at its contacts 1264, and the lock-pulse relay R860, at its contacts 861, cooperate in the manner previously described to insure that the magnet 1263 is fully operated before this circuit is reopened by the lock-pulse relay R860. Each time the magnet 1263 is operated it steps the wipers 1261 and 1262 of the minor switch 1260 one step in a clockwise direction, and at the end of the third impulse the wipers 1261 and 1262 stand in engagement with the third contacts in their respective banks. Incident to the off-normal movement of these wipers, the minor switch off-normal contacts 1113 are closed in order again to energize the winding of the minor switch off-normal relay R1120. This relay, upon operating, at its contacts 1124, again prepares a point in the operating circuit for the minor switch release magnet 1265 and at its contacts 1121, it prepares a circuit, traced hereinafter, for energizing the upper winding of the last digit and restricted trunk relay R910.

Shortly following the last impulse of the fourth digit dialed by the calling subscriber, the relay R1080 restores to normal and, at its contacts 1081, completes a circuit including the grounded conductor C1003, the contacts 1071, 1121, 1145, 1056 and 973 for energizing the upper winding of the relay R910. The relay R910 upon operating, at its contacts 918, completes a locking circuit including its lower winding and the grounded conductor C1000. As a further result of the operation of the relay R910, at its contacts 911 it prepares a point in the locking circuit for the ring cut-off slave relay R1150; at its contacts 912 it interrupts a point in the circuit for applying ground potential to the conductor C1001 extending to the lower winding of the first digit relay R1140, but the latter relay remains in its operated position over an alternate circuit including the contacts 1146 and 1153 and the grounded conductor C1000; and at its contacts 913 it completes a circuit including the grounded conductor C1002, the upper winding of the lock-pulse relay R860, the contacts 853, and the lower winding of the lock-pulse relay R860 to insure that the latter relay is maintained in its operated position. By way of explanation, it may be mentioned that the lock-pulse relay R860 is normally retained in its operated position due to the previously mentioned circuit completed upon the last operation of the magnet 1263 of the minor switch 1260, but it may happen under certain conditions that the line relay R850 may momentarily release and thus cause the lock-pulse relay R860 to be restored. At the contacts 914, the relay R910 disconnects the grounded conductor C1002 from the conductor C1003, thereby to interrupt the locking circuit for the trunk hunting relay R970 and the above-traced initial energizing circuit for the upper winding of the relay R910. However, it will be recalled that the relay R910 remains locked up over the circuit including its lower winding and its contacts 918. At its contacts 915, the relay R910 prepares a point in a circuit including the contacts 843, whereby the hold relay R870 is retained in its operated position after a calling subscriber has replaced his receiver during the extension of a reverting call, as will be subsequently described. At its contacts 916, the relay R910 opens a point in the previously traced impulsing circuit for controlling the magnet 1263 of the minor switch 1260, the vertical magnet 1126, and the rotary magnet 936. Finally, at its contacts 917, the relay R910 completes a circuit, traced hereinafter, for connecting either the pickup pulse lead PU—1 or the pickup pulse lead PU—2 from the ringing interrupter to the pickup relay R1240.

Since the first digit dialed by the calling subscriber in order to extend the connection to the subscriber at substation 1200A was the digit "2," the pickup select relay R1230 is in its normal position and, consequently, the pickup pulse lead PU—1 will be connected through to the winding of the pickup relay R1240. By way of explanation, attention is directed to the fact that if the first digit dialed by the calling subscriber had been the digit "3," the wiper 1261 of the minor switch 1260 would have advanced to the third contact in its associated contact bank and thereby caused the operation of the relay R1230. Operation of this relay, at its contacts 1233, connects the pickup pulse lead PU—2 to the circuit including the winding of the pickup relay R1240.

*Ringing the called substation*

Shortly following the operation of the relay R910 to perform the functions described above, a ground pulse is transmitted over the pickup pulse lead PU—1 extending from the ringing interrupter 1212, thereby to energize the pickup relay R1240. The circuit for operating the relay R1240 extends from the grounded lead PU—1 by way of the contacts 1234, 917, 1245, 1153 and 1227, and the winding of the relay R1240, to battery. This pickup pulse occurs just prior to the beginning of each of the available ten ringing codes in the first group of ten ringing codes. On the other hand, if the pickup select relay R1230 is in its energized position, the ground pulse for controlling the operation of the pickup relay R1240 will be applied to the pickup pulse lead PU—2, whereby the ten codes of the second group, which are different from the codes of the first-mentioned group, are applied to the ten ringing conductors connected to the bank contacts of the minor switch 1260. The pickup relay R1240 operates when the ground pulse is received over the pickup lead PU—1 and, at its contacts 1244, completes a locking circuit including the grounded hold lead HOLD extending to the ringing interrupter. Ground potential is maintained upon the hold lead by the ringing interrupter during the ringing cycle and, at the end of each ringing cycle, ground is removed therefrom in order to restore the pickup relay R1240 and thus permit it to be reoperated under control of one of the pickup pulse leads. At its contacts 1242, the relay R1240 prepares a circuit including the even numbered bank contacts associated with the wiper 1262 of the minor switch 1260 and the even digit ringing relay R1180; at its contacts 1243 it prepares a circuit including the odd numbered contacts of the bank associated with the wiper 1262 of the minor switch 1260 and the odd digit ringing relay R1170; and, finally, at its contacts 1241 it prepares a point in the circuit for transmitting a dial tone signal to the calling subscriber in the event that conversation timing is used in the connection. This operation will be described more in detail hereinafter. In response to the final digit "3" dialed by the calling subscriber the wiper 1262 is left standing in engagement with the third contacts in its associated contact banks which terminate the third code conductor C3. Accordingly, the odd digit ringing relay R1170 is operated in accordance with the code transmitted over the code conductor C3 by the ringing interrupter. Thus each time a ground pulse is applied to the conductor C3 in accordance with the particular code, the odd digit ringing relay R1170 is operated.

Each time the relay R1170 operates, at its contacts 1172 it completes a circuit for transmitting ringing current over the called party line extending to the substation 1200A. Accordingly, the ringing current traverses a circuit which may be traced as extending from the ringing current generator (not shown) by way of the ringing current conductor GEN., the winding of the ring cutoff relay R1210, the contacts 1172, 1181, 1221 and 1251, the —1 wiper 1272 and the engaged contact in its associated contact bank terminating the negative line conductor 1200Z, to the grounded ringer at substation 1200A. At its contacts 1175, the relay R1170 also applies ground potential by way of the contacts 1184, 1222 and 1253, the +1 wiper 1273 and the engaged contact in its associated contact bank terminating the positive line conductor 1200Y, in order to provide a direct current circuit for operating the ring cutoff relay R1210 should the called subscriber at substation 1200A answer the call during a ringing period. Furthermore, the relay R1170, at its contacts 1171 and 1174, disconnects the talking conductors extending to the calling subscriber at substation 200 in order to prevent the ringing current from being transmitted to the receiver of the calling subscriber. At its contacts 1173, the relay R1170 completes a circuit for transmitting a ring-back tone signal to the calling subscriber in order to indicate that the desired called substation is being signaled. This circuit may be traced from the ringing current conductor GEN. by way of the winding of the ring cutoff relay R1210, the contacts 1173, the ring-back tone condenser 1101, and the negative talking conductor of the connector, including the talking condenser 918 and the contacts 812, and the previously traced circuit extending to the calling subscriber substation. Finally, at its contacts 1176, the relay R1170 completes a circuit for the slow-to-operate drain relay R1160. The latter relay remains in its operated position for a short period of time after each restoration of the relay R1170 in order to discharge the ringing condensers included in the substation circuits of each of the subscribers on the called party line, in order to prevent false operation of the back-bridge relay R880, as will be described hereinafter. The above-traced circuit for transmitting ringing current to the called subscriber line is completed each time the relay R1170 is operated, and each time the relay restores, at its contacts 1171 and 1174, it completes a circuit, traced hereinafter, for draining the accumulated charge from the calling subscriber line. Thus it will be noted that, with the relay R1160 in its operated position and the relay R1170 in its restored position, exchange battery is connected to the negative conductor 1200Z of the called subscriber line over a path which includes the resistor 1166, the contacts 1162, 1171, 1181, 1221 and 1251, and the −1 wiper 1272 which stands in engagement with the bank contact terminating the negative line conductor 1200Z. Furthermore, the relay R1160 connects ground potential to the positive conductor 1200Y of the called subscriber line over a path which includes the contacts 1164, 1174, 1184, 1222 and 1253, and the +1 wiper 1273 which stands in engagement with the bank contact terminating the positive conductor 1200Y. Furthermore, at its contacts 1165, the relay R1160 prepares a circuit for the ring cutoff slave relay R1150 so that, in the event the ring cutoff relay R1210 is operated by a direct current circuit completed in response to the called subscriber answering the call during the time ringing current is applied to the called subscriber line, the ring cutoff slave relay R1150 may also be operated. In view of the foregoing description of the operation of the relay R1170 and the relay R1160, it will be apparent that each time the relay R1170 is operated in accordance with the grounded code pulses transmitted by the ringing interrupter over the code conductor C3 a ringing current is transmitted to the called subscriber line. Furthermore, each time the relay R1170 restores it interrupts the transmission of ringing current to the called subscriber line and it interrupts the circuit for energizing the drain relay R1160. The latter relay is somewhat slow to release and therefore retains the battery and ground potentials upon the negative and positive line conductors, respectively, of the called subscriber line. Shortly thereafter the relay R1160 also restores to normal and, at its contacts 1161 and 1163, connects the upper and lower windings of the back-bridge relay R880 to the conductors of the called line. The circuit for connecting the lower winding of the back-bridge relay R880 to the positive line conductor of the called line may be traced from ground, by way of the lower winding of the relay R880, the contacts 1163, 1174, 1184, 1222 and 1253, and the +1 wiper 1273; and the circuit for connecting the upper winding of the back-bridge relay R880 to the negative conductor of the called line may be traced from battery, by way of the upper winding of the relay R880, the contacts 1161, 1171, 1181, 1221 and 1251, and the −1 wiper 1272. The main purpose of providing the previously described arrangement for draining the accumulated charge on the called subscriber line at the end of each ringing period is to prevent a transient current pulse from causing the premature operation of the back-bridge relay R880 before the call is answered at the called substation 1200A.

At the end of each ringing code cycle, as determined by the operation of the ringing interrupter, the hold conductor HOLD is disconnected from ground by the ringing interrupter in order to deenergize the pickup relay R1240. Upon restoring, the relay R1240 opens its contacts 1244 in order to interrupt its locking circuit and closes its contacts 1245 to reprepare its original operating circuit including the pickup pulse lead PU—1. At its contacts 1243, the relay R1240 interrupts the previously traced circuit for energizing the odd digit ringing relay R1170 in accordance with the code ground pulses transmitted over the code conductor C3. After an appropriate spacing interval, as determined by the operation of the interrupter, a ground pulse is again transmitted by the ringing interrupter over the pickup pulse lead PU—1 to cause the reoperation of the pickup relay R1240. From this point on the manner in which the ringing equipment continues to operate in order to cause the transmission of the coded ringing current over the called subscriber line extending to substation 1200A is exactly the same as described above. The character of the transmitted code indicates to the subscribers at the various substations served by the called party line that only the subscriber at substation 1200A is being called.

The manner in which the ringing current is transmitted in accordance with the coded ground pulses transmitted over any one of the odd numbered code leads C1, C3, C5, C7 and C9 over the negative conductor 1200Z of the called subscriber line is exactly the same as explained above, and the particular code utilized in signaling a desired called subscriber is determined by the position of the wiper 1262 of the minor switch 1260 in response to the dialing of the fourth or last digit of the called subscriber directory number. In the event the wiper 1262 is positioned in engagement with the even numbered contacts in its associated contact bank, by the dialing of the fourth or last digit of a called subscriber directory number, the code conductor C2, C4, C6, C8 or C10 will be selected in order to operate the even digit ringing relay R1180 in accordance with the grounded code transmitted over the selected code conductor by the ringing interrupter. Consequently, the even digit ringing relay R1180 will be operated in accordance with the selected code instead of the odd digit ringing relay R1170 and, at its contacts 1182 and 1185, causes the ringing current transmitted over the ringing current conductor GEN. to be connected to the positive line conductor 1200Y instead of to the negative line conductor 1200Z. The subscriber substations having their ringers connected between ground and the positive conductor 1200Y will respond to the coded current transmitted over the line and will cause the respective ringers to respond, but only the particular called subscriber whose ringing code corresponds to that being transmitted will answer the call.

Regardless of the circuit utilized for transmitting ringing current to the ringers at the various substations connected to the positive or negative line conductors, a portion of the ringing current is transmitted to the calling subscriber involved in the connection during each ringing interval to produce the usual ring-back tone signal in the manner described hereinbefore.

*Answering of a call*

When the call is answered at the called substation 1200A, a direct current bridge is established between the negative conductor 1200Z and the positive conductor 1200Y of the called party line, thereby to terminate the transmission of the coded ringing current. If the call is answered during a time that the ringing current is applied to the conductors of the called party line the ring cutoff relay R1210 is operated. The circuit for energizing the relay R1210 may be traced from ground by way of the contacts 1175, 1184, 1222 and 1253, the +1 wiper 1273, the positive line conductor 1200Y, the direct current bridge established between this conductor and the negative conductor 1200Z at the substation 1200A, the −1 wiper 1272, the contacts 1251, 1221, 1181 and 1172, the winding of the relay R1210, the ringing current conductor GEN. and the ringing current generator (not shown) which is connected to the negative terminal of the exchange battery. The above-traced circuit is completed in the event that the odd digit ringing relay R1170 is in its energized position. However, in the event that the even digit ringing relay R1180 is utilized to transmit the ringing current over the positive conductor 1200Y of the called subscriber line, then the above-traced circuit is reversed and includes the contacts 1182 and 1185 instead of the contacts 1172 and 1175.

When the ring cutoff relay R1210 is energized over either of the two circuits traced above it completes a circuit, at its contacts 1211, for operating the ring cutoff slave relay R1150. The latter circuit may be traced from the grounded conductor C1000 by way of the contacts 1211 and 1165, and the winding of the relay R1150, to battery. Upon operating the relay R1150, at its contacts 1154, completes a locking circuit for itself which includes the contacts 911 of the operated relay R910, and the grounded conductor C1000. At its contacts 1151, the relay R1150 interrupts a further point in the dial tone circuit; at its contacts 1152 it prepares a point in the circuit for transmitting a reverting call tone signal, which is only effective in the event a reverting call is made by the calling subscriber; at its contacts 1153 it interrupts the locking circuit for the lower winding of the relay R1140, thereby to cause the latter relay to restore to normal; at its contacts 1155 it prepares a point in the circuit for the relay R1010; and at its contacts 1156 and 1157 it interrupts the operating circuits for the relays R1180 and R1170, respectively. When the latter circuits are interrupted the operated one of the two relays mentioned restores to normal, thereby to disconnect the ringing current conductor GEN. from the conductor of the called line and thus terminates the transmission of the ringing current. The relay R1150 also prepares, at its contacts 1158, a circuit for controlling the release control relay R920; at its contacts 1159 it interrupts a point in the locking circuit for one of the timing relays R930; and, simultaneously therewith, at its contacts 1151' it prepares an alternative circuit for controlling the latter relay. Furthermore, the relay R1150, at its contacts 1152', prepares a point in the circuit for the pickup relay R1240, whereby the latter relay may be subsequently controlled in order to transmit a warning tone to a calling subscriber in the event that conversation timing is utilized in a connection; and, finally, at its contacts 1154' a circuit is completed, including the contacts 1124, for energizing the release magnet 1265 of the minor switch 1260. When thus energized the release magnet 1265 attracts its associated holding pawl to permit the wipers 1261 and 1262 of the minor switch 1260 to be restored in a counterclockwise direction to their normal resting positions. Incident to the return movement of these wipers the minor switch off-normal contacts 1113 are disengaged, thereby to interrupt the circuit for the relay R1120 which restores to normal. In restoring to normal the relay R1120, at its contacts 1123, prepares a further point in the incomplete locking circuit for the relay R930; at its contacts 1124 it interrupts the circuit for the release magnet 1265, thereby to permit the magnet to restore to normal; and, finally, at its contacts 1125 it prepares a point in the incomplete circuit for the release magnet 1135.

Incident to the restoration of the relay R1170 or R1180, the circuit for the drain relay R1160 is interrupted thereby causing the latter relay to restore. In restoring, the relay R1160, at its contacts 1161 and 1163, completes the answering loop circuit which extends from the called substation 1200A to the back-ridge relay R880. Also, at its contacts 1165, the relay R1160 interrupts a point in the initial operating circuit for the relay R1150, which was completed previously under control of the ring cutoff relay R1210.

The circuit for operating the back-bridge relay R880, upon the restoration of the drain relay R1160, may be traced from ground by way of the lower winding of the relay R880, the contacts 1163, 1174, 1184, 1222 and 1253, the +1 wiper 1273 and the engaged contact in its associated contact bank terminating the positive conductor 1200Y, the direct current loop circuit bridging the conductors 1200Y and 1200Z at the substation 1200A, the negative line conductor 1200Z, and the contact in the bank engaged by the −1 wiper 1272, the contacts 1251, 1221, 1181, 1171 and 1161, and the upper winding of the back-bridge relay R880, to battery. In operating, the back-bridge relay R880, at its contacts 885, completes a multiple holding circuit for the ring cutoff slave relay R1150, which extends from the grounded conductor C1000 by way of the contacts 885 and the winding of the relay R1150, to battery. As a further result of the operation of the back-bridge relay R880, at its contacts 881 to 884, inclusive, it reverses the battery and ground connection, including the upper and lower windings of the relay R850, to the negative and positive calling line conductors C41 and C42. Since in the present case the call originated from a subscriber line, the reversal of the direction of current flow over the calling line has no function to perform. However, if the call had originated at an operator position the reversal of current would be utilized to give the calling operator the usual answering supervisory signal. Following the operation of the relay R880 the desired conversational connection between the calling subscriber at substation 200 and the called subscriber at substation 1200A is fully completed. In this regard it will be noted that talking battery is applied to the conductors of the calling subscriber line through the windings of the line relay R850, and talking battery is applied to the conductors of the called party line through the windings of the back-bridge relay R880.

In the foregoing description of the operation of the connector 800 to terminate the transmission of the ringing current to the called subscriber line it was assumed that the called subscriber answered the call at a time when ringing current was being applied to the line; in other words the relay R1170 or R1180 and the relay R1160 were in their operated positions. In the event that the called subscriber at substation 1200A answers the call during a silent period in a ringing code cycle, for example when the relay A1170 or R1180 is in its normal resting position, the relay R1160 remains energized for a short interval of time in order to maintain the discharge circuit, including its contacts 1162 and 1164, for a short interval of time after the ringing relays have restored. Finally, the relay R1160 restores to normal and, at its contacts 1161 and 1163, completes the previously traced circuit, including the windings of the backbridge relay R880 and the positive and negative conductors 1200Y and 1200Z. If the called subscriber at substation 1200A now answers the call, the direct current substation circuit is completed for operating the relay R880, in the manner previously described. At its contacts 885, the relay R880 completes an operating circuit for the ring cutoff slave relay R1150. Operation of the relay R1150 controls the various circuits of the connector, as described hereinbefore, and thus prevents further transmission of ringing current over the called subscriber line. Thus it will be seen that the ring cutoff relay R1210 is not energized when a called subscriber answers a call during the silent interval of a ringing code cycle.

*Ringing on twenty party lines*

From the preceding explanation it will be understood that the called subscriber party line may serve at least ten subscriber substations since ten separate code conductors, each transmitting a different code, may be selected by the final digit dialed by the calling subscriber into the minor switch 1260. In some installations it may be desirable to have ten additional subscribers connected to the party line, in which case ten additional code signals must be provided by the ringing interrupter. In order to provide the code selecting facilities required for signaling over lines having as many as twenty substations thereon, the first digit dialed by a calling subscriber is utilized to effect a partial selection of the ringing code. As has been pointed out above in describing the connection extended to the called subscriber at substation 1200A, the first digit dialed by the calling subscriber was the digit "2," which causes the minor switch 1260 to advance its wiper 1261 into engagement with the second contact in its associated contact bank and thus cause the operation of the relay R1140. The pickup select relay R1230, however, is not operated when the first digit "2" is dialed and, consequently, the pickup pulse lead PU—1 is utilized to control the time at which the pickup relay R1240 is to be operated, so that when the final code selecting digit of a directory number is dialed, the minor switch wiper 1262 will permit the proper code impulses to be transmitted to the odd or even digit ringing relay R1170 or R1180.

In the event the first digit dialed by a calling subscriber comprises three impulses, the wipers 1261 and 1262 of the minor switch are positioned to engage their respective associated third contacts at the end of the digit. In this case a circuit is completed for energizing the lower winding of the pickup select relay R1230 instead of energizing the upper winding of the relay R1140. The circuit for operating the pickup select relay is completed in response to the restoration of the transfer control relay R1080 at the end of the third pulse of the first digit "3" dialed by the calling subscriber and may be traced from the grounded conductor C1003 by way of the contacts 1081, the conductor C1004, the contacts 954, the conductor C1005, the third contacts in the contact bank engaged by the wiper 1261, and the winding of the pickup select relay R1230, to battery. In operating, the pickup select relay R1230 closes its preliminary make contacts 1232, whereby a locking circuit is completed for the upper winding of the relay from the grounded conductor C1000 by way of the contacts 1153 and the conductor C1001. Also, at its contacts 1231, the relay R1230 completes a multiple circuit for energizing the lower winding of the relay R1140, which may be traced from the grounded conductor C1000 by way of the contacts 1153 and the conductor C1001, and the contacts 1231. The relay R1140 operates and, at its contacts 1146, completes a multiple locking circuit which includes the grounded conductor C1000 and the contacts 1153. Furthermore, the pickup select relay R1230, at its contacts 1234, disconnects the pickup pulse lead PU—1 and substitutes, at its contacts 1233, the pickup pulse lead PU—2, thereby to prepare the circuit for operating the pickup relay R1240 under control of the pickup lead PU—2 instead of the pickup lead PU—1.

After the desired called line has been selected and the ringing digit has been dialed into the minor switch 1260, in the manner previously explained, the last digit relay R910 is operated in order further to prepare the operating circuit for the pickup relay R1240. More specifically, when the ringing interrupter functions to transmit a pickup pulse over the pickup lead PU—2, the relay R1240 is energized over the circuit which includes the contacts 1233, 917, 1245, 1153′ and 1227, and the winding of the pickup relay R1240, to battery. Upon operating, the relay R1240, at its contacts 1245, locks itself to the grounded hold conductor HOLD, and closes its contacts 1242 and 1243 to prepare the operating circuit for either the odd or even digit ringing relay R1170 or R1180, depending upon the number of impulses in the last digit dialed by the calling subscriber.

In order to provide ten additional codes from the ringing interrupter to the odd or even digit ringing relay R1170 or R1180, the pickup pulse transmitted over the pulse lead PU—2 occurs prior to a short preliminary ringing period which is common to the ten available codes. Thus a short ringing interval, which precedes the main portion of the selected code, is introduced into the code thereby to produce a different code. For example, with the relay R1230 operated and the minor switch 1260 positioned with its wipers 1261 and 1262 in engagement with the third contacts in its associated contact bank terminating the code conductor C3, the odd digit ringing relay R1170 is controlled in accordance with a code which comprises a short preliminary ringing period followed by the remaining ringing periods of the third ringing code. On the other hand if the relay R1230 occupies its restored position, such that the pickup relay R1240 is controlled in accordance with the pickup pulse transmitted over the pickup lead PU—1 and the third ringing code is selected, the preliminary ringing period is omitted. Accordingly, ten different ringing codes may be selected by the minor switch 1260 when the pickup relay R1240 is controlled over the pickup lead PU—1, and ten different ringing codes may be selected by the minor switch 1260 when the pickup relay R1240 is controlled over the pickup lead PU—2. With this arrangement, twenty different ringing codes may be transmitted to signal twenty different subscriber substations located on a twenty party line.

In view of the foregoing description of the operation of the connector 800, it will be seen that the set of wipers comprising the wipers 1271 to 1275, inclusive, may be utilized to extend a connection to any subscriber line terminating in the first hundred group 1280 of bank contacts. In the event the second set of bank contacts comprising a second hundred group 1285 is utilized, the second set of wipers comprising the wipers 1286 and 1288, inclusive, will be utilized to extend a connection to any subscriber line terminating in the second hundred group of bank contacts. In order to extend a connection over the second set of wipers mentioned above, a wiper switching relay R1250 has been provided which is operated to disconnect the first set of wipers and to connect the second set of wipers when either the digit "4" or "5" is dialed as a first digit by a calling subscriber.

When the first digit "4" is dialed by the calling subscriber the wipers 1261 and 1262 of the minor switch 1260 are positioned into engagement with the fourth contacts in their associated contact banks. Shortly after the last pulse of the digit "4" is received by the connector 800 the relay R1080 restores to normal and, at its contacts 1081, it completes a circuit for operating the wiper switch relay R1250, which may be traced from the conductor C1003 by way of the contacts 1081, the conductor C1004, the contacts 954, the conductor C1005, the fourth contacts in the minor switch contact bank bridged by the wiper 1261, and the upper winding of the wiper switching relay R1250, to battery. The relay R1250 operates when this circuit is completed and, at its contacts 1258, completes a locking circuit for itself including the grounded conductor C1000. As a further result of the operation of the wiper switching relay R1250, at its contacts 1251, 1253, 1255 and 1259 it disconnects the —1 wiper 1272, the +1 wiper 1273, the C1 wiper 1274, and the EC wiper 1275 from the corresponding leads in the connector 800; and at its contacts 1252, 1254 and 1256 it connects the —2 wiper 1286, the +2 wiper 1287, and the C2 wiper 1288 to the corresponding conductors in the connector 800. Thus it will be seen that the wiper switching relay R1250 disconnects the first set of wipers from the first hundred group 1280 of bank contacts and connects the second group of wipers to the second hundred group 1285 of bank contacts. Finally, at its contacts 1257 the relay R1250 completes a circuit for the first digit relay R1140 which may be traced from the grounded conductor C1000 by way of the contacts 1153, the conductor C1001, the contacts 1257, and the lower winding of the relay R1140, to battery. The relay R1140 operates when this circuit is completed and, at its contacts 1146, completes a locking circuit for itself which includes the grounded conductor C1001 and, in multiple therewith, by way of the contacts 1153, the grounded conductor C1000. Thus it will be seen that the relay R1140 operates at the end of the first digit in the same manner as described hereinbefore when the first digit "2" or "3" was dialed, and when the digit "4" is dialed the additional relay R1250 is also operated.

The connector 800 may now be operated in accordance with the second, third and fourth digits of a called subscriber directory number in the same manner as has been described hereinbefore in extending a connection to the called subscriber at substation 1200A. In extending a connection to a subscriber line terminated in the second hundred group 1285 of bank contacts, each of the last three digits dialed may be any digit from "1" to "9" and "0," and the final digit will cause the ringing current to be transmitted to the called line in accordance with one of the codes in the first group of ten codes C1 to C10, inclusive, each time the pickup relay R1240 is operated over the pickup lead PU—1. The remaining operation of the connector, to transmit a busy signal to the calling subscriber in the event a called line is busy or to terminate the transmission of the ringing code in response to a called subscriber answering the call, is the same as has been described hereinbefore.

It will now be assumed that the first digit dialed by a calling subscriber is the digit "5" and, consequently, the wipers of the minor switch 1260 are positioned to engage the fifth contacts in their associated contact banks. Shortly after the last impulse of the digit "5" has been received by the connector 800, the relay R1080 restores to normal and, at its contacts 1081, completes the previously traced circuit including the conductors C1003, C1004 and C1005, the fifth contacts in the bank of the minor switch 1260 bridged by the wiper 1261, the lower winding of the wiper switching relay R1250, and the lower winding of the pickup select relay R1230. When this circuit is completed both the pickup select relay R1230 and the wiper switch relay R1250 operate in series, the former relay, at its contacts 1232, completing a locking circuit for its upper winding from the grounded conductor C1001. The relay R1250, upon energizing, at its contacts 1258 also completes a locking circuit for its upper winding which includes the grounded conductor C1000. At the contacts 1231 and 1257, the relays R1230 and R1250 respectively complete multiple circuits for energizing the lower winding of the first digit relay R1140. Thus it will be seen that when the first digit "5" is dialed into the connector 800 the relays R1140, R1230 and R1250 are operated and perform the same functions which have been described hereinbefore. More particularly, the wiper switching relay R1250 disconnects the first set of wipers, comprising the wipers 1271 to 1275, inclusive, and connects the second set of wipers, comprising the wipers 1286 to 1288, inclusive, whereby the connection completed through the connector 800 is extended to a called subscriber line terminated in the second hundred group 1285 of bank contacts. Furthermore, the pickup select relay R1230 disconnects the pickup pulse lead PU—1 and connects the pickup pulse lead PU—2 to the pickup relay R1240, whereby the ringing current transmitted to a called line in the second hundred group is in accordance with one of the codes in the second group of ten codes C11 to C20, inclusive, each time the pickup relay R1240 is operated over the pickup pulse lead PU—2. The remaining operations of the connector 800, either in the event the called subscriber line is busy or in the event that the call extended to a subscriber line is answered, are the same as have been described hereinbefore.

*Release*

The release of the connection as set up between the subscriber at substation 200 and the subscriber at substation 1200A is entirely under the control of the calling subscriber at substation 200. Thus if the connection is released at the called substation 1200A prior to its release by the calling subscriber at substation 200, the only resulting operation is the restoration of the back-bridge relay R880 in the connector 800. More particularly, when the called subscriber at substation 1200A interrupts the loop circuit thereat, including the positive and negative line conductors 1200Y and 1200Z, by restoring the receiver at the substation upon the associated switchhook, the energizing circuit, traced hereinbefore, for the back-bridge relay R880 is interrupted and the relay restores to normal. Upon restoring, the relay R880, at its contacts 881 to 884, inclusive, again reverses the battery potential and ground potential connected to the negative and positive talking conductors C41 and C42 in order to give disconnect supervision in the event that the connection was originated by an operator. In the present connection, however, the reversal of battery has no function to perform. As a further result of the restoration of the relay R880, at its contacts 885 it interrupts a point in the previously traced operating circuit for the ring cutoff slave relay R1150, but this relay is retained in its operated position over the locking circuit including the contacts 1154 and 911 and the grounded conductor C1000.

When the calling subscriber at substation 200 releases the connection by restoring the receiver upon the switchhook of the associated telephone instrument, the loop circuit, including the negative and positive conductors C41 and C42, is interrupted and thereby causes the line relay R850 in the connector 800 to restore to normal. Upon restoring, the relay R850, at its contacts 853, interrupts the locking circuit for the lock-pulse relay R860, thereby to cause the latter relay to restore to normal and, at its contacts 852, it interrupts a point in the multiple holding circuit for the release control relay R820. When the lock-pulse relay R860 restores to normal, at its contacts 862, it interrupts a further point in the circuit for the release control relay R820, thereby to cause the latter relay to restore. At its contacts 861, the relay R860 prepares a point in a circuit which is utilized in connection with reverting calls but which has no function to perform at the present time; and, finally, at its contacts 863 it opens a point in the incomplete locking circuit for itself.

When the release control relay R820 restores to normal, at its contacts 823 it interrupts the circuit for the control relay R830, whereupon the holding ground potential applied to the conductor C43 is removed therefrom and the relay R830 restores to normal. Furthermore, at its contacts 821, the relay R820 interrupts a point in the initial energizing circuit for the hold relay R870. Inasmuch as the holding ground potential has been removed from the conductor C43, the hold relay R870 restores to normal at substantially the same time that the relay R830 restores to normal.

When the control relay R830 restores to normal, at its contacts 831 it interrupts a point in the initial operating circuit for the auxiliary control relay R840, and when the hold relay R870 restores to normal, at its contacts 879 it removes the holding ground potential from the hold conductor C1002, thereby interrupting the locking circuit for the auxiliary control relay R840, which now restores to normal. As a further result of the restoration of the relay R870, at its contacts 875 it removes the holding ground potential from the conductor C1000, whereupon the relays R910, R1140, R1150 and R1220 restore to normal in the event that a connection has been extended to a called subscriber having a first digit "2." If a connection has been extended to a called subscriber having a first digit "3," the pickup select relay R1230 will also restore to normal when ground potential is removed from the conductor C1000. If the connection has been extended to a called subscriber having a first digit "4," the wiper switching relay R1250 will be locked to the grounded conductor C1000 but the pickup select relay R1230 will be in its normal position and therefore only the relay R1250 of the two relays mentioned will be restored when ground potential is removed from the conductor C1000. Finally, if the connection has been extended to a subscriber having a first digit "5," both the pickup select relay R1230 and the wiper switching relay R1250 will be locked to the conductor C1000 and therefore will restore to normal when ground potential is removed therefrom. In view of the foregoing it will be understood that all of the operated relays in the connector 800 are restored to normal when the hold relay R870 removes the holding ground potentials from the conductors C1000 and C1002, except the vertical off-normal relay R950 which is retained in its operated position until the vertical off-normal contacts 958 are opened by the restoration of the wipers of the connector 800 to their normal vertical and rotary positions.

As a further result of the restoration of the hold relay R870, at its contacts 872', it completes a circuit for energizing the release magnet 1135, which may be traced from ground by way of the contacts 819, 872', 957 and 1125, the winding of the release magnet 1135, and the contacts 1228, to battery. Upon operating the release magnet 1135 causes the wipers 1271 to 1275, inclusive, and 1286 to 1288, inclusive, to be restored to their normal vertical and rotary positions, in a well known manner, whereupon the vertical off-normal contacts 958 are opened, thereby to interrupt the circuit for the vertical off-normal relay R950. The relay R950 restores to normal and, at its contacts 957, interrupts the above-traced circuit for the release magnet 1135, thereby to cause the latter magnet to restore to normal. As a further result of the restoration of the vertical off-normal relay R950, at its contacts 955 it removes ground potential from the guard conductor C44 and, at its contacts 956, it applies ground potential to the ALB2 conductor C45 extending to the corresponding conductors of the finder 300 illustrated in Fig. 3. Finally, at its contacts 951, the relay R950 applies battery potential by way of the resistor 859 to the conductor C43 which is utilized to mark the connector 800 as idle when it is utilized in a selector system provided with selectors of the battery searching type. Since the present system involves only a finder-connector link the battery potential connected to the conductor C43 performs no function. Following the restoration of the relay R950 the connector 800 is fully restored to normal and is available for the next call.

Referring now to the finder 300 it is noted that when ground potential is removed from the conductor C43 upon the restoration of the release control relay R820 in the connector 800, the holding circuit for the switch-through relay R360 or the switch-through relay R370, depending upon which one of these two relays is operated, is interrupted whereupon the operated relay restores to normal. In the present example the relay R360 was utilized in extending the connection through to the connector 800 and, consequently, when it restores to normal, at its contacts 369, it completes a circuit for energizing the release magnet 394 which may be traced from ground by way of the vertical off-normal contacts 303, the contacts 388, 379 and 369, and the winding of the release magnet 394, to battery. When thus energized the release magnet 394 closes its contacts 395 in order to impress ground potential upon the release alarm conductor and it also attracts its associated holding pawl, thereby to cause the wipers 311 to 318, inclusive, of the finder 300 to be restored to their normal vertical and rotary positions. In this connection it is to be noted that the vertical wiper 351 is restored to its normal vertical position when the wiper carriage, including the wipers 311 to 318, inclusive, is restored to normal in the manner described above. Incident to the restoration of the wipers of the finder 300 to their normal resting positions the vertical off-normal contacts 305 are opened in order to remove ground potential from the guard conductor G extending to the contacts of the first link distributor relay R700 in the distributor 600. Since ground potential is also removed from the guard conductor C44 in response to the restoration of the vertical off-normal relay R950 in the connector 800, the finder-connector link, comprising the finder 300 and the connector 800, is now in condition to be selected by the distributor 600 for further use. Also, incident to the restoration of the wipers of the finder 300 to their normal resting positions, the vertical off-normal contacts 302 are closed, whereby the ground potential applied to the ALB2 conductor C45 upon the restoration of the vertical off-normal relay R950 in the connector 800 is extended to the all links busy lead ALB extending to the distributor 600 in order to maintain the all links busy relay R610 in its energized position and thus indicate to the distributor 600 that an idle finder-connector link is available in the associated group of finder-connector links. Finally, the vertical off-normal contacts 303 in the finder 300 are also opened upon the restoration of the wipers to their normal resting positions, whereupon the energizing circuit for the release magnet 394 is interrupted, thereby to cause the magnet to restore to its normal position and thus remove ground potential, at its contacts 395, from the release alarm conductor.

As a further result of the removal of ground potential from the conductor C43 by the restoration of the release control relay R820 in the connector 800, the holding circuit for the cutoff relay R275 individual to the subscriber line extending to the substation 200 is interrupted, whereupon the relay R275 restores to normal. When the cutoff relay R275 restores, at its contacts 276 and 277, it prepares the circuit for the line relay R280 and, at its contacts 278, it opens a point in the previously traced locking circuit for itself. The line circuit 20, comprising the line relay R280 and the cutoff relay R275 individual to the line extending to the subscriber at substation 200, is now restored to normal and may be utilized in the extension of further calls from or to the associated party line. The apparatus involved in the connection established between the subscriber at substation 200 and the subscriber at substation 1200A has now been restored to normal and may be utilized in the extension of further calls.

*Private branch exchange calls*

The manner in which calls may be routed through the finder-connector link, comprising the finder 300 and the connector 800, to an idle P. B. X trunk in a group of trunks extending to a private branch exchange switchboard is substantially the same as the operation thereof when a connection is extended to a called subscriber line. In considering this type of service it may be assumed that a group of P. B. X trunks is terminated in the tenth level of the contacts in the first hundred group 1280 of bank contacts associated with the connector 800. It may also be assumed that the subscriber at substation 200 desires to extend a connection over an idle one of the P. B. X trunks to the P. B. X operator at the distant end thereof and, in accordance with the usual procedure, the operator at the P. B. X switchboard will extend the connection manually to the desired called subscriber whose line is terminated in the P. B. X switchboard. Consequently, when the calling subscriber at the substation 200 removes his receiver, the finder 300 and the distributor 600 operate in the manner previously described and the connector 800 is conditioned to respond to the directory number designating the P. B. X group of trunks. For the purpose of describing the operation of the connector 800 to extend a connection to an idle P. B. X trunk in the group it will be assumed that the group consists of ten trunks extending to the P. B. X switchboard and that the directory number thereof is "2011."

When the two impulses of the first digit "2" are dialed into the connector 800, the minor switch 1260 operates, in the manner previously described, to position its wipers 1261 and 1262 into engagement with the second contacts in the associated contact banks. At the end of the digit, and when the transfer control relay R1080 restores, the transfer relay R1070 operates in order to transfer the pulsing circuit from the minor switch magnet 1263 to the vertical magnet 1126, in exactly the same manner explained hereinbefore.

When the ten impulses of the second digit "0" are dialed into the connector 800, the vertical magnet 1126 is operated ten times to elevate the wipers 1271 to 1275, inclusive, and the wipers 1286 to 1288, inclusive, to a position opposite the tenth level of contacts in the associated contact banks, that is, to the level in which the conductors of the ten trunks in the P. B. X group are terminated. Incident to the off-normal movement of the wipers of the connector 800, the vertical off-normal contacts 958 are closed to cause the operation of the vertical off-normal relay R950 to perform the functions previously described. Shortly following the last impulse of the second digit "0" dialed into the connector 800 the vertical transfer relay R1060 operates to prepare the previously described impulsing circuit for the rotary magnet 936. It also completes the energizing circuit for the minor switch release magnet 1265, whereupon the wipers of the minor switch 1260 are restored to normal and the minor switch off-normal relay R1120 restores to interrupt the energizing circuit for the minor switch release magnet 1265.

When the third digit of one impulse is dialed from the calling subscriber substation 200 a single current pulse is transmitted to the rotary magnet 936 over the previously traced impulsing circuit. The rotary magnet 936, upon operating, rotates the wipers of the connector 800 into engagement with the contacts terminating the first P. B. X trunk in the selected group. Also, upon the first pulse transmitted to the rotary magnet 936 the rotary transfer relay R1050 is operated, as previously described, and prepares the busy test circuit including the C1 wiper 1274 and the busy test relay R1030. The relay R1050 in turn, upon operating, completes the operating circuit for the trunk hunting relay R980. At the end of the single pulse transmitted to the rotary magnet 936 the trunk hunting relay R970 operates, in the manner previously described, in order to prepare an automatic rotary stepping circuit whereby the rotary interrupter relay R940 will control the rotary magnet 936 to cause the wipers to be rotated automatically to select an idle P. B. X trunk in the group. In the event the first trunk in the tenth level engaged by the wipers 1271 to 1275, inclusive, is idle at the time it is selected, the private conductor terminating in the bank contact engaged by the C1 wiper 1274, and jumpered to a corresponding contact in the bank engaged by the EC wiper 1275, is marked with negative battery potential so that the test circuit for the busy test relay R1030 is not completed. Accordingly, the busy test relay R1030 remains in its restored position and the relay R1050 subsequently restores to complete the previously described circuit for the idle test relay R1130. The idle test relay R1130 operates over a circuit including the battery potential applied to the C1 wiper 1274 and thus completes the previously described circuit for operating the switching relay R1220. The latter relay, at its contacts 1226, locks to the grounded conductor C1000 and prepares the ringing equipment for ringing current transmission, in the manner previously described.

When the fourth digit "1" is dialed into the connector 800 a single current pulse is transmitted over the previously traced impulsing circuit, whereby the magnet 1263 of the minor switch 1260 operates to rotate its wiper 1261 and 1262 in a clockwise direction into engagement with the first set of contacts in the associated contact banks. When the wipers of the minor switch are moved from their normal resting positions the minor switch off-normal contacts 1113 are reclosed, thereby to reoperate the relay R1120. From this point on the manner in which ringing current is transmitted over the selected trunk, to energize the drop or other signal device individual to this trunk and provided at the P. B. X switchboard, is exactly the same as described above with reference to the signaling of the called subscriber at substation 1200A. In this connection it is noted that since the final digit "1" is dialed into the minor switch 1260 the odd digit ringing relay R1170 is controlled in accordance with the first code transmitted over the code conductor C1 from the ringing interrupter. This code causes a long ring to be transmitted over the selected trunk line to the signaling device at the P. B. X switchboard.

Before considering the trunk hunting operation of the connector 800, it is noted that in the connector bank contacts in the first hundred group 1280 the contacts in the associated bank, terminating the private conductor of the trunk line and engaged by the C1 wiper 1274, and the corresponding contacts in the bank engaged by the EC wiper 1275, are strapped together and connected to the associated private conductor extending to the line circuit individual to the first trunk. Thus the contacts in the bank engaged by the C1 wiper 1274 and the EC wiper 1275 are connected together so that the potential applied to the private conductor terminating in the bank contacts engaged by the wiper 1274 is extended to the connector 800 by way of the EC wiper 1275 as well as by way of the C1 wiper 1274. Accordingly, if this trunk is busy both the C1 wiper 1274 and the EC wiper 1275 encounter ground potential when a test is made of the first trunk of the group. On the other hand, if the trunk is idle the two wipers 1274 and 1275 are marked with negative battery potential. Since it has been assumed that there are ten P. B. X trunks terminating in the tenth level of the first hundred group 1280 of bank contacts, each of the contacts in the level engaged by the C1 wiper 1274 is jumpered to the corresponding contacts in the bank engaged by the EC wiper 1275 except the contact which is individual to the last trunk of the group. Consequently, if all of the trunks in the group are busy, including the last trunk, the wipers of the connector 800 are automatically rotated over the first nine busy trunks and come to rest in engagement with the contacts terminating the tenth trunk. A busy tone signal is then transmitted to the calling subscriber in order to indicate that all of the trunks in the P. B. X group are busy and a connection cannot be established with the P. B. X switchboard at the present time.

In order to describe the manner in which the connector automatically rotates the wipers over the busy trunks in the selected P. B. X group, it will be assumed that the busy ground potential is encountered by the C1 wiper 1274 and the EC wiper 1275 when the first trunk in the group is selected. The busy test relay R1030 is therefore operated in the manner previously explained and, at its contacts 1037, prepares a point in the circuit for operating the rotary interrupter relay R940. It will also be recalled that during the transmission of the third digit "1" to the connector 800 the rotary transfer relay R1050 and the trunk hunting relay R980 are in their energized positions and that, at the end of the third digit, the trunk hunting relay R970 is operated. When the latter relay operates a busy ground potential applied to the EC wiper 1275 is extended by way of the contacts 1259, 1025, 1037, 983 and 971', the winding of the rotary interrupter relay R940, and the contacts 937, to battery. The relay R940 operates when this energizing circuit is completed and, at its contacts 942, completes a locking circuit for itself which includes the grounded conductor C1003. As a further result of the operation of the relay R940, at its contacts 941 it completes a circuit for energizing the rotary magnet 936 in multiple with the trunk hunting relay R980. In the previously described connection the trunk hunting relay R980 slowly restored to normal after its circuit was interrupted, at the contacts 979, in response to the operation of the trunk hunting relay R970. In view of the above-mentioned multiple circuit for the rotary magnet 936 the trunk hunting relay R980 is retained in its operated position. This relay, in turn, at its contacts 981 maintains a locking circuit for the upper winding of the rotary transfer relay R1050. The relays R1060 and R1070, however, now restore to normal in the manner previously described, inasmuch as the locking circuit for these relays has been interrupted at the contacts 976 upon the operation of the trunk hunting relay R970. During the interdigital pause between the third and fourth digits transmitted by the calling subscriber, and shortly after the first trunk in the P. B. X group is selected, the above described restoration of the relays R1060 and R1070 takes place in order to recomplete the impulsing circuit for the magnet 1263 of the minor switch 1260. Consequently, the calling subscriber may dial the fourth and final digit of the P. B. X trunk group while the wipers of the connector 800 are automatically rotated to search for an idle trunk in the selected P. B. X group.

The above-mentioned circuit for operating the rotary magnet 936 in multiple with the trunk hunting relay R980 may be traced from ground, by way of the contacts 873 and 941, one branch extending by way of the contacts 977 to the winding of the rotary magnet 936 and the other branch extending by way of the winding of the trunk hunting relay R980. When thus energized the rotary magnet 936 steps the wipers of the connector 800 into engagement with the second set of contacts in the selected level terminating the second trunk in the P. B. X trunk group. Furthermore, upon operating, the magnet 936, at its contacts 937, interrupts a point in the above-mentioned circuit for the rotary interrupter relay R940. The relay R940 now restores and, at its contacts 942, interrupts its locking circuit and, at its contacts 941, interrupts the circuit for energizing the rotary magnet 936 and in multiple therewith the trunk hunting relay R980.

In the event that the second trunk in the selected group of P. B. X trunks is also busy, ground potential is again encountered by the C1 wiper 1274 and the EC wiper 1275 and the busy test relay R1030 is reoperated. In reoperating, the busy test relay R1030, at its contacts 1037, again completes the circuit for operating the rotary interrupter relay R940 which again completes, at its contacts 941, the previously traced circuit for retaining the trunk hunting relay R980 in its energized position and for operating the rotary magnet 936. The rotary interrupter relay R940 also locks to the grounded conductor C1003 and is restored to normal as soon as the rotary magnet 936 interrupts its contacts 937. Thus the wipers of the connector 800 are advanced an additional step in the rotary direction into engagement with the third set of contacts terminating the third trunk in the P. B. X trunk group.

The above-described operations are repeated until the idle trunk in the selected group is found or until all of the trunks in the group have been tested and found to be in a busy condition. During the trunk hunting operation the relays R970, R980 and R1050 are retained in their operated positions and if any one of the tested trunks is found to be idle the busy test relay R1030 remains in its restored position. Incident to the selection of an idle trunk, the trunk hunting operation is arrested and the trunk hunting relay R980 and the rotary transfer relay R1050 restore to normal. The connection is now completed over the selected idle trunk in the P. B. X trunk group in the exact manner as has been described hereinbefore in extending a connection to the called subscriber at substation 1200A.

From the above explanation it will be understood that the starting of the trunk hunting operation occurs in response to the release of the transfer control relay R1080 at the end of the third digit dialed by the calling subscriber. It will also be recalled that the two relays R1060 and R1070 are restored at the end of the third digit, thereby to render the impulsing circuit for the minor switch 1260 effective to respond to the fourth or ringing code selecting digit dialed by the calling subscriber. Accordingly, it will be understood that the fourth or ringing code selecting digit may be dialed into the connector 800 to set the minor switch 1260 in the position corresponding to the desired ringing code, which in this case is the first position, concurrently with the operation of the trunk hunting facilities to select an idle trunk in the selected P. B. X group.

In the above-described trunk hunting operation of the connector 800 it was assumed that ten trunks are provided in the selected P. B. X trunk group and, therefore, the EC contact in the bank terminating the tenth trunk is not jumpered to the corresponding C1 contact terminating the private conductor of the associated trunk. Accordingly, when the wipers 1271 to 1275, inclusive, are advanced into engagement with the contacts terminating the last trunk in the group and it is also found busy, the EC wiper 1275 does not encounter the ground potential and therefore the rotary interrupter relay R940 cannot be operated. The busy test relay R1030, however, is operated over the test circuit which includes the C1 wiper 1274. The trunk hunting relay R980, being of the slow-to-release type, subsequently restores to normal and, at its contacts 981, interrupts the holding circuit for the rotary transfer relay R1050 which also restores to normal. The latter relay, at its contacts 1054, completes the previously traced locking circuit for the busy test relay R1030 and, at its contacts 1051, closes the previously described busy signaling circuit. Thus a busy signal is transmitted to the calling subscriber at substation 200 which informs the subscriber thereat that all of the trunks in the selected P. B. X trunk group are busy.

*Trunk calls*

In considering the operation of the connector 800 automatically to select an interoffice trunk and to switch a calling loop circuit through to the repeater associated with the selected trunk, it may be assumed that the above-described call originating at the substation 200 is intended to be extended to a toll operator position in the central office. It may be further assumed that the directory number "0" is assigned to the group of interoffice trunks connecting the tandem exchange A with the central office. After a call is extended from the calling subscriber at substation 200 to the connector 800, in the manner previously described, and when the single digit "0" is dialed into the connector 800, ten current pulses are transmitted to the line relay R850. The line relay R850 and the lock-pulse relay R860 function in the manner previously described to transmit ten current pulses over the impulsing circuit to the magnet 1263 of the minor switch 1260. The first six current pulses control the magnet 1263 to advance the wipers 1261 and 1262 of the minor switch 1260 into engagement with the sixth contacts in their respective banks. During the transmission of the first six impulses, the transfer control relay R1080 and the digit relay R1110 are retained in their operated positions. When the wiper 1261 of the minor switch 1260 engages the sixth contacts in its associated contact bank, ground potential is extended by way of the contacts 1148 to the winding of the transfer relay R1070. In addition thereto a multiple circuit is also completed by way of the contacts 1149 for energizing the lower winding of the rotary transfer relay R1050. The relays R1070 and R1050 both operate when the above-mentioned circuit is completed. The relay R1070, upon operating, at its contacts 1073 completes a locking circuit for itself which includes the contacts 976 and the grounded conductor C1003. As a further result of the operation of the relay R1070, at its contacts 1074 it interrupts the impulsing circuit for the magnet 1263 and, simultaneously therewith, at its contacts 1075 it prepares the impulsing circuit for the vertical magnet 1126. When the sixth pulse transmitted over the pulsing circuit is interrupted by the reoperation of the lock-pulse relay R860 or by the operation of the transfer relay R1070, depending upon which operation takes place first, the digit relay R1110 and the magnet 1263 restore to normal. The relay R1110, upon restoring, at its contacts 1112 prepares a further point in the circuit for the vertical magnet 1126. As a further result of the operation of the relay R1070, at its contacts 1076 it completes a circuit for the rotary interrupter relay R940, which may be traced from ground by way of the wiper 1261 of the minor switch 1260 and the engaged sixth contacts in its associated contact bank, the contacts 1141′ of the deenergized relay R1140, the contacts 1076 and 972′, the winding of the rotary interrupter relay R940, and the contacts 937, to battery. The relay R940 operates when this circuit is completed and, at its contacts 942, completes a locking circuit for itself which includes the grounded conductor C1003. As a further result of its operation the relay R940, at its contacts 941, completes a circuit for operating the slow-to-operate trunk hunting relay R980 and prepares a point in the circuit for subsequently operating the rotary magnet 936. The circuit for operating the relay R980 may be traced from ground by way of the contacts 873 and 941, and the winding of the relay R980, to battery.

The relay R1050, upon operating in multiple with the relay R1070, at its contacts 1051 interrupts a point in the busy tone circuit; at its contacts 1052 it interrupts a point in the circuit for the idle test relay R1130; at its contacts 1053 it prepares the circuit for the busy test relay R1030; and at its contacts 1059 it completes a locking circuit for itself which includes the contacts 976 and the grounded conductor C1003. As a further result of the operation of the relay R1050, at its contacts 1058 it prepares a circuit for the trunk hunting relay R970; at its contacts 1055 it interrupts a point in the circuit for the upper winding of the switch-through relay R810; at its contacts 1052′ it completes a multiple locking circuit for the trunk hunting relay R980; and, finally, at its contacts 1053′ it removes ground potential from the holding windings of the timing relays, thereby to reset the timing operation.

The foregoing operations occur incident to the advance of the wiper 1261 of the minor switch 1260 into engagement with the sixth contacts in its associated contact bank. Accordingly, the operation of the transfer relay R1070, as noted above, completes the impulsing circuit for the vertical magnet 1126, whereby the four remaining current pulses of the digit "0" are transmitted to the vertical magnet 1126 in multiple with the transfer control relay R1080. Each time the vertical magnet is energized over the previously traced impulsing circuit therefor the vertical magnet operates to complete, at its contacts 1127, the previously traced circuit for the lock-pulse relay R860 and to step the wipers of the connector 800 one step in the vertical direction. It will be understood that after the remaining four impulses of the digit have been transmitted to the vertical magnet the wipers 1271 to 1275, inclusive, and 1286 to 1288, inclusive, are positioned opposite the fourth level of contacts in the associated contact banks terminating the group of trunks extending to the operator position at the central office. Incident to the off-normal movement of these wipers the vertical off-normal contacts 958 are closed to complete the operating circuit for the relay R950, thereby to perform the circuit operations previously described.

Shortly following the end of the digit "0" the transfer control relay R1080 restores to normal to complete the previously described circuit for operating the vertical transfer relay R1060. The latter relay, upon operating, at its contacts 1064, locks to the grounded conductor C1003; in addition, at its contacts 1067 it completes the previously described circuit including the contacts 1124 for operating the release magnet 1265, thereby to cause the wipers of the minor switch 1260 to restore to their normal positions; at its contacts 1066 it interrupts the impulsing circuit for the vertical magnet 1126 and the multiple circuit for the transfer control relay R1080; and finally at its contacts 1062 it completes a circuit including the grounded conductor C1003, and the contacts 1081, 1072, 1062 and 1058 for energizing the trunk hunting relay R970. The latter relay operates and, at its contacts 975, locks itself to the grounded conductor C1003. As a further result of the operation of the trunk hunting relay R970, at its contacts 976 it interrupts the previously mentioned locking circuits for the relays R1060 and R1070, whereupon the relays mentioned restore to normal; and at its contacts 977 the previously mentioned circuit for energizing the rotary magnet 936 is completed, whereby the wipers of the connector 800 are rotated one step in a rotary direction into engagement with the first set of contacts in their associated contact banks terminating the first trunk extending to the central office. As soon as the rotary magnet 936 operates to advance the wipers, at its contacts 937 it interrupts the previously described locking circuit for the relay R940, thereby to cause the latter relay to restore. In restoring, the relay R940, at its contacts 941, interrupts the circuit for the rotary magnet 936 and also interrupts the holding circuit for the trunk hunting relay R980, but this relay due to its slow-to-release characteristics remains operated during the trunk hunting operation. The contacts in the bank of the connector 800 engaged by the C1 wiper 1274 and the EC wiper 1275 are jumpered together in the manner previously described so that both the C1 wiper and the EC wiper will encounter potential applied by the associated trunk to indicate its idle or busy condition. If the first trunk in the group is busy when the C1 wiper 1274 and the EC wiper 1275 engage the associated contacts, the busy test relay R1030 operates in the manner previously described and completes, at its contacts 1037, the previously traced circuit including the EC wiper 1275 for reoperating the rotary interrupter relay R940. The latter relay recompletes, at its contacts 941, the holding circuit for the relay R980 and the operating circuit for the rotary magnet 936, whereby the wipers are advanced an additional step into engagement with the second set of contacts in the associated contact banks. Under control of the busy test relay R1030 the rotary interrupter relay R940 and the rotary magnet 936 interact in the manner described above, whereby the wipers noted are advanced step by step over the contacts in the selected level in search of an idle trunk. When an idle trunk is reached busy ground potential is not encountered by the C1 wiper 1274, and the busy test relay R1030 is prevented from reoperating, thus terminating the rotary stepping of the wipers. With the busy test relay R1030 in its restored position, the previously traced circuit for controlling the rotary interrupter relay R940 is interrupted and shortly thereafter the trunk hunting relay R980 restores to normal. Incident to the restoration of the trunk hunting relay R980, at its contacts 981 it interrupts the locking circuit for the rotary transfer relay R1050, thereby to cause the latter relay to restore.

When the relay R1050 restores to normal, at its contacts 1052 it prepares a point in the incomplete circuit for the idle test relay R1130. This circuit cannot be completed at this time inasmuch as the relay R1140 is retained in its restored position. However, as a further result of the restoration of the relay R1050, at its contacts 1055 it completes a circuit for operating the trunk switch-through relay R810 over a circuit which may be traced from ground, by way of the contacts 873, 1035, 1143, 1055 and 971, and the upper winding of the relay R810, to battery. Finally, at its contacts 1056, the relay R1050 completes a circuit for operating the upper winding of the relay R910, which may be traced from the grounded conductor C1000 by way of the contacts 1144, 1056 and 973, and the upper winding of the relay R910, to battery. Upon operating, the relay R910, at its contacts 918, completes a locking circuit which includes the grounded conductor C1000 and, at its contacts 914, it interrupts a point in the locking circuit for the trunk hunting relay R970, which now restores to normal.

Referring now to the trunk switch-through relay R810, it is noted that upon operating, at its contacts 818, it completes a locking circuit for itself which includes the conductor C43 which is grounded by way of the winding of the control relay R830. As a further result of the operation of the relay R810, at its contacts 811, 813, 815 and 817 it connects the conductors C40, C41, C42 and C43 directly through the connector 800 to the respective wipers 1271, 1272, 1273 and 1274. These wipers now stand in engagement with a trunk repeater which is individual to the selected idle trunk extending to the central office. When the loop circuit, including the calling subscriber line, is switched through to the trunk repeater (not shown) individual to the selected idle trunk, certain relays in this repeater are operated, whereupon ground potential is returned by way of a conductor terminating in the contact bank engaged by the C1 wiper 1274, the contacts 1255, 1224, 817 and 818, and the lower winding of the relay R810, to battery. A branch of this circuit is extended by way of the contacts 823, thereby to short-circuit the winding of the control relay R830 which now restores to normal. A further branch of this circuit includes the conductor C43, extending to Fig. 8, whereby the switch-through relay R360 or the switch-through relay R370, depending upon the set of wipers utilized in the finder 300, is retained in its operated position and the cutoff relay R275, individual to the calling line, is also maintained in its operated position. Consequently, the finder-connector link utilized in the connection extended to the central office trunk is retained in its operated position under control of the repeater individual thereto.

As a further result of the operation of the relay R810, at its contacts 812 and 814 it interrupts the previously traced loop circuit for the line relay R850, whereupon the latter relay restores. Upon restoring, the line relay R850, at its contacts 852, interrupts a point in the multiple circuit for the release control relay R820 and, at its contacts 853, interrupts the locking circuit for the lock-pulse relay R860, whereupon the latter relay restores. Restoration of the relay R860, at its contacts 862, interrupts the second point in the multiple circuit for the relay R820, thereby to cause the latter relay to restore. Restoration of the relay R820, at its contacts 821, interrupts a point in the circuit for the hold relay R870, which also restores to normal. When the hold relay R870 restores to normal, at its contacts 873 it opens a point in the initial energizing circuit for the relay R810; and at its contacts 875 it removes ground potential from the conductor C1000, thereby to cause restoration of the relay R910 and any other relays in the connector which are locked to this conductor. Furthermore, upon restoring to normal, the relay R870, at its contacts 879, removes ground potential from the conductor C1002, thereby to cause the restoration of the auxiliary control relay R840 and any other relays which are locked to the conductor C1002 at the present time; and, finally, at its contacts 872′, the relay R870 prepares a point in the incomplete circuit for the release magnet 1135. This circuit remains interrupted at the contacts 819 until the trunk switch-through relay R810 is restored to normal. In view of the foregoing, it will be understood that two relays in the connector 800 remain in their operated positions when a connection is extended to the trunk repeater (not shown) individual to the selected central office trunk. More particularly, the trunk switch-through relay R810 is retained in its operated position over the previously described holding circuit, including its lower winding and ground potential applied to the C1 wiper 1274; and the vertical off-normal relay R950 is retained in its operated position by way of a circuit which includes the vertical off-normal contacts 958.

If the calling subscriber should abandon the connection at the present time, the associated trunk repeater will be controlled by the central office operator to remove the ground potential from the C1 wiper 1274 and thus cause the restoration of the trunk switch-through relay R810 in the connector 800. Restoration of the relay R810, at its contacts 819, will complete the previously described circuit for the release magnet 1135, thereby to cause the wipers of the connector 800 to be restored to their normal vertical and rotary positions. When the wipers of the connector 800 are thus restored to normal, the vertical off-normal contacts 958 are opened, thereby to cause the relay R950 to restore, which relay in turn, at its contacts 957, interrupts the circuit for the release magnet 1135 which also restores to normal. The removal of ground from the C1 wiper 1274 also disconnects the holding ground from the conductor C43, thereby to cause the finder 300 and the cutoff relay R275 to restore to normal, in the manner previously described.

The manner in which calls may be routed through the illustrated finder-connector link to other interoffice trunks terminating in the bank contacts of the connector 800 is exactly the same as has been described above with reference to the selection and seizure of an idle trunk in the group terminated in the fourth level of the first hundred group 1280 of bank contacts. This trunk group, it will be recalled, was selected by dialing the single digit "0." Three other groups of trunks may be terminated in the third, second and first levels of the above-mentioned bank contacts and an idle trunk in each of these groups may be selected by dialing, respectively, the single digits "9," "8" and "7." The individual trunk groups selected by the digits "9," "8" and "7" may, for example, as is illustrated in Fig. 1A, be utilized in extending connections to the respective automatic suboffice B, the automatic suboffice C, and the manual office D.

*Operation of the trunk repeater 100*

In the foregoing description it was assumed that the calling subscriber extended a connection to the toll operator at the central office by dialing the single digit "0" and it was pointed out that the release of the finder-connector link in the tandem exchange A was under control of the operator. In order to describe the operation of the trunk repeater 100 individual to a trunk line in the group of trunks extending to the automatic suboffice B it will be assumed that the calling subscriber dialed the single digit "9" and that the connector 800 has selected the repeater 100 in the same manner described above in connection with the operation of the connector 800 to select an idle trunk extending to the central office. More specifically, in response to the receipt of the single digit "9" the wipers 1271 to 1275, inclusive, and 1286 to 1288, inclusive, are raised to the third level and are automatically rotated over the contacts of the selected level to search for an idle trunk extending to the automatic suboffice B. When the idle trunk terminating the repeater 100 is selected the trunk switch-through relay R810 operates, in the manner previously described, and connects the calling subscriber loop circuit through to the negative and positive conductors C1302 and C1303 by way of the −1 and +1 wipers 1272 and 1273, respectively. When the loop circuit is extended to the repeater 100 a series circuit for operating the line relays R1470 and R1485 therein is completed, which may be traced from ground by way of the winding of the line relay R1485, the contacts 1574, the lower left-hand winding of the repeating coil 1595, the contacts 1314, and the loop circuit extending to the calling subscriber substation including the negative and positive conductors C1302 and C1303, and returning by way of the contacts 1312, the upper left-hand winding of the repeating coil 1595, the contacts 1572, and the upper winding of the line relay R1470, to battery. The relays R1470 and R1485 operate in series when the above-mentioned circuit is completed. When the line relay R1485 operates, at its contacts 1486 it prepares a point in the incomplete circuit for operating the reversing relay R1310 in multiple with the slow-to-operate answer relay R1350. The line relay R1470, upon operating, at its contacts 1471, interrupts a point in the incomplete circuit for preenergizing itself; at its contacts 1472 it completes a locking circuit for energizing its differentially wound lower winding in series with the hold relay R1450, thereby to provide a circuit for partially deenergizing the line relay while still retaining it in its operated position and to cause the operation of the relay R1450; and, finally, at its contacts 1473 it completes an energizing circuit for the pulse assist relay R1440, which includes the grounded contacts 1469, the contacts 1473, and the winding of the relay R1440. When the pulse assist relay R1440 operates, at its contacts 1441 it interrupts a point in the incomplete circuit for controlling the relay R1430; at its contacts 1442 it prepares a point in the incomplete circuit for the lower winding of the dial control relay R1590; and at its contacts 1443 it completes a holding circuit for itself which may be traced from ground, by way of the resistor 1445, and the contacts 1443 and 1473, whereby the relay is retained in its operated position after its initial energizing circuit is interrupted at the contacts 1469 in response to the operation of the hold slave relay R1460.

When the hold relay R1450 operates in series with the lower winding of the line relay R1470, at its contacts 1451 it completes an operating circuit for the hold slave relay R1460, which also operates. Furthermore, the relay R1450, at its contacts 1452, prepares a point in the incomplete circuit for the control relay R1430; at its contacts 1453 it disconnects the lower winding of the control relay R1348 from the dial lead DIAL; and at its contacts 1454 it prepares a point in the incomplete circuit for connecting the lower winding of the dial control relay R1590 to the dial lead DIAL. When the hold slave relay R1460 operates, at its contacts 1461 it prepares a point in the incomplete circuit for preenergizing the upper winding of the line relay R1470; at its contacts 1463 it disconnects the incoming control conductor C1304 from battery potential; and at its contacts 1462 it connects the control conductor C1304 by way of the winding of the seizure relay R1360 to ground potential at the contacts 1332. It may be well to mention at this time that if the trunk repeater 100 is utilized in a selector system and is accessible from the banks of a battery searching selector of the type illustrated in Fig. 4 of the drawings, the repeater is wired in accordance with the "S" wiring so that battery potential is connected by way of the resistor 1586, and the contacts 1579 and 1463 to the control conductor C1304, in order to indicate that the repeater 100 is idle and available for use. However, in a connector system of the type now being described, the "S" wiring is omitted and therefore battery potential does not normally appear upon the control conductor C1304 when the repeater 100 is idle. It is also to be noted that the above-traced circuit for the seizure relay R1360 includes alternate wiring which is designated as "NR" wiring or as "R" wiring. In the event that the trunk repeater 100 is to be utilized in a system wherein certain subscribers are restricted, and thus cannot make connections over the trunk repeater 100, the "R" wiring is utilized and the "NR" wiring is omitted. Regardless of the type of wiring used, however, the seizure relay R1360 is operated when the repeater 100 is seized, thereby to apply ground potential upon the C1 wiper 1274 of the connector 800, and thus retains the connector 800, the finder 300, and the cutoff relay R275, included in the present connection, in their operated positions. Furthermore, the hold slave relay R1460, at its contacts 1464 and 1465, provides holding ground potential for certain of the relays included in the repeater 100; at its contacts 1466 it prepares a point in incomplete circuits for the hold relay R1540 and the control relay R1430; and, finally, at its contacts 1467 and 1468 it switches the dial lead DIAL from the upper winding of the impulse relay R1560 to the lower winding of the dial control relay R1590, thus transferring the normal battery potential applied to the dial lead DIAL to ground potential. When the potential upon the dial lead is transferred in the manner described above, a pulse relay in the repeater in the suboffice B is operated thereby to mark the trunk line 1596 busy to incoming calls to the tandem exchange A. The circuit for applying ground potential to the dial lead may be traced from ground by way of the lower winding of the relay R1590, and the contacts 1442, 1454 and 1467, and since battery potential is connected to the corresponding dial lead in the distant exchange through an impulsing relay similar to relay R1560, the dial control relay R1590 in the tandem exchange A and the impulse relay in the distant exchange operate in series. Incident to the operation of the relay R1590, at its contacts 1592 it completes a circuit for the relay R1480, which may be traced from ground by way of the contacts 1465, 1542 and 1592, and the lower winding of the relay R1480, to battery. Also, at its contacts 1593, the relay R1590 interrupts a point in the circuit for the impulse relay R1560 and, at its contacts 1594, it prepares a point in the circuit for the conversation timing relay R1340. Incident to the operation of the relay R1480, at its contacts 1482 it completes a locking circuit for its upper winding from ground at the contacts 1465, whereby the relay is retained in its operated position independent of the circuit including the contacts controlled by the relays R1590 and R1540.

Referring now to the seizure relay R1360, it is noted that in response to its operation, at its contacts 1361, it completes a circuit for the seizure slave relay R1365. The latter relay upon operating, at its contacts 1366, prepares a point in the incomplete circuit for shunting the contacts 1442 included in the pulsing circuit and, at its contacts 1367 and 1368, it prepares points in the circuit for controlling the timing relay R1340.

The trunk repeater 100 is in condition to receive the subsequent impulses transmitted by the calling subscriber and the incoming repeater in the suboffice B is in condition to receive the impulses repeated thereto by the repeater 100.

Before describing the operation of the repeater 100 to repeat the received impulses to the trunk repeater in the distant office, attention is directed to the fact that the trunk repeater 100 is arranged to register the first digit "1" or the first digit "2" dialed into it. The relays provided in the repeater 100 for registering the first digit "1" or "2" provide a means whereby the repeater 100 may distinguish between a call made by an operator and a call made by a subscriber. Accordingly, the repeater 100 when controlled by a first digit "1" transmitted by an operator functions to permit certain services to be given to a toll operator, which services are denied to local subscribers. When a local subscriber extends a call through the repeater 100 the digit "2" is transmitted and is absorbed by the repeater.

It will now be assumed that the calling subscriber at substation 200 dials the prefix digit "2" into the repeater 100. When the loop circuit, including the conductors C1302 and C1303, is interrupted at the beginning of the first pulse, the line relay R1470 quickly restores to normal inasmuch as the locking circuit, including its differentially wound lower winding, has conditioned the relay so that it is partially deenergized. Also upon restoring, the relay R1470, at its contacts 1473, interrupts the circuit for the pulse assist relay R1440, which also restores to normal. Finally, the line relay R1470, at its contacts 1471, completes a preenergizing circuit for its upper winding, which includes the resistor 1446, and the contacts 1461 and 1471, whereby the upper winding is energized sufficiently to cause the relay to immediately operate when the loop circuit is reclosed at the end of the first pulse. The pulse assist relay R1440 restores to normal when the circuit is opened upon the restoration of the relay R1470 and, at its contacts 1442, interrupts the previously traced circuit including the dial lead DIAL extending to the incoming repeater in the distant office. Thus the first pulse is transmitted over the dial lead to the distant office. As a further result of the restoration of the relay R1440, at its contacts 1441 it completes an obvious circuit for operating the control relay R1430, which relay in turn, at its contacts 1431, prepares a point in the incomplete circuit for reoperating the relay R1440. In multiple with the abovementioned circuit for the relay R1430, a circuit is also completed from ground by way of the contacts 1452, 1441 and 1423 for energizing the lower winding of the first pulse registering relay R1420. This relay is of the two-step type and closes its preliminary make contacts 1421 when the circuit is completed for its lower winding. When the pulse assist relay R1440 is subsequently energized at the end of the first pulse, at its contacts 1441 it interrupts the circuit for the lower winding of the relay R1420, thereby to remove the short-circuit from the upper winding, whereupon the relay operates fully over a circuit which includes ground at the contacts 1465, the contacts 1421, and the upper and lower windings of the relay R1420 in series. Thus it will be seen that the first pulse registering relay R1420 responds to the first pulse transmitted to the repeater 100. As a further result of the first restoration of the relay R1440, at its contacts 1441 it completes a circuit for operating the hold relay R1540, which may be traced from ground by way of the contacts 1452, 1441, 1355 and 1466, and the winding of the hold relay R1540, to battery. The latter relay, in turn, upon operating, at its contacts 1543, completes an operating circuit for the hold slave relay R1530. The relays R1540 and R1530 are retained operated during the pulsing period due to their slow-to-release characteristics. The relay R1540 upon operating, at its contacts 1544, places a direct shunt around the lower winding of the relay R1590 and thereby prepares a circuit for placing direct ground potential upon the dial lead DIAL the next time the pulse assist relay R1440 operates, thereby to improve the pulsing circuit over the dial lead. Furthermore, the relay R1540, at its contacts 1542, interrupts a point in the previously traced initial operating circuit for the relay R1480. When the shunt circuit is completed for the lower winding of the dial control relay R1590 the relay restores and, at its contacts 1591, prepares a point in the incomplete circuit for controlling the slow-to-operate relay R1350. This circuit, however, is interrupted as soon as the hold relay R1540 operates. The hold slave relay R1530, upon operating, at its contacts 1533 completes a circuit from ground by way of the contacts 1465 and 1533, and the resistor 1535 for shunting the line relay R1485, thereby to improve the pulsing circuit from the calling subscriber line.

At the end of the first pulse the loop circuit, including the conductors C1302 and C1303, is again closed, thereby to reoperate the line relay R1470 which operates immediately inasmuch as it has been preenergized over the circuit including the resistor 1446. Upon operating, the relay R1470, at its contacts 1472, again completes a circuit for the hold relay R1450 thereby to retain the latter relay in its operated position and, at its contacts 1473, it recompletes the circuit for the pulse assist relay R1440. The circuit for energizing the relay R1440 includes the contacts 1431 and 1473, and as soon as the relay R1440 operates it completes a locking circuit for itself which includes the contacts 1443 and the resistor 1445. Also, at its contacts 1442, the relay R1440 recloses the pulsing circuit including the dial lead DIAL and, at its contacts 1441, it interrupts the circuit for the control relay R1430 which now restores to normal, and the latter relay, at its contacts 1431, interrupts a point in the initial energizing circuit for the relay R1440. As a further result of the reoperation of the pulse assist relay R1440, the first pulse registering relay R1420 operates to its second step, thereby to close its contacts 1422 and 1424 and to open its contacts 1423, in the manner previously described.

At the beginning of the second pulse of the digit "2" transmitted by the calling subscriber, the line relay R1470 again restores, thereby to cause the restoration of the pulse assist relay R1440 in the manner previously described. At its contacts 1442, the relay R1440 interrupts the pulsing circuit, including the dial lead DIAL, and, at its contacts 1441, it again completes the circuit for the control relay R1430 which reoperates in the manner previously described. Furthermore, at its contacts 1441, the relay R1440 recompletes the previously traced circuit for energizing the hold relay R1540, which relay remains in its operated position during pulsing, and it completes a circuit for operating the lower winding of the second impulse registering relay R1370, which may be traced from ground by way of the contacts 1452, 1441, 1424, 1415 and 1372, and the lower winding of the relay R1370, to battery. The relay R1370 is of the two-step type and first closes its preliminary make contacts 1371, thereby to prepare a circuit for energizing its upper winding in series with the lower winding as soon as the relay R1440 reoperates at the end of the second pulse.

At the end of the second pulse transmitted by the calling subscriber the line relay R1470 reoperates, thus causing the reoperation of the pulse assist relay R1440. The latter relay, at its contacts 1442, terminates the second pulse transmitted over the dial lead DIAL and, at its contacts 1441, interrupts the circuit for the control relay R1430, the circuit for the lower winding of the relay R1370, and the circuit for the hold relay R1540. When this occurs the second impulse registering relay R1370 operates fully, thereby to interrupt its initial energizing circuit for its lower winding, including its contacts 1372, and to interrupt, at its contacts 1373, a point in a circuit for shunting the impulsing contacts 1442. When the above-mentioned circuit is interrupted for the hold relay R1540, the relay subsequently restores to normal and, at its contacts 1544, removes the shunt circuit from around the lower winding of the relay R1590. The latter relay now operates in series with the impulsing relay in the distant exchange and, at its contacts 1592, again prepares the circuit including the lower winding of the relay R1480. As a further result of the restoration of the relay R1540, at its contacts 1543 it opens the circuit for the slow-to-release hold slave relay R1530. The latter relay is somewhat slow to release and, consequently, the relay R1590 is operated before the relay R1530 restores to normal. Upon restoring, the relay R1530, at its contacts 1534, completes a circuit which may be traced from ground by way of the contacts 1465, 1534 and 1422, and the winding of the relay R1410, to battery. The latter relay, upon operating, at its contacts 1411 prepares a locking circuit for itself; at its contacts 1415 it interrupts a further point in the initial operating circuit for the lower winding of the relay R1370; and, at its contacts 1416, it prepares a further point in the incomplete circuit for shunting the impulsing contacts 1442.

In view of the above-described operation of the repeater 100 to repeat the impulses of the digit "2" transmitted by a calling subscriber over the trunk 1596 to the distant office, it will be seen that the relay R1420 responds to the first pulse and that the relay R1370 responds to the second pulse. If the calling subscriber had dialed the digit "1" a single impulse would have been repeated to the distant exchange and the first pulse registering relay R1420 would have operated. At the end of the single pulse the relay R1440 would have remained in its energized position and, consequently, the relays R1540 and R1530 would restore to normal in the order named. Following the restoration of the relay R1530 the relay R1410 would have operated, and as a result thereof, at its contacts 1416 a shunting circuit would have been completed for the impulsing contacts 1442 and thus would have prevented further digits from being repeated by the repeater 100 to the distant exchange. The shunting circuit for the impulsing contacts 1442 may be traced from ground by way of the winding of the relay R1590 and the contacts 1416, 1373 and 1366. Consequently, further interruptions of the contacts 1442 would have no effect on the dial lead DIAL, and the repeater 100 will prevent the subscriber from dialing further digits to the distant exchange when the prefix digit "1" is dialed.

In the event that the toll operator at the central office has extended the connection to the repeater 100 via the finder 300 and the connector 800, ground potential is forwarded over the control conductor C1304 thereby to prevent the operation of the relay R1360 and the relay R1365 when the repeater 100 is seized. Consequently, when the operator dials the digit "1" into the repeater 100 the above-mentioned shunting circuit for the contacts 1442 is interrupted, at the contacts 1366, thus permitting the toll operator to control the repeater 100 to repeat the remaining digits dialed thereinto to the distant exchange.

The remaining impulses constituting the digits of the called subscriber in the suboffice B are repeated under control of the line relay R1470 and the pulse assist relay R1440, in the same manner as has been described above, in the event the calling subscriber has first dialed the digit "2"

into the repeater 100. The call is thus extended to the desired called subscriber in the suboffice B and when the subscriber answers the connection the incoming repeater at the suboffice is controlled, in the manner to be explained subsequently, to return ground potential over the dial lead DIAL, thereby to cause the restoration of the dial control relay R1590. At the time the dial control relay R1590 restores to normal, the hold relay R1540 and the hold slave relay R1530 will be in their restored positions inasmuch as the energizing circuit for these relays is interrupted at the end of the final digit received by the repeater 100. Consequently, when the relay R1590 restores, at its contacts 1591 a circuit is completed from ground by way of the contacts 1465, 1542, 1591, 1532, 1481 and 1352 for energizing the slow-to-operate answer relay R1350. Upon operating, the relay R1350, at its contacts 1353, completes a locking circuit for itself which includes ground at the contacts 1464. In this connection it is noted that the contacts 1352 are arranged to be opened following the closure of the contacts 1353 in order to prevent interruption of the initial energizing circuit until after the locking circuit for its winding has been completed. As a further result of the restoration of the relay R1590 a circuit is completed for operating the battery reversing relay R1310 which may be traced from ground by way of the contacts 1465, 1542, 1591, 1532, 1481 and 1486, and the winding of the relay R1310, to battery. The relay R1310, upon operating, at its contacts 1315 completes a locking circuit for itself in multiple with the contacts 1486 and the previously traced circuit to ground at the contacts 1465. As a further result of the operation of the slow-to-operate relay R1350, at its contacts 1355 it opens a point in the incomplete circuit for the relay R1540, thereby to prevent the reoperation of the latter relay in the event the calling subscriber should inadvertently operate his dial after the connection is established. As a further result of the operation of the battery reversing relay R1310, at its contacts 1311 to 1314, inclusive, the application of battery and ground potential to the conductors C1302 and C1303 by way of the windings of the relays R1470 and R1485, is reversed in order to give answering supervision in the event the connection has been established by a toll operator in the central office, but this reversal has no function to perform when the call is extended from a subscriber line. The connection between the calling subscriber at substation A and the called subscriber in the automatic suboffice B is now completed and conversation may take place.

When the conversation between the calling subscriber at substation 200 and the called subscriber at the suboffice B has been terminated, the calling subscriber replaces his receiver upon the associated switchhook of his telephone instrument, thereby to interrupt the loop circuit including the conductors C1302 and C1303 extending to the repeater 100, thereby causing the restoration of the line relays R1470 and R1485. Upon restoring, the relay R1470, at its contacts 1473, interrupts the circuit of the pulse assist relay R1440, which also restores to normal. The latter relay, at its contacts 1442, interrupts the series circuit including the lower winding of the dial control relay R1590, the dial lead DIAL, and the operated impulse receiving relay in the repeater in the suboffice B. The two relays included in the above-mentioned series circuit are in their restored position at the present time and thus no action takes place. As a further result of the restoration of the relay R1440, at its contacts 1441, it completes a circuit including the contacts 1452, 1441, and 1354 for energizing the upper winding of the control relay R1348. The latter relay upon operating, at its contacts 1349, completes a multiple holding circuit for the hold slave relay R1460. Thus the relay R1460 will be held in its operated position under control of the relay R1348 after the hold relay R1450 restores to normal. As a further result of the restoration of the relay R1470, at its contacts 1472, it interrupts the circuit of the slow-to-release hold relay R1450, which relay, upon restoring, at its contacts 1451 interrupts a point in the multiple circuit of the hold slave relay R1460. At its contacts 1453 and 1454, the relay R1450 also transfers the dial lead DIAL from the circuit including the lower winding of the relay R1590 to the circuit including the lower winding of the control relay R1348. Since the dial lead DIAL has ground potential applied thereto through a relay in the suboffice A repeater this relay operates in series with the lower winding of the relay R1348, thereby to initiate the release of the suboffice A repeater and the further release of the repeater 100 in the manner to be explained hereinafter.

*Forced release and conversation timing in the repeater 100*

The repeater 100 is provided with facilities for forcibly releasing a connection in the event a calling subscriber delays too long in dialing successive digits of a called number and also in the event a connection is extended to a called subscriber who fails to answer within a predetermined elapsed time interval. In this regard it is pointed out that when a connection is extended from a calling subscriber line to the repeater 100, the seizure relay R1360 and the seizure slave relay R1365 are operated. The latter relay, at its contacts 1367 and 1368, prepares a circuit for the timing relay R1340, whereby the timing apparatus, not shown, included in the tandem exchange A periodically transmits ground pulses over the timing conductor 50A at approximately three second intervals. Consequently, at a variable time interval after the relay R1365 operates a ground pulse appearing upon the conductor 50A completes a circuit including the contacts 1367 and 1368, the upper winding of the relay R1340, and the contacts 1335, whereby the relay R1340 operates. Upon operating, at its contacts 1345, the relay R1340 completes a locking circuit for itself which includes the contacts 1592 of the dial control relay R1590, the contacts 1542, and ground potential at the contacts 1465. It will be recalled that the hold relay R1540 interrupts a point in the above-traced locking circuit during the time pulses are received from the calling subscriber line but that during the interdigital pause between successive digits dialed by the calling subscriber the relay R1540 remains in its restored position. Consequently, it will be understood that the relay R1340 will be operated momentarily at approximately three second intervals and will complete the above-traced locking circuit for its lower winding during the interdigital pause at a time when the relay R1540 is in its restored position. If the next digit of a called subscriber number is not dialed within a predetermined time interval, a ground pulse transmitted from the timing apparatus will appear upon the conductor 51B, thereby to cause the operation of the disconnect relay R1330. This circuit includes the lower winding of the relay R1330 and battery potential at the contacts 1343 of the operated timing relay R1340. It will be seen that if the calling subscriber does not delay too long in dialing successive digits of a called subscriber number the relay R1340 will be restored and the ground pulse appearing on the conductor 51B will have no effect upon the disconnect relay R1330.

Assuming that the above operations have taken place because of the failure of the subscriber to dial a digit within a predetermined time interval, the relay R1330, upon operating, at its contacts 1333, completes a locking circuit for its upper winding, which includes the ground potential at the contacts 1464. As a further result of the operation of the relay R1330, at its contacts 1331 and 1332, it transfers the holding ground potential applied by way of the winding of the seizure relay R1360 to the control conductor C1304 to the ground potential at the contacts 1351 of the answer relay R1350. Since in the present case it has been assumed that the subscriber failed to dial a digit within a predetermined time interval, the answer relay R1350 has not been operated. In view of this, the operation of the relay R1330 disconnects the holding ground from the winding of the seizure relay R1360 and the control conductor C1304, whereupon the repeater 100 and the finder-connector link involved in the connection are restored to normal, in the manner previously described.

It will now be assumed that the calling subscriber has dialed all of the digits of a called subscriber number within the predetermined time interval and, therefore, during the transmission of the last digit the timing relay R1340 is in its restored position. Shortly after the last digit has been transmitted, however, the relay R1340 may again be operated over the circuit including the conductor 50A, and the contacts 1367 and 1368 if conversation timing is required. In addition to preparing the circuit for the lower winding of the disconnect relay R1330, the relay R1340 also completes a locking circuit for itself which includes the contacts 1345, 1337, 1592, 1542 and 1465. At its contacts 1341, the relay R1340 prepares a point in a substitute holding circuit for the seizure relay R1360. When the called subscriber answers the connection extended to his substation, the dial control relay R1590 is restored to normal in the manner previously explained, thereby to interrupt the locking circuit for the timing relay R1340, which also restores to normal. Furthermore, at its contacts 1591, the relay R1590 completes a circuit for operating the answer relay R1350 and the battery reversing relay R1310, in the manner previously described. At its contacts 1351, the answer relay R1350 prepares another point in the substitute holding circuit for the seizure relay R1360 and, at its contacts 1356, it interrupts a point in the circuit for energizing the upper winding of the timing relay R1340. Thus the timing relay R1340 is restored to normal before the slow-to-operate relay R1350 operates.

If conversation timing is not provided in the repeater 100, the "C" wiring is omitted from the contacts 1368 and 1357 and, consequently, the circuit for operating the timing relay R1340 over the conductor 50A cannot be completed during conversation since the relay R1590 remains in its restored position. When the conversation is terminated by the called subscriber at the distant exchange, the relay R1590 is reoperated over the dial lead DIAL and, at its contacts 1594, it prepares the circuit for operating the upper winding of the timing relay R1340 over the conductor 50A. Assuming now that the calling subscriber fails to release the repeater 100 within a predetermined time interval after the called subscriber disconnects, the next ground pulse transmitted over the conductor 50A will complete a circuit for operating the upper winding of the relay R1340, which includes the contacts 1367 and 1594. The relay R1340 operates over this circuit and, at its contacts 1345, completes a locking circuit for its lower winding, which includes ground potential at the contacts 1465. Subsequently the ground pulse is transmitted over the conductor 51B, thus causing the operation of the timing disconnect relay R1330, in the manner previously described. The relay R1330, at its contacts 1333, completes a locking circuit for its upper winding, which includes ground potential at the contacts 1464. Furthermore, at its contacts 1336 and 1337, the relay R1330 transfers the holding circuit for the lower winding of the relay R1340 from ground at the contacts 1465 to the grounded conductor 52C. Also, at its contacts 1331 and 1332, the relay R1330 transfers the holding ground for the relay R1360 from the contacts 1332 to a circuit including the contacts 1331, 1341 and 1351. Shortly after the above-described ground pulse appears upon the conductor 51B, the holding ground potential is momentarily disconnected from the conductor 52C, thereby to cause the relay R1340 to restore to normal. Upon restoring, the relay R1340, at its contacts 1341 and 1342, transfers the holding circuit for the relay R1360 from ground potential at the contacts 1351 to the grounded conductor 53C. Shortly after the relay R1340 is restored in the above-described manner, a momentary ground pulse is transmitted over the conductor 54C thereby to complete an obvious circuit for momentarily operating the warning tone relay R1320. The relay R1320, upon operating, at its contacts 1321, transmits a warning tone signal to the calling subscriber, thereby to indicate that the connection is about to be forcibly released. If the connection is not immediately released by the calling subscriber, in the manner previously explained, the timer apparatus functions to remove the holding ground potential from the conductor 53C shortly after the warning tone signal is transmitted. When ground potential is removed from the conductor 53C the relay R1360 restores to normal and the finder 300 and the connector 800 involved in the connection are restored to normal in the manner previously explained. In the latter event the repeater 100 is also restored to normal in the manner described hereinbefore and, as a result thereof, the holding circuit for the upper winding of the relay R1330 is interrupted, thereby causing the latter relay to restore. The apparatus involved in the connection is now fully restored to normal and may be utilized in the extension of additional connections.

In the event that conversation timing is required in the repeater 100 the "C" wiring of contacts 1368 and 1357 is included therein. Consequently, when a connection is answered by the called subscriber the relay R1340 is restored to normal in the same manner as has been described above. Shortly after the relay R1340 restores to normal a ground pulse will again be applied to the conductor 50A and, since "C" wiring is included in the repeater, a circuit is completed by way of the contacts 1367 and 1368 for operating the relay R1340 over a circuit including its upper winding. Upon operating, at its contacts 1345, the relay R1340 completes a locking circuit for its lower winding which includes the contacts 1337 and the contacts 1357 of the operated answer relay R1350. Shortly thereafter a ground pulse is applied to the conductor 51B, thereby to cause the relay R1330 to operate and to lock itself in its operated position over the circuit including its upper winding. At its contacts 1331 and 1332, the relay R1330 transfers the holding ground potential for the seizure relay R1360 from the contacts 1332 to the contacts 1351 and, at its contacts 1336 and 1337, it transfers the holding circuit for the lower winding of the relay R1340 from ground at the contacts 1357 to the grounded conductor 52C. With the relays R1330 and R1340 in their operated positions conversation timing now takes place. If the calling and called subscribers involved in the connection fail to release within the predetermined conversation timing period, ground potential applied to the conductor 52C will be momentarily interrupted by the timer apparatus, thereby causing the timing relay R1340 to restore to normal. The latter relay, at its contacts 1341 and 1342, transfers the holding ground potential for the seizure relay R1360 from the contacts 1351 to the grounded conductor 53C. Shortly after the ground potential on the conductor 52C is momentarily interrupted, a momentary ground pulse is applied to the conductor 54C, thereby to complete an obvious circuit for momentarily operating the warning tone relay R1320. At its contacts 1321, the relay R1320 momentarily applies the warning tone signal to the talking conductors C1302 and C1303, thereby to indicate to both the calling and the called subscribers involved in the connection that the time allotted for the conversation has elapsed and that the connection will be forcibly released. Shortly after the warning tone signal has been transmitted to the subscribers involved in the connection, the ground potential applied to the conductor 53C is momentarily interrupted by the timer, thereby to remove the holding ground potential for maintaining the relay R1360 in its operated position and for retaining the finder 300 and the connector 800 in their operated positions. The finder 300 and the connector 800 are thus restored when the ground potential is removed from the control conductor C1304 in the same manner as has been described hereinbefore, and the repeater 100 is also restored to normal incident to the restoration of the connector 800 and the restoration of the seizure relay R1360. In view of the foregoing it will be understood that when conversation timing is utilized in the repeater 100 a connection extended therethrough will be forcibly released in the event that the subscribers involved in the connection fail to disconnect within the allotted conversation timing interval.

*Restricted service*

In view of the foregoing description of the operation of the switching apparatus in the tandem exchange A, it will be understood that the various tandem exchange subscribers may complete local connections including the finder-connector links of the type illustrated in Figs. 3, 8, 9, 10, 11 and 12, and may also complete interoffice connections over the various trunk lines including outgoing repeaters of the type disclosed in Figs. 13, 14 and 15. As pointed out previously, provisions are made in the system for imposing different restrictions on the services rendered any particular tandem exchange subscriber line. In the system under consideration, wherein all connections are set up through the finder-connector links and wherein interoffice calls are completed through the interoffice repeaters which are seized directly through the contact banks of the connectors, the service restriction facilities are incorporated in the repeaters which terminate the restricted trunks so that the restrictions are imposed on a per trunk basis. The illustrated repeater 100, which terminates the restricted trunk 1596 in the tandem exchange, may be used without change in a connector system employing finder-connector links or in a selector system employing finder-selector links. In the latter type system the outgoing trunk repeaters of the type illustrated in Figs. 13, 14 and 15 may be seized directly through the bank contacts of the selectors of the type illustrated in Fig. 4, instead of through the bank contacts of the connectors. Thus the repeater 100 may be used in either a connector or a selector system, and if restricted service facilities are provided the repeater is wired in accordance with the "R" wiring and the "NR" wiring is omitted. On the other hand, if the service restricting facilities are not to be provided the repeater 100 may be wired in accordance with the "NR" wiring and the "R" wiring is omitted.

For the purpose of describing the operation of the service restricting facilities it will now be assumed that the restricted repeater 100 is wired, as described above, to provide service restricting facilities. Referring now to the restricted service network 10, illustrated in Fig. 2, it will be seen that this network is arranged to provide five different signals which respectively designate different restrictions and the line signals which designate the different lines or incoming trunks upon which restrictions may be imposed. More particularly, this network produces at spaced intervals matched signal or control pulses which respectively represent or designate five different restrictions. The pulse relays R260, R265 and R270 represent respectively the restrictions 1, 2 and 5. Intervening restrictions 3 and 4 have been omitted for the sake of simplifying the circuit and description thereof. The upper make contacts of each of the three relays R260, R265 and R270 are wired respectively to corresponding terminals 1, 2 and 5 of the terminal frame 290. The individual make contacts following in order below the upper make contacts are also wired to corresponding terminals on the terminal frame 290. In the illustrated example the restriction 1 is applied to the line of the subscriber at substation 200 by way of the conductor C30 which terminates in the bank contact accessible to the wiper 311 of the finder 300. If the restriction 2 were to be applied to the line of the subscriber at substation 200 the conductor C30 would have been connected to the second terminal in the frame 290 to which the restriction 2 is applied by the relay R265. By referring to the illustrated second row of terminals on the terminal frame 290, it will be seen that the first, second and third terminals may be multiply connected and the lead taken therefrom extending to a bank contact in the finder individual to a calling subscriber line, in the same manner as the conductor C30 is now connected to the terminal individual to the subscriber at substation 200, whereby the restrictions 1, 2 and 3 would be applied to the associated subscriber line. Thus, it will be understood that each subscriber line may have any one restriction or any combination of restrictions applied thereto.

Figure 2:
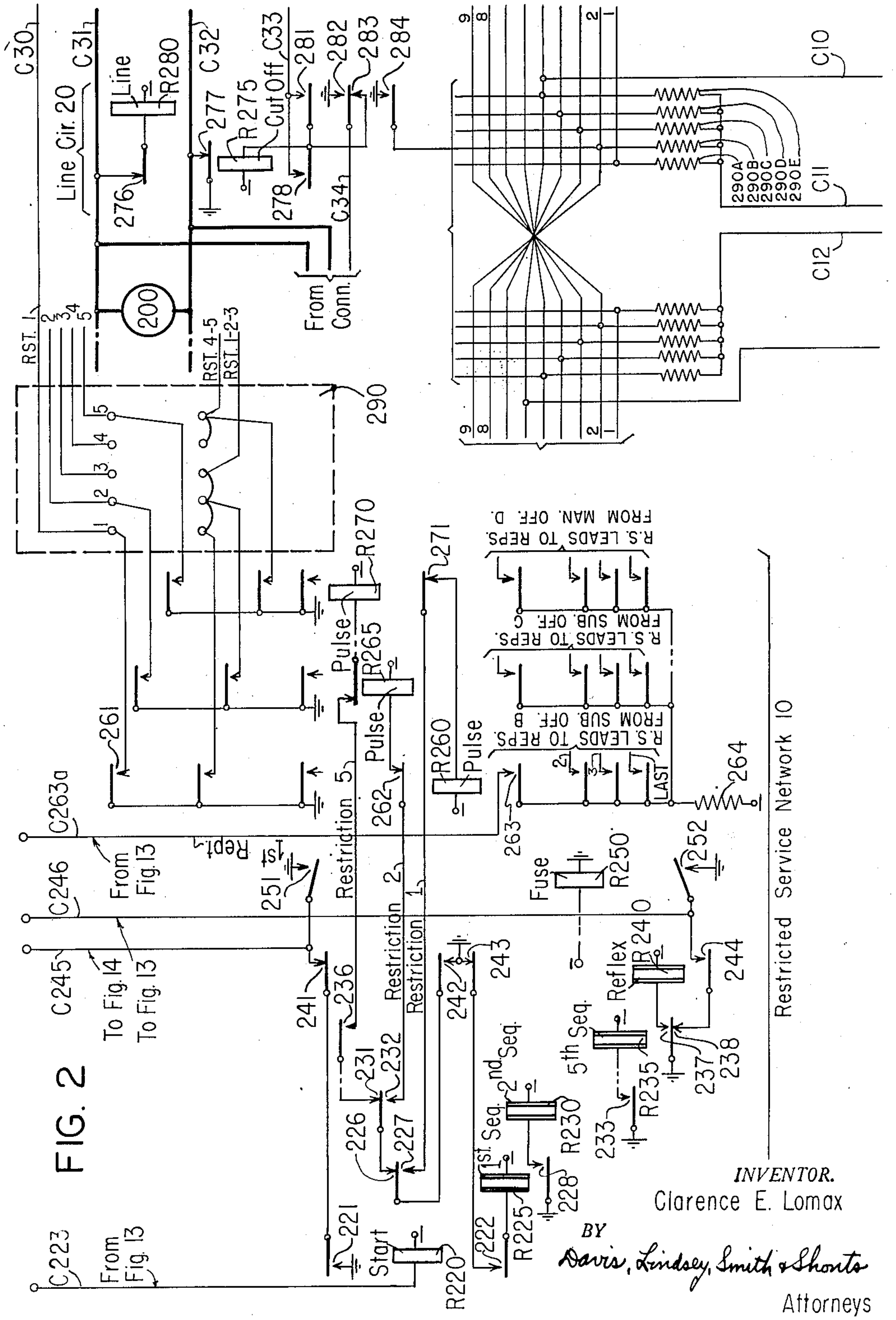

In order to describe the operation of the restricted service network 10 illustrated in Fig. 2 and the restricted service apparatus incorporated in the repeater 100, it will be assumed that the illustrated finder-connector link, comprising the finder 300 and the connector 800, has been seized over the calling line associated with the subscriber at substation 200 and that a connection is extended from this line through the connector to the trunk repeater 100 by the dialing of the single digit "9." It will also be assumed that the subscriber at substation 200 is prohibited from completing interoffice trunk connections via the repeater 100 to the automatic subscribers located in the suboffice B. Consequently, the repeater 100 is wired in accordance with the "R" wiring to provide restricted service facilities.

When a connection is thus extended to the repeater 100 the line relays R1470 and R1485 operate in the manner previously described in order to cause the successive operations of the relays R1450 and R1460. The latter relay, at its contacts 1462, applies a holding ground potential to the conductor C1304, which circuit may be traced from ground by way of the contacts 1332 and 1393, the winding of the seizure relay R1360, the contacts 1462, and the conductor C1304, thereby to energize the relay R1360 and to retain the associated finder-connector link in its operated position. It should be particularly noted that this circuit includes the contacts 1393 of the deenergized restricted service relay R1390. It will be apparent below that as long as the restricted service relay remains in its deenergized position the holding ground potential will be applied to the finder-connector link to prevent its restoration. It will also be noted below that the restricted service relay R1390 will interrupt the holding circuit for the finder-connector link in order to cause the restoration of the link in the event that the calling subscriber is restricted from extending connections via the trunk repeater 100.

As a further result of the operation of the hold slave relay R1460 upon the seizure of the repeater 100, at its contacts 1461′, a circuit is completed for the start relay R220 of the restricted service network 10, which may be traced from ground by way of the contacts 1461′ and 1379, the restricted service start conductor C223 extending to Fig. 2, and the winding of the start relay R220, to battery. Also, at its contacts 1462′, the relay R1460 prepares a point in a circuit whereby the restricted service test relay R1380 in the repeater 100 is controlled in response to the operation of the start relay R220 in the restricted service network 10.

Referring now to the restricted service network 10, it is noted that when the above-traced starting circuit is completed for the relay R220, at its contacts 221, the above-mentioned circuit is completed for the restricted service test relay R1380, which may be traced from ground by way of the contacts 221 and 241, the conductor C245 extending to Fig. 14, the contacts 1462′, 1383 and 1378, and the winding of the slow-to-release restricted service test relay R1380, to battery. Upon operating, the relay R1380, at its contacts 1384, completes a locking circuit for itself from ground at the contacts 1464 of the operated hold slave relay R1460. Also, at its contacts 1383, the relay R1380 interrupts its initial energizing circuit from ground at the contacts 221 of the start relay R220; at its contacts 1382, it prepares a point in a circuit, to be traced hereinafter, for operating the restricted service release relay R1375; and, at its contacts 1381, it prepares a point in a circuit, traced hereinafter, whereby the restricted service relay R1390 is operated when the proper restriction pulse is transmitted by one of the pulse relays R260, R265 or R270.

As a further result of the operation of the start relay R220, at its contacts 222, an obvious circuit is completed for the first sequence relay R225. The latter relay operates when this circuit is completed and, at its contacts 227, prepares a point in a circuit, traced hereinafter, for transmitting a pulse indicative of restriction 1, to the pulse relay R260, and, at its contacts 228, completes an obvious circuit for energizing the second sequence relay R230. The second sequence relay R230 now operates to prepare, at its contacts 232, the point in a circuit for transmitting a pulse, indicative of restriction 2, to the pulse relay R265, and, at its contacts 233, it completes a circuit for the third sequence relay (not shown), which relay in turn completes a circuit for the fourth sequence relay (not shown), and the fourth sequence relay in turn completes a circuit for operating the fifth sequence relay R235. As has been pointed out above, the third and fourth sequence relays, which are indicative respectively of restrictions 3 and 4, have not been illustrated and it should be understood that these relays apply a pulse indicative of restrictions 3 and 4 to the corresponding pulse relays, in the same manner as the second sequence relay R230. The fifth sequence relay R235, upon operating, at its contacts 237, completes an operating circuit for the reflex relay R240 and, at its contacts 236, it prepares a circuit for applying a pulse, indicative of restriction 5, to the pulse relay R270. From the foregoing description of the operation of the sequence relays it will be understood that when the start relay is operated the five sequence relays sequentially operate in the order named in order to prepare circuits, whereby the corresponding restriction pulse is momentarily transmitted to the associated pulse relay as the sequence relays are restored to normal in the same order in which they were operated. The reflex relay R240, upon operating, at its contacts 241, removes ground potential from the conductor C245; at its contacts 242, it completes a circuit including the contacts 227 and 271 for operating the first pulse relay R260; at its contacts 243, it interrupts the circuit for the first sequence relay R225; and, at its contacts 244, it prepares a point in a circuit for transmitting ground potential over the conductor C246. The relay R260 upon operating, at its contacts 261, applies ground potential to the first restriction conductor C30 by way of the first terminal of the terminal frame 290. Furthermore, at its contacts 263, the pulse relay R260 applies battery potential by way of the resistor 264 to the restricted service lead C263$a$ extending to Fig. 13. Thus the pulse relay R260 simultaneously applies ground potential to the conductor C30 and battery potential to the conductor C263$a$, and if these potentials arrive simultaneously in the repeater 100, over a circuit to be traced hereinafter, the restricted service relay R1390 will be operated in order to cause the finder-connector link involved in the connection to be restored to normal. The above-traced circuit for operating the pulse relay R260 is maintained for a momentary period inasmuch as the circuit for the first sequence relay R225 is interrupted at the same time the operating circuit for the pulse relay R260 is completed. The relay R225, upon restoring to normal, interrupts, at its contacts 227, the circuit for the relay R260, thereby to cause the latter relay to restore to normal. Also upon restoring, the relay R225, at its contacts 226, completes a circuit for the second pulse relay R265 which includes the contacts 242, 226, 232 and 262. Attention is directed to the fact that the circuit for the second pulse relay R265 cannot be completed until the first pulse relay R260 has restored to normal, thereby to prevent more than one restriction circuit from being completed at a time through the terminal frame 290. As a further result of the restoration of the relay R225, at its contacts 228, it interrupts the circuit for the second sequence relay R230 which now restores to normal. At its contacts 231, 232 and 233, the relay R230 controls the third sequence relay (not shown) in the same manner in which the first sequence relay R225 controlled the second sequence relay R230; the third and fourth sequence relays (not shown) operate in the manner described above; and finally the circuit of the fifth sequence relay R235 is interrupted. After the restoration of the fourth sequence relay, and just prior to the restoration of the fifth sequence relay, a circuit is completed from ground at the contacts 242 by way of the contacts 226 and 232, the corresponding break contacts on the third and fourth sequence relays, and the contact 236 of the fifth sequence relay R235, for operating the pulse relay R270. The latter relay, at its associated contacts, transmits the ground and battery matching pulses indicative of restriction 5. Subsequently the fifth sequence relay R235 restores to normal, thereby to interrupt the circuit for the pulse relay R270, at its contacts 236; at its contacts 237, it interrupts the circuit for the reflex relay R240; and, at its contacts 238, it applies ground potential to the conductor C246 via the contacts 244.

The above-described cycle of operation of the restricted service network 10 takes place each time the start relay R220 is operated. Thus it will be seen that the pulse relays for transmitting the matching pulses indicative of the various restrictions are sequentially operated upon the restoration of the sequence relays rather than upon their energization.

It will be recalled that the pulse relay R260 was momentarily operated upon the operation of the reflex relay R240 and, as a result thereof, applied ground potential to the conductor C30; simultaneously it also applied battery potential to the conductor C263a. When ground and battery potential are simultaneously applied, respectively, to the above-mentioned conductors, a circuit is completed for operating the restricted service relay R1390, which may be traced from ground by way of the contacts 261, the first terminal of the terminal frame 290, the conductor C30, the wiper 311 of the finder 300, the contacts 361, the conductor C49 extending to the corresponding conductor of Fig. 8, the contacts 811, the wiper 1271, and the engaged contact in its associated contact bank terminating the conductor C1301 extending to Fig 13, the contacts 1381, the winding of the restricted service relay R1390, the conductors C263a extending to Fig. 2, the contacts 263, the resistor 264, and battery potential. Thus the restricted service relay R1390 in the repeater 100 is operated in the event that the calling subscriber at substation 200 is prohibited from extending calls via the repeater 100 to the subscribers located in the suboffice B. When this test circuit is completed the relay R1390 operates and, at its contacts 1392, completes a locking circuit for its left-hand winding which includes ground potential at the contacts 1364. Furthermore, at its contacts 1393, the relay R1390 interrupts the previously traced circuit for applying ground potential by way of the winding of the seizure relay R1360 to the C conductor C1304. When the latter circuit is interrupted the relay R1360 restores to normal and the associated finder-connector link is released in the manner previously described. The connector 800 of the finder-connector link, in restoring its wipers to normal, interrupts the previously traced loop circuit for the line relays R1470 and R1485 of the repeater 100. The relay R1470 interrupts the circuit of the hold relay R1450, which also restores to normal. At its contacts 1451, the hold relay R1450 interrupts the circuit for the hold slave relay R1460 and the latter relay, at its contacts 1464, interrupts the previously traced holding circuit for the restricted service test relay R1380 and the restricted service relay R1390, whereupon the latter two relays restore to normal. Finally, the hold slave relay R1460, at its contacts 1461', interrupts the previously traced start circuit including the conductor C223, whereupon the start relay R220 in the restricted service network 10 restores to normal. Further operation of the repeater 100 in response to the restoration of the seizure relay R1360 and other relays included therein, is exactly the same as has been described hereinbefore. The repeater 100 is then completely restored to normal and is available for the extension of further connections.

In view of the foregoing description of the operation of the restricted service network 10 in conjunction with the restricted service apparatus included in the repeater 100, it will be understood that if the subscriber at substation 200 is prohibited from extending connections over the trunk repeater 100 the ground and the battery potentials transmitted respectively over the conductors C1301 and C263a, incident to the operation of the pulse relay R260, cause the operation of the restricted service relay R1390 in order to release the established connection. If the subscriber at substation 200 is permitted to make trunk calls over the group of trunks including the repeater 100, and is prohibited from making trunk calls over another group of trunks extending to the automatic suboffice C, for example, then the conductor C30 individual to his line would have been connected to the second terminal (restriction 2) of the terminal frame 290 instead of to terminal 1 (restriction 1). Under this condition the conductor C263a included in the circuit for the restricted service relay R1390 would have battery potential applied thereto at the time of the operation of the pulse relay R260. Subsequently the relay R260 will restore to normal to remove the battery potential from the conductor C263a, and the second pulse relay R265 is operated to apply ground potential to the second terminal of the terminal frame 290 and over the conductor C30 and the previously traced circuit including the conductor C1301 to the winding of the restricted service relay R1390. Since the battery potential applied to the conductor C263$a$ and the ground potential applied to the conductor C1301 are not applied at the same time, and accordingly are not matched, the restricted service relay R1390 cannot operate to release the connection established through the repeater 100, in the manner previously described. Thus the calling subscriber at substation 200 is permitted to complete the connection to the automatic suboffice B.

Referring again to the restricted service network 10 (Fig. 2), it will be recalled that the start relay R220, upon operating, applied a ground pulse to the conductor C245 in order to cause the operation of the relay R1380 in the repeater 100. Thereafter the chain of relays R225, etc. operated in sequence and were subsequently restored in the same order in order to cause the sequential operation of the various pulse relays R260, R265, etc., thereby to transmit the various restriction pulses. Upon the restoration of the fifth sequence relay R235, at its contacts 237, it interrupted the circuit for the reflex relay R240. The latter relay, being somewhat slow to release, retains its contacts 244 closed so that a circuit is now completed from ground by way of the contacts 238 and 244, the conductor C246 extending to Fig. 13, the contacts 1382, and the winding of the restricted service release relay R1375, to battery. The latter relay, upon operating, at its contact 1376, completes a locking circuit for itself which includes ground at the contacts 1464. Furthermore, at its contacts 1378, the relay R1375 interrupts a point in the locking circuit for the relay R1380, which now restores to normal, and, at its contacts 1379, it interrupts a point in the previously traced start circuit for the relay R220, which also restores to normal. Incident to the restoration of the relay R1380, at its contacts 1381, it interrupts a point in the matching circuit for the right-hand winding of the relay R1390; at its contacts 1382, it interrupts a point in the initial energizing circuit for the relay R1375; and, at its contacts 1384, it interrupts a further point in its locking circuit. The restricted service apparatus in the repeater 100 remains in this condition until the connection established through the repeater 100 is abandoned by the calling subscriber at substation 200.

Since the restricted service network 10 is a common piece of apparatus, the current supplied thereto is taken through an individual fuse which is separated from the remaining exchange switching apparatus. As long as the fuse remains intact the fuse relay R250 is retained in its energized position and the restricted service apparatus operates in the manner described above. In the event that the fuse blows, the relay R250 restores to normal and, at its contacts 251 and 252, it applies ground potential to the conductors C245 and C246. These conductors are common to all of the repeaters provided with restricted service facilities and during the normal operation of the restricted service network 10 ground potential is applied to the conductor C245 at the beginning of the cycle of operation of the sequence relays, and ground potential is applied to the conductor C246 at the end of this sequence operation. Incident to the application of ground potential to the conductors C245 and C246 in response to the restoration of the fuse relay R250, the restricted service test relay R1380 in the repeater 100 will operate over the previously traced circuit, including the conductor C245, as soon as the repeater is seized. Upon operating, the relay R1380, at its contacts 1382, completes a circuit including the grounded conductor C246 for operating the restricted service release relay R1375. The relay R1375, upon operating, locks to ground over a circuit including the contacts 1376 and 1464, and, at its contacts 1378, it interrupts the circuit of the relay R1380, which subsequently restores to normal. In view of the above-described arrangement of the restricted service network 10 it will be understood that in the event the network is rendered inoperative by the blowing of a fuse individual thereto, all restrictions applied to the various subscriber lines are rendered ineffective and the associated restricted service apparatus in the respective trunk repeaters is controlled to permit the extension of all calls until the faulty condition is removed by the replacement of the fuse individual to the network 10.

The manner in which service restrictions may selectively be imposed upon the other lines or trunks of the system will be clearly apparent from the above explanation. It will also be understood that one or more of the various restrictions may be applied to any one line or trunk.

*Reverting calls*

The arrangement of the illustrated finder-connector link included in the switching apparatus of the tandem exchange A is such that reverting call connections, that is connections between substations served by the same party line, are set up by the dialing of the directory number. In considering this type of call it may be assumed that a call is initiated by the subscriber at substation 200, which is to be extended to another subscriber served by the same line conductors. It will also be assumed that the calling subscriber at substation 200 has removed his receiver and has dialed the four digits into the connector 800, whereby the wipers thereof are positioned into engagement with the bank contacts terminating the negative conductor C31, the positive conductor C32, and the connector normal conductor C34. These conductors are individual to the line of the subscriber at substation 200 and, consequently, the connector normal conductor C34 has ground potential applied thereto in the manner described previously, in order to busy the associated subscriber line to all connectors having access thereto. In response to the dialing of the four digits of the called subscriber number the connector 800 operates, in the manner previously described, and, upon engagement with the conductors of the busy calling line, the busy relay R1030 is operated to transmit a busy tone signal to the calling subscriber at substation 200. Upon receiving the busy signal the calling subscriber restores his receiver upon the switchhook of his associated telephone instrument, and thus interrupts the loop circuit extending through the finder 300 to the winding of the line relay R850 in the connector 800. When the relay R850 in the connector 800 restores to normal, at its contacts 853, it interrupts the circuit for the lock-pulse relay R860, which also restores to normal, and, at its contacts 852, it interrupts a point in the multiple circuit for the release control relay R820. Incident to the restoration of the relay R860, at its contacts 862, it interrupts a further point in the circuit of the relay R820. The latter relay, however, due to its slow-to-release characteristics is retained in its operated position for a short time interval. As a further result of the restoration of the relay R860 ground potential is applied to the connector normal conductor C34 individual to the calling line by way of the wiper of the connector engaging the contact terminating the conductor C34. This circuit may be traced from ground by way of the contacts 923, 861, 877, 915, 843, 1012, 1034 and 1255, the C1 wiper 1274 and the engaged contact in its associated bank terminating the conductor C34, the contacts 283 and 278, the conductor C33, the wiper 314 of the finder 300, the contacts 364, the conductor C43 extending to Fig. 8, the contacts 816 and 872, and the winding of the hold relay R870, to battery. Thus the ground potential applied to the C1 wiper of the connector 800 is returned through the finder 300 in order to retain the hold relay R870 in the connector 800 in its operated position. Furthermore, this ground potential also retains the switch-through relay R360 of the finder and the cutoff relay R275, individual to the calling line, in their operated positions. Shortly after the above-traced circuit is completed for retaining the hold relay R870 in its operated position the release control relay R820 restores to normal and, at its contacts 821, interrupts a point in the multiple circuit for the relay R870. At its contacts 823, the relay R820 disconnects the winding of the control relay R830 from the conductor C43 and, at its contacts 822, it completes a circuit including the grounded conductor C43 and the contacts 822 and 876 for operating the reverting call relay R960.

The relay R960, upon operating, at its contacts 962, prepares a point in a circuit, traced hereinafter, for transmitting a reverting call tone signal over the calling line, in order to indicate to the subscriber who answers the reverting call that another subscriber on his line desires to converse with him and that he should not hang up if he does not get an immediate response. As a further result of the operation of the relay R960, at its contacts 961, it interrupts a point in the circuit for transmitting the busy tone signal to the calling line; at its contacts 963, it completes a multiple locking circuit for the hold relay R870, so that this relay will remain in its operated position after the relay R810 operates to interrupt the circuit at its contacts 816; and, at its contacts 965, it completes a circuit from the grounded conductor C1000 for operating the upper winding of the switch-through relay R810. The latter relay, upon operating, at its contacts 818 completes a locking circuit for its lower winding, including the grounded conductor C43, and, at its contacts 812 and 814, it disconnects the windings of the line relay R850 from the conductors C41 and C42. Furthermore, the relay R960, at its contacts 966, completes an operating circuit for the switching relay R1220, which relay upon operating prepares the circuits for signaling the called subscriber on the calling party line, in the same manner as has been previously described. Finally, at its contacts 967, the relay R960 prepares a point in the circuit for the lower winding of the trunk test busy relay R1010. The latter circuit, however, cannot be completed until the called subcriber has answered the connection and has caused the operation of the ring cutoff slave relay R1150. The manner in which ringing current of the selected code is transmitted over the conductors C31 and C32 of the calling party line is exactly the same as described above with reference to a call originating at the substation 200 and routed to substation 1200A.

When the calling subscriber on the same party line with the calling subscriber at substation 200 answers the call, an answering loop circuit is completed whereby the previously traced circuit for stopping the transmission of the ringing current is completed and the ring cutoff slave relay R1150 is operated. In addition to the previously described circuits for controlling the various relays included in the ringing operation of the connector 800, the relay R1150, at its contacts 1152, completes a circuit including the reverting call tone conductor R. C. TONE, whereby a distinctive signal tone current is transmitted over the established connection to the subscriber at the answering substation, and serves to inform the answering party that the call is of the revertive type and that he should remain connected until the calling party on the same line returns to the connection. Furthermore, at its contacts 1155, the relay R1150 prepares the previously mentioned reverting call pickup circuit for the trunk test busy relay R1010. The next time the reverting call pickup conductor R. C. PICKUP is momentarily grounded a circuit is completed by way of the contacts 967, 1155 and 1016 for energizing the lower winding of the relay R1010. Upon operating, the relay R1010, at its contacts 1015, completes a locking circuit for itself including the grounded conductor C1000. As a further result of the operation of the relay R1010, at its contacts 1011 and 1012, it transfers the above-traced circuit for applying ground potential to the wiper 1274 from ground at the contacts 923 to the reverting call release conductor C1229. Shortly after the reverting call release conductor C1229 is connected in the manner described above, ground potential is removed from this lead in order to interrupt the previously traced circuit for the hold relay R870. Also, when the above-traced circuit is interrupted the holding circuit for the lower winding of the trunk switch-through relay R810 is interrupted, thereby to cause the restoration of the latter relay. Further release of the connector 800 and the finder 300 is exactly the same as has been described hereinbefore, and when the release is completed the finder 300 and the associated connector 800 may be utilized in extending additional connections.

Referring now to the line 20 illustrated in Fig. 2, it will be noted that when ground potential is removed from the wiper 1274, in the manner described above, the holding circuit for the cutoff relay R275 is thereby interrupted and the relay restores to normal. The calling subscriber at substation 200 and the called subscriber upon the same line may now converse, and talking battery is supplied to the calling and called subscribers through the winding of the line relay R280. When the calling and called parties both hang up the loop circuit, including the winding of the line relay R280, is interrupted and the line relay restores to again condition the line 20 for further use.

*Calls from the toll operator position at the central office*

When the toll operator at the central office decides to extend a connection to a subscriber located in the tandem exchange A, the finder 300 is operated in the manner previously described to find the terminals in the associated contact banks terminating the incoming conductors of the toll trunk over which the connection is extended. As soon as the finder 300 engages the terminals terminating the incoming trunk, ground potential is forwarded over the conductor C43 to the corresponding conductor in the connector 800. The loop circuit including the conductors C41 and C42 is completed in the previously described manner in order to condition the connector for further operation. More specifically, the line relay R850 is operated over the loop circuit including the conductors C41 and C42, thereby to cause the operation of the lock-pulse relay R860, the operation of the release control relay R820, and the operation of the hold relay R870, all in the manner previously described. However, since this call has been originated at a toll operator position the ground potential applied to the conductor C43 prevents the operation of the control relay R830 when the release control relay R820 operates. Since the control relay R830 is prevented from operating, due to the shunting ground potential applied to the conductor C43, it prevents the auxiliary control relay R840 from operating. The latter relay during ordinary calls prepares the connector 800 for conversation timing and also for possible reverting call connections. Prevention of the operation of relay R840, when a call is extended by a toll operator, disconnects the conversation timing and reverting call features from the connector 800.

The operator at the distant toll board may now dial the four digits comprising the directory number of the desired called subscriber in the tandem exchange A. The operation of the connector 800 in response to the dialing of the digits of the called subscriber number is exactly the same as has been described previously and, in the event the called subscriber line is idle, the ringing current is transmitted over the called line. When the called subscriber answers, the transmission of the ringing current by the connector 800 is terminated and the back-bridge relay R880 is operated over the previously traced circuit, including the called subscriber line, thereby to reverse the current flow over the conductors C41 and C42 in order to give answering supervision to the calling toll operator. When the called subscriber involved in the connection replaces his receiver upon the switchhook of his associated telephone instrument, the loop circuit including the called line is interrupted, thereby to cause the restoration of the back-bridge relay R880 which, upon restoring, again reverses the current flow over the conductors C41 and C42 in order to give the toll operator at the distant exchange a disconnect signal. When the operator withdraws the calling plug from the jack at her switchboard the ground potential applied to the conductor C43 is removed therefrom, thereby to cause the restoration of the connector 800 and the finder 300, in the same manner as has been described above.

In the above description of the operation of the connector 800 it was assumed that the called line was idle at the time the toll operator extended a connection thereto. It will now be assumed that the called subscriber line is busy when a connection is extended thereto and, consequently, the busy test relay R1030 is operated in the manner described previously and causes a busy tone signal to be transmitted to the operator at the distant toll board. The operator has two alternative actions which she may exercise when a busy condition is encountered. She may release the connection in the manner described above and attempt to complete it at some later time or she may dial an additional digit "1" in order to condition the connector 800 to complete the connection to the desired called subscriber as soon as the busy condition is removed.

It will now be assumed that the operator desires to condition the connector 800 to cut in on the busy called line as soon as the busy condition is removed therefrom. It will be recalled that during the operation of the connector 800 the busy test of a called line is made at the end of the dialing of the third digit, that is, at the end of the rotary movement of the wipers of the connector, and that the busy test relay R1030 operates at that time. It will also be recalled that thereafter the final digit of the called subscriber directory number is dialed into the connector in order to position the minor switch 1260 and to condition the connector for the transmission of the selected ringing code to the called subscriber line. In view of the foregoing it will be understood that after the toll operator has dialed the final digit of the called subscriber number, the connector 800 will continue to transmit the busy tone signal over a circuit including the contacts 1032 of the busy test relay R1030 and will prevent the transmission of the selected ringing code to the called line. In order to override the busy condition and to condition the connector to cut in on the busy line as soon as it becomes idle the operator dials an additional digit "1," whereupon the line relay R850 and the lock-pulse relay R860 are momentarily restored to normal. When the latter relay is restored to normal a circuit is completed at its contacts 861 for operating the override busy relay R1020, which circuit may be traced from ground by way of the contacts 923, 861, 877, 915 and 842, and the winding of the relay R820, to battery. Shortly after the above-traced circuit is completed for the relay R1020 the line relay R850 and the lock-pulse relay R860 are again operated and the initial circuit for the relay R1020 is interrupted. However, incident to the operation of relay R1020, at its contacts 1023, a locking circuit is completed for itself, which includes the winding of the override busy slave relay R1040, the contacts 1036 of the operated busy test relay R1030, and ground at the contacts 873. When this circuit is completed the relay R1020 remains in its operated position and the relay R1040 operates in series therewith. As a further result of the operation of the relay R1020, at its contacts 1021, it interrupts the previously mentioned busy tone signaling circuit, thereby to terminate the transmission of the busy signal to the calling toll operator and, at its contacts 1025, it interrupts a point in the incomplete circuit for the rotary interrupter relay R940. When the override busy slave relay R1040 operates, at its contacts 1041 and 1042, it completes a monitoring circuit including the .5 mfd. condensers 1046 and 1047, whereby the operator at the distant toll board may listen to the conversation transmitted over the connection including the busy called line but not converse thereover. This monitoring circuit includes the conductors C41 and C42, the contacts 812 and 814, the condensers 918 and 919, the condensers 1046 and 1047, the contacts 1041 and 1042, the contacts 1251 and 253, and the −1 and +1 wipers 1272 and 1273. As a further result of the operation of relay R1040, at its contacts 1043, it interrupts a point in the previously traced locking circuit for the busy test relay R1030, which includes the grounded conductor C1000. The busy test relay R1030 has been rendered slow to release by the closing of the contacts 1022 of the override busy relay R1020 and, therefore, it does not restore when the above-mentioned locking circuit is momentarily interrupted. Furthermore, at the contacts 1044, the relay R1040 completes a new locking circuit for the busy test relay R1030, which includes ground potential applied to the C1 wiper 1274 from the busy called line, the contacts 1255, 1044, 1033 and 1054, and the winding of the relay R1030, to battery. In view of the latter circuit it will be seen that the busy test relay R1030 will remain in its operated position only as long as the called subscriber line is maintained busy.

When the conversation between the subscribers involved in the busy connection is terminated, the line of the desired called subscriber becomes idle and ground potential is removed from the C1 wiper 1274, and the busy test relay R1030 restores to normal. Incident to the restoration of the busy test relay R1030, at its contacts 1036, it interrupts the previously traced locking circuit for the windings of the relays R1020 and R1040. The relays R1020 and R1040 now restore to normal, the former relay, at its contacts 1021, again preparing a point in the circuit for transmitting the busy tone signal and the latter, at its contacts 1041 and 1042, interrupting the previously described monitoring circuit. As a further result of the restoration of the busy test relay R1030, at its contacts 1035, it completes the previously traced circuit, including the winding of the idle test relay R1130 and the C1 wiper 1274 which now has battery potential applied thereto from the winding of the cutoff relay (not shown) individual to the called subscriber line. The idle test relay R1130 operates and, at its contacts 1131, completes the previously described circuit for operating the switching relay R1220. The remaining operation of the connector 800, incident to the energization of the switching relay R1220, to transmit the ringing current to signal the wanted subscriber, is exactly the same as has been described hereinbefore. Furthermore, when the called subscriber answers the connection the transmission of ringing current is terminated and the back-bridge relay R880 is operated over the loop circuit including the conductors of the called line, and reverses the current flow over the conductors C41 and C42 in order to give answering supervision to the toll operator. The conversational connection between the toll operator at the central office and the desired called subscriber in the tandem exchange A is now completed through the connector 800 over the previously traced path including the conductors C41 and C42, the contacts 812 and 814, the condensers 918 and 919, the contacts 1161 and 1163, 1171 and 1174, 1181 and 1184, 1221 and 1222, 1251 and 1253, and the −1 and +1 wipers 1272 and 1273. The talking current for the called end of the connection is supplied through the windings of the back-bridge relay R880 and the talking current for the calling end of the connection is supplied through the windings of the line relay R850. When the conversation is terminated the called subscriber replaces his receiver upon the switchhook of his associated telephone instrument, thereby to interrupt the circuit for the back-bridge relay R880 which, upon restoring, again reverses the current flow over the conductors C41 and C42 in order to give disconnect supervision to the toll operator. In response to the release of the connection by the toll operator the ground potential is removed from the conductor C43, thereby to cause the release of the finder-connector link, in the manner previously described.

*Conversation timing in the connector 800*

The connector 880 is provided with timing relays which function somewhat in the same manner as the timing relays associated with the repeater 100, in order to control the connector 800 in the event (1) the subscriber fails to dial after the connector is seized, (2) the subscriber dials an incomplete number of digits of a called subscriber directory number, and (3) the called subscriber fails to answer a connection within a predetermined elapsed time interval. Furthermore, the timing relays are arranged to time the length of a conversation and to forcibly release the connection after a predetermined elapsed time interval. Before discussing the detailed operation of the timing relays it should be understood that when an ordinary subscriber seizes the connector 800 the control relay R830 is operated and it, in turn, causes the operation of the auxiliary control relay R840. The latter relay, at its contacts 841, prepares a point in the circuit whereby a first time pulse may be transmitted to the upper winding of the timing relay R930. Since an ordinary subscriber is unable to prevent the operation of the relay R830, the relay R930 will always be controlled in accordance with the time pulses received over the conductor 50A. It is also to be noted that the relay R830 is normally prevented from operating when the toll operator extends a connection to the connector 800, since ground is applied to the conductor C43 under control of the toll operator. Accordingly, both the relays R830 and R840 are prevented from operating when the toll operator forwards ground over the conductor C43. It should also be understood, however, that the toll operator may desire to apply conversation timing to certain connections extended via the connector 800 and to accomplish this result the operator momentarily removes ground potential from the conductor C43, thereby to permit the momentary operation of the control relay R830 which, in turn, completes a circuit for the relay R840. The latter relay, at its contacts 844, completes a locking circuit for itself which is independent of the initial energizing circuit including the contacts 831 of the control relay R830.

In view of the foregoing it will be understood that when the connector 800 is seized by a local subscriber or by the distant toll operator and the relays R830 and R840 are operated, the circuit is prepared, at the contacts 841, for transmitting a time pulse to the relay R930. If no digits are dialed into the connector 800 within a predetermined elapsed time interval, a ground pulse is applied to the conductor 50A, thereby to complete the above-traced circuit for operating the timing relay R930. Upon operating, the relay R930, at its contacts 934, completes a locking circuit which includes the contacts 926, 1159 and 1053′, the conductor C1002, and ground at the contacts 879. As a further result of the operation of relay R930, at its contacts 933, it prepares a point in the circuit for the timing disconnect relay R920. Furthermore, the relay R930, at its contacts 936, interrupts a point in the circuit for transmitting a disconnecting warning tone to the calling party; at its contacts 931, it prepares a point in the circuit for releasing the connector 800 in the event the call is not answered within a predetermined time interval; and, at its contacts 935, it interrupts a point in the circuit for controlling the pickup relay R1240. If the calling party fails to dial the first, second and third digits into the connector 800 prior to the time a ground pulse appears upon the conductor 51B, a circuit is completed by way of the contacts 933 for energizing the upper winding of the timing disconnect relay R920. The latter relay, upon operating, at its contacts 928, completes a locking circuit for its lower winding, which includes the grounded conductor C1002; and, at its contacts 925 and 926, it transfers the locking circuit for the relay R930 from the grounded conductor C1002 to the grounded conductor 52C. Furthermore, at its contacts 922, the relay R920 prepares a circuit for substituting the ground potential at the contacts 923 for holding the release control relay R820 in its operated position. This substitute circuit, however, cannot be completed at the present time inasmuch as the relay R930 is now locked in its energized position by way of the contacts 925 and the grounded conductor 52C. Consequently, the relay R920, at its contacts 923, removes the holding ground from the release control relay R820, whereupon the latter relay restores to normal and, at its contacts 823, removes the holding ground potential from the conductor C43. Removal of ground potential from the conductor C43 causes the finder 300 and the connector 800 to restore to normal, in the manner previously explained. With the above-mentioned timing arrangement it will be understood that a calling party is prevented from monopolizing the finder-connector link for any extended period of time, in the event he fails to dial the digits of a called subscriber number.

From the above-described operations of the timing relays R930 and R920 it is apparent that the calling party failed to dial sufficient digits between the time the ground pulse appeared upon the conductor 50A, to operate the relay R930, and the time another ground pulse appeared upon the conductor 51B, to operate the timing disconnect relay R920. If the calling party had dialed the third digit of the called subscriber number prior to the time the ground pulse appeared upon the conductor 51B, the relay R930, in that event, would have been restored to normal since its locking circuit would have been interrupted, at the contacts 1053′, in response to the operation of the rotary transfer relay R1050. When another time cycle is initiated a ground pulse is again applied to the conductor 50A, thereby to reoperate the relay R930. The latter relay will complete the above-traced locking circuit for itself and prepare the circuit for the timing disconnect relay R920, in the previously described manner. If the ring cutoff slave relay R1150 is not operated to indicate that the called subscriber has answered the connection, thereby to interrupt the locking circuit for the timing relay R930, prior to the time another pulse is applied to the conductor 51B, the timing disconnect relay R920 will be operated to cause the forced release of the finder-connector link in the manner previously described. If the call is answered prior to the time the pulse is received over the conductor 51B, the ring cutoff slave relay R1150 operates and, at its contacts 1159, the locking circuit for the timing relay R930 is again interrupted and the relay R930 restores to normal. In restoring to normal the relay R930, at its contacts 933, prevents the operation of the timing disconnect relay R920 and, consequently, the release of the connector 800 is prevented at this time.

At the beginning of the next cycle of operation of the timer a ground pulse is again applied to the conductor 50A to cause the reoperation of the relay R930. The relay R930 now completes a locking circuit for its lower winding, which includes the contacts 934, 926, 1151′ and 1123, and the grounded conductor C1002. When the relay R930 operates this time, that is, after the called subscriber has answered the connection, conversation timing begins. After a predetermined elapsed time interval a ground pulse is again applied to the conductor 51B, thereby to reoperate the timing disconnect relay R920. The latter relay, at its contacts 928, completes a locking circuit for its lower winding, which includes the grounded conductor C1002. As a further result of the operation of the relay R920, at its contacts 921, it prepares a point in the circuit for transmitting a warning tone signal to the calling subscriber; at its contacts 922 and 923, it transfers the holding ground for the release control relay R820 from the contacts 923 to the grounded conductor C1000. The latter holding circuit includes the contacts 922, 931 and 1158, and the grounded conductor C1000. Furthermore, the relay R920, at its contacts 924, interrupts a point in the circuit for the upper winding of the relay R930; at its contacts 925 and 926, it transfers the holding circuit for the lower winding of the timing relay R930 from the grounded conductor C1002 to the grounded conductor 52C extending to the timer; and, finally, at its contacts 927, it prepares a point in the circuit for transmitting a momentary ground pulse received over the conductor 54C to the winding of the pickup relay R1240. Shortly after the relay R920 is operated in the above-described manner, the ground potential applied to the conductor 52C is momentarily disconnected therefrom, thereby to cause the restoration of the timing relay R930. The latter relay, at its contacts 931 and 932, transfers the holding ground potential for the release control relay R820 from the grounded conductor C1000 to the grounded conductor 53C extending to the timer. Also, at its contacts 936, the relay R930 prepares a further point in the circuit for transmitting a warning tone to the calling subscriber and, at its contacts 935, it prepares a further point in the circuit for operating the pickup relay R1240 over the conductor 54C extending to the timer. Shortly after the relay R930 is restored a momentary ground pulse is applied to the conductor 54C and extended by way of the contacts 927, 935, 1152′ and 1227 for causing the momentary operation of the pickup relay R1240. The latter relay, at its contacts 1241, now completes the circuit for transmitting a warning tone signal to the calling and called subscribers by way of the conductor C1201, the contacts 1241, 921, 936, 1031, 1051 and 961, the condenser 958, the contacts 871, and the talking conductor of the connector 800. When the calling and called subscribers receive the warning tone signal they are thus informed that the connection will be forcibly released very shortly because the conversation timing period has elapsed. If the subscribers fail to release the connection at this time ground potential is removed from the conductor 53C by the timer, thereby to interrupt the holding circuit for the release control relay R820. The release control relay R820 now restores to normal and, at its contacts 823, interrupts the circuit for the control relay R830 and thus removes the holding ground potential from the conductor C43. The finder-connector link, comprising the finder 300 and the connector 800, is forcibly restored to normal in the manner previously described.

*Call from the tandem exchange A to the automatic suboffice B*

In describing the operation of the finder-connector link, comprising the finder 300 and the connector 800, it will be recalled that the connector is arranged to respond to the single digit "7," "8," "9" or "0." In response to the dialing of these digits the connector is arranged to select an idle trunk terminating in the first, second, third or fourth level of the associated contact banks. When the digit "7," "8" or "9" is dialed into the connector 800 a repeater, of the type illustrated in Figs. 13 to 15, inclusive, is selected, and in the event the single digit "0" is dialed an idle trunk repeater (not shown) is selected to extend a connection to the toll operator position in the central office.

It now will be assumed that the calling subscriber at substation 200 desires to call a subscriber located in the automatic suboffice B. In response to the removal of the receiver by the subscriber at substation 200, the finder 300 extends the calling subscriber line to the connector 800 in the manner previously described. The calling subscriber then dials the single digit "9" into the connector 800, whereupon an idle repeater terminating a trunk line extending to the automatic suboffice B is selected and, for the purpose of this description it will be assumed that the repeater selected is the repeater 100 illustrated in Figs. 13 to 15, inclusive. The calling subscriber now dials the digit "2," thereby to control the repeater 100, in the manner previously described, to repeat the impulses constituting this digit over the dial lead DIAL of the trunk 1596. It will be recalled that the impulses constituting the digit "2" are registered by the relays R1420 and R1370 in order to condition the repeater 100 to repeat the impulses of subsequent digits dialed by the calling subscriber over the dial lead DIAL. In the suboffice B the trunk 1596 terminates in a repeater 1600 which is utilized in extending connections in either direction over the said trunk line. The remaining automatic switchng apparatus in the suboffice B may comprise finder-connector links of the type illustrated in Figs. 3 and 8 to 12, inclusive.

It will be recalled that when the repeater 100 is seized, in the manner previously described, the battery potential applied to the dial lead DIAL by way of the winding of the impulse relay R1560 is disconnected and ground potential is applied thereto, either through the winding of the dial control relay R1590 or from the contacts 1544. When this occurs a circuit is completed for the impulse relay R1640 in the repeater 1600. This circuit may be traced from ground by way of the winding of the relay F1590, the contacts 1442, 1454 and 1467, the dial lead DIAL, the two conductors of the trunk line 1596, the dial lead DIAL of the repeater 100, the contacts 1785 and 1622, and the lower winding of the impulse relay R1640, to battery. The relay R1640 upon operating, at its contacts 1643, completes an obvious circuit for energizing the control relay R1645. The control relay R1645 upon operating, at its contacts 1647, completes an obvious circuit for operating the seizure relay R1630. As a result of the operation of the relays R1640 and R1630, a loop circuit is completed for controlling the incoming line circuit, whereby the finder link in the suboffice B is controlled to find the calling trunk line, in the same manner as has been described in connection with the operation of the finder-connector link in the tandem exchange A. This loop circuit may be traced from the negative conductor extending to the incoming line circuit, the contacts 1631 and 1641, the upper right-hand winding of the repeating coil 1610, the contacts 1633, the resistor 1648, the upper winding of the answer relay R1660, the contacts 1636, the lower right-hand winding of the repeating coil 1610, the contacts 1634, and the positive conductor extending to the incoming line circuit. In this circuit it should be noted that the contacts 1641 are shunted temporarily by the contacts 1711 of the control relay R1710. As a further result of the operation of relay R1630, at its contacts 1631' it completes an energizing circuit for the lower winding of the answer relay R1660, but the relay R1660 does not operate over this circuit. The circuit for the lower winding of the relay R1660 is only effective to hold the relay in its operated position after it has been energized in the proper direction over the circuit including its upper winding. As a further result of the operation of the relay R1630, at its contacts 1632' it prepares a point in the circuit for the lower winding of the relay R1670; at its contacts 1637 it prepares a circuit for connecting the winding of the relay R1730 to the C conductor extending to the incoming line circuit; and, finally, at its contacts 1639 it applies ground potential by way of the contacts 1782 to the control conductor C1895, thereby to busy the repeater 1600 in the banks of the connectors having access thereto. When the finder of the associated finder-connector link in the suboffice B finds the line circuit individual to the repeater 1600, ground potential is returned over the C conductor by way of the contacts 1637, 1721 and 1731, thereby to cause the operation of the connect relay R1730. Upon operating, the relay R1730, at its contacts 1733, locks to ground at the contacts 1639 and, at its contacts 1732, it applies ground potential by way of the contacts 1721 and 1637 to the C conductor extending to the incoming line circuit, thereby to retain the cutoff relay of the line circuit individual to the repeater 1600 in its operated position. With this arrangement the connector of the associated finder-connector link is held under control of the ground potential supplied over the C conductor by the relay R1730 and thus the control relay, similar to the relay R830 illustrated in the connector 800, is retained in its deenergized position. With the above described arrangement for controlling the finder-connector link in the suboffice B it was assumed that a connector system was employed and, consequently, the "Y" wiring is utilized for controlling the relay R1730 and the "X" wiring is omitted. In the event that a selector system is employed in the suboffice B the "Y" wiring is omitted and the "X" wiring is utilized. With the latter type arrangement the ground potential is not forwarded over the C conductor to the incoming line circuit by the repeater 1600 until the selector of the associated finder-selector link is in an off-normal position. The delay in the application of ground potential to the C conductor extending to the incoming line circuit is brought about by the fact that the relay R1730, with "X" wiring, is not operated until after the first digit is dialed into the repeater 1600.

It will be recalled that when the repeater 100 was seized by a local subscriber in the tandem exchange A the digit "2" is dialed into the repeater 100, and that the impulses constituting this digit are registered in the repeater 100 and are repeated by the pulse assist relay R1440 over the dial lead DIAL to the corresponding lead in the repeater 1600. The first time the pulse assist relay R1440 restores to normal and interrupts the above-traced circuit over the dial lead to the lower winding of the impulse relay R1640 the latter relay restores to normal. Incident to the restoration of the impulse relay R1640, a circuit is completed from ground by way of the contacts 1642, 1646, 1632′ and 1674, and the lower winding of the relay R1670, to battery, thereby to cause the operation of the latter relay. Also, at its contacts 1642 a multiple circuit is completed by the relay R1640 for energizing the winding of the hold relay R1650. The relay R1670 upon operating over the above-traced circuit, closes its preliminary make contacts 1671, thereby to complete a circuit for its upper winding, which winding, however, is shunted until the termination of the first pulse transmitted to the impulse relay R1640. When the relay R1640 reoperates to terminate the first pulse, a circuit is completed from ground by way of the contacts 1639 and 1671, and the upper and lower windings of the relay R1670 in series, to battery, whereupon the latter relay fully operates in order to close the contacts 1672 and 1673 and to open the contacts 1674. As a result of the operation of the relay R1650, at its contacts 1651 it places a shunt circuit across the lower winding of the relay R1610; at its contacts 1653 it prepares a circuit for shunting the winding of the line relay R1750; and at its contacts 1652 it completes an energizing circuit for the winding of the hold slave relay R1680. Incident to the operation of the relay R1680, at its contacts 1681 a shunt circuit is completed around the upper winding of the answer relay R1660; at its contacts 1682 it interrupts a point in the incomplete circuit for the control relay R1710; at its contacts 1683 a point in the circuit including the "X" wiring (in the event a selector is utilized) is prepared for the winding of the relay R1730; and at its contacts 1684 and 1685 it performs no function on an incoming call to the suboffice B.

At the conclusion of the first impulse, the impulse relay R1640 remains in its energized position to terminate the first pulse received thereby. At its contacts 1641, the relay R1640 opened and closed a point in the previously traced circuit, including the negative and positive conductors extending to the incoming line circuit but, due to the fact that the relay R1710 is in its deenergized position at this time at its contacts 1711, the contacts 1641 are short-circuited and they perform no function. As a further result of the reoperation of the impulse relay R1640 at the end of the first pulse, at its contacts 1642 the previously traced circuit for the hold relay R1650 is interrupted. Due to the slow-to-release characteristics of the latter relay, it remains in its operated position during pulsing. At the beginning of the second impulse transmitted over the dial lead DIAL the relay R1640 restores to normal and, at its contacts 1642, completes a circuit by way of the contacts 1646, 1632′, 1673, 1714 and 1723, and the lower winding of the second impulse registering relay R1720, to battery. The relay R1720 operates sufficiently to close its preliminary make contacts 1721 and as soon as the pulse is terminated upon the reoperation of the relay R1640 a locking circuit is completed for the upper and lower windings of the relay R1720 in series from ground at the contacts 1639. Upon the completion of the above-traced locking circuit, the relay R1720, at its contacts 1721, interrupts a point in the previously traced circuit for applying ground potential to the C conductor extending to the incoming line circuit. When ground potential is removed from the C conductor in the above-described manner, the connector portion of the associated finder-connector link is controlled so that the control relay, similar to the relay R830 illustrated in the connector 800, conditions the associated connector for conversation timing. At the end of the second impulse the relay R1640 reoperates and interrupts the circuit for the slow-to-release relay R1650. During the interdigital pause between the impulses constituting the various digits transmitted over the dial lead DIAL, the relay R1650 restores to normal and it, in turn, at its contacts 1652, causes the restoration of the relay R1680. When the latter relay restores to normal, at its contacts 1682, it completes a circuit for energizing the first digit relay R1710 over a circuit which includes ground, the contacts 1631′, 1682 and 1672, and the winding of the relay R1710. Upon operating the relay R1710, at its contacts 1712, completes a locking circuit for itself from ground at the contacts 1639. Furthermore, at its contacts 1711, the relay R1710 removes the shunt from across the contacts 1641; at its contacts 1713 it prepares a point in the circuit for the relay R1730 in the event that the "X" wiring is utilized; and, finally, at its contacts 1714 it interrupts a point in the initial energizing circuit for the relay R1720. In the above-described operation of the repeater 1600 it was assumed that the digit "2" was dialed thereinto, the first pulse of the digit operating the relay R1670 and the second pulse of the digit causing the operation of the relay R1720. Since the relay R1710 cannot be operated until the termination of the first digit, the digit "2" is registered by the repeater 1600 and no corresponding pulses are repeated to the connector of the associated finder-connector link.

Before described the subsequent operation of the repeater 1600, in response to further digits transmitted over the dial lead DIAL, it will be assumed that a toll operator has seized the repeater 1600 and has dialed the digit "1" as the first digit. When the digit "1" is dialed in the repeater 1600 the impulse relay R1640 restores once and causes the impulse to be registered by the relay R1670, in the manner previously described. At the end of the first impulse the relay R1640 reoperates and interrupts the circuit for the relay R1650. The relay R1650 restores to normal and thereby interrupts the circuit for the relay R1680, which also restores to normal. When the latter relay restores, at its contacts 1682, the previously traced circuit is completed for operating the first digit relay R1710. The latter relay, upon operating, locks to ground at the contacts 1639; at its contacts 1711 it removes the previously described shunting circuit from across the impulsing contacts 1641; and at its contacts 1714 it interrupts the circuit for the second impulse registering relay R1720. Inasmuch as the relay R1720 is not operated when a toll operator transmits the digit "1" to the repeater 1600, ground potential is not removed from the C conductor extending to the incoming line circuit at the end of the digit. In this manner the control relay in the connector of the associated finder-connector link is retained in its deenergized position to prevent the connector from responding to the conversation timing apparatus. It should be understood, however, that if the toll operator desires to have conversation timing applied to the connection extended to a subscriber in the suboffice B, she may dial the digit "2" into the repeater 1600 in the same manner as is required by a local subscriber in the tandem exchange A.

When the next digit is dialed over the dial lead DIAL, that is, the first digit of the called subscriber directory number, the impulse relay R1640 responds in the manner previously described and, at its contacts 1641, now repeats the impulses constituting the dialed digit to the connector of the associated finder-connector link. During the operation of the impulse relay R1640 in response to the second digit, the relays R1650 and R1680 are operated in the manner previously described, but they now perform no useful function other than that the relay R1680, at its contacts 1681, places a short circuit around the winding of the relay R1660 in order to improve the impulsing circuit to the associated connector. The remaining digits of the called subscriber directory number are repeated by the relay R1640, in the manner pointed out above, and when the called subscriber answers the connection the associated connector causes the current in the loop circuit, including the negative and positive conductors extending to the incoming line circuit, to be reversed. In this connection it is to be noted that at the end of the last digit dialed over the dial lead DIAL the relays R1650 and R1680 are restored to normal. The relay R1680, upon restoring, at its contacts 1681 removes the shunt circuit from around the upper winding of the relay R1660. Consequently, when the current flow is reversed in the manner pointed out above, an energizing circuit is completed whereby the relay R1660 closes its associated contacts 1661. The relay R1660 remains in its operated position over a locking circuit including its lower winding. When the relay R1660 operates in response to the called subscriber answering the connection, at its contacts 1661 it completes an obvious circuit for energizing the answer slave relay R1620. Upon operating, at its contacts 1621, the relay R1620 completes a holding circuit for the upper winding of the impulse relay R1640, thereby to retain the latter relay in its operated condition when the circuit for its lower winding is interrupted at the contacts 1622. Furthermore, at its contacts 1623, the relay R1620 connects the grounded upper winding of the dial control relay R1610 to the dial lead DIAL but, inasmuch as a like potential is applied to the corresponding lead in the repeater 100 at the tandem exchange, through the lower winding of the dial control relay R1590, the relay R1590 in the repeater 100 restores to normal and the relay R1610 does not operate. In this manner the dial control relay R1590 in the repeater 100 is restored and causes a reverse battery answering signal to be given to the calling subscriber or toll operator, in the manner previously described. The connection between the calling subscriber in the tandem exchange A and the called subscriber in the suboffice B is now completed and the respective subscribers may converse.

After the conversation between the subscribers has been terminated they replace their receivers on the switchhooks of their associated telephone instruments in order to release the connection. It will now be assumed that the calling subscriber in the tandem exchange A disconnects first and, as a result thereof, causes the ultimate restoration of the relay R1450 in the repeater 100. The relay R1450, at its contacts 1453 and 1454, transfers the dial lead DIAL from ground potential by way of the lower winding of the relay R1590 to battery potential by way of the lower winding of the control relay R1348. When this transfer is made in the repeater 100 the dial control relay R1610 in the repeater 1600 of the suboffice B is caused to operate over a circuit which may be traced from ground by way of its upper winding, the contacts 1623 and 1785, the dial lead DIAL in the repeater 1600, the conductors of the trunk 1596, the dial lead DIAL in the repeater 100, the contacts 1467 and 1453, and the lower winding of the control relay R1348, to battery. Incident to the operation of the relay R1610, at its contacts 1611, it interrupts the previously traced locking circuit for the upper winding of the impulse relay R1640. The latter relay now restores to normal and, at its contacts 1642, completes the previously traced circuit for the relay R1650, whereupon the latter relay operates and, at its contacts 1652, completes the operating circuit for the relay R1680. As a further result of the restoration of the relay R1640, at its contacts 1643, it interrupts the circuit of the relay R1645 and, at its contacts 1641, it opens the loop circuit including the negative and positive conductors extending to the incoming line circuit, thereby to cause the restoration of the associated finder-connector link, in the same manner as has been described hereinbefore in connection with the restoration of the finder 300 and the connector 800. As a further result of the interruption of the loop circuit at the contacts 1641, the energizing circuit for the upper winding of the relay R1660 is also interrupted. The latter relay, however, is retained in its operated condition under control of the locking circuit including its lower winding. The slow-to-release relay R1645 subsequently restores and, at its contacts 1647, interrupts the circuit of the relay R1630. The latter relay, in turn, at its contacts 1639 interrupts the locking circuits for the relays R1670, R1710, R1720 and R1730, thereby to cause the operated ones of these relays to restore to normal. Also, at its contacts 1639, the relay R1630 removes ground potential from the control conductor C1895, thereby to render the repeater 1600 accessible to the finder-connector links of suboffice B. Finally, at its contacts 1631', the relay R1630 interrupts the holding circuit for the lower winding of the relay R1660, thereby to cause the latter relay to restore. Upon restoring, the relay R1660, at its contacts 1661, interrupts the circuit for the answer slave relay R1620, thereby to cause the latter relay to restore. Incident to the restoration of the relay R1620, at its contacts 1623, it transfers the dial lead DIAL from the circuit including the upper winding of the dial control relay R1610, thereby to cause the latter relay to restore, to the lower winding of the impulse relay R1640. Incident to the transfer of the dial lead DIAL in the repeater 1600, the previously traced circuit for the lower winding of the control relay R1348 in the repeater 100 is interrupted, thereby to cause the latter relay to restore. Attention is directed to the fact that the dial lead DIAL in the repeater 100 now has battery potential applied thereto by way of the lower winding of the control relay R1348, and the dial lead DIAL in the repeater 1600 now has battery potential applied thereto by way of the lower winding of the impulse relay R1640. Consequently the relay R1348 now restores and the relay R1640 does not operate. The repeater 1600 is now completely released and may be utilized to complete the connections in either direction over the trunk line 1596 interconnecting the suboffice B and the tandem exchange A.

Referring now to the repeater 100 it will be recalled that when the calling subscriber released the connection the control relay R1348 was first operated over a circuit including its upper winding and held in its operated position over a circuit, including its lower winding, in series with the upper winding of the dial control relay R1610 in the repeater 1600. The restoration of the control relay R1348, incident to the release of the repeater 1600, initiates the release of the repeater 100. When the relay R1348 restores it interrupts, at its contacts 1349, the holding circuit for the hold relay R1460 thereby to cause the immediate restoration of the latter relay. When the relay R1460 restores, at its contacts 1462, it removes the holding ground potential from the conductor C1304 thereby to cause the release of the associated finder-connector link in the manner previously described. At its contacts 1464 and 1465, the relay R1460 interrupts the circuits for the relays R1350, R1420, R1410, R1480 and R1310, thereby to cause the relays mentioned to restore. The repeater 100 is now completely restored to normal and is available for the extension of further connections in either direction over the trunk 1596.

In describing the release of a connection established between a calling subscriber in the tandem exchange A and a called subscriber in the suboffice B, it was assumed that the calling subscriber released the connection before the called subscriber. It will now be assumed that the called subscriber has released the connection before the calling subscriber. Incident to the disconnection by the called subscriber, the connector portion of the associated finder-connector link in the suboffice B causes the reversal of the current flow over the loop circuit including the upper winding of the answer relay R1660 in the repeater 1600. When the current flow in the upper winding of the relay R1660 is reversed the magnetic field created in its upper winding opposes the magnetic field created by the circuit including its lower winding. The relay R1660 now restores to normal and, at its contacts 1661, interrupts the circuit for the answer slave relay R1620, which also restores to normal. Incident to the restoration of the relay R1620, at its contacts 1622 and 1623, it transfers the dial lead DIAL from the upper winding of the dial control relay R1610 to the lower winding of the impulse relay R1640. Also at its contacts 1621, the relay R1620 interrupts the previously described locking circuit for the upper winding of the impulse relay R1640. However, the relay R1640 is now retained in its operated position over a circuit including the lower winding of the dial control relay R1590 in the repeater 100, and the latter relay is caused to operate. The series circuit for the relays R1590 and R1640 may be traced from ground, by way of the lower winding of the dial control relay R1590, the contacts 1442, 1554 and 1667, the dial lead DIAL, the conductors of the trunk 1596, the dial lead DIAL in the repeater 1600, the contacts 1785 and 1622, and the lower winding of the impulse relay R1640, to battery. In view of the above-traced circuit for the impulse relay R1640, it will be understood that the repeater 1600 and the associated finder-connector link in the suboffice B involved in the connection are now retained in their operated positions, under control of the repeater 100 in the tandem exchange A. When the calling subscriber in the tandem exchange A replaces his receiver upon the switchhook of the associated telephone instrument the relays R1450, R1470 and R1485 are restored to normal, in the manner previously described. As a result thereof, the relay R1460 of the repeater 100 is retained in its operated position and the relay R1450 at its contacts 1454 and 1453, transfers the dial lead DIAL from the circuit including the lower winding of the dial control relay R1590 to a circuit including the lower winding of the control relay R1348. When this transfer occurs the dial control relay R1590 and the control relay R1348 in the repeater 100 restores to normal and the impulse relay R1640 in the repeater 1600 also restores to normal. Incident to the restoration of the impulse relay R1640, the repeater 1600 and the associated finder-connector link in the suboffice B are restored to normal in substantially the same manner as has been described above. Incident to the restoration of relays R1348 and R1590, the repeater 100 and the finder-connector link in the tandem exchange A are restored to normal in the manner previously explained. The connection is now completely released and the repeater 100 in the tandem exchange A and the repeater 1600 in the suboffice B are now in condition to extend calls in either direction over the interconnecting trunk 1596.

*Call from the automatic suboffice B to the tandem exchange A*

It will now be assumed that a calling subscriber in the automatic suboffice B desires to extend a connection to a subscriber located in the tandem exchange A. It will be assumed further that the calling subscriber has dialed the digit indicative of the tandem exchange A into the associated finder-connector link and that the connector has selected the repeater 1600. Inasmuch as it has been assumed that the switching apparatus in the suboffice B comprises a connector system rather than a selector system, the control conductor C1895 of the repeater 1600 has neither ground nor battery potential applied thereto when the repeater is in an idle condition. Consequently, when the wipers of the associated connector engage the bank contacts terminating the conductors C1895 to C1898 of the repeater 1600, a loop circuit including the negative conductor C1897 and the positive conductor C1898 is completed for energizing the line relays R1750 and R1760 in the repeater 1600. This loop circuit may be traced from ground by way of the winding of the line relay R1750, the contacts 1635, the lower right-hand winding of the repeating coil 1610, the contacts 1874, the positive conductor C1898, the loop circuit including the associated connector, the negative conductor C1897, the contacts 1872, the upper right-hand winding of the repeating coil 1610, the contacts 1632, and the upper winding of the line relay R1760, to battery. Incident to the operation of the relay R1760, at its contacts 1762, a locking circuit is completed for its lower winding in series with the winding of the hold relay R1790 and, at its contacts 1763, it completes a circuit for the pulse assist relay R1770. The latter circuit may be traced from ground by way of the contacts 1789 and 1763, and the winding of the relay R1770, to battery. As a result of its operation the relay R1770, at its contacts 1771, interrupts a point in the incomplete circuit for the relay R1795; at its contacts 1772, it prepares a point in the incomplete circuit for the lower winding of the dial control relay R1610; and, at its contacts 1773, it completes a holding circuit for itself which includes the resistor 1764. The latter circuit is short-circuited until the hold slave relay R1780 is subsequently operated, and is provided in order to cause the relay R1770 to quickly restore when its circuit is interrupted under control of the line relay R1760. Incident to the operation of the hold relay R1790, at its contacts 1791, it prepares a point in the incomplete circuit for the relay R1795; at its contacts 1792, it interrupts a point in the incomplete circuit for the lower winding of the relay R1820; at its contacts 1793, it prepares a further point in the incomplete circuit for the lower winding of the dial control relay R1610; and, at its contacts 1794, it completes an obvious operating circuit for the hold slave relay R1780. Incident to the operation of the hold slave relay R1780, at its contacts 1781, it prepares a circuit including the resistor 1701 for preenergizing the upper winding of the line relay R1760 each time the latter relay is restored to normal. At its contacts 1783, the relay R1780 connects ground potential to the control conductor C1895 in order to retain the associated connector in its operated position and to busy the repeater 1600 to all other connectors having access thereto. This circuit may be traced from ground, over one path including the contacts 1893 and the lower winding of the resistance coil 1805, and over another path including the contacts 1861 and the lower winding of the resistance coil 1805, the contacts 1783, and the control conductor C1895. As a further result of the operation of the relay R1780, at its contacts 1784, it prepares a point in the incomplete circuit for the hold relay R1650; at its contacts 1785 and 1786, it transfers the dial lead DIAL from battery potential connected thereto through the lower winding of the impulse relay R1640 to ground potential connected thereto through the lower winding of the dial control relay R1610; at its contacts 1787, it prepares a point in the incomplete holding circuit for various ones of the relays in the repeater 1600; and, at its contacts 1788, it prepares a point in the incomplete circuit for operating the relay R1850. Furthermore, the relay R1780 upon operating, at its contacts 1789, interrupts a point in the initial energizing circuit for the pulse assist relay R1770, but the latter relay is now retained in its energized position over the previously traced holding circuit including the resistor 1764; at its contacts 1781′, it prepares a point in the circuit, traced hereinafter, for energizing the relay R1740; and, at its contacts 1782′, 1783′ and 1784′, it prepares points in the circuits for controlling the timing and restricted service relays included in the repeater 1600.

Prior to the seizure of the repeater 1600, the dial lead DIAL individual thereto and the associated dial lead DIAL in the repeater 100 have battery potential applied thereto at the respective repeaters. More specifically, the circuit including the above-mentioned dial leads prior to the seizure of the repeater 1600 may be traced from battery by way of the lower winding of the impulse relay R1640, the contacts 1622 and 1785, the dial lead DIAL in the repeater 1600, the conductors of the trunk 1596, the dial lead DIAL in the repeater 100, the contacts 1468 and 1584, and the upper winding of the impulse relay R1560, to battery. Thus it will be seen that in normal condition the dial leads DIAL of the respective repeaters have battery potential applied thereto. However, when the repeater 1600 is seized, in the manner described above, and the hold slave relay R1780 is operated, the battery potential connected by way of the winding of the relay R1640 to the dial lead DIAL is disconnected therefrom, and ground potential is applied thereto by way of the lower winding of the relay R1610. When this transfer is made the dial control relay R1610 in the repeater 1600 and the impulse relay R1560 in the repeater 100 are operated. Incident to the operation of the dial control relay R1610, at its contacts 1612, it completes a circuit for the lower winding of the relay R1740. This circuit may be traced from ground by way of the contacts 1781′, 1654 and 1612, and the lower winding of the relay R1740, to battery. Upon operating the relay R1740, at its contacts 1741, completes a locking circuit for its upper winding from ground at the contacts 1781′.

Referring now to the repeater 100, it will be recalled that the impulse relay R1560 operated in series with the dial control relay R1610. More specifically, incident to the seizure of the repeater 1600 by the calling suboffice subscriber, the relay R1560 in the repeater 100 is operated in order to initiate operation of the tandem exchange equipment. The impulse relay R1560, upon operating at its contacts 1562, completes an obvious circuit for operating the control relay R1550. The latter relay upon operating, at its contacts 1551, completes an obvious circuit for operating the relay R1570 and, at its contacts 1552, prepares a point in the circuit for operating the hold relay R1540. Incident to the operation of the seizure relay R1570, at its contacts 1578, it applies ground potential by way of the contacts 1463 to the control conductor C1304 in order to busy the repeater 100 to the connectors having access thereto. At its contacts 1577, the relay R1570 completes an obvious circuit for energizing the lower winding of the answer relay R1490, but the latter relay does not actuate its associated contacts until an energizing circuit in the proper direction is completed for its upper winding. Furthermore, at its contacts 1571, 1573, 1575 and 1576, the relay R1570 completes a loop circuit for operating the incoming line circuit 1500 individual to the repeater 100. The loop circuit for controlling the incoming line switch individual to the repeater 100 may be traced from the negative conductor C1564 by way of the contacts 1571 and 1561, the upper left-hand winding of the repeating coil 1595, the contacts 1573, the resistor 1545, the upper winding of the answer relay R1490, the contacts 1575, the lower left-hand winding of the repeating coil 1595, the contacts 1576, and the positive conductor C1565. When the above-traced loop circuit is completed the associated incoming line circuit 1500 is operated in the same manner as the line circuit 20 (Fig. 2), whereby a finder-connector link in the branch exchange is brought into engagement with the contacts terminating the above-traced loop circuit. As a further result of the above-described operation of the relay R1570, at its contacts 1572 and 1574, it disconnects the windings of the line relays R1470 and R1485 from the negative and positive conductors C1302 and C1303. The repeater 100 is now in condition to receive the impulses repeated by the repeater 1600 in the suboffice B and to repeat such impulses over the above-traced loop circuit, including the conductors C1564 and C1565, in order to control the connector portion of the finder-connector link which is now associated with the repeater 100.

The calling subscriber in the suboffice B may now manipulate the dial at his substation, thereby to transmit the digits of the directory number of the called subscriber in the tandem exchange. In response to the first pulse of the first digit dialed by the calling subscriber, the loop circuit including the conductors C1897 and C1898 is interrupted, thereby to cause the restoration of the line relays R1750 and R1760. Upon restoring, the relay R1760, at its contacts 1763, interrupts the previously traced circuit for the pulse assist relay R1770, thereby to cause the latter relay to restore. At its contacts 1761, the relay R1760 completes a circuit, including the contacts 1781 and the resistor 1791, whereby the upper winding of the line relay R1760 is preenergized so that it will quickly operate when the above-mentioned loop circuit is again closed. Finally, at its contacts 1762, the relay R1760 interrupts the circuit for the hold relay R1790, the latter relay, due to its slow-to-release characteristics, remaining in its operated position during pulsing. Incident to the restoration of the relay R1770, at its contacts 1771, a multiple circuit is completed for operating the control relay R1795 and the hold relay R1650, which includes ground at the contacts 1771, the contacts 1791, and the winding of the relay R1795, and the multiple path including the contacts 1803, 1813 and 1784 and the winding of the hold relay R1650. The relay R1795, upon operating at its contacts 1796, prepares a point in the circuit for reoperating the pulse assist relay R1770 as soon as the line relay R1760 operates at the end of the pulse. The relay R1650, upon operating at its contacts 1651, completes a shunting circuit for the lower winding of the dial control relay R1610 in order to improve pulsing over the dial lead DIAL; at its contacts 1653, it completes a shunting circuit for the line relay R1750, which may be traced from ground by way of the contacts 1781′ and 1653, and the winding of the relay R1750 to ground, in order to improve the pulsing circuit including the negative and positive conductors C1897 and C1898; and, finally, at its contacts 1652, it completes a multiple circuit for operating the hold slave relay R1680 and the first digit relay R1850, which includes ground at the contacts 1652 and the winding of the relay R1680 and, in multiple therewith, the contacts 1788, 1862 and 1855, and the upper winding of the relay R1850. The relay R1850 is a two-step relay and when the circuit is completed for its upper winding only the contacts 1857 are closed. Consequently, at the present time, when the contacts 1857 are closed, a shunting circuit is completed for the lower winding of the relay R1850, which includes the inital energizing circuit for the upper winding, the lower winding of the relay, the contacts 1864 and 1857, and ground at the contacts 1787. As soon as the above traced initial energizing circuit for the relay R1850 is interrupted at the end of the pulses constituting the first digit dialed by the calling subscriber, the relay operates fully and controls all of its remaining contacts. When the relay R1680 operates, at its contacts 1685 it interrupts a point in the incomplete circuit for the reversing relay R1870, in order to prevent the premature operation of the latter relay. The circuit operations controlled by the remaining contacts of the relay R1680 have no function to perform at this time. At the end of the first impulse the loop circuit, including the conductors C1897 and C1898, is reclosed, thereby to cause reoperation of the line relay R1760. At this time the line relay R1750 does not operate since its winding is shunted by the ground potential applied over the previously traced circuit including the contacts 1781′. Reoperation of the line relay R1760 completes the previously traced circuit for operating the pulse assist relay R1770 and the circuit for maintaining the hold relay R1790 in its operated position. At its contacts 1771, the pulse assist relay R1770 interrupts the circuit of the relay R1795, which now restores to normal and interrupts a point in the inital energizing crcuit for the relay R1770. The latter relay, however, is maintained in an energized condition over a locking circuit, including its contacts 1773 and the resistor 1764. Furthermore, at its contacts 1772, the relay R1770 terminates the first pulse transmitted over the dial lead DIAL. Thus it will be seen that the line relay R1760 and the pulse assist relay R1770 respond to the pulses comprisng the first digit dialed by the calling subscriber, and each time the relay R1770 is restored and reoperated it transmits a pulse over the dial lead DIAL to the repeater 100 in the tandem exchange A. At the end of the first digit the relays R1760 and R1770 remain in their operated positions and the latter relay, at its contacts 1771, removes ground potential which has periodically energized the hold relay R1650 during the pulses constituting the first digit, and the latter relay now slowly restores to normal. Upon restoring, at its contacts 1651, the relay R1650 removes the shunting circuit from the lower winding of the relay R1610; at its contacts 1652, it interrupts the circuit for the hold slave relay R1680 and the initial energizing circuit for the upper winding of the two-step relay R1850; and, at its contacts 1653, it interrupts the full shunting circuit for the line relay R1750, but the latter relay remains partially shunted over a circuit which includes the contacts 1781′ and 1684, and the resistor 1662. When the above-mentioned circuit for the upper winding of the relay R1850 is interrupted, the relay operates fully in the manner previously described and, at its contacts 1856, now prepares the circuit for the second digit relay R1860. As a result of the removal of the shunt circuit from around the lower winding of the relay R1610, in the manner described above, the latter relay reoperates in series with the impulse relay R1560 in the repeater 100. Attention is directed to the fact that, due to the slow-to-release characteristics of the hold slave relay R1680, the dial control relay R1610 is reoperated, prior to the restoration of the relay R1680 and, at its contacts 1613, it interrupts a point in the circuit for the reversing relay R1870 prior to its completion, at the contacts 1685, upon the restoration of the relay R1680. In addition to the foregoing precaution to prevent premature operation of the relay R1870, the line relay R1750 is prevented from operating by the partial shunting circuit traced above, including the resistor 1662 and the contacts 1684. The relay R1680 may now restore to normal and, at its contacts 1684, interrupts the partial shunt circuit for the line relay R1750, whereupon the latter relay now operates in series with the line relay R1760 over the previously traced loop circuit including the conductors C1897 and C1898. The line relay R1750 upon operating, at its contacts 1751, prepares a further point in the incomplete circuit for the reversing relay R1870. As a further result of the restoration of the relay R1680, at its contacts 1685, it prepares an additional point in the incomplete circuit for the relay R1870.

The repeater 1600 is now in condition to receive the second digit dialed by the calling subscriber in the suboffice B. In response to the dialing of the second digit the repeater operates, in the manner described above during the dialing of the first digit, but in this case the circuit is completed for the winding of the second digit relay R1860 as soon as the hold relay R1650 is operated. It will be recalled that the relay R1650 operated at the beginning of the first pulse and, consequently, at its contacts 1652, it completes a circuit including the contacts 1788, 1862 and 1856 for energizing the relay R1860. Upon operating, the latter relay closes its preliminary make contacts 1863, thereby to lock the relay in its energized position from ground at the contacts 1787. As a further result of the operation of the relay R1860, at its contacts 1864, it interrupts the locking circuit for the first digit relay R1850, which now restores to normal; at its contacts 1862 it interrupts its initial energizing circuit; and, at its contacts 1861, it interrupts a point in one of the multiple circuits for applying ground potential to the control conductor C1895. The operation of the second digit relay R1860 indicates that the call being extended by the calling subscriber in the suboffice B is a station-to-station call and that more than one digit is being dialed. If the connection extended by the calling subscriber is of the type in which only a single digit is dialed into the repeater 1600, only the first digit relay R1850 will respond and further operations of the repeater will be slightly different from those in the present type call in which more than one digit is dialed. When the calling subscriber dials the remaining digits of the called subscriber number the repeater 1600 responds in the same manner as has been described above and repeats the impulses constituting the dialed digits over the dial lead DIAL to the repeater 100 in the tandem exchange.

Referring now to the repeater 100, it will be seen that each time the dial lead DIAL is interrupted by the pulse assist relay R1770 in the repeater 1600, the impulse relay R1560 restores and operates a corresponding number of times. Consequently, each time the relay R1560 restores and reoperates, at its contacts 1561, it interrupts the loop circuit including the conductors C1564 and C1565, thereby to repeat a corresponding number of impulses to the connector portion of the associated finder-connector link. Furthermore, each time the impulse relay R1560 restores during pulsing, it completes a circuit for operating the slow-to-release hold relay R1540. The relay R1540 operates upon the first restoration of the impulse relay R1560 and remains in its operated position, due to its slow-to-release characteristics, during the series of impulses constituting each dialed digit. Incident to its operation the relay R1540, at its contacts 1543, completes an obvious circuit for energizing the hold slave relay R1530. As a further result of the operation of the relay R1540, at its contacts 1541, it completes a circuit for energizing the lower winding of the differential relay R1510 which may be traced from ground, by way of the contacts 1577, 1541 and 1522, and the lower winding of the relay R1510, to battery. Incident to the operation of the relay R1510, at its contacts 1511, it prepares a point in the incomplete circuit for its upper winding; at its contacts 1512, it prepares a point in the circuit for operating the lower winding of the relay R1520 in series with its own lower winding; and, at its contacts 1514, it applies ground potential to the control conductor C1566, extending to the incoming line circuit 1500 and the associated finder-connector link, in order to shunt a control relay in the associated connector which corresponds to the relay R830 in the connector 800. When the relay R1530 operates, at its contacts 1531, it shunts the upper winding of the answer relay R1490 in order to improve the impulsing circuit extending by way of the conductors C1564 and C1565 to the incoming line circuit 1500 and the associated finder-connector link and, at its contacts 1532, 1533 and 1534, it performs no function at the present time. At the end of the series of impulses constituting the first digit the relay R1560 comes to rest in its operated position and, at its contacts 1563, it interrupts the previously traced circuit for the hold relay R1540. Due to its slow-to-release characteristics, the relay R1540 slowly restores to normal and, at its contacts 1541, interrupts the previously traced circuit for energizing the lower winding of the relay R1510. The relay R1510 now locks in series with the lower winding of the relay R1520 over a circuit which may be traced from ground by way of the contacts 1577, the lower winding of the relay R1520, the contacts 1512, and the lower winding of the relay R1510. Incident to the operation of the relay R1520, at its contacts 1521, it prepares a point in the incomplete circuit for the upper winding of the relay R1510; at its contacts 1522, it interrupts a point in the previously traced initial energizing circuit for the lower winding of the relay R1510; and, at its contacts 1523, it completes a locking circuit for its upper winding.

When the impulses constituting the second digit are received by the impulse relay R1560, the relay operates in the manner previously described, thereby to control the operation of the relay R1540 and the relay R1530. Incident to the operation of the relay R1540 during the dialing of the second digit, at its contacts 1541, it now completes a circuit for the upper winding of the differential relay R1510, which may be traced from ground by way of the contacts 1577, 1541, 1521 and 1511, and the upper winding of the relay R1510, to battery. In view of the fact that the upper and lower windings of the relay R1510 are differentially wound, the circuits including these windings oppose each other and cause the relay to restore to normal. Upon restoring, the relay R1510, at its contacts 1511 and 1512, interrupts the respective circuits for its upper and lower windings, and, at its contacts 1514, it removes ground potential from the control conductor C1566, whereby the previously mentioned control relay in the connector is permitted to operate, in the manner described hereinbefore. As a further result of the operation of the impulse relay R1560 during the dialing of the second digit, at its contacts 1561, it interrupts the previously described loop circuit extending to the connector portion of the finder-connector link, whereby the associated connector is controlled in accordance with the impulses constituting the second dialed digit.

The calling subscriber in the suboffice B now dials the third and fourth digits of the called subscriber directory number, whereupon the repeater 1600 and the repeater 100 are controlled in the manner previously described in order to repeat the impulses, constituting the said digits, to the connector portion of the associated finder-connector link. The connector responds to the impulses of the last two digits dialed by the calling subscriber in the manner described above, thereby to complete the connection to the desired called subscriber line.

When the called subscriber answers the connection the associated connector reverses the current flow over the loop circuit, including the conductors C1564 and C1565, so that it is in the proper direction to cause the energization of the upper winding of the answer relay R1490. The relay R1490 now operates and, at its contacts 1491, completes an obvious circuit for energizing the answer slave relay R1580. Incident to the operation of the relay R1580, at its contacts 1581, it prepares a point in the incomplete circuit for the lower winding of the relay R1510; at its contacts 1582, it reapplies ground potential to the conductor C1566 over a circuit which includes the contacts 1551, 1582 and 1513; and, at its preliminary make contacts 1585, it completes a circuit for the lower winding of the relay R1560. At its contacts 1584, the relay R1580 interrupts the circuit for the upper winding of the relay R1560 which includes the dial lead DIAL, but the latter relay is retained in its operated position over the above-mentioned circuit including its lower winding. Finally, at its contacts 1583, the relay R1580 connects the grounded upper winding of the relay R1590 to the dial lead DIAL, but the relay R1590 remains in its restored position since the corresponding dial lead DIAL in the repeater 1600 is also grounded through the lower winding of the relay R1610.

Referring now to the repeater 1600, it is noted that when the above-mentioned transfer takes place the dial control relay R1610 restores to normal and, at its contacts 1613, completes a circuit for operating the battery reversing relay R1870. This circuit extends from ground by way of the contacts 1781', 1654, 1613, 1685, 1742, 1751 and 1858, and the winding of the relay R1870, to battery. Upon operating, the relay R1870, at its contacts 1875, completes a locking circuit for itself which is independent of the circuit including the contacts 1751 and 1858, and, finally, at its contacts 1871 to 1874, inclusive, it reverses the direction of current flow over the negative and positive line conductors C1897 and C1898, in order to collect the deposited coin if the call is made from a paystation line, or in order to give answering supervision in the event the call is made from an operator position. As a further result of the closing of the contacts 1613 upon the restoration of the relay R1610, a circuit is completed for operating the answer relay R1810 over a circuit which may be traced from ground by way of the contacts 1781', 1654, 1613, 1685, 1742, 1814 and 1852, and the winding of the relay R1810, to battery. Upon operating, the relay R1810 closes its contacts 1815 in order to complete a locking circuit for itself before it opens its initial energizing circuit, at its contacts 1814. This locking circuit for the relay R1810 may be traced from ground by way of the contacts 1787, 1854 and 1815. As a further result of the operation of the relay R1810, at its contacts 1811, it prepares a point in an incomplete holding circuit for applying ground potential to the control conductor C1895 when the timing relays R225 and R230 are placed in operation; at its contacts 1812, it prepares a point in the incomplete circuit for the upper winding of the relay R1820; at its contacts 1813, it interrupts a point in the incomplete circuit for the relay R1650; at its contacts 1814, it interrupts a point in the initial circuit for itself; and, at its contacts 1816 and 1817, it prepares points in the circuits of the conversational timing relays R225 and R230. Attention is directed to the fact that the circuit for the relay R1650 is interrupted, at the contacts 1813, in order to prevent the operation of this relay and the hold slave relay R1680 in the event the calling subscriber should inadvertently actuate his calling dial or manipulate his switchhook after the call is answered. By thus preventing reoperation of the relay R1680 after a call has been answered it cannot interrupt, at its contacts 1685, the previously traced circuit for the reversing relay R1870. The connection between the calling subscriber in the suboffice B and the desired called subscriber in the tandem exchange A is now completed and the subscribers may converse.

When the conversation between the calling and the called subscriber has been terminated they may replace their receivers on the switchhooks of their respective telephone instruments in order to release the switching apparatus involved in the connection, as will be described below. It will first be assumed that the calling subscriber at the suboffice B replaces his receiver before the called subscriber and, as a result thereof, the loop circuit including the windings of the line relays R1750 and R1760 is interrupted, thereby causing the relays to restore. Upon restoring, the line relay R1750, at its contacts 1751, interrupts a point in the previously traced initial energizing circuit for the reversing relay R1870. The line relay R1760, upon restoring, interrupts the circuit for the pulse assist relay R1770, thereby to cause the latter relay to restore and, at its contacts 1762, interrupts the circuit for its lower winding and the winding of the hold relay R1790. Inasmuch as the hold relay R1790 is of the slow-to-release type, it remains in its energized position for a short interval of time after the restoration of the relay R1770. In this interval a circuit is completed by way of the contacts 1771, 1791, 1803 and 1812 for energizing the upper winding of the relay R1820. In multiple with the above-traced circuit for the upper winding of the relay R1820, a circuit is also completed for the winding of the control relay R1795. As a result of the energization of the upper winding of the relay R1820, the relay operates and, at its contacts 1821, completes an energizing circuit for the hold slave relay R1780. Thus a substitute holding circuit is provided for the relay R1780 in addition to the holding circuit, including the contacts 1794, of the relay R1790. Shortly after the operation of the relay R1820, the relay R1790 restores to normal and, at its contacts 1791, it interrupts the initial energizing circuit for the upper winding of the relay R1820. The relay R1820, however, is now rendered slow-to-release over a circuit which includes the winding of the relay R1795, the contacts 1803 and 1812, and the upper winding of the relay R1820. Before the relay R1820 restores to normal, a circuit is completed at the contacts 1792, whereby the lower winding thereof is energized over the dial lead DIAL extending to the repeater 100 in the tandem exchange A. This circuit may be traced from battery by way of the lower winding of the relay R1820, the contacts 1792 and 1786, the dial lead DIAL, the two conductors of the trunk 1596, the dial lead DIAL in the repeater 100, the contacts 1468 and 1583, and the upper winding of the dial control relay R1590, to ground. Consequently, the relay R1820 in the repeater 1600 remains in its operated position and the dial control relay R1590 in the repeater 100 now operates. The repeater 1600 now remains in its operated condition under control of the repeater 100 in the tandem exchange A.

Referring now to the repeater 100, the relay R1590, upon operating incident to the replacement of the receiver by the calling subscriber in the suboffice B, at its contacts 1593, interrupts the circuit for the lower winding of the impulse relay R1560, which now restores to normal. When the relay R1560 restores to normal, at its contacts 1561, it interrupts the previously described loop circuit for controlling the incoming line circuit 1500 and the associated finder-connector link in the tandem exchange A, thereby to cause their release. As a further result of the restoration of the relay R1560, at its contacts 1562, it interrupts the circuit for the slow-to-release relay R1550, and, at its contacts 1563, it completes a circuit for the winding of the relay R1540. The relay R1550 subsequently restores to normal and, at its contacts 1551, it interrupts the previously traced circuit for the seizure relay R1570. The latter relay, however, may or may not restore to normal, depending upon the potential applied to the C conductor C1566 during the time the incoming line circuit 1500 and the associated finder-connector link are restoring to normal. As long as ground potential is applied to the conductor C1566 during the release period of the associated incoming line circuit and finder-connector link, the relay R1570 is maintained in its operated position over a circuit which includes the grounded conductor C1566 and the contacts 1513 and 1582. It will be recalled that while the seizure relay R1570 remains in its operated position, at its contacts 1578, it maintains a busy ground potential upon the conductor C1304, thereby to prevent seizure of the repeater 100 by any switches having access thereto and, at its contacts 1577, it maintains the answer relay R1490 in its operated position even after the circuit for the upper winding of the latter relay is interrupted. The relay R1540 may or may not be completely energized to actuate its associated contacts during the time its circuit is completed, upon the restoration of the relay R1560 and the interruption of the circuit upon the restoration of the relay R1550. In any event, if the relay R1540 does operate, at its associated contacts 1543, it will be for a momentary interval only and the hold relay R1530 will not operate due to its slow-to-operate characteristics. The circuits controlled by the remaining contacts of the relay R1540 are ineffective at the present time. When ground potential is subsequently removed from the conductor C1566, the seizure relay R1570 restores to normal and, at its contacts 1577 it interrupts the circuit for the lower winding of the answer relay R1490 and the upper winding of the relay R1520, which relays now restore. The relay R1490 upon restoring, at its contacts 1491, interrupts the circuit for the answer slave relay R1580. The relay R1580 upon restoring, at its contacts 1583, interrupts the previously traced circuit including the upper winding of the relay R1590 and the lower winding of the relay R1820, thereby to cause the latter two relays to restore. As a further result of the restoration of the seizure relay R1570, at its contacts 1578, it removes the busy marking condition from the conductor C1304, thereby to permit the repeater 100 to be seized by the switches having access thereto.

Referring now to the repeater 1600, the relay R1820 restores to normal when the upper winding of the dial control relay R1590 is disconnected from the dial lead DIAL in the repeater 100 and, at its contacts 1821, it interrupts the circuit for the hold slave relay R1780. The latter relay now restores to normal and, at its contacts 1787, it interrupts the holding circuit for the relay R1860 and R1810 which also restore to normal. As a further result of the restoration of the relay R1780, at its contacts 1781′, it interrupts a point in the locking circuit for the relay R1740, which now restores to normal and, at its contacts 1742, interrupts a point in the locking circuit for the relay R1870. Incident to the restoration of the relay R1870, at its contacts 1871 to 1874, inclusive, it reverses the connection including the conductors C1897 and C1898 back to its normal condition. Finally, at its contacts 1783, the relay R1780 removes the holding ground potential from the conductor C1895, thereby to permit the restoration of the associated finder-connector link involved in the above-described connection. With the above-described arrangement for releasing the repeater 1600, under control of the repeater 100 in the tandem exchange A, it is apparent that the switching apparatus in the tandem exchange A is restored to normal before the switching apparatus in the suboffice B is released. However, when the repeater 100 in the tandem exchange A is restored in the manner described above, and disconnects the upper winding of the dial control relay R1590 from the dial lead DIAL, the relays in the repeater 1600 are also released and, since these relays are of the quick release type, the clearance of the repeater 100 in the tandem exchange A and the repeater 1600 in the suboffice B is substantially simultaneous. The switching apparatus involved in the above-described connection is now completely restored to normal and is available for further calls.

It has been assumed in the foregoing explanation of operation that the calling subscriber released the connection before the called subscriber. It will now be assumed that the called subscriber releases the connection before the calling subscriber. When the called subscriber replaces his receiver upon the switchhook of his associated telephone instrument the connector 800 of the associated finder-connector link reverses the current flow over the negative and positive conductors C1564 and C1565 extending to the repeater 100 and thereby causes the answer relay R1490 to restore to normal. In this connection it will be recalled that the answer relay R1490 is of the polarized type which will be maintained in its operated position over a circuit including its lower winding when the current flow through the upper winding in the proper direction has caused the relay to operate. When the current flow through the upper winding is reversed in the manner stated above, the flux generated by the current flow in the upper winding opposes the flux generated in the lower winding and thereby causes the relay to restore to normal. Incident to the restoration of the answer relay R1490, at its contacts 1491, it interrupts a circuit for the answer slave relay R1580, which also restores to normal. When the answer slave relay R1580 restores, at its contacts 1583, it disconnects the upper winding of the relay R1590 from the dial lead DIAL and shortly thereafter, at its contacts 1584, it connects the upper winding of the impulse relay R1560 thereto. Since the dial lead DIAL in the repeater 1600 has ground potential applied thereto by way of the lower winding of the relay R1610, the latter relay operates in series with the relay R1560. It will be recalled that the relay R1580 was maintained in its operated position over a circuit including the contacts 1593 and 1585. When the relay R1580 restores and completes the circuit described above for the upper winding of the relay R1560 it simultaneously, at its contacts 1585, interrupts the circuit for the lower winding of the relay R1560. In this manner the relay R1560 is maintained in its operated position incident to the restoration of the relay R1580. In view of the foregoing it will be seen that the repeater 100 and the associated switching apparatus in the tandem exchange A are manitained in their operated positions under control of the repeater 1600 in the suboffice B.

Referring now to the repeater 1600 it will be noted that, incident to the operation of the relay R1610, at its contacts 1613, it interrupts the locking circuit for the reversing relay R1870, thereby to cause the latter relay to restore and, at its contacts 1612, it completes a circuit for the lower winding of the relay R1740, thereby to maintain the latter relay in its operated position. Incident to the restoration of the reversing relay R1870, at its contacts 1871 to 1874, inclusive, it reverses the current flow over the negative and positive conductors C1897 and C1898 in order to give disconnect supervision in the event the call originated at an operator position. In the present example, however, the call originated at a subscriber substation and the current reversal has no function to perform. When the calling subscriber replaces his receiver on the switchhook of the associated telephone instrument, the line relays R1750 and R1760 restore to normal in the manner previously described and, in turn, cause the restoration of the pulse assist relay R1770. Incident to the restoration of the relay R1770, at its contacts 1771, it completes the previously described circuit for operating the relay R1820, and at its contacts 1772, it interrupts the previously traced series circuit including the dial leads DIAL and the windings of the relays R1560 and R1610. The relay R1820 upon operating, at its contacts 1821, completes an alternative holding circuit for the hold slave relay R1780 in order to prevent the release of the latter relay. Shortly after the operation of the relay R1820, however, the hold relay R1790 restores and, at its contacts 1792, connects the lower winding of the relay R1820 to the dial lead DIAL. Thus it will be seen that, incident to the restoration of the hold relay R1790 and the pulse assist relay R1770, the dial lead DIAL in the repeater 1600 is transferred from ground potential through the winding of the relay R1610 to battery potential through the winding of the relay R1820. When the above-traced series circuit including the windings of the dial control relay R1610 and the impulse relay R1560 is interrupted, upon the restoration of the relay R1770, the said relays restore to normal. Incident to the restoration of the relay R1560 in the repeater 100, the circuit for the control relay R1550 is interrupted, at its contacts 1562, and, at its contacts 1561, the loop circuit extending to the incoming line circuit and associated finder-connector link, by way of the negative and positive conductors C1564 and C1565, is interrupted. When this occurs the associated finder-connector link is released, in the manner described hereinbefore, and is rendered available for further calls. As a result of the restoration of the relay R1550, at its contacts 1551, it interrupts the circuit of the seizure relay R1570 which now restores to normal, and, at the contacts 1578, removes the busy marking ground potential from the control conductor C1304, thereby to render the repeater 100 accessible to switches having access thereto.

Referring again to the repeater 1600, it is noted that when the hold relay R1790 restores it interrupts, at its contacts 1791, the initial energizing circuit for the upper winding of the relay R1820 and, at its contacts 1792, it connects the lower winding of the relay R1820 to the dial lead DIAL. Since the dial lead has battery potential applied thereto through the upper winding of the impulse relay R1560, the relay R1820 now restores to normal and, at its contacts 1821, interrupts the circuit for the relay R1780. The relay R1780, upon restoring to normal, interrupts the circuits for the remaining operated relays in the repeater 1600, in the manner previously explained, and the repeater 1600 is thus rendered available for further calls.

In view of the foregoing explanation it will be understood that the repeater 100 in the tandem exchange A is held under control of the repeater 1600 in the suboffice B until the latter repeat is conditioned to completely restore to normal. Consequently, the repeater 100 is not rendered available to the switches having access thereto until the associated repeater 1600 is conditioned to release. Thus the release of the two repeaters occurs substantially simultaneously.

*Restricted service and timing*

In order to provide restricted service facilities in the suboffice B the repeater 1600 is equipped with a restricted service release relay R1875, a restricted service test relay R1880 and a restricted service relay R1890, which function with the suboffice switching apparatus and restricted service network in the same manner as the corresponding relays R1375, R1380 and R1390 in the repeater 100. Since the operation of the relays R1375, R1380 and R1390 has been described in detail hereinbefore it is believed that the operation of the relays R1875, R1880 and R1890 will be readily understood.

Furthermore, the repeater 1600 is provided with a timing relay R1825, a time disconnect relay R1830 and a warning tone relay R1840, which are controlled by a timer in the automatic suboffice B, in the same manner as the corresponding relays R1340, R1330 and R1320 in the repeater 100. Accordingly, it will be understood that a connection initiated by a calling subscriber in the suboffice B may be forcibly disconnected from the associated switching apparatus if the subscriber fails to dial the digits of a called subscriber number within a predetermined elapsed time interval or if he delays too long between the dialing of successive digits of the called subscriber number. In addition, these relays function to time a completed connection and to forcibly release such a connection after a predetermined conversational timing period has elapsed.

*Call from the subscriber in the suboffice B to the toll operator position via the tandem exchange A*

In the foregoing description of operation it was assumed that a call is extended from a calling subscriber in the suboffice B to a called subscriber in the tandem exchange A. It will now be assumed that a calling subscriber in the suboffice B desires to extend a connection to the central office toll operator by way of the switching apparatus included in the tandem exchange A. Such a connection is completed, in the same manner as has been described hereinbefore, to the repeater 1600, but instead of dialing two or more digits in the repeater 1600 a single digit is dialed thereinto. In the present example the single digit "0" is utilized to obtain a connection with the toll operator, and when this digit is received by the repeater 1600 the impulses are repeated over the trunk 1596 to the repeater 100, in the manner previously described. Since only a single digit is dialed into the repeater 1600 the first digit relay R1850 remains in its operated position and the second digit relay R1860 remains in its restored position.

Referring to the repeater 100 in the tandem exchange A, it will be understood that this repeater and the associated finder-connector link operate in the manner previously described to extend the connection to the central office toll operator. Inasmuch as only a single digit has been received by the repeater 100 the relays R1510 and R1520 remain in their operated positions. The relay R1510, at its contacts 1514, maintains a ground potential upon the conductor C1566 extending to the incoming line circuit 1500 and the associated finder-connector link, whereby a toll repeater (not shown) is conditioned in order to control the latter repeater to give reverse battery supervision to the repeater 100 when the toll operator answers the connection. When the toll operator answers the connection extended to her position, the toll repeater (not shown) reverses the current flow over the negative and positive conductors C1564 and C1565, thereby to cause the operation of the answer relay R1490 in the manner previously described. At its contacts 1491, the relay R1490 causes the answer slave relay R1580 to operate and the latter relay, at its contacts 1581, completes a circuit for the upper winding of the relay R1510. This circuit may be traced from ground by way of the contacts 1577, 1581, 1521 and 1511, and the upper winding of the relay R1510, to battery. The relay R1510, being of the differential type, now restores to normal and, at its contacts 1514, removes ground potential from the conductor C1566. The ground potential is removed from the conductor C1566 in order to cause the toll trunk over which the connection has been extended to be automatically cleared when the toll operator disconnects, regardless of the fact that the calling subscriber may fail to replace his receiver upon the switchhook of his associated telephone instrument. As a further result of the toll operator answering the connection, ground potential is returned over the control conductor C1566 in order to maintain the seizure relay R1570 in its operated position. In this manner the relay R1570 will be under the direct control of the toll operator and cannot restore to normal even through the calling subscriber releases the connection and causes the restoration of the relays R1560 and R1550, in the manner previously described.

When the toll operator answers the connection the upper winding of the dial control relay R1590 is connected to the dial lead DIAL, thereby to cause the restoration of the relay R1610 in the repeater 1600, as has been described. Inasmuch as the first digit relay R1850 is in its operated position when the toll operator answers, the previously traced circuit for the reversing relay R1870 is interrupted, at its contacts 1858, and a circuit is prepared, at its contacts 1851, for the operator answer relay R1800. Consequently, when the relay R1610 restores to normal, at its contacts 1613, a circuit is completed from ground by way of the contacts 1781′, 1654, 1613, 1685, 1742, 1814 and 1851, and the winding of the relay R1800, to battery. The relay R1800 is provided with a weighted armature spring which vibrates with diminishing amplitude when the relay is operated and subsequently the associated contacts 1801, 1802 and 1804 are closed and the contacts 1803 are opened. If a class of service tone signal is provided for the calling subscriber at suboffice B this tone signal is connected by way of the control conductor C1895 to the lower winding of the inductively coupled windings of the resistance coil 1805. Due to the inductive coupling of the upper and lower windings of the resistance coil 1805 the tone signal is induced into the upper winding and transmitted by way of the condenser 1806 and the contacts 1801 and 1802 to the toll operator. The class of tone signal indicates to the operator the class of service to which the calling subscriber is entitled. When the contacts 1804 of the relay R1800 are closed the answer relay R1810 operates and locks by way of the contacts 1815, 1853, 1742, 1685, 1613, 1654 and 1781′, to ground. It is noted that the relay R1810, in this type of connection, locks to ground at the contacts 1781′ of the hold slave relay R1780 instead of to ground at the contacts 1787 thereof. As a further result of the operation of relay R1810, at its contacts 1814, it interrupts the previously described circuit for operating the relay R1800 and the latter relay now restores and removes the class of service tone signal. Since the answer relay R1810 is now locked over a circuit which includes the contacts 1613 of the dial control relay R1610, it will be understood that the toll operator may reconnect the class of tone signal by momentarily removing the answer plug from the associated jack. When this operation occurs the answer relay R1490 is restored and it, in turn, causes the restoration of the answer slave relay R1580. When the latter relay restores it connects battery potential through the upper winding of the impulse relay R1560 to the dial lead DIAL, thereby to cause the operation of the dial control relay R1610, in the manner previously described. The latter relay, at its contacts 1613, interrupts the circuit of the answer relay R1810 which now restores to normal and, at its contacts 1814, completes the circuit for the relay R1800. The latter relay again applies the tone signal in the manner previously described.

The release of the connection by the calling subscriber in suboffice B is exactly the same as has been described hereinbefore, but in the repeater 100 the ground potential maintained on the conductor C1566 by the toll operator prevents the release of the relay R1570 and maintains the associated finder-connector link in the tandem exchange A in its operated position. When the relays R1560 and R1550 in the repeater 100 restore to normal, the loop circuit including the negative and positive conductors C1564 and C1565 is interrupted, in the manner previously described, in order to give disconnect supervision to the toll operator. When the toll operator disconnects by removing the plug from the associated jack the ground potential is removed from the conductor C1566, thereby to permit the associated finder-connector link to release and to cause the restoration of the seizure relay R1570. The latter relay, at its contacts 1577, interrupts the circuit for the relays R1520 and R1490, thereby to cause these relays to restore. The relay R1490 interrupts the circuit of the answer relay R1580, which also restores to normal. The remaining operations of the repeater 100, the repeater 1600 and the switching apparatus in the suboffice B, in releasing, are exactly the same as have been described hereinbefore.

THE SELECTOR SYSTEM

As previously indicated, initial installation of the telephone exchange equipment in the tandem exchange A comprises finder-connector links, of the type illustrated in Figs. 2, 3 and 5 to 12, inclusive, and serves a maximum of two hundred line terminals. This system may be converted from a connector system into a selector system in order to increase the capacity of the exchange system to one thousand lines. A system of this character is illustrated in the drawings by the combination of Figs. 2 to 21, inclusive, assembled in the manner illustrated in Fig. 23 and schematically illustrated in Fig. 1B. Such a system is substantially the same as the finder-connector link system described hereinbefore, with the exception that the connector portion of each of the finder-connector links is disconnected from the associated finder portion and a selector switching mechanism, such, for example, as the type illustrated in Fig. 4, is substituted in place thereof. More specifically, it will be recalled that the illustrated finder 300 and connector 800, comprising the finder-connector link of a two hundred line connector system, are directly connected by means of the conductors C40 to C45, inclusive, and that the various groups of inter-exchange trunks are accessible to the connector 800 in the first, second, third and fourth levels by merely dialing a single digit "7," "8," "9" or "0." When such a system is converted into a selector system the connectors are disconnected from the finders and the selectors, of the type illustrated in Fig. 4, are connected to the corresponding conductors C40 to C45, inclusive, of the finders in order to form finder-selector links. Thus the finder-selector links comprise a finder portion, such as the finder 300 (Fig. 3) and a selector portion, such as the selector 400 (Fig. 4). The corresponding conductors C40 to C43, inclusive, of the connectors are multiply connected to the bank contacts accessible to the wipers 410 to 413, inclusive, of the various selectors, and the conductors C44 and C45 of the connectors are not used. In this manner each of the finder-connector links, comprising a finder 300 and a connector 800, of a connector system is converted into a finder-selector link comprising a finder 300 and a selector 400, and the various connectors 800 are rendered available to the selectors 400 by terminating the conductors C40 to C43, inclusive, of the connectors in the bank contacts of the various selectors 400. Thus the finder-connector system having a maximum capacity of two hundred line terminals is converted into a finder-selector system having a capacity of one thousand line terminals. It will also be recalled that the various groups of trunks inter-connecting the tandem exchange A and the suboffice B and C, the manual office D and the central office toll operator position terminated in repeaters in the tandem exchange A and that the various groups of trunks are selectable by dialing the single digit "7," "8," "9" or "0" into the finder-connector links. In order to maintain this numbering arrangement after a system is converted in the manner indicated above, the various groups of repeaters are disconnected from the first, second, third and fourth levels of the bank contacts of the connectors accessible to the wipers 1271 to 1274, inclusive, and are then connected to the respective seventh, eighth, ninth and tenth levels of the bank contacts of the selectors 400 accessible to the wipers 410 to 413, inclusive. For example, the conductors C1301 to C1304, inclusive, of the repeater 100 are disconnected from the bank contacts accessible to the wipers 1271 to 1274, inclusive, of the connector 800 and are connected to the bank contacts accessible to the wipers 410 to 413, inclusive, of the selector 400. When the last-mentioned conversion is completed trunk calls to the various indicated offices may be extended by continuing to dial the single digit "7," "8," "9" or "0," in the same manner as has been explained in connection with the operation of a connector system. Furthermore, it is obvious that since the first four levels of the bank contacts of the various connectors have been vacated by the disconnection of the various trunk groups therefrom, these contacts may now be utilized to terminate forty additional subscriber line terminals.

Each of the selectors 400 now has access to the different groups of connectors, one of which includes the connector 800 (Figs. 8 to 12, inclusive) and the various groups of repeaters, one of which includes the repeater 100 (Figs. 13 to 15, inclusive). The assignment of idle finder-selector links to the use of calling lines is under control of the distributors 500 and 600, and the operation of the various line circuits, the finder 300, the connector 800, and the repeaters 100 and 1600 is the same as has been previously described. The selectors, however, which, in the present selector system, form the selector portion of the finder-selector links, are arranged in an improved manner and, accordingly, the details of the selector 400, which are illustrated in Fig. 4 of the drawings, will now be described.

Briefly considered, this selector comprises a Strowger switching mechanism having its contact field divided into ten levels of bank contacts which are accessible to the wipers 410 to 413, inclusive. The mechanism further comprises the usual vertical and rotary magnets 447 and 445 which are respectively operative in conjunction with their associated pawl and ratchet mechanism, not shown, to impart vertical and rotary movement to the wipers 410 to 413, inclusive. The mechanism is also equipped with a release magnet 468 which, when energized, permits the wipers 410 to 413, inclusive, to be returned in a rotary and vertical direction to a normal position. The mechanism is also provided with vertical off-normal contacts 401, 406, 409 and 436, which are actuated when the wipers 410 to 413, inclusive, are stepped in a vertical direction away from their normal resting positions; cam contacts 402 to 405, inclusive, which are respectively actuated when the wipers are rotated to the eleventh rotary off-normal position thereof; and normal post contacts 407 and 408 which are actuated when the wipers are elevated in a vertical direction to certain designated levels of the associated bank contacts. The normal post contacts noted above are provided so that the selector can give conversation timing when the levels selected by the wipers extend connections to certain local connectors, and to give restricted service on other levels used for extending connections over the interoffice trunks. In the event that conversation timing is required on both local and interoffice trunk calls, the normal post contacts 407 and 408 need not be provided. On the other hand, if conversation timing is required on local calls but not on outgoing trunk calls, and if restricted service is not required on such trunk calls, the normal post contacts 408 are not required although the circuit operation will be satisfactory if these contacts remain in the circuit. In addition to the Strowger switching mechanism, just described, the selector 400 includes a line relay R410, a pulsing relay R420, a slow-acting hold relay R430, a slow-acting transfer relay R440, a second transfer relay R450 which operates as a slave to the hold relay R430 and also as a vertical off-normal relay, a timing disconnect relay R460, a timing relay R470, a test relay R480, and a switching relay R490. Associated with the selector 400 a timer 750, including the cams 751 to 755, inclusive, and a motor 761 are provided in order to control the operation of the timing disconnect relay R460 and the timing relay R470 when conversation timing is required in connection with the selector 400. The timer 750 is common to all of the selectors, such as the selector 400, to all of the connectors, such as the connector 800, and to all of the repeaters, such as the repeater 100, and is of the character disclosed in Lomax and Bakker Patent No. 2,385,715, issued September 25, 1945.

In a system of the character under consideration, wherein selectors are used as the first numerical switching stage, the interoffice trunk repeaters are terminated directly in the bank contacts of the selectors as indicated previously, and the service restricting facilities, if required, are provided directly in the repeaters, as previously described. The selectors are provided with a different type of testing arrangement from that which is illustrated in the connector 800 and, accordingly, the repeater 100 illustrated in Figs. 13 to 15, inclusive, as being directly accessible to the selector 400, is wired in accordance with the "S" wiring whereby battery potential is provided by way of the resistor 1586, and the contacts 1759 and 1463, to indicate when the associated repeater 100 is idle and available to the selector 400. More specifically, the selector 400 is of the battery searching type and will not switch through unless battery potential is encountered by the test wiper 413.

In considering the operation of the selector system it may be assumed that a call has been initiated by the subscriber at substation 200 and that the finder 300 has found the calling line, in the manner previously described, and has thus extended the loop circuit including the line conductors C31 and C32 to the selector 400. It will be seen that incident to the operation of the start relay R380 in the finder 300 a circuit is completed, at its contacts 381, for energizing the line relay R410 of the selector 400, and, at its contacts 382, ground potential is applied to the conductor C43 in order to complete an energizing circuit for the upper winding of the transfer relay R440. The loop circuit for energizing the line relay R410 may be traced over a path which includes the grounded dial tone conductor C415, the cam contacts 403, the lower winding of the relay R410, the contacts 494, the conductor C42, the resistor 381', the contacts 381, the conductor C41, the contacts 491, and the upper winding of the relay R410, to battery. The circuit for operating the upper winding of the transfer relay R440 may be traced from ground by way of the contacts 382, the conductor C43, the contacts 462, the vertical off-normal contacts 409, and the upper winding of the transfer relay R440, to battery.

In operating, the line relay R410, at its contacts 413', interrupts an incomplete priming circuit for itself; at its contacts 412', it prepares a point in the circuit for the hold relay R430; and, at its contacts 411', it completes a circuit for energizing the pulsing relay R420 over a circuit which may be traced from ground by way of the contacts 494', 452 and 411', and the upper winding of the relay R420, to battery. When the transfer relay R440 operates over the above-described circuit, at its contacts 441, it prepares a point in an incomplete circuit for connecting a warning tone signal to the calling subscriber; at its contacts 442, it prepares a point in the circuit for the upper winding of the transfer relay R450; at its contacts 443, it interrupts a point in the circuit for the rotary magnet 445; and, at its contacts 444, it prepares the operating circuit for the timing relay R470.

The pulsing relay R420, upon operating, completes a circuit, at its contacts 421, whereby the upper and lower windings are differentially connected in series in order to partially deenergize the relay, so that the relay will quickly restore when the circuit is subsequently opened at the contacts 411' upon the restoration of the line relay R410. This series circuit may be traced from ground by way of the lower winding of the relay R420, the contacts 421 and 411', and the upper winding of the relay R420 to battery. However, as long as the relay R450 remains in its deenergized position the lower winding of the pulsing relay R420 is shunted and rendered ineffective from ground, at the contacts 494'. As a further result of the operation of the pulsing relay R420, at its contacts 423, it interrupts a point in the circuit for energizing the vertical magnet 447, and, at its contacts 422, it completes the circuit for operating the hold relay R430. This circuit may be traced from ground by way of the contacts 494' and 422, and the winding of the hold relay R430, to battery.

The relay R430 upon operating, as it contacts 431, prepares a point in the operating circuit for the test relay R480; at its contacts 432, it connects ground to the conductor C43 in order to maintain the finder 300 in its operated position after the switch-through operation occurs and to maintain the energizing circuit for the upper winding of the transfer relay R440; at its contacts 433, it completes a circuit, including the contacts 442, for operating the upper winding of the transfer relay R450; at its contacts 434, it prepares a point in the circuit for the vertical magnet 447 and the lower winding of the transfer relay R440; and, finally, at its contacts 435, it interrupts a point in the incomplete circuit for the release magnet 468.

The relay R450 upon operating, at its contacts 451, prepares a point in the operating circuit for the rotary magnet 445; at its contacts 452, it interrupts the previously traced initial energizing circuit for the upper winding of the pulsing relay R420 and the shunting circuit for the lower winding thereof; and, at its contacts 453, it completes a multiple circuit, including the contacts 412', for energizing the hold relay R430 and it prepares a priming circuit, including the contacts 413', for the line relay R410. As a further result of the operation of the relay R450, at its contacts 454, it prepares a point in the incomplete circuit for the release magnet 468; at its contacts 455, it prepares a point in the incomplete circuit for the timing relay R470; at its contacts 457, it prepares a point in the locking circuit for the timing disconnect relay R460; and, finally, at its contacts 456, it interrupts the circuit for applying ground potential to the ALB2 conductor C45 individual to the finder-selector link 300, 400. When the shunt circuit is removed from around the lower winding of the pulsing relay R420 the previously mentioned locking circuit, including its differentially wound upper and lower windings, is completed, whereby the relay is partly deenergized but still retained in its operated position so that it will quickly restore when the locking circuit is opened, at the contacts 411', by the line relay R410. The selector 400 is now in condition to receive the first digit dialed by the calling subscriber at substation 200.

Incident to the switch-through operation of the finder 300, the start relay R380 is restored to normal and, at its contacts 381, interrupts the previously traced loop circuit, including the conductors C41 and C42, for operating the line relay R410. However, inasmuch as the finder 300 has switched through, the conductors C41 and C42 are now extended to the calling subscriber loop circuit, including the conductors C31 and C32. In view of the foregoing, the line relay is now retained in its operated position over the calling subscriber loop circuit and the dial tone signaling current is transmitted to the calling subscriber to indicate that the dialing operation may be started. As a further result of the restoration of the start relay R380, at its contacts 382, it removes the ground potential applied to the conductor C43 but this conductor is now grounded by the selector 400 in order to retain the switch-through relay of the finder 300 in its operated position, in the manner previously explained.

In the event the dialing operation at the calling subscriber substation 200 is not started within a predetermined time interval after the selector 400 is seized, the timing relay R470 is controlled by the timer 750 to release the selector 400 and the associated finder 300. This timing apparatus also functions to release the link when the link is seized over a defective line having a permanent calling condition thereon. In considering the operation of the timing relay R470 it may be assumed that the dialing operation is not started for a substantial time interval. During this interval the timer 750 functions to transmit, under control of the cam 755, a momentary ground pulse by way of the contacts 760, the conductor 50A, the contacts 444 and 493', the normal post contacts 497, the upper winding of the relay R470, and the contacts 464, to battery. The relay R470 operates when the above-traced circuit is completed, and, at its contacts 474, completes a locking circuit for its lower winding which includes the contacts 466 and 455 and the vertical off-normal contacts 436; at its contacts 471 and 472, it interrupts a point in the normally grounded cutoff conductor 53C; and, at its contacts 475, it prepares a point in the circuit for the upper winding of the timing disconnect relay R460. After a short delay the motor 761 of the timer 750, upon continued rotation of the cams 751 to 755, inclusive, causes the cam 754 to close its contacts 759, thereby to apply a momentary ground pulse to the conductor 51B in order to energize the upper winding of the relay R460. The latter relay upon operating, at its contacts 467, completes a locking circuit for itself including the grounded contacts 457; at its contacts 465 and 466, it transfers the locking circuit for the lower winding of the timing relay R470 from ground at the vertical off-normal contacts 436 to the normally grounded conductor 52C. As a further result of the operation of the relay R460, at its contacts 464, it interrupts a point in the previously traced initial energizing circuit for the upper winding of the relay R470; and, at its contacts 461 and 462, it interrupts the circuit for applying the holding ground potential to the conductor C43. When the holding ground potential is removed from the conductor C43 the operated switch-through relay of the finder 300 restores to normal and thereby causes the complete restoration of the finder 300. Incident to the restoration of the finder 300 the previously traced circuits for seizing the selector 400 are interrupted and the line relay R410 restores to normal. The line relay upon restoring, at its contacts 411', interrupts the circuit for the pulsing relay R420 and, at its contacts 412', it interrupts a point in the multiple holding circuit for the hold relay R430. The pulsing relay R420 upon restoring to normal, at its contacts 422, interrupts a further point in the multiple holding circuit for the relay R430, thereby to cause the latter relay to restore. As a result of the restoration of the hold relay R430, at its contacts 432, it interrupts the energizing circuit for the upper winding of the transfer relay R440, thereby to cause the latter relay to restore and, at its contacts 433, it interrupts the circuit for the upper winding of the transfer relay R450, thereby to cause the latter relay to restore. Incident to the restoration of the relay R450, at its contacts 457, it interrupts the holding circuit for the relay R460 which now restores to normal, and, at its contacts 465, interrupts the circuit for the lower winding of the timing relay R470 which also restores. Following the restoration of the relay R470 the selector 400 is fully restored to normal and may be seized for further use.

It will now be assumed that the calling subscriber at substation 200 dials the first digit of the called subscriber number within a predetermined time interval and that the first digit of the directory number of the called subscriber is the digit "2." During the open circuit period of the first impulse the relay R410 restores to normal and opens, at its contacts 411', the previously traced circuit for the pulsing relay R420; at its contacts 412', it interrupts a point in the multiple holding circuit for the relay R430; and, at its contacts 413', it completes the above-mentioned priming circuit for itself, which circuit may be traced from ground by way of the contacts 494', 453 and 413', the resistor 414, and the upper winding of the relay R410 to battery. Completion of this circuit does not cause the reoperation of the line relay R410 but it serves to render the relay exceedingly fast to reoperate when the calling loop circuit is recompleted at the end of the open circuit period of the first impulse. When the circuit of the pulsing relay R420 is opened the relay quickly restores to normal and, at its contacts 421, it interrupts the previously traced holding circuit including its upper and lower windings; at its contacts 422, it interrupts the circuit for the hold relay R430; and, at its contacts 423, it completes the prepared circuit for energizing the lower winding of the transfer relay R440 in multiple with the vertical magnet 447, this circuit extending from ground by way of the contacts 494', 423 and 434, and the multiply connected windings of the relay R440 and the magnet 447, to battery.

In operating, the vertical magnet 447 elevates the wipers 410 to 413, inclusive, one step, whereat they are positioned opposite the first level of bank contacts in the associated contact bank. This magnet, in operating, also closes its contacts 448 to prepare or complete an alternative operating circuit for the pulsing relay R420, this circuit extending from ground by way of the contacts 448 and 411′, and the upper winding of the relay R420, to battery. Assuming that the line relay R410 is reoperated before the vertical magnet 447 completes its operation, this circuit is completed, at the contacts 448, incident to the complete operation of the vertical magnet 447. On the other hand, if the vertical magnet 447 completes its operation prior to the reoperation of the line relay R410, this circuit is first prepared, at the contacts 448, and is completed, at the contacts 411′, incident to the reoperation of the relay R410. In this manner the pulsing relay R420 cannot be reoperated to interrupt the circuit for the vertical magnet 447 until after the vertical magnet has fully operated. In reoperating, the pulsing relay R420 closes its contacts 421 to recomplete its locking circuit, including both windings as traced above, and opens its contacts 423 to interrupt the above-traced circuit for energizing the vertical magnet 447 in multiple with the upper winding of the transfer relay R440. At its contacts 422, the relay R420 recompletes the operating circuit for the hold relay R430. Due to the slow-to-release characteristics thereof, the hold relay R430 and the transfer relay R440 do not restore during the series of impulses transmitted to the selector 400. During each of the succeeding impulses of the first digit dialed at the calling substation 200, the two relays R410 and R420 interact with the vertical magnet 447 in the exact manner explained above. Thus, in the present example, two current pulses are transmitted to the multiply connected windings of the vertical magnet 447 and the transfer relay R440. It will be understood that the wipers 410 to 413, inclusive, are operated to a position opposite the second level of bank contacts in the associated contact bank, in response to the dialing of the first digit "2" at the calling substation 200.

Incident to the first vertical step of the wipers 410 to 413, inclusive, the vertical off-normal contacts 409 are opened to interrupt the circuit for the upper winding of the transfer relay R440. As indicated above, due to its slow-to-release characteristics the relay R440 remains operated until shortly after the first digit is ended. Also, incident to the first vertical step of the wipers, the vertical off-normal contacts 436 are opened in order to interrupt a point in the previously traced locking circuit for the timing relay R470. Consequently, if the timing relay R470 has been operated under control of the timer 750, the relay will now be restored to normal to prevent the forced release of the link. Also, incident to the first vertical step of the wipers, the vertical off-normal contacts 401 are closed to complete an obvious circuit for grounding the guard conductor C44 and thus guard the finder 300 from being subsequently allotted by the distributor 600; and the vertical off-normal contacts 406 are closed in order to complete an energizing circuit for the lower winding of the transfer relay R450. Due to the last-mentioned circuit the transfer relay R450 is now maintained in its operated position until the wipers of the selector 400 are again restored to their normal positions.

At the end of the first digit the line and pulsing relays R410 and R420 are held operated to cause the deenergization and release of the transfer relay R440. The relay R440 now restores to normal and, at its contacts 442, interrupts a point in the previously traced circuit for the upper winding of the transfer relay R450; at its contacts 444, it interrupts the operating circuit for the timing relay R470; and, at its contacts 443, it completes the operating circuit for the rotary magnet 445. This circuit extends from ground by way of the contacts 433, 482, 499, 451 and 443, the self-interrupting contacts 446, and the winding of the rotary magnet 445, to battery. When energized over this circuit the rotary magnet 445 operates to rotate the wipers 410 to 413, inclusive, into engagement with the first set of contacts in the selected second level of the associated contact banks. The succeeding operations depend upon the idle or busy condition of the first connector of the selected group of connectors terminating in the selected set of contacts. If this connector is busy the control conductor thereof is marked with ground potential so that the winding of the test relay R480 is short-circuited over a path which includes the test wiper 413 and the contacts 431, and thus is prevented from operating. On the other hand, if the first connector of the selected group is idle the control conductor thereof is marked with negative battery potential to energize the test relay R480 in a circuit which includes the test wiper 413 and the grounded contacts 431. In such a case the test relay R480 immediately operates in order to arrest further operation of the rotary magnet 445, in the manner explained below.

As a further result of the operation of the rotary magnet 445, it opens its contacts 446 in order to interrupt its own circuit. Upon releasing, the rotary magnet recloses its contacts 446, thereby to again complete its operating circuit and, hence, steps the wipers 410 to 413, inclusive, into engagement with the contacts terminating the conductors of the second connector in the selected group. If this connector is also busy, ground potential is encountered by the wiper 413 and short-circuits the test relay R480, and the rotary magnet restores to normal and reoperates to advance the wipers into engagement with the third set of bank contacts. The rotary step by step movement of the wipers continues until all of the connectors in the selected group have been tested and found to be busy or until an idle connector in the selected group is found.

Assuming that all of the connectors of the selected group are busy, the wipers 410 to 413, inclusive, are rotated to their eleventh rotary off-normal positions, at which time the cam contacts 495 are closed to complete an alternative circuit for reoperating the transfer relay R440. This circuit extends from ground by way of the contacts 433, 482 and 499, the cam contacts 495, and the upper winding of the transfer relay R440, to battery. Upon reoperating, the transfer relay R440 opens its contacts 443 to interrupt a point in the above-traced operating circuit for the rotary magnet 445 and thus prevents further operation of this magnet. The relay R440 also reprepares, at its contacts 444, the operating circuit for the timing relay R470 and, at its contacts 442, recompletes the energizing circuit for the upper winding of the transfer relay R450. As a further result of the advance of the wipers 410 to 413, inclusive, into engagement with the eleventh off-normal positions thereof, the cam contacts 403 are opened to interrupt the above-described dial tone signaling circuit and the cam contacts 402 are closed to transmit a busy tone signal applied to the conductor C417 to the calling subscriber at substation 200. In response to this operation the busy tone signal current is transmitted to the calling subscriber to indicate that the connection to the desired called line cannot be obtained at the present time. Also, incident to the eleventh rotary step of the selector wipers the cam contacts 404 are closed to complete an alternative locking circuit for the pulsing relay R420. This circuit is only used as a means for reoperating the pulsing relay R420 in the event the calling subscriber fails to notice the busy signal and continues to dial the remaining digits of the called subscriber directory number. It will be noted that in such case the impulses transmitted to the selector 400 are without effect because the circuit for the rotary magnet is interrupted in response to the operation of the transfer relay R440, and, while the impulses transmitted by the pulsing relay R420 control the vertical magnet 447, the vertical magnet is, however, ineffective to step the wipers of the selector in a vertical direction.

When the calling subscriber receives the busy tone signal and releases the connection, the relays R410, R420 and R430 are deenergized and restore in the order named. When the hold relay R430 restores, at its contacts 435, it completes a circuit for operating the release magnet 468, which may be traced from ground by way of the contacts 494', 423, 435 and 454, and the winding of the release magnet 468, to battery. Furthermore, the hold relay R430 upon restoring, at its contacts 432, disconnects ground potential from the conductor C43 and thus initiates the release of the finder 300 and the line circuit 20. Also, upon restoring the hold relay R430, at its contacts 433, interrupts the previously traced circuit for the transfer relay R440 which now restores, and the latter relay, at its contacts 442, interrupts a point in the circuit for the upper winding of the transfer relay R450. The transfer relay R450, however, remains in its operated position under control of the vertical off-normal contacts 406. As a result of the operation of the release magnet 468, the wipers 410 to 413, inclusive, of the selector 400 are automatically returned to their normal vertical and rotary positions. Incident to the release of the selector switching mechanism the vertical off-normal contacts 406 are opened, thereby to cause the restoration of the transfer relay R450. Upon restoring the relay R450, at its contacts 454, interrupts the circuit for the release magnet 468; the vertical off-normal contacts 401 are opened in order to disconnect ground potential from the guard conductor C44 and thus mark this finder-selector link as idle to the distributor 600; and the vertical off-normal contacts 409 and 436 are again closed in order to prepare the circuits including these contacts for subsequent operation. Attention is directed to the fact that as soon as the wipers of the selector 400 are returned in a rotary direction away from the eleventh off-normal rotary position, the cam contacts 402 to 405, inclusive, are actuated to the positions illustrated in the drawings. The finder 300 and the selector 400 have now been completely restored to normal and may be reassigned by the distributor 600 for further use.

Assuming now that the connector 800 is the first idle connector of the selected group, an automatic rotary step by step operation of the selector 400 is arrested when the wipers 410 to 413, inclusive, are positioned into engagement with the contacts terminating the conductors C40 to C43, inclusive, of the connector 800. At this time a circuit is completed for the test relay R480 which may be traced from ground by way of the contacts 431, the winding of the test relay R480, the test wiper 413, the engaged contact terminating the control conductor C43, the contacts 816 and 951, and the resistor 859, to battery. Upon operating the test relay R480, at its contacts 482, interrupts a point in the above-traced self-interrupting circuit for the rotary magnet 445 and thus prevents further rotary movement of the wipers 410 to 413, inclusive. As a further result of the operation of the relay R480, at its contacts 481, it completes a circuit including the contacts 433 for operating the switch-through relay R490.

Incident to the operation of the switch-through relay R490, at its contacts 498, it completes a locking circuit for itself including ground at the contacts 432. At its contacts 496, the relay R490 completes a circuit whereby the ground potential, at the contacts 432, is applied by way of the wiper 413 and the conductor C43 to the connector 800 and, simultaneously therewith, it completes a shunting circuit for the test relay R480, which now restores to normal. When thus short-circuited the relay R480 is rendered somewhat slow to release and subsequently restores to normal in order to interrupt, at its contacts 481, the initial energizing circuit for the switch-through relay R490 and to prepare, at its contacts 482, a point in the incomplete circuit for the rotary magnet 445. However, the latter circuit is not completed at the present time inasmuch as the relay R490 has interrupted the circuit by opening its contacts 499. At its contacts 493', the relay R490 interrupts a point in the circuit for the timing relay R470, and, at its contacts 492', it prepares a point in the circuit for the timing relay R470 which includes the wiper 410 and the conductor C40 extending to the connector 800. In connection with the latter circuit it is noted that, in the present call which is extended to a local subscriber, the normal post contacts 407 remain closed and thus enable the conversation timing facilities provided in the selector 400 to be controlled from the selected connector. Inasmuch as the connector 800 is individually provided with conversation timing facilities the above-mentioned circuit for the timing relay R470 is ineffective in the present call. As a further result of the operation of the relay R490, at its contacts 491 and 494, it disconnects the windings of the line relay R410 and the dial tone conductor C415 from the calling loop circuit. Thus the dial tone signal is terminated and the line relay R410 is restored to normal. Also, at its contacts 492 and 495, the relay R490 extends the calling subscriber loop circuit through to the seized connector by way of the wipers 411 and 412 and the negative and positive conductors C41 and C42. In response to the latter operation the line relay R850, the lock-pulse relay R860, the release control relay R820, and the hold relay R870 in the connector 800 operate, in the order named, in the manner previously described in connection with the explanation of the connector system. It is the operation of the relay R820 that causes ground potential to be applied to the conductor C43, through the winding of the control relay R830, in order to hold the selector 400, the finder 300 and the line circuit 20 in their operated positions. Shortly following the seizure of the connector 800 the line relay R410, the pulsing relay R420 and the hold relay R430 all restore to normal. It will be understood that when the switch-through relay R490 interrupts the circuit for the upper winding of the timing relay R470, at its contacts 493', if a timing operation is in progress the timing relay R470 will not operate. In this manner the connection is prevented from being forcibly released by the timing relays R460 and R470 in the selector 400 as controlled by the timer 750. As a result of the foregoing, the selector 400 has switched the calling subscriber loop circuit through to the connector 800 and the only relays in the selector remaining in their operated positions are the relays R450 and R490. No further operation of the selector 400 occurs until the connection is released at the calling end thereof.

Assuming that the calling subscriber at substation 200 desires to extend the present connection to the called subscriber at substation 1200A, the last four digits "2543" of the called subscriber directory number are now dialed into the connector 800, in the manner previously described. The detailed operations of the connector in response to the dialing of the digits "2543" are exactly the same as have been described hereinbefore and hence need not be considered at this point. When the subscribers involved in the connection release, the connector 800 is restored to normal, in the manner previously explained, and ground potential is disconnected from the control conductor C43. When this occurs the test wiper 413 of the selector 400 no longer encounters ground potential on the conductor C43 and the switch-through relay R490 immediately restores to normal. Furthermore, since the switch-through relay of the finder 300 is also locked to the ground potential applied to the conductor C43, it restores and thereby causes the release of the finder 300. Incident to the restoration of the switch-through relay R490, at its contacts 494', it completes a circuit including the contacts 423, 435 and 454 for energizing the winding of the release magnet 468. The release magnet 468, upon operating, causes the restoration of the wipers 410 to 413, inclusive, to their normal positions in the conventional manner. Incident to the restoration of the wipers to normal the various off-normal contacts are actuated to the positions illustrated in the drawings, whereby the relay R450 is restored to normal by the opening of the vertical off-normal contacts 406, the guarding ground potential is removed from the conductor C44 by the opening of the vertical off-normal contacts 401, and the previously described circuits are prepared by the closing of the vertical off-normal contacts 409 and 436. Incident to the restoration of the transfer relay R450, at its contacts 454, it interrupts the circuit for the release magnet 468, and the release of the latter magnet fully restores the selector 400 to normal.

If the above-described call originating at the substation 200 is an interoffice trunk call intended for a subscriber line terminated in the automatic suboffice B, the calling subscriber after receiving the dial tone signal dials the single digit "9" designating the group of trunks, including the trunk 1596 individual to the repeater 100. At the end of the digit the wipers of the selector 400 are positioned opposite the ninth level of bank contacts in which the conductors of the repeater 100 are terminated. Shortly following the end of the digit, the transfer relay R440 restores to initiate the automatic rotary stepping operation of the selector, in the manner previously explained. In this regard it is noted that, when utilized in a selector system of the character under consideration, the repeater 100 is provided with "S" wiring. Accordingly, each repeater in the group, when idle, is provided with a control conductor which is connected to the negative terminal of the exchange battery through a resistor. Thus, so long as the repeater 100 is idle the control conductor C1304 is connected to the negative terminal of the exchange battery through the contacts 1463 and 1579, and the resistor 1586. On the other hand, when this repeater is busy the control conductor C1304 is connected to ground potential through the contacts 1578 of the operated seizure relay R1570, or through the contacts 1462 of the operated hold slave relay R1460 and the winding of the seizure relay R1360.

Assuming that the repeater 100 is seized by the selector 400 in extending the call under consideration, the switch-through operation of the selector 400 is effected in the exact manner explained above. Further operation of the trunk repeater 100 in the tandem exchange A and the associated repeater 1600 in the suboffice B, in extending a connection to a called subscriber in the latter exchange, is exactly the same as has been described above in connection with the operation of the switching apparatus in a connector system. The release of the established connection between the calling and called subscribers is the same as has been described hereinbefore and when the ground potential is removed from the control conductor C1304 the selector 400, the finder 300, and the line circuit 20 are released in the manner previously explained.

*Restricted service*

If restricted service is required on calls involving the interexchange trunks, the selector 400 is arranged so that the normal post contacts 408 are closed and the normal post contacts 407 are opened when the wipers of the selector are elevated to the levels thereof which terminate the interexchange trunks. Consequently, if the subscriber at substation 200 is to be restricted against making outgoing calls over the group of trunks, including the trunk 1596 extending to the suboffice B, the normal post contacts 408 of the selector are closed when the wipers are elevated to the ninth level. Therefore, when the selector 400 switches through in the manner previously described and seizes the repeater 100, the restricted service conductor C30 individual to the calling subscriber line is extended through to the repeater 100, by way of the wiper 311 of the finder 300, the conductor C40 extending to the selector 400, the contacts 491', the normal post contacts 408, the contacts 492', the restricted service wiper 410, and the conductor C1301 extending to the repeater 100, to the contacts 1381 controlled by the restricted service test relay R1380. When this circuit is completed upon the seizure of the repeater 100, the previously described matching circuit of the restricted service network 10 is prepared. Shortly after the seizure of the repeater 100 the relay R1460 is operated, in the manner previously explained, whereupon the restricted service test relay R1380 is energized in order to close its contacts 1381 and complete the above-mentioned matching circuit. Further operation of the restricted service apparatus, including the relays R1375, R1380 and R1390 in the repeater 100, in conjunction with the restricted service network 10, in order to forcibly release the attempted connection by the calling subscriber at substation 200, is exactly the same as has been described in connection with the operation of this apparatus when utilized in a connector system. It should be understood, however, that if the calling subscriber is not restricted from making interexchange calls to subscribers in the suboffice B, but is on the other hand restricted from making interexchange calls to a different suboffice, the signal transmitted by the restricted service network 10 to the repeater 100 will not match and the restricted service relay R1390 will not operate. Accordingly, the relay R1390 remains in its restored position for the duration of the call and the connection is permitted to be extended in the normal manner.

It should also be understood that the selector 400 may be controlled by the calling subscriber by the dialing of the single digit "7," "8" or "0" to extend connections, in the same manner as has been described above, to the manual office D, the automatic suboffice C, or the toll operator at the central office. The groups of trunks extending to the above-mentioned offices are terminated respectively in the seventh, eighth and tenth levels of the selector banks.

*Additional connectors*

When the connector system is converted to a selector system in order to increase the capacity thereof, in the manner described above, additional groups of connectors are also required to provide terminal facilities for additional subscriber lines. While two hundred line connectors of the character illustrated in Figs. 8 to 15, inclusive, are entirely satisfactory and may be added to the system to handle the increased traffic, it has been found that one hundred line connectors provide certain advantages. The connector 1900 illustrated in Figs. 19 to 21, inclusive, is a one hundred line connector of the character noted. This connector is of the four digit type and is arranged for twenty party code ringing. In order to substantially reduce the size of the connector 1900 as compared with the connector 800, the conversational timing facilities have been provided in the associated selectors instead of this connector, but the control of the timing facilities in the selector is retained under the connector 1900 when it is included in a connection. It will be recalled that when the original connector system is converted into a selector system the original connectors are terminated in the second levels of the selectors. Consequently, the original tandem exchange subscriber directory numbers must now be prefixed with the digit "2." If an additional group of connectors of the type illustrated in Figs. 19 to 21, inclusive, is also required to increase the capacity of the system, the additional group may, for example, be terminated in the third level of the selectors. With this arrangement the subscriber lines accessible to the added group of connectors will have five digit directory numbers in which the first digit is the digit "3."

Figure 19:
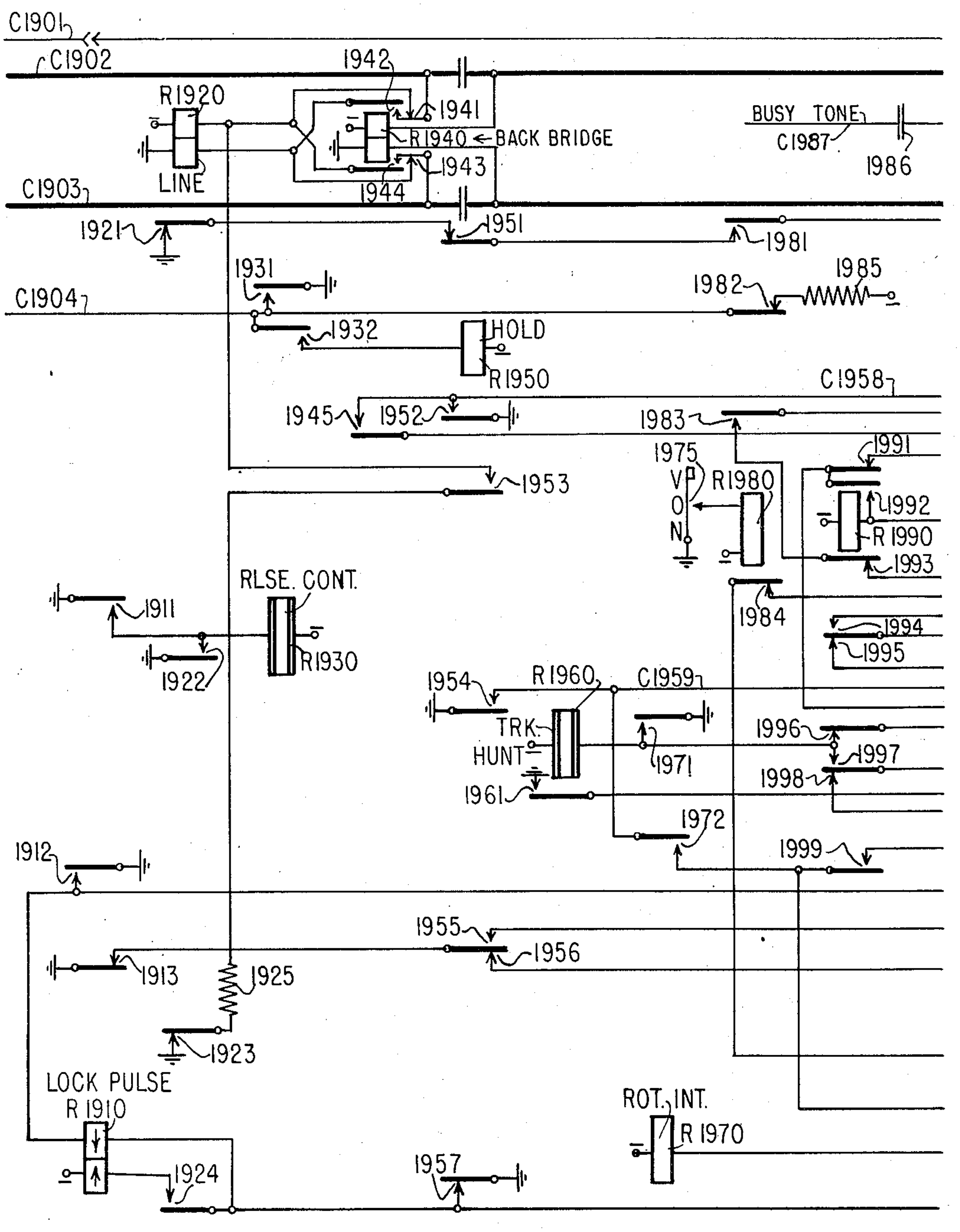
Figure 20:
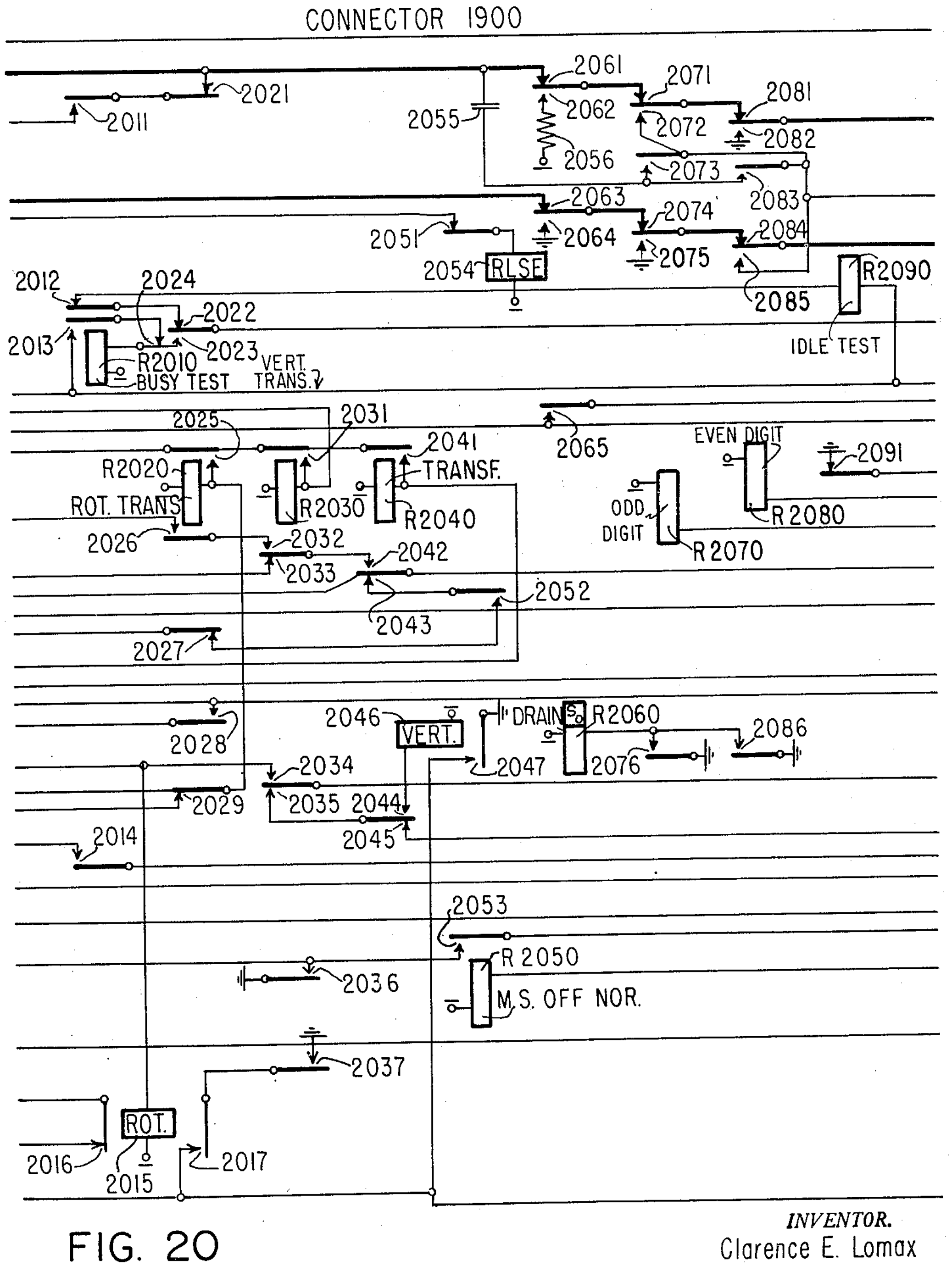
Figure 21:
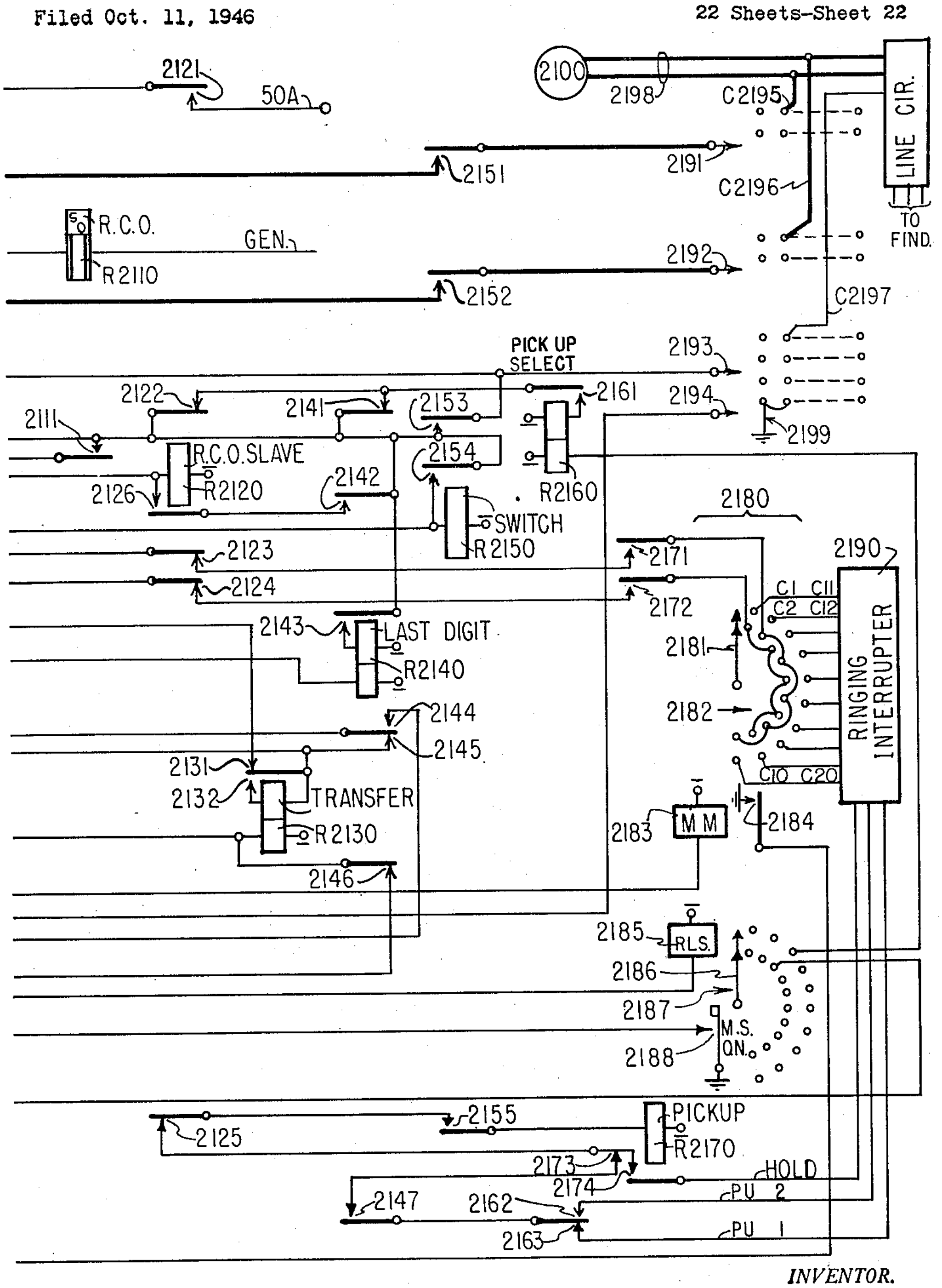

In order to describe this arrangement it will be assumed that a group of connectors, one of which is illustrated in Figs. 19 to 21, inclusive, is terminated in the third level of the selectors, such as the selector 400, and that the calling subscriber at substation 200 desires to extend a connection to the subscriber substation 2100 on the party line 2198. It will also be assumed that in response to the initiation of a call by the subscriber at substation 200 the finder 300 has extended the calling line to the selector 400, and that the calling subscriber has dialed the first digit "3" of the called subscriber directory number. In responding to the impulses of the digit "3" the selector 400 operates to elevate the wipers 410 to 413, inclusive, opposite the third level of bank contacts and to rotate the wipers over the selected level in search of an idle connector in the selected group, in the manner previously described. Assuming that the connector 1900 (Figs. 19 to 21, inclusive) is the first idle connector in the selected group, the wiper 413 of the selector upon engaging the bank contact terminating the conductor C1904 encounters negative battery potential applied thereto by way of the resistor 1985, the contacts 1982 and the conductor C1904. When this occurs the selector 400 switches through and thereby extends the calling subscriber loop circuit through to the connector 1900 by way of the wipers 411 and 412, the negative and positive conductors C1902 and C1903, the contacts 1941 and 1943, and the upper and lower windings of the line relay R1920, to battery and ground respectively. When the selector 400 switches through in the above-described manner the line relay R1920 operates.

Incident to the operation of the line relay R1920, at its contacts 1921, it interrupts a point in the incomplete circuit for the release magnet 2054; at its contacts 1922, it completes an energizing circuit for the release control relay R1930 which now operates; at its contacts 1923, it interrupts a point in the incomplete priming circuit for its upper winding; and, at its contacts 1924, it completes an energizing circuit for the lower winding of the lock-pulse relay R1910, which includes ground at the contacts 1957. When the release control relay R1930 operates, at its contacts 1931, it applies ground potential to the control conductor C1904, thereby to retain the selector 400, the finder 300 and the cutoff relay R275 of the calling line, in their operated positions. Also, at its contacts 1932, the relay R1930 completes an obvious circuit for operating the hold relay R1950. The lock-pulse relay R1910 operates when the above-mentioned energizing circuit for its lower winding is completed, and, at its contacts 1911, it completes a multiple circuit for retaining the release control relay R1930 in its operated position; at its contacts 1913, it opens a point in the incomplete pulsing circuit for the various magnets of the connecter 1900; and, finally, at its contacts 1912, it completes a circuit including its upper winding, the contacts 1924, and its lower winding, the contacts 1924, and its lower winding, whereby the relay is retained in its operated position, but, due to the differential action of the two windings of the relay, it is partially deenergized so that it will quickly restore when the circuit is opened under control of the line relay R1920, as will be subsequently explained. In this connection attention is directed to the fact that as soon as the hold relay R1950 operates it interrupts, at its contacts 1957, the initial energizing circuit for the lower winding of the relay R1910 and permits the above-mentioned circuit for the two windings of the relay R1910 to be completed as noted above, by removing the shunting ground from the circuit, including the upper winding thereof.

As a further result of the operation of the hold relay R1950, at its contacts 1952, it applies ground potential to the common locking conductor C1958; at its contacts 1953, it prepares a point in the preenergizing circuit for the upper winding of the line relay R1920; and, at its contacts 1954, it applies ground potential to the common locking conductor C1959. The relay R1950 also interrupts, at its contacts 1956, a point in the incomplete circuit for the release magnet 2185 of the minor switch 2180; at its contacts 1951, it interrupts a point in the incomplete circuit for the release magnet 2054, whereby the wipers of the connector 1900 may be restored to normal when the connector is released; and, finally, at its contacts 1955, it prepares a point in the incomplete pulsing circuit for the magnet 2183 of the minor switch 2180 and the vertical and rotary magnets 2046 and 2015 of the connector 1900. Thus, when the connector 1900 is seized by the selector 400 the relays R1920, R1910, R1930 and R1950 operate in that order to condition the connector to respond to the remaining digits of the called subscriber directory number.

Assuming that the second digit of the called subscriber number dialed at the calling subscriber substation is the digit "2," the line relay R1920 momentarily restores to normal a corresponding number of times, in the manner previously explained in connection with the operation of the line relay R850 of the connector 800. Each time the line relay R1920 restores it interrupts a point in the multiple holding circuit for the release control relay R1930; and, at its contacts 1923, it completes the preenergizing circuit for its upper winding, whereby the relay will be instantly reoperated when the loop circuit is reclosed at the end of each impulse. Finally, at its contacts 1924, the relay R1920 interrupts the locking circuit including the oppositely wound upper and lower windings of the lock-pulse relay R1910. The relay R1910 quickly restores inasmuch as the locking circuit, including its differential windings, is such that the relay in its locked position is just on the verge of restoring.

In response to the restoration of the relay R1910, at its contacts 1911, it interrupts the remaining point in the multiple circuit for the release control relay R1930. The latter relay, due to its slow-to-release characteristics remains in its operated position during the time its circuit is interrupted by the momentary restoration of the relays R1910 and R1920. At its contacts 1912, the relay R1910 opens a further point in its locking circuit and, finally, at its contacts 1913, it completes a circuit for energizing the magnet 2183 of the minor switch 2180 in parallel with the transfer control relay R2130. This circuit extends from ground by way of the contacts 1913, 1955 and 2145, one branch including the winding of the relay R2130 and battery, and the other branch including the contacts 2035 and 2045, and the winding of the magnet 2183 and battery. Incident to the completion of the above circuit, the transfer control relay R2130 and the magnet 2183 operate.

The relay R2130 upon operating, at its contacts 2132, short-circuit its upper winding in order to render the relay slow-to-release and is thus retained in its operated position during pulsing. In response to the operation of the magnet 2183 the wipers 2181 and 2186 of the minor switch 2180 are advanced in a clockwise direction into engagement with the first set of contacts in the respective banks 2182 and 2187 and, at its contacts 2184, the magnet 2183 prepares a point in the circuit for reenergizing the lower winding of the lock-pulse relay R1910. The completion of the circuit for the lower winding of the relay R1910 may occur as soon as the magnet 2183 is fully operated, provided the line relay R1920 has in the meantime been reoperated and has closed its contacts 1924 and, on the other hand, the circuit may be completed as soon as the line relay R1920 reoperates, provided the magnet 2183 has been fully operated. With this interlocking arrangement the circuit for the magnet 2183 cannot be interrupted by a premature operation of the relay R1910 and thus insures full operation of the magnet 2183 upon each restoration of the relay R1910.

Incident to the advancement of the wipers 2181 and 2186 away from their normal resting positions, the minor switch off-normal contacts 2188 are closed, thereby to complete an obvious circuit for energizing the winding of the minor switch off-normal relay R2050. The relay R2050 now operates and, at its contacts 2052, prepares a circuit for subsequently controlling the last digit relay R2140 and the transfer relay R2040; at its contacts 2151, it interrupts a point in the circuit for the connector release magnet 2054; and, at its contacts 2053, it prepares a point in the incomplete circuit for the minor switch release magnet 2185.

When the calling subscriber loop circuit is reclosed at the end of the first pulse, the line relay R1920 quickly reoperates, inasmuch as it has been preenergized over the circuit including its upper winding, the contacts 1953 and 1923, and the resistor 1925. Upon reoperating, the relay R1920, at its contacts 1922, again completes the circuit for maintaining the slow-to-release relay R1930 in its operated position; at its contacts 1923, it interrupts its preenergizing circuit; and, at its contacts 1924, it completes the circuit for the lower winding of the relay R1910 from ground at the contacts 2184. Upon reoperating the lock-pulse relay R1910, at its contacts 1912, prepares the above-mentioned holding circuit for itself, including its upper and lower windings; and, at its contacts 1913, it interrupts the above-mentioned pulsing circuit for the transfer control relay R2130 and the minor switch magnet 2183. The magnet 2183 now restores but due to the fact that the relay R2130 has been rendered somewhat slow to release by its short-circuited upper winding, the relay remains in its operated position during pulsing. When the magnet 2183 restores, at its contacts 2184, it removes the short circuit from the upper winding of the relay R1910 and thus the relay R1910 now locks itself over this circuit, including its oppositely wound upper and lower windings. Subsequent impulses transmitted by the calling subscriber control the line relay R1920, the lock-pulse relay R1910, the release control relay R1930, the transfer control relay R2130 and the minor switch magnet 2183, in the same manner as has been described above. Since the second digit dialed by the calling subscriber is the digit "2," the minor switch wipers 2181 and 2186 are positioned into engagement with the second contacts in the banks 2182 and 2187, and the line relay R1920 and the lock-pulse relay R1910 are in their operated positions at the end of the second impulse of the digit "2." Shortly after the end of the second impulse, i. e., during the interdigital pause, the relay R2130 restores and, at its contacts 2131, completes a circuit for energizing the winding of the transfer relay R2040. This circuit may be traced from the grounded conductor C1959 by way of the contacts 2145, 2131, 2043, 2052, 2027 and 1995, and the winding if the relay R2040, to battery. The relay R2040 operates and closes its preliminary make contacts 2041 before its initial energizing circuit is interrupted by the opening of its contacts 2043, whereupon the relay is locked over a circuit including the contacts 1991 and 2145 and the grounded conductor C1959. When the relay R2040 fully operates, at its contacts 2043, it interrupts its initial energizing circuit; at its contacts 2042, it prepares a point in the incomplete circuit for the vertical transfer relay R2030; at its contacts 2045, it disconnects the minor switch magnet 2183 from the impulsing circuit; and, at its contacts 2044, it connects the vertical magnet 2046 thereto. The connector 1900 has now been conditioned to receive the third digit of the directory number of the called substation 2100.

When the calling subscriber dials the third digit of the called directory number, which is assumed to be the digit "5," the line relay R1920 and the lock-pulse relay R1910 cooperate in the manner previously explained to transmit five impulses to the transfer control relay R2130 and the vertical magnet 2046. More specifically, each time the lock-pulse relay R1910 restores it completes a circuit from ground by way of the contacts 1913, 1955 and 2146, over one branch including the winding of the relay R2130 and over another branch including the contacts 2035 and 2044 and the winding of the vertical magnet 2046. The relay R2130 operates in response to the first impulse and remains in its operated position during the time five impulses are transmitted to the vertical magnet 2046. The vertical magnet 2046 operates each time an impulse is transmitted thereto and, at its contacts 2047, it completes an alternative circuit whereby the lock-pulse relay R1910 may be reoperated each time the line relay R1920 is reenergized. Thus the interlocking action between the relays R1910 and R1920 and the vertical magnet 2046 is the same as the interlocking action between these relays and the minor switch magnet 2183, as has been previously explained. Incident to each operation of the vertical magnet 2046, the wipers 2191 to 2194, inclusive, are advanced one step in a vertical direction away from their normal resting position and, consequently, at the conclusion of the five impulses transmitted to the magnet 2046 the wipers are positioned opposite the fifth level of the associated bank contacts. As soon as the wipers 2191 to 2194, inclusive, are moved in a vertical direction away from their normal resting positions, the vertical off-normal contacts 1975 are closed, thereby to complete an obvious circuit for energizing the vertical off-normal relay R1980. Upon operating, the relay R1980, at its contacts 1982, disconnects the resistance battery potential from the control conductor C1904; at its contacts 1981, it prepares a further point in the incomplete circuit for the release magnet 2054; at its contacts 1983, it prepares a point in the incomplete circuit for the vertical transfer relay R2030; and, at its contacts 1984, it interrupts a point in the incomplete circuit for the pickup select relay R2160. The last-mentioned circuit is only completed in the event that the wiper 2186 of the minor switch 2180 is positioned into engagement with the third set of contacts in the bank contact 2187. More specifically, the pickup select relay R2160 operates when the first digit dialed into the connector, i. e., the second digit of the directory number, is the digit "3," and determines that one of the ringing codes in the second set of codes is to be selected by the final digit dialed into the connector.

At the conclusion of the fifth impulse of the digit "5," dialed by the calling subscriber the line relay R1920 and the lock-pulse relay R1910 remain in their operated positions, and the slow-to-release transfer control relay R2130 restores to normal shortly thereafter. Upon restoring, the relay R2130, at its contacts 2131, now completes the circuit for energizing the vertical transfer relay R2030. This circuit extends from the grounded conductor C1959 by way of the contacts 2145, 2131, 2042, 2033, 1933, and 1983, and the winding of the vertical transfer relay R2030, to battery. The relay R2030 operates over this circuit and, at its preliminary make contacts 2031, completes a locking circuit for itself which is independent of its initial energizing circuit and which includes the contacts 1991 and 2145 and the grounded conductor C1959. The relay R2030, upon operating fully, at its contacts 2033, interrupts its initial energizing circuit; at its contacts 2032, it prepares a point in the incomplete circuit for the trunk hunting relay R1990; at its contacts 2035, it interrupts a point in the circuit for the vertical magnet 2046; at its contacts 2034, it prepares the impulsing circuit for the rotary magnet 2015 and the rotary transfer relay R2020; at its contacts 2037, it prepares a point in the circuit for lock-pulse relay R1910; and, at its contacts 2036, it completes a circuit for the minor switch release magnet 2185. The latter circuit may be traced from ground by way of the contacts 2036 and 2053, and the winding of the release magnet 2185, to battery. When this circuit is completed the minor switch release magnet 2185 attracts its associated holding pawl (not shown), thereby to permit the wipers 2181 and 2186 of the minor switch 2180 to be restored in a counterclockwise direction to their illustrated normal positions. Incident to the return of the wipers 2181 and 2186 to normal, the minor switch off-normal contacts 2188 are opened, thereby to interrupt the circuit of the minor switch off-normal relay R2050. The relay R2050 now restores and, at its contacts 2053, interrupts the circuit for the release magnet 2185 which now restores. Furthermore, at its contacts 2052, the relay R2050 interrupts a point in the initial energizing circuit for the relay R2040 but the latter relay remains in its operated position over the locking circuit including the contacts 2041. Finally, at its contacts 2051, the relay R2050 prepares a point in the incomplete circuit for the release magnet 2054 of the connector 1900. Following the operations just described, the connector 1900 is conditioned to respond to the impulses of the fourth digit of the directory number of the called subscriber at substation 2100.

Assuming that the fourth digit dialed by the calling subscriber is the digit "4," the line relay R1920 and the lock-pulse relay R1910 cooperate in the manner previously explained to transmit four current pulses to the rotary magnet 2015 and the transfer relay R2130. Upon the first restoration of the relay R1910 the first pulse is transmitted from ground by way of the contacts 1913, 1955 and 2146, one branch extending to the lower winding of the transfer control relay R2130, and the other branch extending by way of the contacts 2034 and the winding of the rotary magnet 2015 and, in multiple therewith, by way of the contacts 1998 and 2029 to the winding of the rotary transfer relay R2020. The relay R2020 operates as a result of the completion of the above traced circuit and, at its preliminary make contacts 2025, completes a locking circuit for itself which includes the contacts 1991 and 2145 and the grounded conductor C1959. After the above-mentioned locking circuit is completed the relay R2020, at its contacts 2029, interrupts its initial energizing circuit. As a further result of the first pulse the relay R2130 operates and, at its contacts 2132, completes a shunting circuit for its upper winding whereby the relay is rendered slow-to-release and remains in its operated position during pulsing. Furthermore, at its contacts 2131, the relay R2130 interrupts a point in the circuit for the trunk hunting relay R1990, thereby to prevent the operation of the relay R1990 until the relay R2130 restores at the end of the fourth dialed digit. The rotary magnet 2015 operates in response to the first impulse and thereby rotates the wipers 2191 to 2194, inclusive, of the connector 1900 one step into engagement with the first set of contacts in the selected fifth level. Also upon operating, the rotary magnet 2015, at its contacts 2017, completes a point in the circuit whereby the lock-pulse relay R1910 and the line relay R1920 interact with the rotary magnet 2015, in the same manner as these relays interact with the vertical magnet 2046 and the minor switch magnet 2183. In view of the foregoing description it is noted that the rotary transfer relay R2020 operates and locks as a result of the first impulse transmitted to the rotary magnet 2015; the transfer control relay R2130 operates as a result of the first impulse and remains in its operated position during the remaining impulses transmitted to the rotary magnet 2015; and the rotary magnet operates and restores as a result of each impulse transmitted thereto.

Referring again to the rotary transfer relay R2020, it is noted that as a further result of its operation, at its contacts 2021, it interrupts a point in the incomplete circuit for transmitting a busy tone signal to the calling subscriber; at its contacts 2022 and 2023, it transfers the C1 wiper 2193 from the circuit including the winding of the idle test relay R2090 to the circuit including the winding of the busy test relay R2010; at its contacts 2026, it prepares a further point in the circuit for the trunk hunting relay R1990; and, at its contacts 2028, it completes a circuit including the grounded conductor C1959 and the contacts 2145 and 1996 for operating the slow-to-operate trunk hunting relay R1960.

The trunk hunting relay R1960 upon operating, at its contacts 1961, completes a holding circuit for the rotary transfer relay R2020 so that the latter relay will not restore in the event the trunk hunting relay R1990 is subsequently operated.

Each time the rotary magnet 2015 operates over the previously traced impulsing circuit the wipers 2191 to 2194, inclusive, are rotated one step in the rotary direction, so that at the conclusion of the digit "4" the wipers are left in engagement with the contacts terminating the conductors C2195, C2196 and C2197 of the party line 2198 of the called subscriber at substation 2199. Incident to the rotary movement of the wipers, the busy test relay R2010 is operated each time the C1 wiper 2193 engages a contact terminating a private conductor, such as the conductor C2197, of a busy line, but such operation is without effect at this time.

Further operation of the connector 1900 is determined by the idle or busy condition of the called line 2198. In the event the called line is busy the conductor C2197 is marked with ground potential from the line circuit individual thereto and as a result thereof a circuit, including the C1 wiper 2193 and the contacts 2023, is completed for operating the busy test relay R2010. Upon operating, the busy test relay R2010, at its contacts 2011, prepares a point in the incomplete busy tone signaling circuit; at its contacts 2012, it interrupts a further point in the circuit for the idle test relay R2090; at its contacts 2013, it prepares a point in the locking circuit for itself; and, at its contacts 2014, it prepares a point in the circuit for connecting the rotary interrupter relay R1970 to the EC wiper 2194. The latter circuit is completed only in the event a P. B. X group of trunks has been dialed by the calling subscriber and provides automatic rotation of the wipers in order to search for an idle trunk in the group.

Shortly after the last impulse transmitted to the rotary magnet 2015, and after the operation of the busy test relay R2010, the transfer control relay R2130 restores. Upon restoring, the relay R2130, at its contacts 2131, completes a circuit, including the grounded conductor C1959, the contacts 2145, 2131, 2042, 2032 and 2026 for energizing the winding of the trunk hunting relay R1990. The latter relay now operates and, at its contacts 1992, completes a locking circuit for itself including the contacts 2145 and the grounded conductor C1959. Furthermore, at its contacts 1991, the relay R1990 interrupts the locking circuit for the relays R2020, R2030 and R2040. The relays R2030 and R2040 now restore to normal but the rotary transfer relay R2020 is retained in its operated position over the holding circuit including ground at the contacts 1961. Furthermore, at its contacts 1994, the relay R1990 prepares a point in the incomplete circuit for the last digit relay R2140; at its contacts 1996, it interrupts the circuit for the slow-acting relay R1960; and at its contacts 1997 and 1999, it prepares circuits whereby the rotary magnet 2015, the relay R1960 and the relay R1970 interact under control of the circuit including the EC wiper 2194 in the event a P. B. X group of trunks is called.

As a result of the restoration of the vertical transfer relay R2030 and the transfer relay R2040, they recomplete at their contacts 2035 and 2045, the previously traced pulsing circuit for the minor switch magnet 2183, and, at their contacts 2034 and 2044, they interrupt, respectively, the previously traced circuits for controlling the rotary and vertical magnets 2015 and 2046.

The trunk hunting relay R1960, due to its slow-to-release characteristics, is somewhat delayed in restoring to normal after its energizing circuit is interrupted in order to permit the automatic trunk hunting action to take place when a P. B. X trunk is called. In the present example, the call is for a subscriber line, consequently the EC wiper 2194 does not encounter ground potential on the engaged bank contact and the circuit is not completed for the rotary interrupter relay R1970. In view of the foregoing, the relay R1960 restores and, at its contacts 1961, interrupts the holding circuit for the rotary transfer relay R2020 which also restores.

Upon restoring, the rotary transfer relay R2020, at its contacts 2023 and 2024, disconnects the winding of the busy test relay R2010 from ground potential applied to the C1 wiper 2193 and connects the relay R2010, by way of contacts 2024 and 2013, to the grounded conductor C1958, thereby to retain the latter relay in its operated position after the relay R2020 restores. At its contacts 2027, the relay R2020 prepares a point in the incomplete circuit for the last digit relay R2140; and, at its contacts 2021, it completes a circuit for transmitting a busy tone signal to the calling subscriber, which may be traced from the busy tone conductor C1987 by way of the condenser 1986, the contacts 2011 and 2021 and the loop circuit including the calling subscriber line. The busy tone signal serves to inform the calling subscriber that the desired called line is busy and that the connection should be released. In view of the foregoing it should be understood that the busy signal is transmitted when a busy called line is encountered before the final digit of the called number is dialed and that the calling subscriber should release the connection without dialing the final digit into the connector 1900. If the calling subscriber ignores the busy signal and dials the fifth or final digit of the called number, the connector will respond to select the ringing code signal of the called substation and the busy signal will be transmitted thereafter.

When the calling subscriber replaces his receiver upon the switchhook of his telephone instrument the loop circuit, including the windings of the line relay R1920, is interrupted and the relay restores. Following the restoration of the line relay R1920, the lock-pulse relay R1910, the release control relay R1930 and the hold relay R1950 restore in the order named. The relay R1930, at its contacts 1931, removes the holding ground from the conductor C1904, thereby to cause the release of the preceding switching apparatus in the manner previously explained. The relay R1950, at its contacts 1952 and 1954, removes the holding ground from the conductors C1958 and C1959, whereupon the relays locked to these conductors restore and, at its contacts 1951, it completes the circuit, including the contacts 1921, 1951, 1981 and 2051, for operating the release magnet 2054. Operation of the release magnet 2054 withdraws the holding pawl (not shown) thereby to cause the wipers 2191 to 2194, inclusive, of the connector 1900 to return to their normal resting positions. Incident to the restoration of the wipers to normal the vertical off-normal contacts 1975 are opened and the relay R1980 restores. At its contacts 1981, the relay R1980 interrupts the circuit for the release magnet 2054 which also restores and, at its contacts 1982, it connects resistance battery to the conductor C1904 in order to mark the connector 1900 as idle to the selectors having access thereto.

In the event that the called party line is idle when the wiper 2193 of the connector 1900 engages the bank contact terminating the private conductor C2197, battery potential will be applied thereto and the busy test relay R2010 cannot operate. Consequently, when the relay R2130 restores at the end of the fourth digit of the called member, the relay R1990 operates in the manner previously explained. Shortly thereafter the slow-to-release relay R1960 restores and, at its contacts 1961, interrupts the circuit of the rotary transfer relay R2020 which also restores. As a result of the restoration of the relay R2020, at its contacts 2022 and 2023, it disconnects the wiper 2193 from the winding of the busy test relay R2010 and connects it to the winding of the idle test relay R2090. A circuit is now completed from the grounded conductor C1958 by way of the winding of the relay R2090, the contacts 2012 and 2022, the C1 wiper 2193 and battery potential applied to the conductor C2197 from the winding of the cutoff relay (not shown) in the line circuit individual to the called line 2198. The idle test relay R2090 and the cutoff relay operate in series. The cutoff relay clears the called line of attachments, thereby to prevent the operation of a finder-selector link when the called subscriber answers. The idle test relay R2090 upon operating, at its contacts 2091, completes an obvious circuit for operating the switching relay R2150.

The switching relay R2150 upon operating completes, at its contacts 2154, a locking circuit for itself which includes the grounded conductor C1958; at its contacts 2151 and 2152, it prepares a point in the talking and signaling circuit for the called line; and, at its contacts 2153, it applies ground potential by way of the wiper 2193 thereby to mark the called line as busy to all connectors having access thereto and to complete a short circuit around the winding of the idle test relay R2090. The relay R2090 restores shortly thereafter and interrupts, at its contacts 2091, the initial energizing circuit for the relay R2150. Finally, at its contacts 2155, the relay R2150 prepares a point in the circuit for the pickup relay R2170. Following the operation of the switching relay the connector 1900 is in condition to respond to the fifth and final digit of the called number but it should be understood that the fifth digit may be dialed while the above operations of the relays R2090 and R2150 take place.

The fifth digit of the directory number of the called subscriber dialed by the calling subscriber selects the particular ringing code assigned to the called substation 2100 on the party line 2198 and, in the present example, is assumed to be the digit "3." When the impulses constituting the digit "3" are received by the connector 1900, the line and lock-pulse relays R1920 and R1910 function in the manner previously explained to transmit three impulses to the transfer control relay R2130 and the minor switch magnet 2183. The circuit over which the relay and the minor switch magnet are controlled is exactly the same as that previously described in connection with the operation of the connector 1900 in response to the first digit received by the connector, that is, the second digit of the called number. Consequently, the minor switch magnet 2183, at its contacts 2184, and the lock-pulse relay R1910, at its contacts 1913, cooperate in the manner previously described to insure full operation of the minor switch magnet 2183 before the circuit therefor is interrupted by the lock-pulse relay R1910. Each time the minor switch magnet 2183 is operated it steps the wipers 2181 and 2186 of the minor switch 2180 one step in a clockwise direction, and at the end of the third impulse of the digit "3" the wipers 2181 and 2186 stand in engagement with the third contacts in their respective banks 2182 and 2187. Incident to the off-normal movement of these wipers, the minor switch off-normal contacts 2188 are closed in order again to energize the winding of the minor switch off-normal relay R2050. Upon reoperating, the relay R2050 performs substantially the same functions described previously but, at its contacts 2052, instead of preparing a circuit for the relay R2040, it prepares a circuit for the last digit relay R2140 inasmuch as the trunk hunting relay R1990 has opened its contacts 1995 and has closed its contacts 1994.

Shortly after the last impulse of the digit "3" the transfer control relay R2130 restores and, at its contacts 2131, completes a circuit including the grounded conductor C1959, the contacts 2145, 2131, 2043, 2052, 2027 and 1994 for energizing the lower winding of the last digit relay R2140. The relay R2140 upon operating, at its contacts 2143, completes a locking circuit including its upper winding and the grounded conductor C1958. Furthermore, at its contacts 2142, the relay R2140 prepares a point in the incomplete locking circuit for the ring cutoff slave relay R2120; at its contacts 2141, it interrupts a point in the multiple locking circuit for the relay R2160; at its contacts 2145, it opens the locking circuit for the relay R1990 which restores; at its contacts 2144, it completes a multiple locking circuit for the windings of the lock-pulse relay R1910; at its contacts 2146, it interrupts the impulsing circuit for the relay R2130 and the minor switch magnet 2183; and, at its contacts 2147, it completes the circuit for connecting the pickup pulse lead PU—1 or PU—2 from the ringing interrupter 2190 to the pickup relay R2170, depending upon whether or not the relay R2160 is operated.

Since the first digit received by the connector 1900, that is, the second dialed digit, is the digit "2," the wipers 2181 and 2186 of the minor switch 2180 engage the second contacts in the respective banks 2182 and 2187. With the wipers in this position a circuit is not completed for the pickup select relay R2160 and, consequently, the pickup pulse lead PU—1 is connected through to the winding of the pickup relay R2170. If the first digit dialed into the connector 1900 had been the digit "3," the above-mentioned wipers would have been positioned into engagement with the third contacts in the respective banks and a circuit would have been completed for energizing the pickup select relay R2160. This circuit is completed in response to the restoration of the transfer control relay R2130 at the end of the second digit and may be traced from ground by way of the contacts 1954, the conductor C1959, the contacts 2145, 2131 and 1984, the third contacts bridged by the wiper 2186 of the minor switch 2180 and the lower winding of the pickup select relay R2160, to battery. Upon operating, the pickup select relay, at its contacts 2161, completes a locking circuit for itself by way of its upper winding and the multiply connected contacts 2122 and 2141, and the grounded conductor C1958. The pickup select relay R2160, at its contacts 2163, disconnects the pickup pulse lead PU—1 and, at its contacts 2162, connects the pickup pulse lead PU—2 to the circuit including the winding of the pickup relay R2170.

Shortly following the operation of the last digit relay R2140 to perform the functions described above, a ground pulse is transmitted over the pickup pulse lead PU—1 extending from the ringing interrupter 2190 for operating the pickup relay R2170. The circuit for operating the relay R2170 extends from the grounded pickup lead PU—1 by way of the contacts 2163, 2147, 2173, 2125 and 2155, and the winding of the pickup relay R2170, to battery. The ground pulse is applied to the pickup lead PU—1 just prior to the beginning of each of the available ten ringing codes C1 to C10, inclusive, transmitted by the ringing interrupter 2190. On the other hand, if the pickup select relay R2160 is in its energized position the ground pulse transmitted over the pickup lead PU—2 controls the operation of the pickup relay R2170 at a time when the second ten codes C11 to C20, inclusive, are transmitted by the ringing interrupter 2190. When the pickup relay R2170 operates, at its contacts 2174, it completes a locking circuit for itself which includes the grounded hold conductor HOLD. Ground potential is maintained upon the hold lead by the ringing interrupter 2190 during the ringing cycle and at the end of each ringing cycle it removes ground from the hold lead in order to restore the pickup relay R2170. As a further result of the operation of the relay R2170, at its contacts 2171 and 2172, it prepares circuits which respectively include the even and odd numbered contacts in the bank 2182 of the minor switch, and the respective even and odd digit relays R2080 and R2070. Since the final digit dialed into the connector 1900 is the digit "3," the wipers 2181 and 2186 of the minor switch 2180 engage the third contacts in the respective banks. Consequently, the third ringing code C3 is transmitted from the ringing interrupter 2190 by way of the contacts 2172 and 2124 to the winding of the odd digit relay R2070. The odd digit relay R2070 is now operated in accordance with the particular ringing code transmitted over the code conductor C3 by the ringing interrupter 2190.

Upon each operation of the odd digit relay R2070 under control of the ringing interrupter 2190, it completes, at its contacts 2072 and 2075, a circuit for transmitting ringing current over the called party line 2198 extending to the called substation 2100. Accordingly, the ringing current is transmitted over a circuit which may be traced as extending from the ringing current generator (not shown) by way of the conductor GEN., the winding of the ring cutoff relay R2110, the contacts 2072, 2081 and 2151, the wiper 2191 and the engaged contacts in its associated contact bank terminating the negative conductor C2195 to the grounded ringer at substation 2100. At its contacts 2075, the relay R2070 also applies ground potential by way of the contacts 2084 and 2152, the wiper 2192 and the engaged contact in its associated contact bank terminating the positive line conductor C2196, in order to provide a direct current circuit for operating the ring cutoff relay R2110 in the event the called subscriber at substation 2100 answers the call during a ringing period. As a further result of the operation of the relay R2070, at its contacts 2071 and 2074, it disconnects the negative and positive talking conductors C1902 and C1903 from the wipers 2191 and 2192 in order to prevent ringing current from being transmitted over the calling end of the connection. At its contacts 2073, the relay R2070 completes a circuit for transmitting a ring-back tone signal to the calling subscriber in order to indicate that the desired called substation is being signaled. This circuit may be traced from the ringing conductor GEN. by way of the winding of the ring cutoff relay R2110, the contacts 2073, the ring-back tone condenser 2055, and the negative talking conductor C1902 of the connector 1900, and the previously traced circuit extending to the calling subscriber substation. Finally, at its contacts 2076, the relay R2070 completes a circuit for operating the slow-to-operate drain relay R2060. The latter relay remains in its operated position for a short period of time after each restoration of the odd digit relay R2070 in order to discharge the ringing condensers included in the called substation circuits of each of the subscribers on the called party line, thereby to prevent false operation of the back-bridge relay R1940. The previously traced circuit for transmitting ringing current to the called subscriber line is completed each time the relay R2070 is operated, and each time the relay restores it connects the conductors including the called line, by way of the contacts 2071 and 2074, and the contacts 2062 and 2064, to battery and ground respectively. Thus, it will be noted that with the relay R2070 in its restored position and the relay R2060 in its energized position, exchange battery is connected by way of the resistor 2056 to the negative conductor C2195 of the called subscriber line and thus drains any accumulated charge from the line. As a further result of the operation of the drain relay R2060, at its contacts 2065, it prepares a circuit, traced hereinafter, for controlling the ring cutoff slave relay R2120 in the event the called subscriber answers the call during the time ringing current is being applied to the called subscriber line.

In view of the foregoing description of operation of the relay R2070 and the relay R2060, it will be apparent that each time the relay R2070 operates in accordance with the code pulses transmitted thereto from the code conductor C3, ringing current is transmitted to the called subscriber line and each time the relay R2070 restores it interrupts the transmission of ringing current to the called subscriber line. Each time the relay R2060 operates it prepares the circuit for draining the accumulated charge from the called subscriber line upon each restoration of the relay R2070, and upon each restoration of the slow-to-release relay R2060, at its contacts 2061 and 2063, it connects the loop circuit including the called subscriber line to a circuit including the windings of the back-bridge relay R1940. The main purpose for draining the accumulated charge from the called subscriber line at the end of each ringing cycle is to prevent a transient current pulse from causing the premature operation of the back-bridge relay R1940.

Before describing the operation of the connector in response to the answering of a call by the called subscriber, a brief description will now be given of the operation of the connector in the event that the even digit relay R2080 is controlled by the ringing interrupter 2190. It is to be noted that the latter relay is controlled by the ringing interrupter 2190 when the wiper 2181 of the minor switch 2180 engages any one of the even numbered contacts in the bank 2182. By referring to the respective contacts of the relay R2080 it will be readily apparent that the manner in which ringing current is transmitted to the called subscriber line is exactly the same as has been described above in connection with the various operations performed by the relay R2070. The only difference in operation is that the ringing current is transmitted over the positive conductor C2196 instead of over the negative conductor C2195. Thus the grounded ringers connected to the positive line conductor of the called party line will be operated in accordance with the particular code selected by the final digit transmitted to the connector 1900. Regardless of the side of the line selected for transmitting ringing current to a called subscriber line, a portion of the selected ringing current is transmitted to the calling subscriber involved in the connection in order to produce the usual ring-back tone signal in the manner described above.

When the call is answered by the called subscriber at substation 2100 a direct current bridge is established between the negative and positive conductors C2195 and C2196, thereby to provide a direct current circuit for operating either the ring cutoff relay R2110 or the back-bridge relay R1940, depending upon the condition of the relays R2060 and R2070. If the call is answered while ringing currnt is applied to the called line the ring cutoff relay R2110 is operated over a circuit, which may be traced from ground by way of the contacts 2075, 2084 and 2152, the wiper 2192, the positive conductor C2196, the direct current bridge at the called subscriber substation 2100, the negative conductor C2195, the wiper 2191, the contacts 2151, 2081 and 2072, the winding of the ring cutoff relay R2110, and the battery connected ringing current conductor GEN. The ring cutoff relay R2110 operates when the above-traced direct current circuit is completed and, at its contacts 2111, completes a circuit including the grounded conductor C1958 and the contacts 2065 for operating the ring cutoff slave relay R2120. The latter relay, upon operating, at its contacts 2126, completes a locking circuit for itself which includes the contacts 2142 and the grounded conductor C1958. At its contacts 2122, the relay R2120 interrupts the locking circuit for the pickup select relay R2160 which now restores to normal in the event it has been operated; at its contacts 2123 and 2124, it interrupts the previously mentioned circuits for controlling the relays R2080 and R2070; and at its contacts 2125, it interrupts a point in the circuit for the pickup relay R2170. Finally, at its contacts 2121, the ring cutoff slave relay R2120 prepares a circuit whereby a ground pulse transmitted from a timer, such as the timer 750, is applied by way of the conductor 50A and the conductor C1901 to initiate conversation timing in the selector 400. It will be recalled that conversation timing facilities have been omitted from the connector 1900 and it now becomes necessary to time the conversation by means of the conversation timing facilities provided in the selector 400. Accordingly, when the timer applies ground potential to the conductor 50A in the connector 1900, a circuit is completed by way of the contacts 2121, the conductor C1901, the wiper 410 of the selector 400, the contacts 492′, the normal post contacts 407, the upper winding of the timing relay R470 and the contacts 464, to battery. When the above-traced circuit is completed the relay R470 operates and, at its contacts 474, it completes a locking circuit including the contacts 455 and ground potential at the contacts 495′. Further operations of the timing relays R470 and R460 in the selector 400 under control of the timer 750 will be described hereinafter.

When the ring cutoff slave relay R2120 operated it interrupted the circuit of the relay R2070 which now restores to normal. The latter relay, at its contacts 2076, interrupts the circuit for the drain relay R2060. The restoration of the relay R2070, at its contacts 2072 and 2075, interrupts the circuit for the ring cutoff relay R2110 and, at its contacts 2071 and 2074, it prepares points in the previously mentioned circuit for the back-bridge relay R1940. Finally, when the drain relay R2060 restores, at its contacts 2061 and 2063, it completes the circuit for energizing the upper and lower windings of the back-bridge relay R1940. This circuit may be traced from ground by way of the lower winding of the relay R1940, the contacts 2063, 2074, 2084 and 2152, the wiper 2192, the conductor C2196, the direct current loop circuit including the substation 2100, and returning by way of the conductor C2195, the wiper 2191, the contacts 2151, 2081, 2071 and 2061, and the upper winding of the relay R1940, to battery.

Incident to its operation, the relay R1940, at its contacts 1945, completes a locking circuit for the ring cutoff slave relay R2120 which is independent of the initial energizing circuit for the relay and which is also independent of the previously traced locking circuit for the relay. As a further result of the operation of the relay R1940, at its contacts 1941 to 1944, inclusive, it reverses the battery and ground connection including the upper and lower windings of the line relay R1920 on the negative and positive conductors C1902 and C1903 extending to the calling subscriber line. Since the present call originated at a subscriber substation the reversal of the direction of current flow over the calling line has no function to perform in the present call. However, if the call had originated at an operator position the reversal of current would be utilized to give the calling operator the usual answering supervisory signal. Following the operation of the back-bridge relay R1940, the desired conversational connection between the calling subscriber at substation 200 and the called subscriber at substation 2100 is fully completed. In this connection it will be noted that talking battery is supplied to the conductors of the calling subscriber line by way of the windings of the line relay R1920 and talking battery is supplied to the conductors of the called party line by way of the windings of the back-bridge relay R1940.

In the foregoing description of operation of the connector 1900 it was assumed that the transmission of ringing current to the called subscriber line was terminated by the answering of the called subscriber at a time when ringing current was being applied to the line. In the event that the called subscriber answers the call during a silent period in a ringing code signal, that is when the relays R2060 and R2070 are in their restored positions, the direct current bridge completed in response to the called subscriber answering the connection causes the operation of the back-bridge relay R1940. In other words, the ring cutoff relay R2110 is not operated in the event the called subscriber answers during a silent period of the ringing signal. The operation of the relay R1940 now completes, at its contacts 1945, an initial energizing circuit for the ring cutoff slave relay R2120. The latter relay, in turn, prevents the ringing code signal from being reapplied to the called subscriber line by interrupting the energizing circuit for the relay R2070. The conversation between the calling and called subscribers may now take place in the same manner as has been described above.

From the foregoing description of operation of the connector 1900 it is to be noted that when the ring cutoff slave relay R2120 is operated either under control of the ring cutoff relay R2110 or under control of the back-bridge relay R1940, a circuit is prepared at the contacts 2121 whereby the timing relay R470 in the selector 400 may be controlled, in the manner previously described, to permit the conversational timing equipment associated with the selector 400 to forcibly release an established connection in the event the subscribers fail to release within a predetermined elapsed time interval. In this connection attention is directed to the fact that the normal post contacts 407 of the selector 400 are retained in their closed positions each time the wipers of the selector 400 engage the contacts in the associated contact bank terminating a connector of the type illustrated in Figs. 19 to 21, inclusive. With this arrangement the initiation of the operation of the conversational timing apparatus associated with the selector 400 is controlled from the connector 1900 in response to the called subscriber answering the connection.

If the subscribers involved in the connection fail to release within a predetermined elapsed time interval the selector 400 will be controlled by the timer 750 to forcibly release the connection. More specifically, a predetermined elapsed time interval of the relay R470 is operated in the manner previously explained, the cam 754 of the timer 750 momentarily closes its contacts 759, thereby to transmit a momentary ground pulse by way of the conductor 51B and the contacts 475 to the upper winding of the timing disconnect relay R460. Relay R460 operates and, at its contacts 467, it completes a locking circuit for itself which includes its lower winding and the contacts 457. Furthermore, at its contacts 465 and 466, the relay R460 transfers the locking circuit for the relay R470 from ground at contacts 495′ to the grounded conductor 52C extending to the contacts 758 of the timer 750; at its contacts 464, it interrupts a point in the initial energizing circuit for the upper winding of the relay R470; at its contacts 463, it prepares a point in a circuit whereby the relay R440 may be subsequently controlled by the timer 750; and, at its contacts 461 and 462, it transfers the circuit for applying a holding ground potential to the conductor C43 from the grounded wiper 413 to ground at the contacts 497. A predetermined elapsed time interval after the relay R460 is operated, the cam 753 of the timer 750 momentarily interrupts the contacts 758, thereby to remove the holding ground from the conductor 52C and cause the restoration of the relay R472. Upon restoring, the relay R470, at its contacts 471 and 472, transfers the holding ground for the conductor C43 from ground at the contacts 497 to the grounded conductor 53C; at its contacts 473, it prepares a further point in the circuit for controlling the relay R440; and, at its contacts 475, it interrupts a point in the circuit for the relay R460. Shortly after the restoration of the relay R470, the cam 751 of the timer 750 closes the contacts 756 thereby to transmit a momentary ground pulse by way of the conductor 54C and the contacts 473 and 463, for energizing the upper winding of the relay R440. The relay R440 operates momentarily and, at its contacts 441, transmits a warning tone signal by way of the conductor C415, the condenser 445 and the contacts 441 and 493, to the calling and called subscribers, thereby to indicate that the connection is about to be forcibly released. Shortly after the above operation of relay R440, the cam 752 of the timer 750 interrupts its contacts 757 whereupon the holding ground potential is removed from the conductor 53C and the conductor C43. Removal of ground potential from the conductor C43 causes the restoration of the finder 300 and the cutoff relay R275 in the manner previously explained. Furthermore, the release of the finder 300 causes the loop circuit, including the line relay R1920 of the connector 1900, to be interrupted, whereupon the connector and the selector involved in the connection are restored to normal in the manner to be explained hereinafter.

The release of the connection as set up between the calling subscriber at substation 200 and the called subscriber at substation 2100 is entirely under control of the calling subscriber. Thus, if the connection is released at the called substation 2100 prior to its release by the calling subscriber at substation 200, the only resulting operation is the restoration of the back-bridge relay R1940. Although the latter relay, at its contacts 1945, interrupts a point in the circuit for the ring cutoff slave relay R2120, the latter relay remains in its operated position as a result of the previously traced locking circuit including the contacts 2126 and 2142 and the grounded conductor C1958. As a further result of the restoration of the relay R1940, at its contacts 1941 to 1944, inclusive, it again reverses the current flow over the conductors C1901 and C1902 for the purpose of giving disconnect supervision in the event that the call included an operator position. However, in the present case the reversal of current has no function to perform.

When the calling subscriber at substation 200 releases the connection the loop circuit, including the negative and positive conductors C1902 and C1903, is interrupted and thereby causes the line relay R1920 to restore to normal. Upon restoring, the relay R1920, at its contacts 1921, prepares a point in the incomplete circuit for operating the release magnet 2054; at its contacts 1922, it interrupts a point in the multiple holding circuit for the release control relay R1930; and, at its contacts 1924, it interrupts the previously traced locking circuit for the lock-pulse relay R1910 which now restores to normal. When the relay R1910 restores, at its contacts 1911, it interrupts the remaining point in the multiple holding circuit for the relay R1930 which slowly restores to normal, and, at its contacts 1913, it prepares a point in the circuit for controlling the minor switch release magnet 2185. When the release control relay R1930 restores it interrupts, at its contacts 1932, the circuit for the hold relay R1950 which now restores to normal, and, at its contacts 1931, it removes the holding ground potential from the conductor C1904 thereby to cause the selector 400 to restore to normal in the manner previously described. Incident to the restoration of the hold relay R1950, at its contacts 1951, it prepares a further point in the incomplete circuit for the release magnet 2054; at its contacts 1952 and 1954, it removes the holding ground potential from the conductors C1958 and C1959, whereupon the relays that are locked to these conductors now restore to normal; and, finally, at its contacts 1956, it completes a circuit including the contacts 1913 and 2053 for energizing the minor switch release magnet 2185. Upon operating, the minor switch release magnet 2185 causes the wipers 2181 and 2186 of the minor switch 2180 to restore in a counterclockwise direction to their normal resting positions. As soon as the wipers restore to normal, the minor switch off-normal contacts 2188 are opened to interrupt the circuit for the minor switch off-normal relay R2050, which restores to normal. Upon restoring, the relay R2050, at its contacts 2053, interrupts the previously traced energizing circuit for the release magnet 2185 which also restores to normal. As a further result of the restoration of the relay R2050, at its contacts 2051, it completes a circuit, including the contacts 1921, 1951 and 1981, for energizing the release magnet 2054. Upon operating, the release magnet 2054 causes the wipers 2191 to 2194, inclusive, of the connector 1900 to be restored to their normal vertical and rotary positions, in a well-known manner, and as a result thereof the vertical off-normal contacts 1975 are opened and cause the restoration of the vertical off-normal relay R1980. When the relay R1980 restores, at its contacts 1981, it interrupts the energizing circuit for the release magnet 2054 which now restores to normal and, at its contacts 1982, it applies resistance battery potential by way of the resistor 1935 to the conductor C1904 in order to mark the connector 1900 as idle to the selectors having access thereto. The connector 1900 is now fully restored to normal and is available for further use.

Referring now to the selector 400 it is noted that when ground potential is removed from the conductor C1904 in response to the release of the connector 1900, the holding circuit for the switch-through relay R490, which includes the wiper 413 and the contacts 496 and 498, is interrupted whereupon the relay R490 restores to normal. As a further result of the removal of ground potential from the conductor C1904 the holding circuit for the switch-through relay R360 or R370 in the finder 300 is interrupted in the manner previously described. Furthermore, the holding circuit for the cutoff relay R275 in the line circuit 20 individual to the calling subscriber substation is also interrupted. Since the release of the line circuit 20, the finder 300 and the selector 400 has been described hereinbefore it is deemed unnecessary to repeat the description at this point.

In order to describe the manner in which the connector 1900 may be controlled in order to select an idle P. B. X trunk in a group of trunks extending to a P. B. X switchboard, it will be assumed that the calling subscriber at substation 200 has extended a connection to the connector 1900, in the same manner as has been described above. The calling subscriber may now dial the second digit of the directory number of the P. B. X trunk group, whereupon the minor switch 2180 is operated in the manner previously described, to determine whether the ringing signal to be transmitted over the selected P. B. X trunk will be in the first group of codes C1 to C10, inclusive, or in the second group of codes C11 to C20, inclusive, in the manner previously described. In response to the third digit dialed by the calling subscriber the vertical magnet 2046 is controlled in the manner previously described to elevate the wipers 2191 to 2194, inclusive, to a level terminating the group of trunks extending to the P. B. X switchboard. At the end of the vertical movement of the wipers the vertical transfer relay R2030 is operated in the manner previously described and transfers the impulsing circuit to the rotary magnet 2015, at its contacts 2034, and, at its contacts 2036, it controls the minor switch release magnet 2185 in order to restore the wipers 2181 and 2186 of the minor switch 2180 to their normal positions. If the next digit of the directory number of the P. B. X trunk group is the digit "1" the rotary magnet 2015 is controlled in the manner previously described, thereby to rotate the wipers 2191 to 2194, inclusive, into engagement with the contacts terminating the first trunk in the associated P. B. X trunk group. In order to control automatic roof relays for preselecting an idle one of said finders, a plurality of conductors multiply connected to all of said finders and to said allotter, a single pair of conductors individual to each of said finders, means controlled by each of said relays for connecting said individual conductors of a preselected finder to said allotter, means in a preselected finder controlled over one of said individual conductors for associating said finder with said allotter via said multiply connected conductors, means in said preselected finder controlled over said multiply connected conductors from said allotter for controlling the operation of said finder to find and connect with a calling one of said lines, and means in said allotter controlled over the other of said individual conductors for controlling a relay in said chain to test the idle condition of the next finder in said group and for disconnecting said individual conductors of said preselected finder from said allotter.

8. In an automatic telephone system, a group of lines, a group of finders having access to said lines, an allotter, a relay in said allotter for each finder in said group for preselecting its associated finder, means responsive to the initiation of a call on one of said lines for controlling said allotter to operate the first of said relays, means responsive to the operation of said first relay for associating the first finder in said group with said allotter and for controlling said first finder to find said calling line, means in said allotter responsive to said finder finding said line for operating the second of said relays to preselect the second finder in said group, means in said allotter operated in the event said second finder fails to find a second calling line in response to a call thereon for reoperating said first of said relays to preselect said first finder in said group in the event said first finder is idle and for releasing said second relay and its associated second finder, means in said allotter controlled in the event said first finder is idle for controlling the same to search for said second calling line, and means in said allotter operated in the event said first finder fails to find said second calling line for preventing further operation of said allotter to preselect additional finders in said group of finders.

9. In an automatic telephone system, a group of lines, a group of finders having access to said lines, an allotter, a relay in said allotter for each finder in said group for preselecting its associated finder, mean responsive to the initiation of a call on one of said lines for controlling said allotter to operate the first of said relays, means responsive to the operation of said first relay for associating the first finder in said group with said allotter and for controlling said first finder to find said calling line, means in said allotter responsive to said finder finding said line for operating the second of said relays to preselect the second finder in said group, means in said allotter operated in the event said second finder fails to find a second calling line in response to a call thereon for reoperating said first of said relays to preselect said first finder in said group in the event said first finder is idle and for releasing said second relay and its associated second finder, means in said allotter controlled in the event said first finder is idle for controlling the same to search for said second calling line, means in said allotter controlled in the event said first finder is busy when said second finder fails to find said second calling line for reoperating said second relay and for causing said second finder to search for said second calling line a second time, and means in said allotter operated in the event said second calling line is not found when a second attempt is made to find the same for preventing further operation of said preselecting relays.

10. In an automatic telephone system, a group of lines, a group of finders having access to said lines, an allotter, a chain of relays corresponding in number to the number of finders in said group for preselecting idle ones of said finders, means in said allotter operated responsive to the initiation of a call on one of said lines for causing the preselected finder to search for said calling line, means in said allotter operated in the event said preselected finder fails to find said calling line for causing the first relay in said chain to preselect the first finder in said group in the event the same is idle and for causing said first finder to search for said calling line, and means in said allotter operated in the event said calling line is not found when a second attempt is made to find the same for preventing preselection of an additional finder in said group of finders.

11. In an automatic telephone system, a group of lines, a group of finders having access to said lines, an allotter, a relay individual to each finder for preselecting said finders in consecutive order, means in said allotter responsive to the initiation of a call on one of said lines for controlling a preselected one of said finders to search for said calling line, means controlled each time a preselected finder finds a calling line for causing the next succeeding relay to preselect the next succeeding finder in said group, means controlled when the last finder in said group finds a calling line for causing the first of said relays to preselect the first finder in said group in the event the same is idle, means operated in the event any one of the preselected finders in said group fails to find a calling line for causing the first of said relays to select the first finder in said group in the event the same is idle and for controlling said first finder to search for said calling line, and means in said allotter controlled only in the event said calling line has not been found after a second attempt is made to find the same for preventing any other finder in said group from searching for said calling line.

12. In a telephone system, a group of subscriber lines, a group of finders having access to said lines, an allotter, a plurality of relays connected in a sequentially operating chain for testing the finders in said group to preselect an idle one thereof, means in said allotter operated responsive to a call for controlling the preselected finder to find said calling line, means in said allotter operated responsive to said finder finding said calling line for normally controlling said relays to successively test the succeeding finders in said group in a definite order until the next idle finder is preselected, and means controlled in the event any selected finder fails to find a calling one of said lines for preventing said relays from successively testing the said succeeding finders and for arbitrarily causing the first relay in said chain to preselect the first finder in the said group in the event the same is idle and for controlling the same to make a second search for said calling line, and means for locking said allotter out of service in the event said first finder in said group fails to find said calling line.

13. In an automatic telephone system which includes a plurality of finders each operative, when assigned for use, to find and seize a calling line of the system, relays individual to said finders and each operative to assign the associated finder for use, means comprising a relay common to said individual assigning relays and energized in series with any one of said individual assigning relays for controlling said assigning relays to cyclically operate in a definite order as the assigned finders are taken for use by calling lines, and means controlled in the event that any assigned finder fails to find a calling one of said lines for restoring any operated assigning relay and said common relay, and means controlled responsive to the restoration of said common relay for controlling the first assigning relay to assign the first finder in said group for use and for controlling the said assigned first finder to find said last-mentioned calling line.

14. In a telephone system which includes a plurality of finders each operative, when assigned for use, to seize a calling line of the system and which also includes equipment common to said finders for controlling the operation of each finder to seize a calling line, selecting relays individual to said finders and operative in sequence to test said finders until an idle finder is found each time a previously selected finder has seized a calling line, a common relay, a circuit for energizing said common relay, said selecting relays each being operated to complete a locking circuit for itself in series with said common relay circuit each time an idler finder is found, means controlled each time a selected finder seizes a calling line for operating the next succeeding selecting relay and for locking the same in series with said common relay if the finder individual to the said next selecting relay is idle, means operated in the event a selected finder fails to seize a calling line within a predetermined time interval for interrupting said series circuit thereby to restore said common relay and the locked selecting relay, and means responsive to the restoration of said common relay for causing the sequential operation of said selecting relays to start with the select relay individual to the first finder in said group.

15. In an automatic telephone system, a group of lines, a group of finders, an allotter common to said finders for preselecting said finders for use, means responsive to a call on one of said lines for causing said allotter to control said preselected finder to search for said calling line, two sets of wipers for said finder, a test circuit for each wiper set, each test circuit including a wiper in its associated wiper set and a test relay in said allotter, means for operating one of said allotter test relays over one of said test circuits when said calling line is found, and means controlled by the operated one of said test relays for switching-through the said calling line to said finder over the corresponding one of said wiper sets.

16. In an automatic telephone system, a group of finders, each of said finders having two sets of wipers, a first group of lines terminating in bank contacts accessible to one set of said wipers and another group of lines terminating in bank contacts accessible to the other set of said wipers, an allotter for assigning an idle finder for the use of a calling line, means responsive to a call on a line in either one of said groups for starting the operation of said assigned finder to find said calling line, a test wiper for each set of wipers whereby bank contacts terminating lines in said first and second groups accessible thereto are simultaneously tested as said finder operates to find said calling line, means in said allotter operated over a circuit including the test wiper engaging the bank contact terminating said calling line for stopping the finding operation of said finder, and means in said finder controlled by said last-mentioned means for connecting the said calling line through to said finder over the set of wipers including the test wiper in engagement with said calling line.

17. In a telephone system, two groups of lines, a finder switch, two sets of wipers for said switch, each set of wipers having access to different groups of lines, a pair of talking conductors in said switch normally disconnected from said wipers, a pair of switch-through relays in said switch, an allotter, means in said allotter operated responsive to a call initiated over any one of said lines for causing said finder to search for said calling line, means in said allotter controlled over one of the wipers of the set when said calling line is found for terminating the searching operation of said finder, means in said allotter controlled by the last-named means for operating one of said switch-through relays, and means controlled by the said operated switch-through relay for connecting said talking conductors only to the set of wipers engaging the said calling line.

18. In an automatic telephone system, two groups of lines, a finder, two sets of wipers for said finder, each set of wipers having access to a different one of said groups of lines, an allotter associated with said finder, means in said allotter operated responsive to the initiation of a call on one of said lines for initiating the operation of said finder to find said calling line, two test relays in said allotter, a first test circuit for one of said relays including a wiper in one of said sets, a second test circuit for the second of said relays including a wiper in the other set, means individual to the calling line for completing one of said test circuits when the wiper in one of said sets finds said calling line, a first and a second switching relay in said finder, means controlled by the operated one of said test relays for operating the one of said switching relays corresponding to the group of lines including the calling line, and means controlled by the operated switching relay for connecting said calling line to said finder via the set of wipers corresponding to the group of lines including the calling line.

CLARENCE E. LOMAX.

REFERENCES CITED

The following references are of record in the file of this patent:

UNITED STATES PATENTS

| Number | Name | Date |
|---|---|---|
| 1,578,420 | Gardner | Mar. 30, 1926 |
| 1,762,700 | Saunders | June 10, 1930 |
| 1,849,694 | Saunders | Mar. 15, 1932 |
| 2,005,595 | Roome | June 18, 1935 |
| 2,115,320 | Saunders | Apr. 26, 1938 |
| 2,133,415 | Baker | Oct. 18, 1938 |
| 2,135,921 | Saunders | Nov. 8, 1938 |
| 2,200,803 | Muller | May 14, 1940 |
| 2,214,256 | Peterson | Sept. 10, 1940 |
| 2,291,496 | Newstedt | July 28, 1942 |